Figure 1:
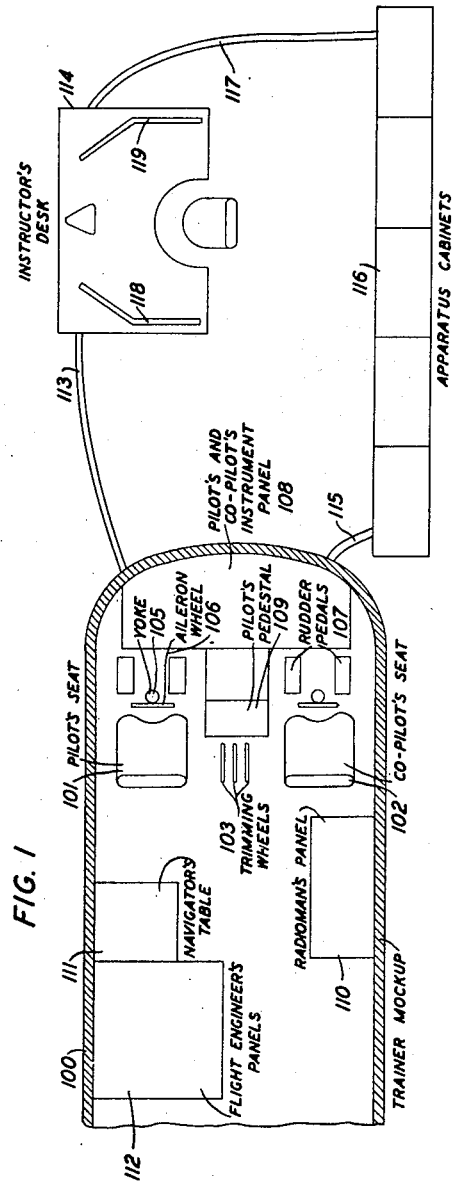
Figure 2:
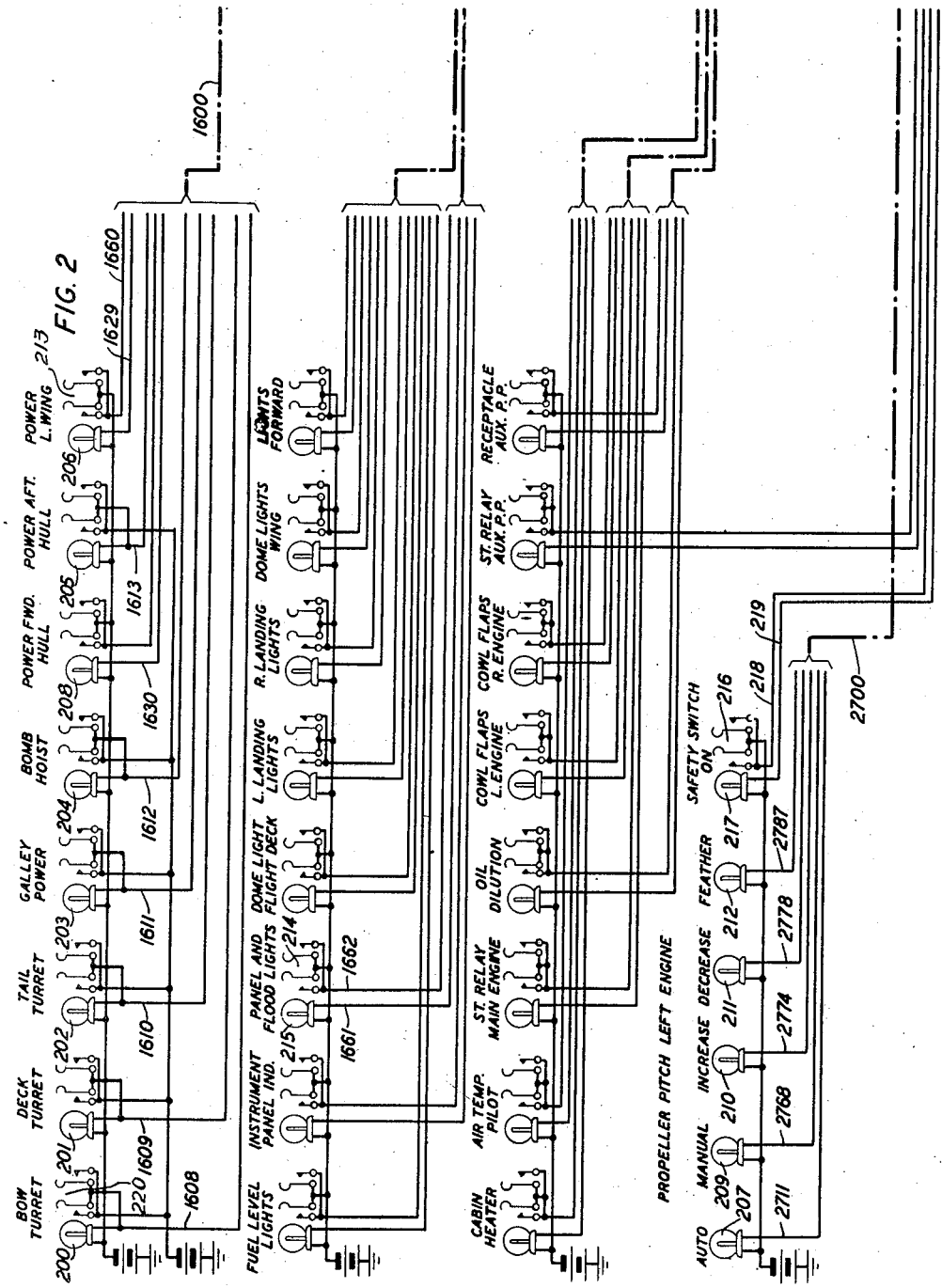
Figure 3:
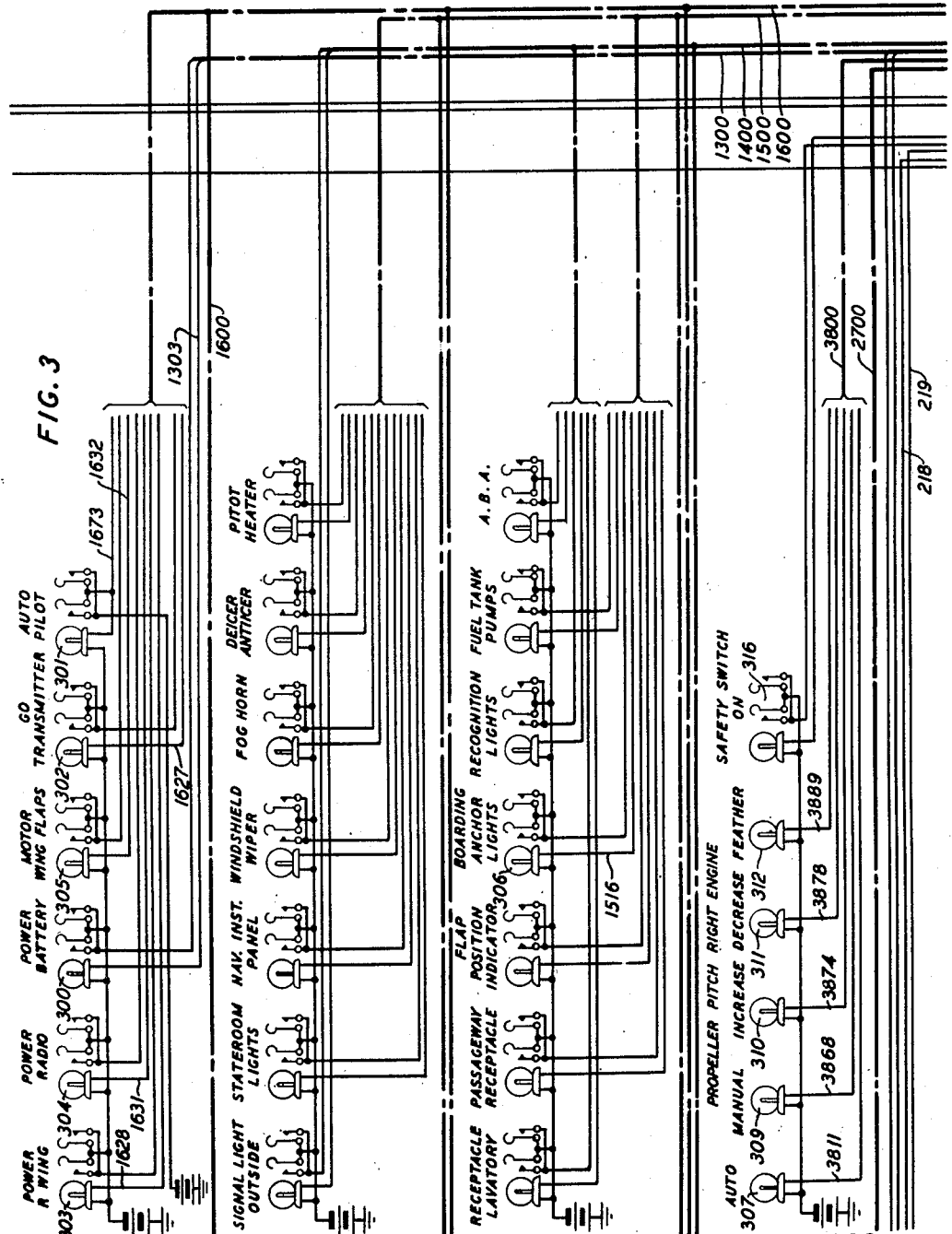

Dec. 12, 1950   J. J. LUKACS ET AL   2,533,484
TRAINER FOR AIRCRAFT PERSONNEL
Filed June 30, 1944   40 Sheets-Sheet 1

INVENTORS J.J. LUKACS
           W.B. STRICKLER
BY
   P.C. Smith
           ATTORNEY Dec. 12, 1950     J. J. LUKACS ET AL     2,533,484
TRAINER FOR AIRCRAFT PERSONNEL
Filed June 30, 1944     40 Sheets-Sheet 8

FIG. 8

INVENTORS    J. J. LUKACS
               W. B. STRICKLER
BY P. C. Smith

ATTORNEY

Dec. 12, 1950     J. J. LUKACS ET AL     2,533,484
TRAINER FOR AIRCRAFT PERSONNEL
Filed June 30, 1944     40 Sheets-Sheet 14

INVENTORS J.J. LUKACS
W.B. STRICKLER
BY
P.C. Smith
ATTORNEY

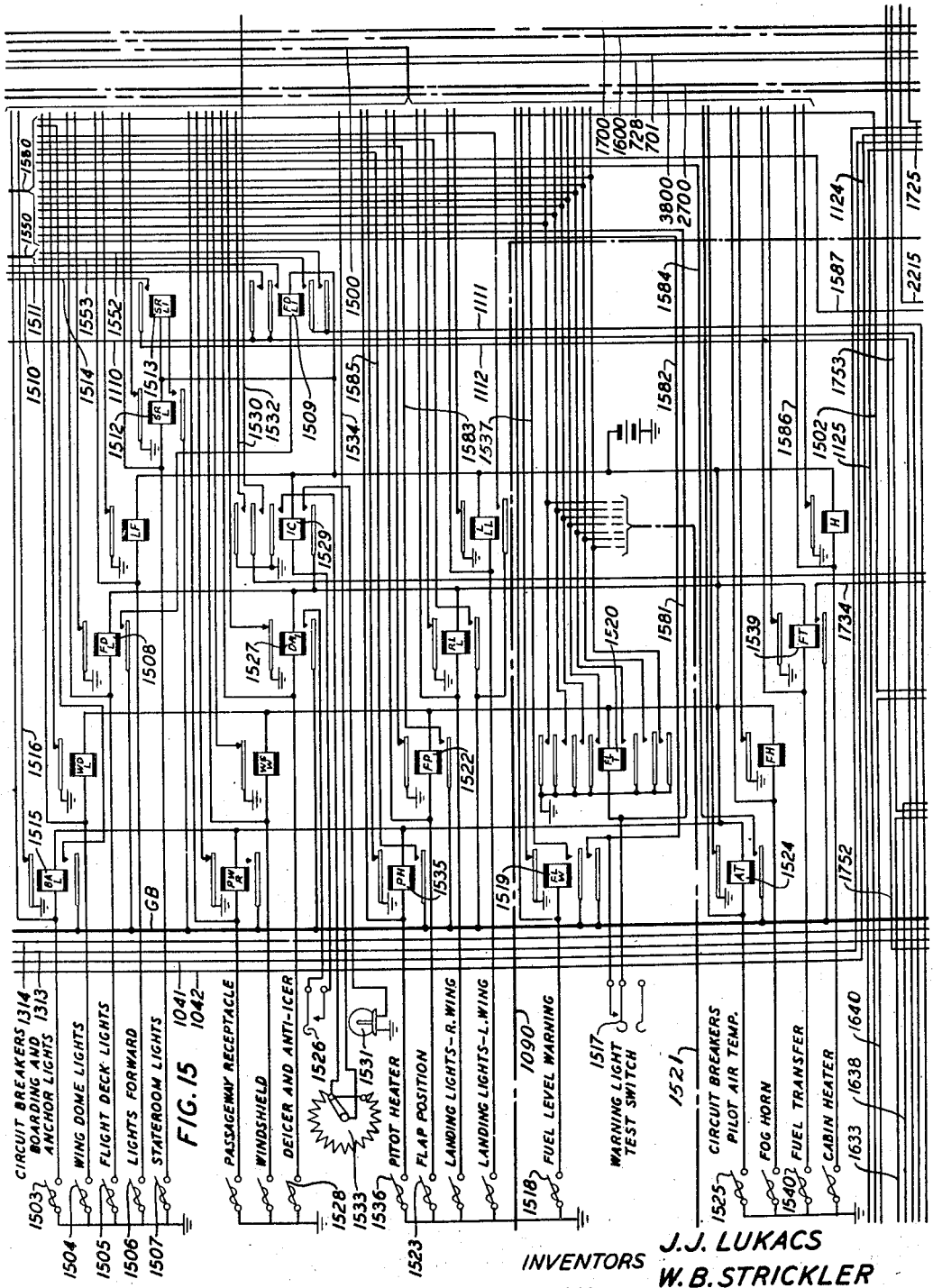

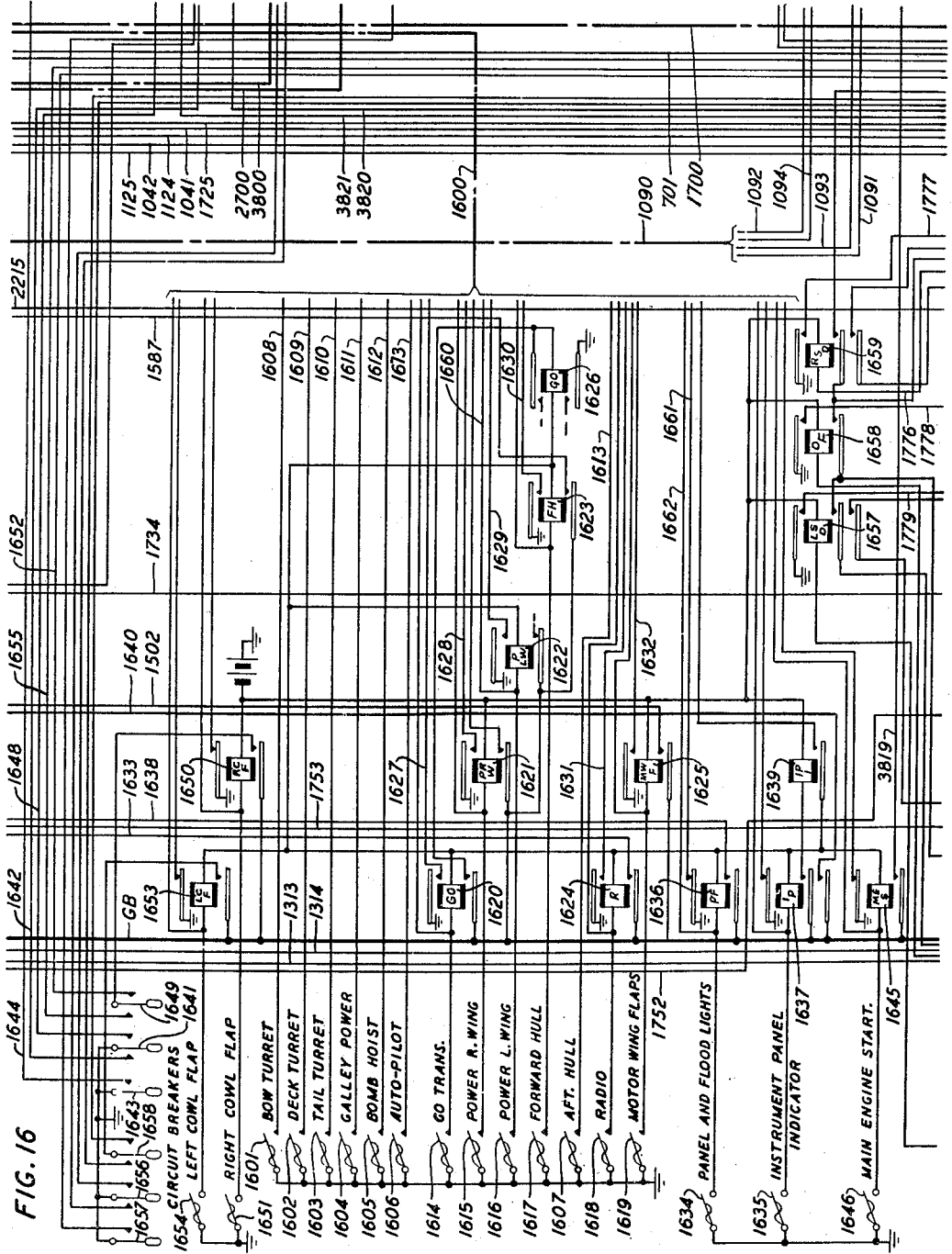

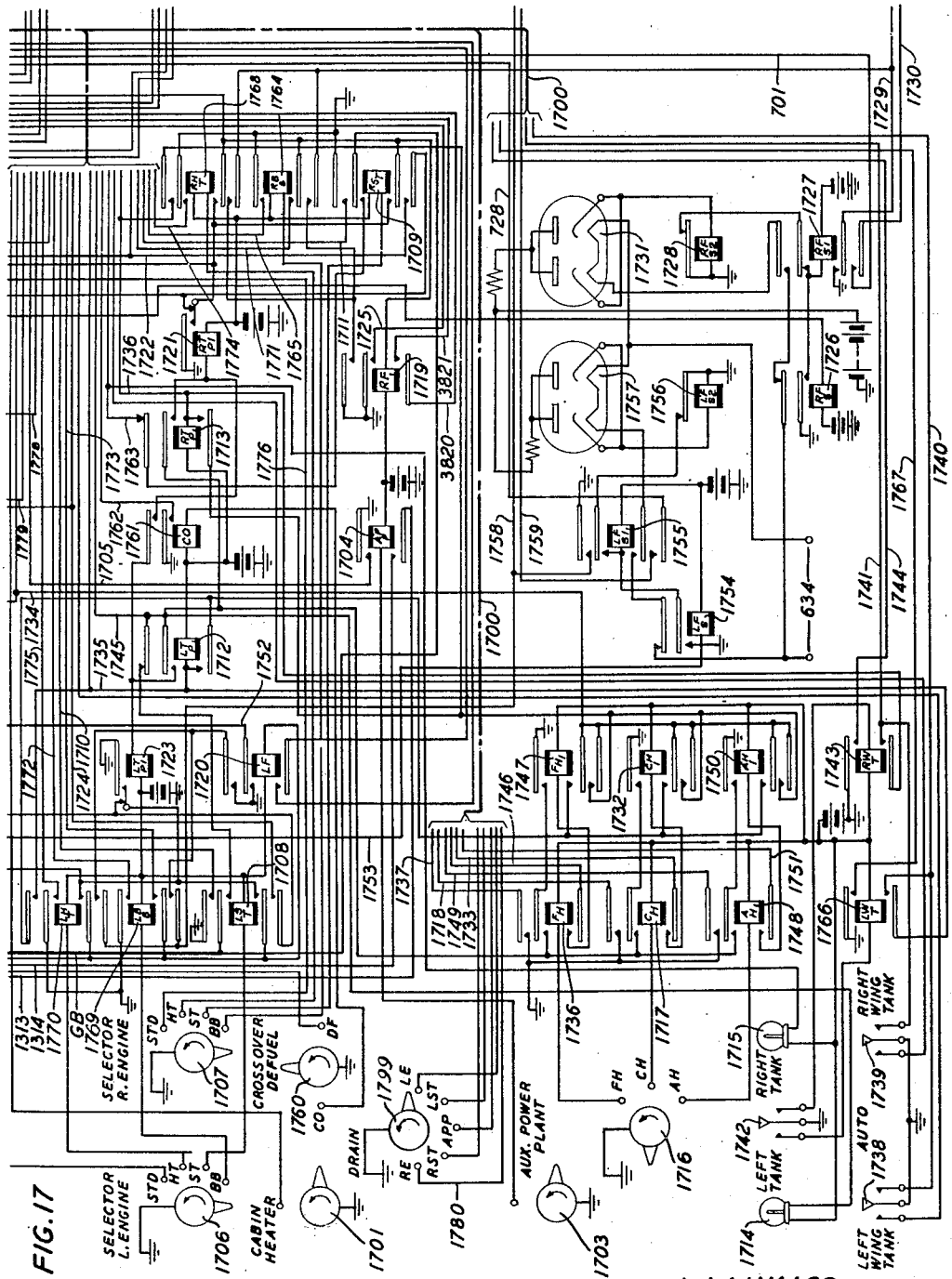

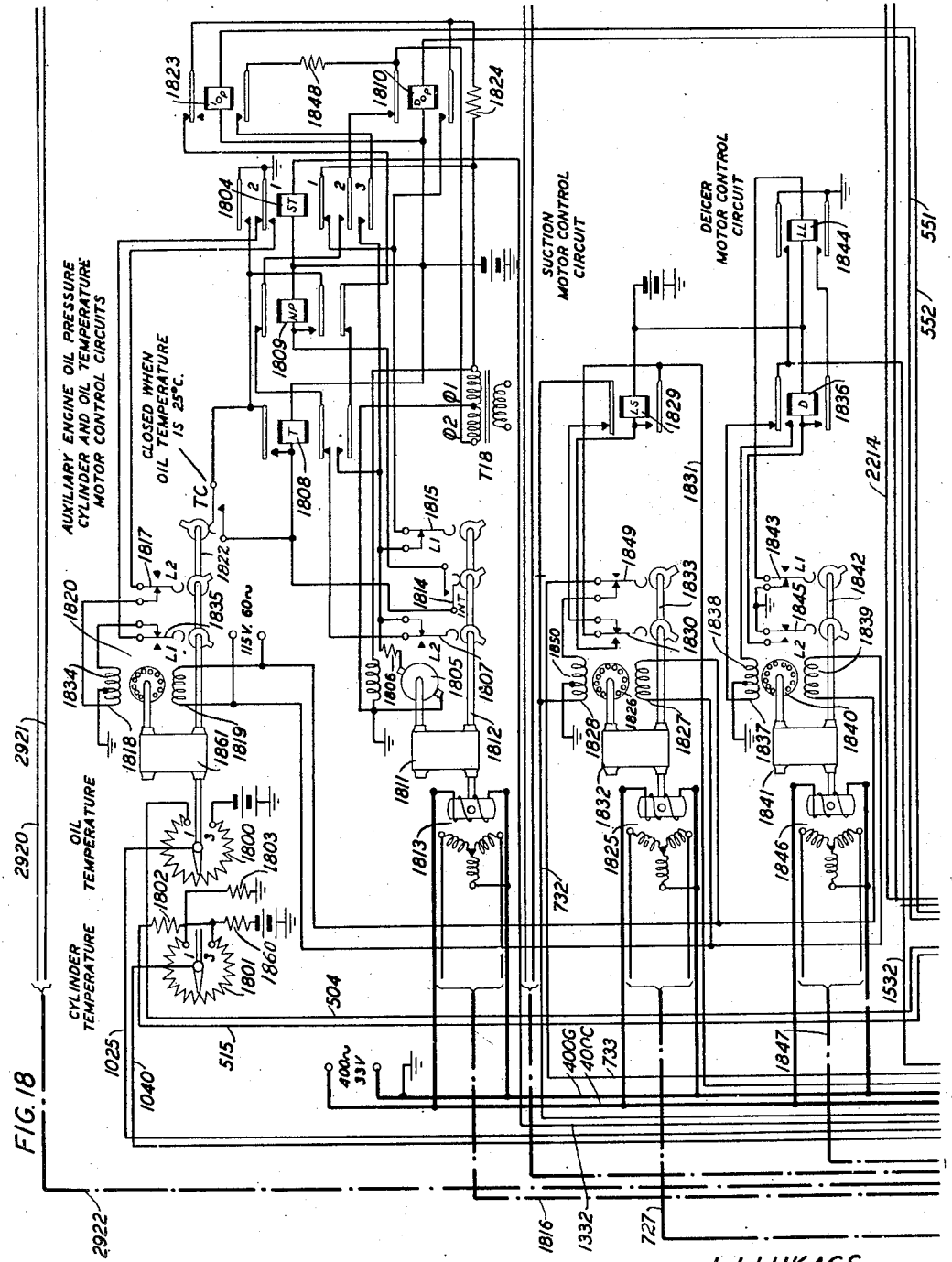

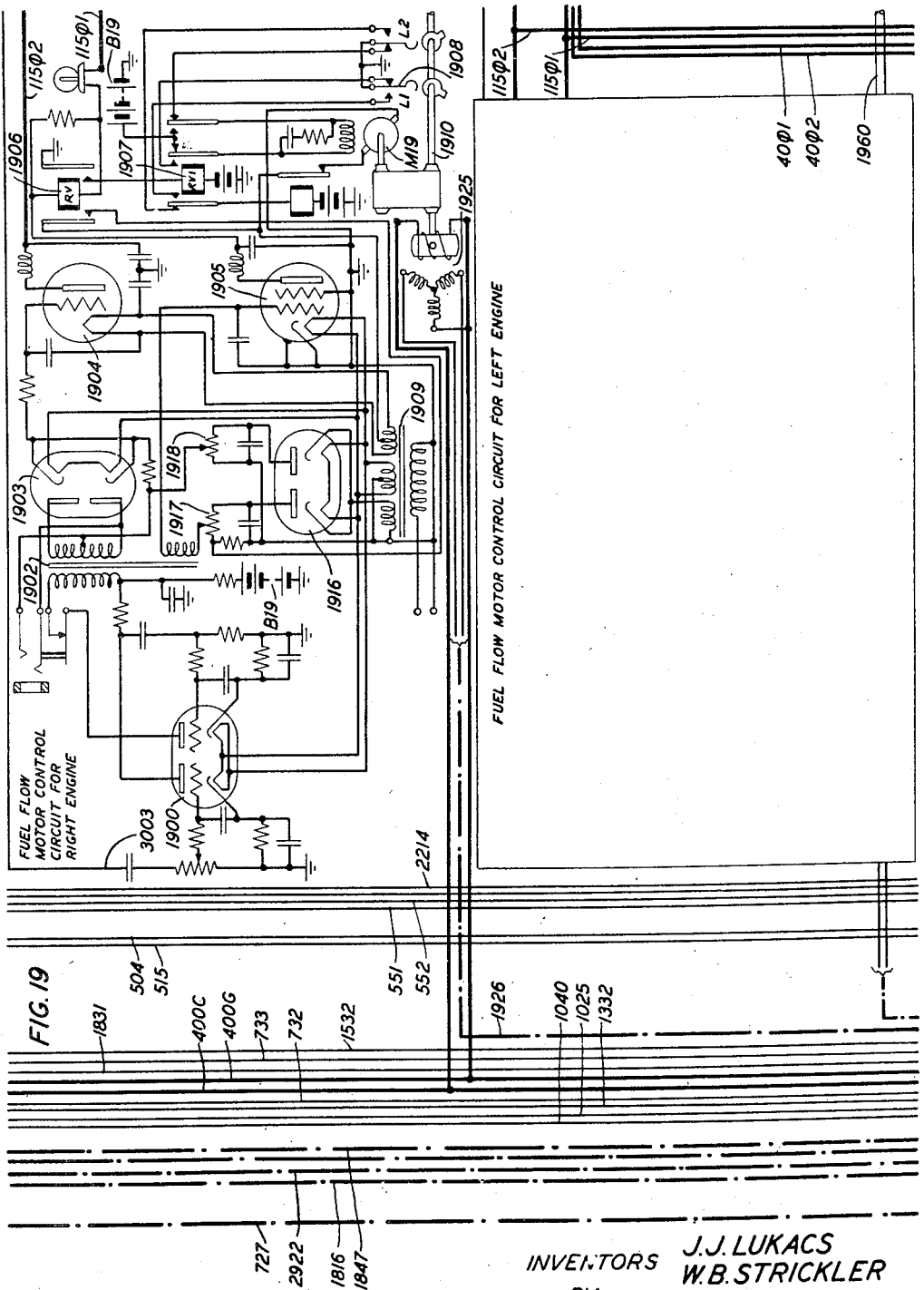

Dec. 12, 1950   J. J. LUKACS ET AL   2,533,484
TRAINER FOR AIRCRAFT PERSONNEL
Filed June 30, 1944   40 Sheets-Sheet 20

INVENTORS
J. J. LUKACS
W. B. STRICKLER
BY
P. C. Smith
ATTORNEY

Dec. 12, 1950   J. J. LUKACS ET AL   2,533,484
TRAINER FOR AIRCRAFT PERSONNEL
Filed June 30, 1944   40 Sheets-Sheet 24

FIG. 24
BRAKE MEAN EFFECTIVE PRESSURE MOTOR CONTROL CIRCUIT

THRUST HORSEPOWER MOTOR CONTROL CIRCUIT

INVENTORS   J.J. LUKACS
             W.B. STRICKLER
BY
P. C. Smith
ATTORNEY

Dec. 12, 1950  J. J. LUKACS ET AL  2,533,484
TRAINER FOR AIRCRAFT PERSONNEL
Filed June 30, 1944  40 Sheets-Sheet 32

INVENTORS J.J.LUKACS
W.B.STRICKLER
BY P.C. Smith
ATTORNEY

Dec. 12, 1950 J. J. LUKACS ET AL 2,533,484
TRAINER FOR AIRCRAFT PERSONNEL
Filed June 30, 1944 40 Sheets-Sheet 34

INVENTORS J.J. LUKACS
W.B. STRICKLER
BY P. C. Smith
ATTORNEY

Dec. 12, 1950　　　　　　J. J. LUKACS ET AL　　　　　　2,533,484
TRAINER FOR AIRCRAFT PERSONNEL
Filed June 30, 1944　　　　　　　　　　　　　　40 Sheets-Sheet 38

INVENTORS J. J. LUKACS
W. B. STRICKLER
BY
P. C. Smith
ATTORNEY

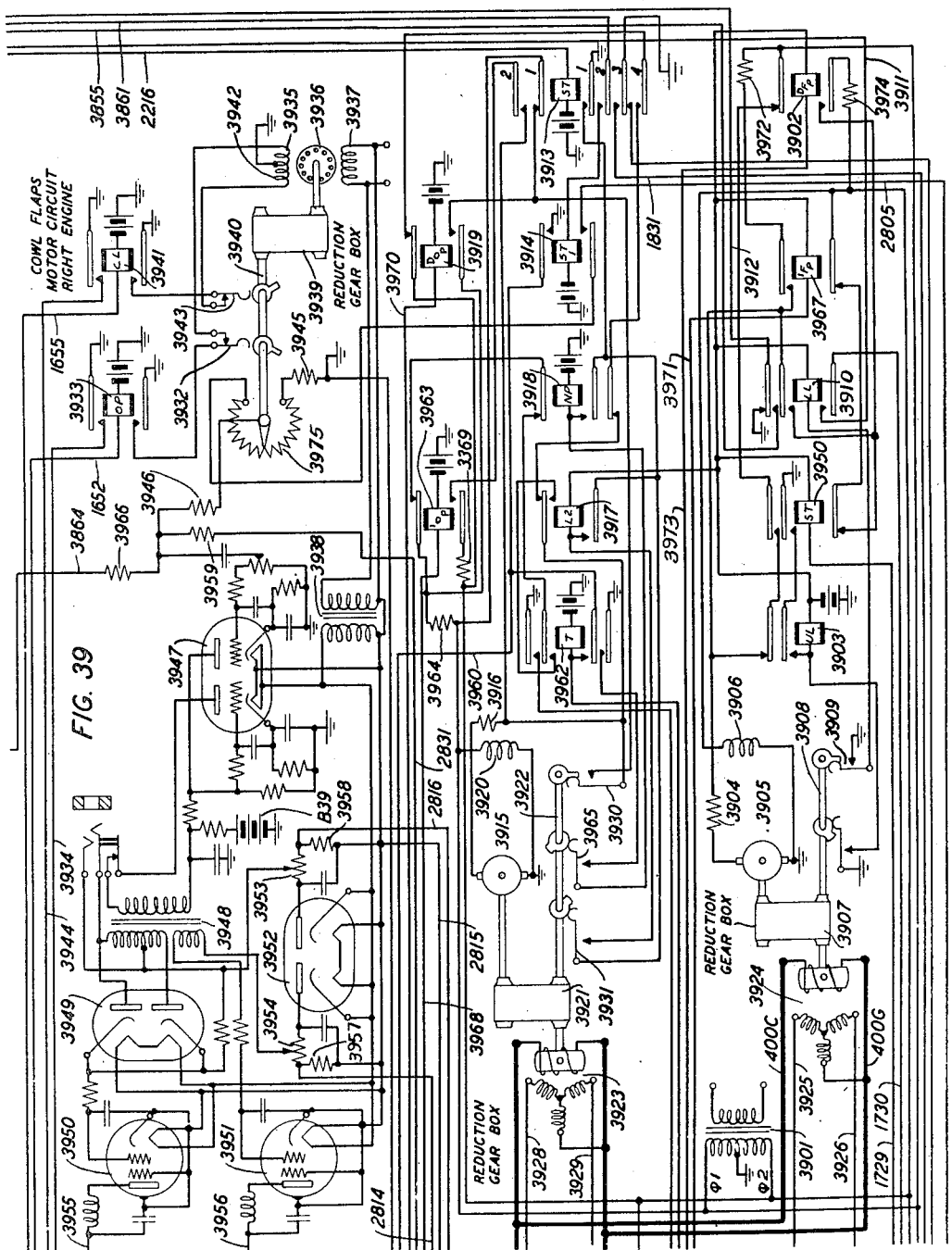

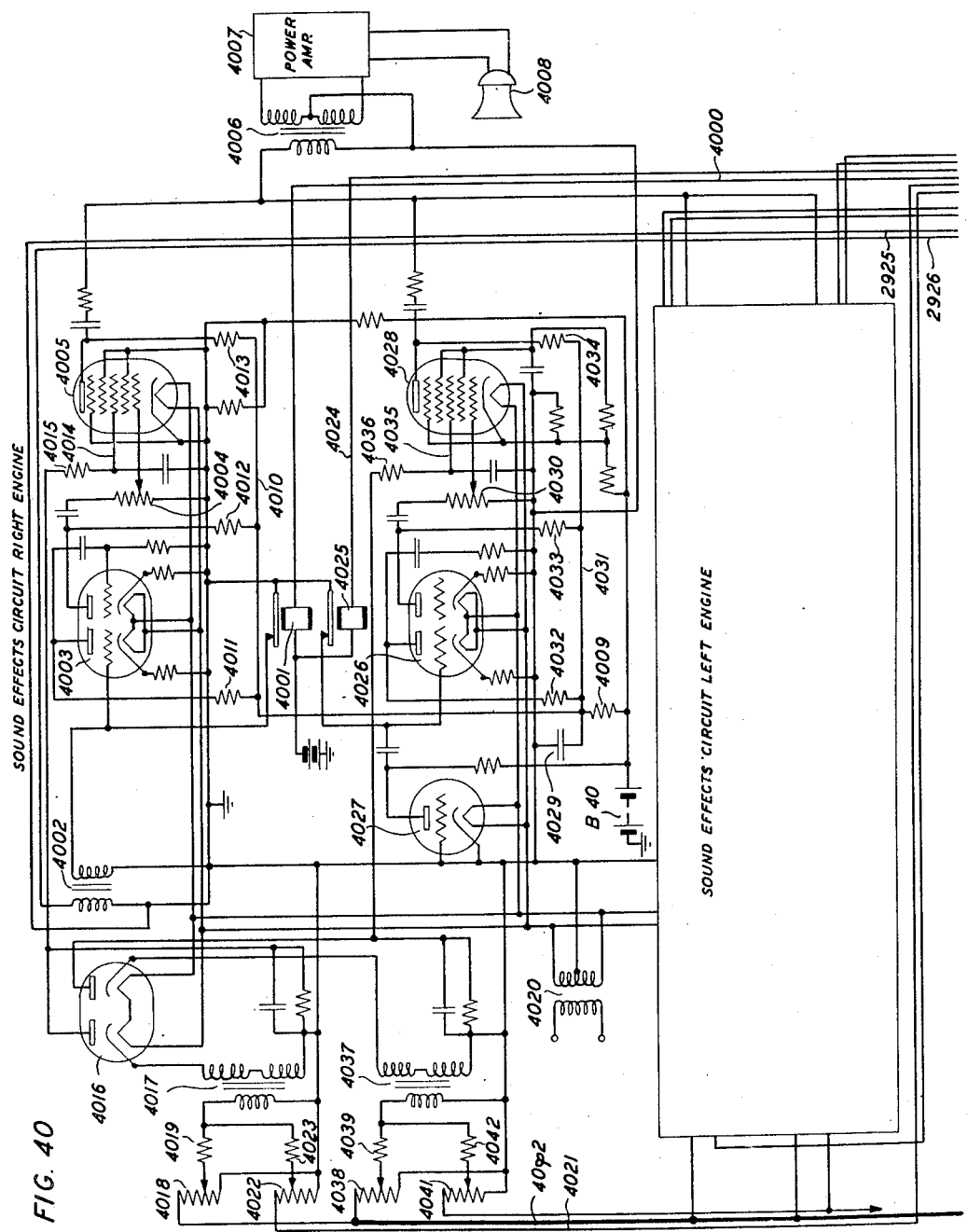

UNITED STATES PATENT OFFICE 2,533,484

TRAINER FOR AIRCRAFT PERSONNEL

Joseph J. Lukacs, New Rochelle, N. Y., and Walter B. Strickler, East Orange, N. J., assignors to Bell Telephone Laboratories, Incorporated, New York, N. Y., a corporation of New York Application June 30, 1944, Serial No. 542,846

82 Claims. (Cl. 35—12)

This invention relates to an aircraft trainer in which the operation of controls similar to those of a standard aircraft by the pilot, copilot, navigator or flight engineer causes the operation of instruments on the pilots', navigator's and engineer's instrument panels and of instruments at an instructor's desk to simulate the instrument operations of an actual aircraft in flight whereby an aircraft crew may be given ground training to enable the crew members to coordinate their efforts to insure efficient aircraft operation under actual flying conditions in a regular aircraft.

In the training of aircraft personnel it has been the practice heretofore to give pilots basic training in aircraft of the trainer type and to give flight engineers and navigators ground training with the actual equipment of aircraft. Following such basic training it has been the practice to form crews from such basically trained personnel and to give such crews coordinated training in the flight of actual aircraft which they will later be assigned to fly in combat duty.

The larger aircraft, particularly multiengined bomber airplanes, are costly to build, to fly and to maintain and the use of such airplanes for extended training purposes with crews who may have had little or no experience in their operation introduces a great hazard both to the equipment and to the operating personnel during the training period and obviously withdraws such airplanes from their more valuable use in actual combat service.

Since the members of the crew have all had basic training in flying and in the operation of equipment of airplanes, the actual flying hours in the type of airplane which they will ultimately be assigned to fly may be materially reduced through the use of a ground trainer designed to simulate all of the flight and operational functions of the type of airplane to which they will later be assigned. After coordinated training in such a ground trainer the crew training may be completed within a comparatively few hours of flying in an actual airplane.

In the application of R. C. Davis, E. J. Fogarty and R. O. Rippere, Serial No. 542,986, filed concurrently herewith, a ground trainer has been disclosed in which an airplane crew may be trained to perform all of the flight and operational functions which would be required to actually fly and operate an airplane which the trainer is designed to simulate. That application is more particularly directed to the flight functions performed by either the pilot or copilot under the direction of an instructor and under flight and operating conditions imposed by the instructor.

It is an object of the present invention to provide a ground trainer in which the airplane crew and particularly the pilots and the flight engineer may be trained to perform all operational functions concerning the equipment of an airplane which would be required to actually control the equipment of an airplane which the trainer is designed to simulate.

It is a further object of the invention to provide a ground trainer which simulates in every detail the operational controls, exclusive of the actual flight controls, of an actual airplane whereby the crew personnel under training therein may under controls exercised by an instructor be subjected to any conditions of equipment operation which might later be experienced in the operation of a similar aircraft.

One feature of the invention is the provision of an engine control circuit which is responsive to ignition, start and carburetor mixture controls at a flight engineer's station of the trainer, to ignition and propeller pitch controls accessible to the pilots and to propeller governor and throttle controls accessible to both the pilots and the flight engineer to simulate the starting and control of a main engine of the airplane which the trainer is designed to simulate. A similar engine control circuit and controls therefor at the pilots' and flight engineer's stations is provided for each main engine.

Another feature of the invention is the provision of a manifold pressure circuit for each simulated engine which is responsive to the engine control circuit of the corresponding simulated engine, to the R. P. M. circuit corresponding to the same simulated engine, to the altimeter circuit of the trainer, to supercharger blower speed controls at the flight engineer's station, to throttle controls accessible to the pilots' and flight engineer's stations and to a control at the instructor's desk, which manifold pressure circuit is instrumental in controlling an associated manifold pressure motor control circuit to control other control circuits of the trainer and to control the operation of the manifold pressure indicators on the pilots', flight engineer's and instructor's instrument panels.

A further feature of the invention is the provision of an R. P. M. circuit for each simulated engine which is responsive to the control circuit of the corresponding simulated engine, to the manifold pressure circuit corresponding to the same simulated engine and to the propeller governor controls accessible to the pilots' and flight engineer's stations, which R. P. M. circuit is instrumental in controlling an associated R. P. M. motor control circuit to control other control circuits of the trainer including a tachometer motor control circuit for operating tachometers on the pilots', flight engineer's and instructor's instrument panels and a sound effects circuit which simulates the explosion noises of an aircraft engine.

A further feature of the invention is the provision of a fuel flow circuit for each simulated engine which is responsive to the control circuit of the corresponding simulated engine, to the manifold pressure, R. P. M. and engine fuel pressure circuits corresponding to the same simulated engine and to the altimeter circuit of the trainer, which fuel flow circuit is instrumental in controlling an associated fuel flow motor control circuit to control the operation of fuel flow indicators on the flight engineer's and instructor's instrument panels.

A further feature of the invention is the provision of a V/ND circuit for each simulated engine which is responsive to the R. P. M. circuit corresponding to the same simulated engine and to the true air speed circuit of the trainer, which V/ND circuit is instrumental in controlling an associated V/ND motor control circuit to control the operation of other control circuits of the trainer.

A further feature of the invention is the provision of a brake horse-power circuit for each simulated engine which is responsive to the engine control circuit of the corresponding simulated engine, to the manifold pressure and R. P. M. circuits corresponding to the same simulated engine and to the altimeter circuit of the trainer, which brake horse-power circuit is instrumental in controlling an associated brake horse-power motor control circuit to control the operation of other control circuits of the trainer.

A further feature of the invention is the provision of an R. P. M. memory circuit for each simulated engine which is responsive to the control circuit of the corresponding simulated engine, to the manifold pressure and propeller pitch circuits corresponding to the same simulated engine and to the true air speed circuit of the trainer, which R. P. M. memory circuit is instrumental in controlling an associated R. P. M. memory motor control circuit to control the operation of the R. P. M. motor control circuit appertaining to the corresponding simulated engine.

A further feature of the invention is the provision of a propeller pitch circuit for each simulated engine which is responsive to the engine control circuit of the corresponding simulated engine and to the V/ND circuit corresponding to the same simulated engine, which propeller pitch circuit is instrumental in controlling an associated propeller pitch motor control circuit to control the operation of other control circuits of the trainer.

A further feature of the invention is the provision of a brake mean effective pressure circuit for one of the simulated engines which is responsive to the brake horse-power and R. P. M. circuits of the corresponding simulated engine, which brake mean effective pressure circuit is instrumental in controlling an associated brake mean effective pressure motor control circuit to control the operation of brake mean effective pressure indicators on the flight engineer's and instructor's instrument panels.

A further feature of the invention is the provision of a thrust horse-power circuit common to both simulated engines which is responsive to the brake horse-power, V/ND and propeller pitch circuits relating to both simulated engines and to the engine control circuits of both simulated engines, which thrust horse-power circuit is instrumental in controlling an associated thrust horse-power motor control circuit to control the operation of other control circuits of the trainer.

A further feature of the invention is the provision of an engine fuel pressure motor circuit for each simulated engine which is responsive to the control of the engine control circuit of the corresponding simulated engine, to fuel supply controls for the corresponding engine at the flight engineer's station, to the R. P. M. circuit of the corresponding simulated engine and to controls at the instructor's desk for controlling the operation of engine fuel pressure indicators on the flight engineer's and instructor's instrument panels.

A further feature of the invention is the provision of an engine cowl flaps motor circuit for each simulated engine which is responsive to controls at the flight engineer's station and at the instructor's desk for controlling the engine cylinder and oil temperature motor control circuit of the corresponding simulated engine.

A further feature of the invention is the provision of an engine oil pressure motor circuit for each simulated engine which is responsive to control from the engine control, engine cylinder and oil temperature and the R. P. M. circuits of the corresponding simulated engine and to controls at the instructor's desk for controlling the engine cylinder and oil temperature motor control circuit of the corresponding simulated engine and for controlling the operation of engine oil pressure indicators on the flight engineer's and instructor's instrument panels.

A further feature of the invention is the provision of an engine cylinder and oil temperature motor circuit for each simulated engine which is responsive to the cowl flaps motor circuit and engine control circuit for the corresponding simulated engine and to controls at the instructor's desk for controlling the engine oil pressure motor circuit of the corresponding simulated engine and for controlling the operation of engine cylinder and oil temperature indicators on the flight engineer's and instructor's instrument panels.

A further feature of the invention is the provision of an engine oil pressure motor circuit for a simulated auxiliary engine responsive to control from the flight engineer's station, to control through the operation of the cylinder and oil temperature motor circuit for the auxiliary engine and to control from the instructor's desk for controlling the operation of the cylinder and oil temperature motor control circuit for the auxiliary engine and for controlling the operation of auxiliary engine oil pressure indicators on the flight engineer's and instructor's instrument panels.

A further feature of the invention is the provision of an engine cylinder and oil temperature motor circuit for a simulated auxiliary engine responsive to control from the auxiliary engine oil pressure circuit for controlling the operation of the auxiliary engine oil pressure circuit and for controlling the operation of auxiliary engine cylinder and oil temperature indicators on the flight engineer's and instructor's instrument panels.

A further feature of the invention is the provision of a suction motor circuit for simulating the functioning of the suction pump and responsive to control from the main engine oil pressure motor circuits and from the instructor's desk to control the operation of suction indicators on the pilots' and instructor's instrument panels.

A further feature of the invention is the provision of a deicer motor circuit for simulating the operation of the deicing equipment of an airplane responsive to control from the flight engineer's station for controlling the operation of deicer pressure indicators on the flight engineer's and instructor's instrument panels.

A further feature of the invention is the provision of equipment on the flight engineer's fuel trunk panel for simulating the operation of the fuel transfer valves and fuel transfer pumps of an airplane together with equipment at the instructor's desk for simulating the depletion of fuel in each fuel tank of the aircraft which is being simulated; the provision of equipment on the flight engineer's power control panel for simulating the operation of the controls and meters relating to the supply of electric power to the various parts of the simulated airplane and the provision of control equipment at the instructor's desk for simulating trouble conditions which might be encountered in the operation of an actual aircraft and signal equipment for indicating to the instructor the operations of the controls exercised by the pilots and flight engineer in the normal operation of an airplane or in response to the trouble conditions imposed by the instructor.

Figure 9:
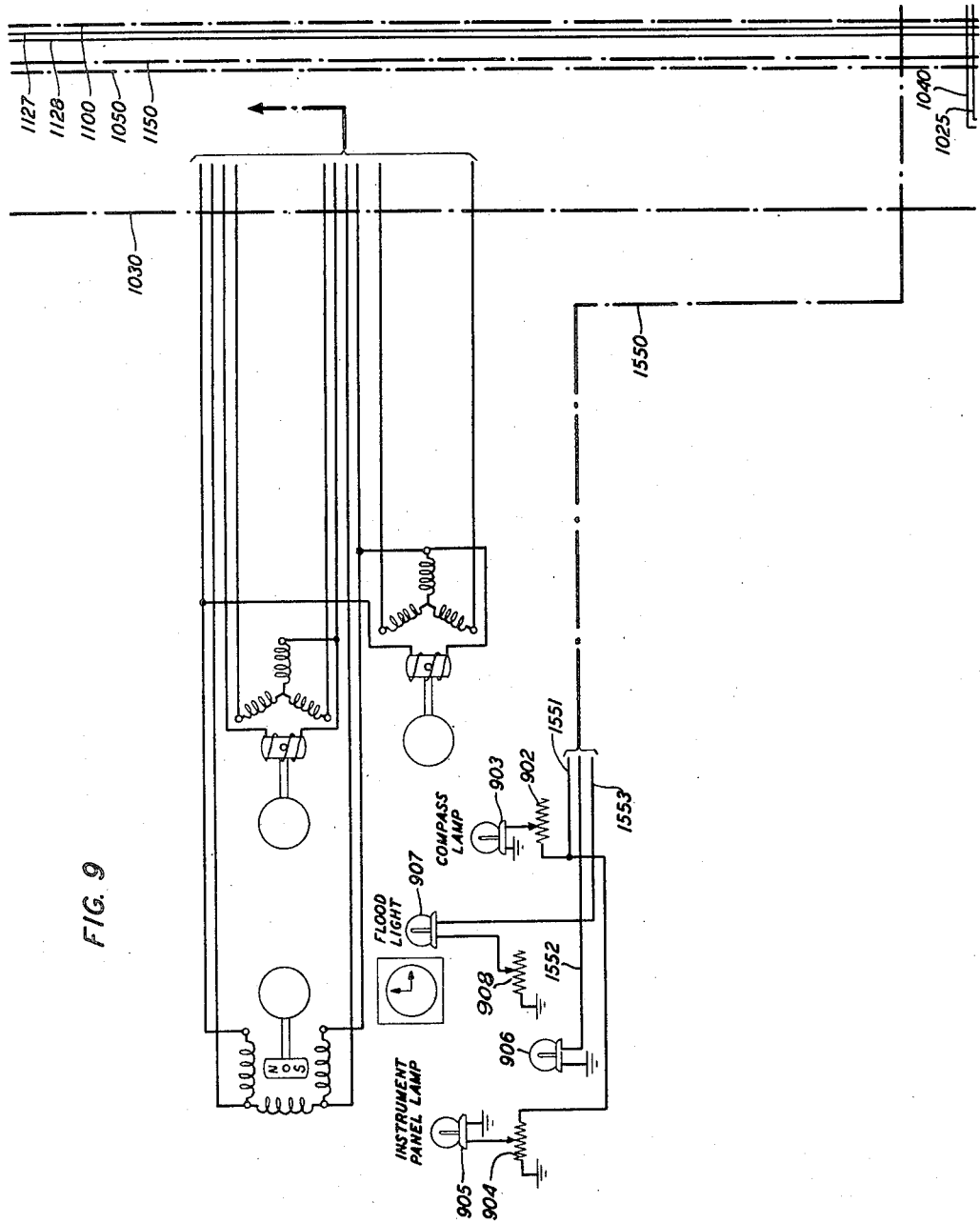
Figure 12:
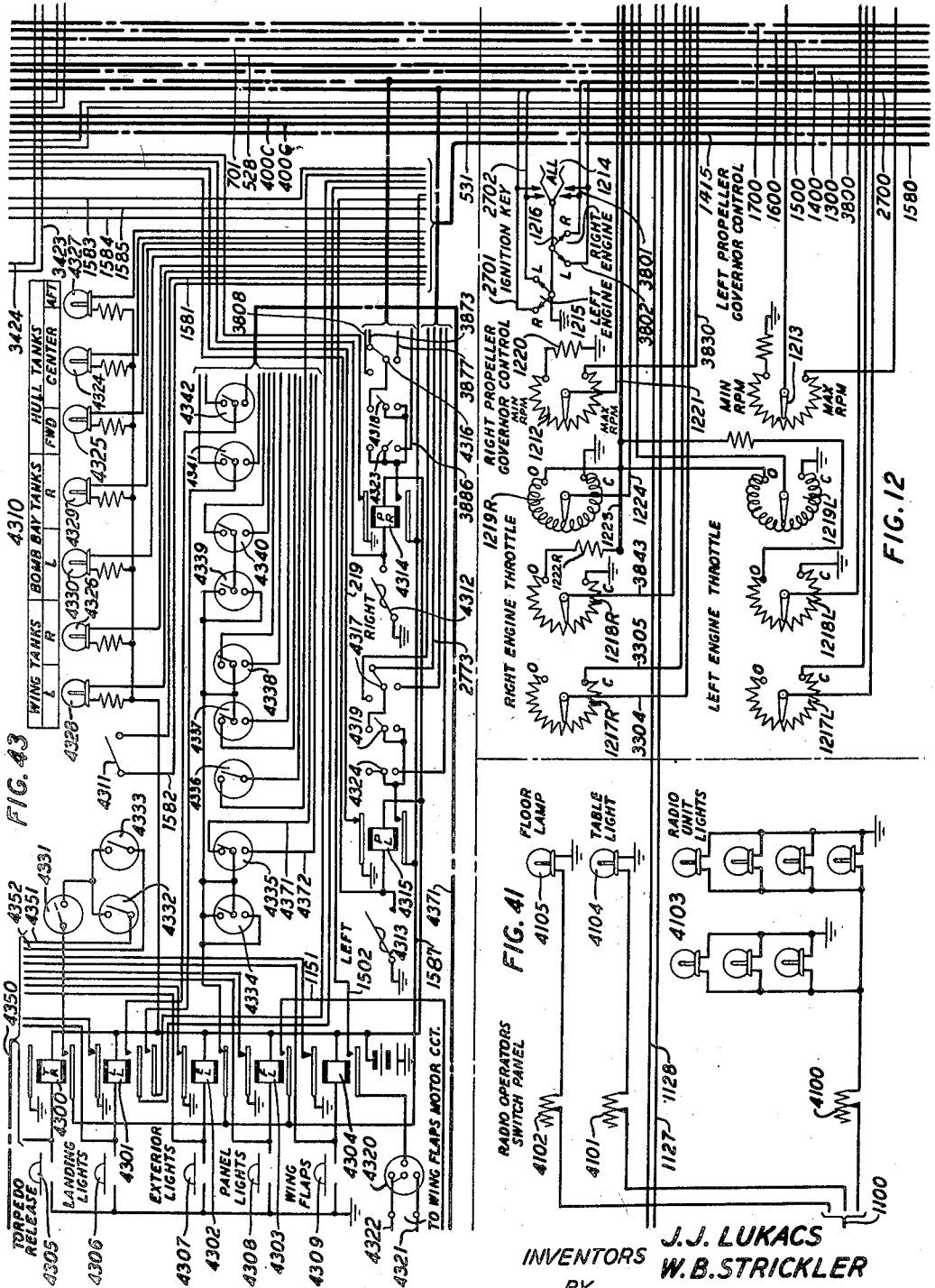
Figure 20:
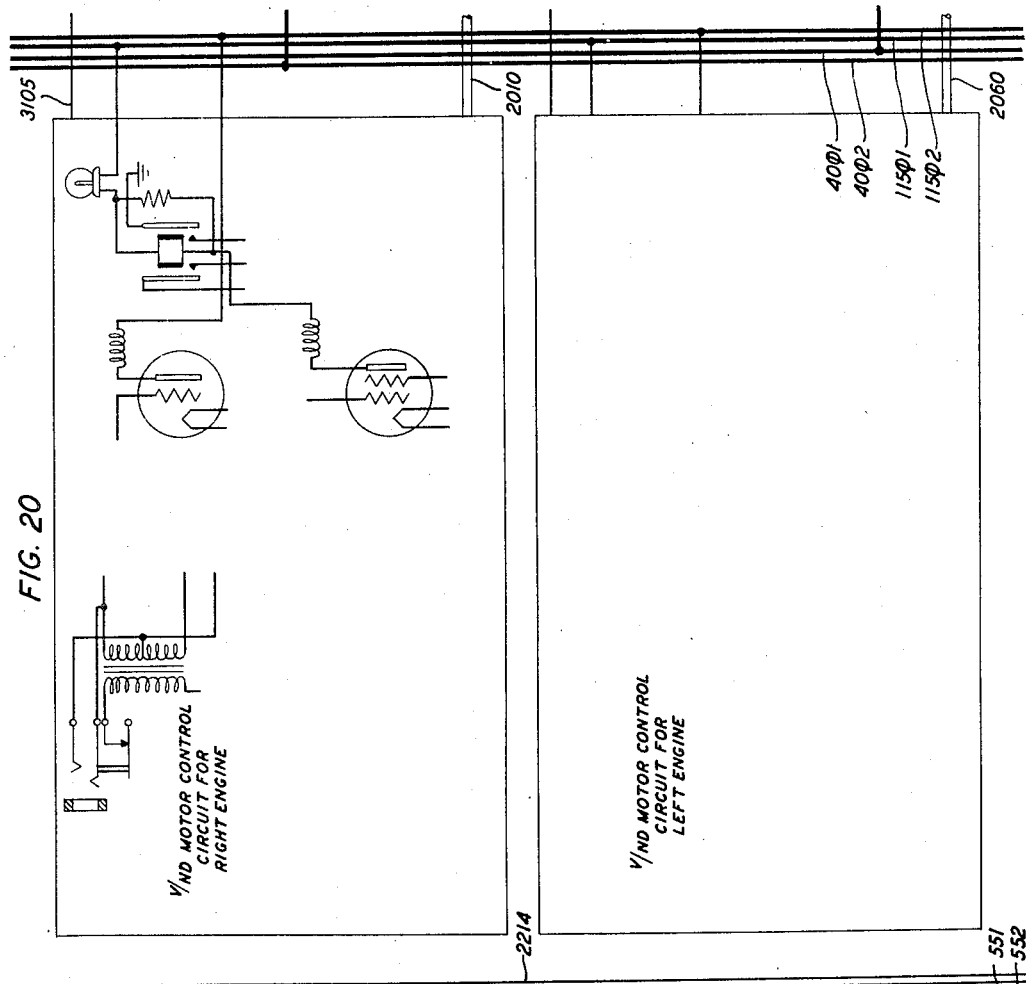
Figure 21:
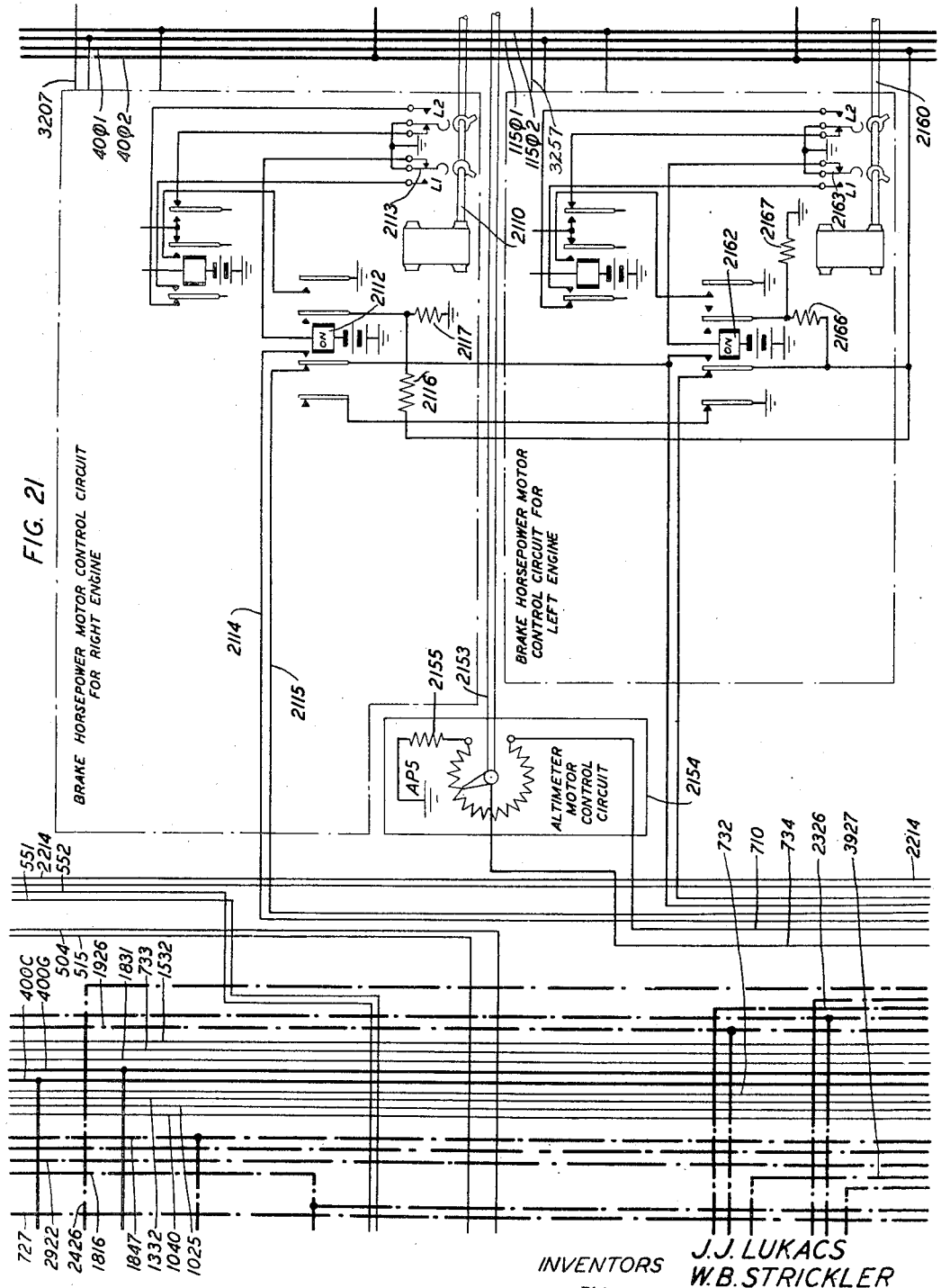
Figure 22:
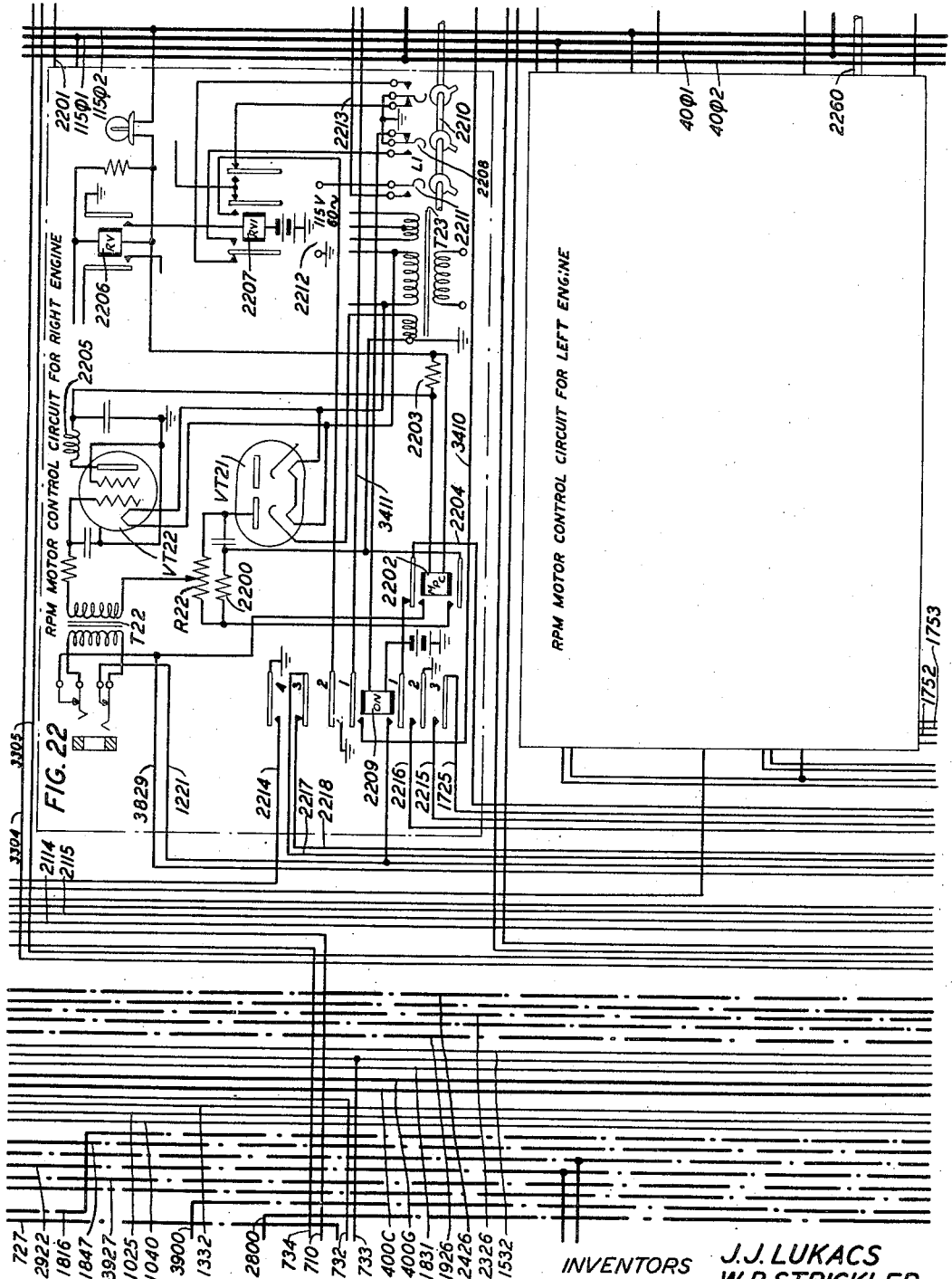
Figure 23:
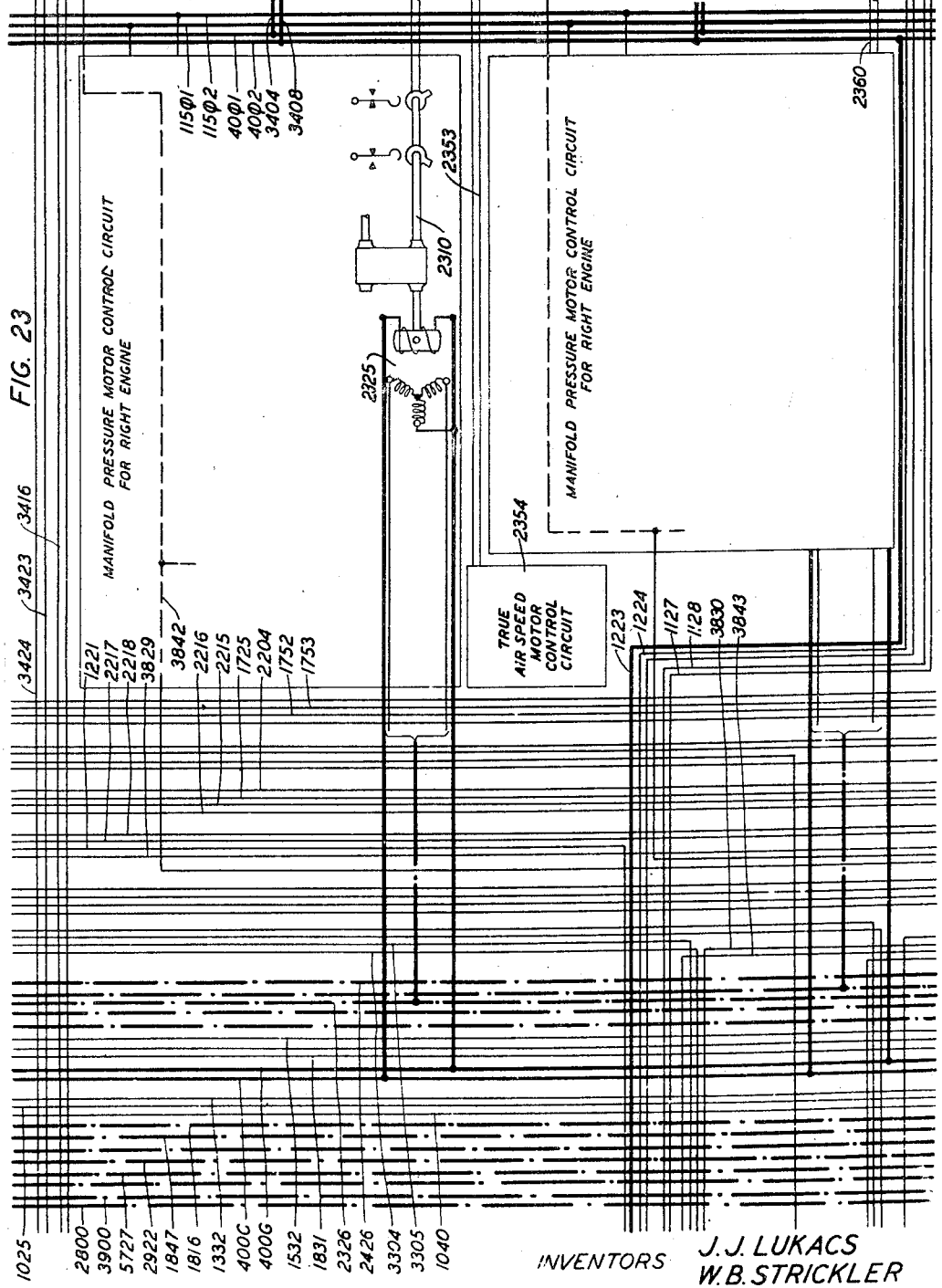
Figure 25:
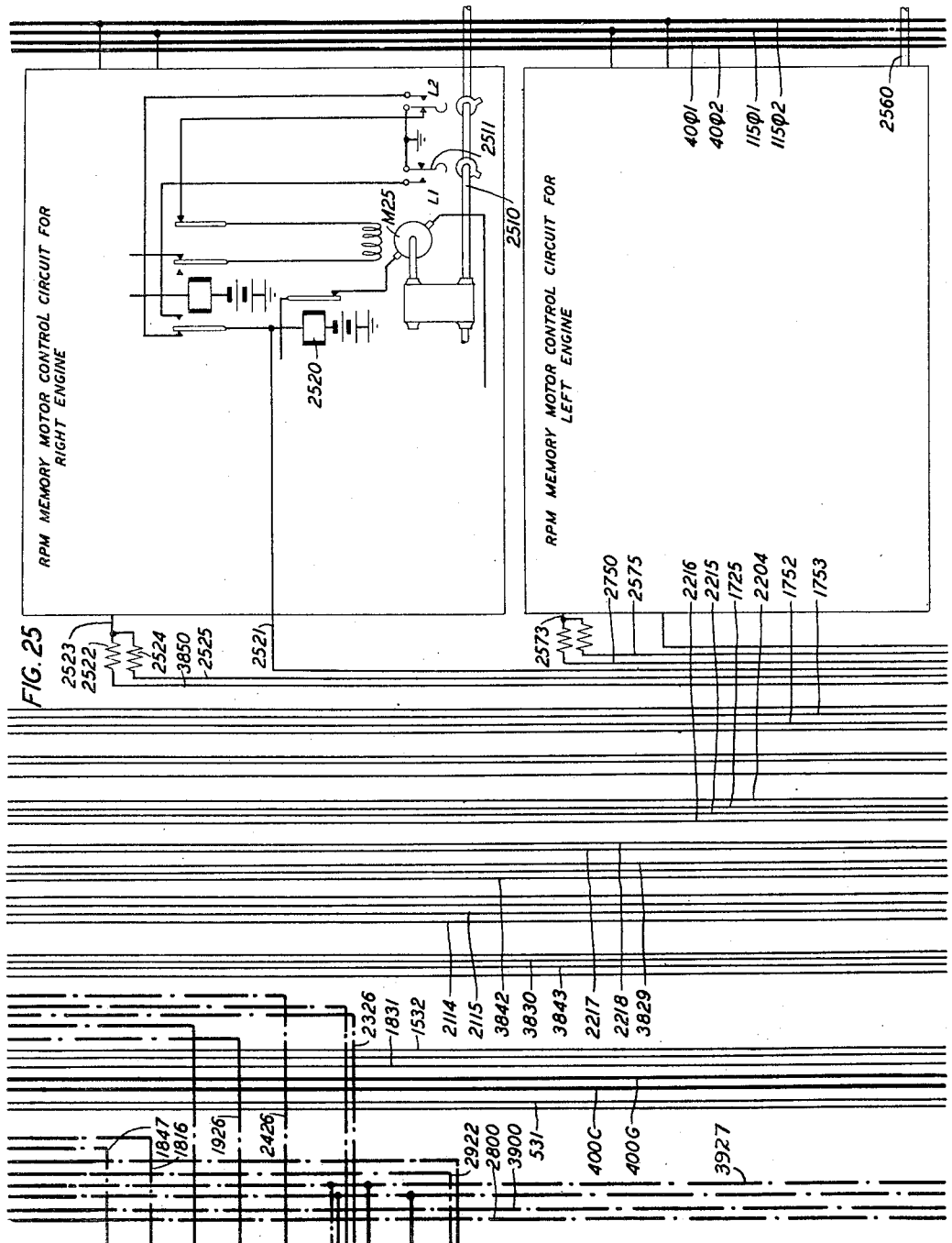
Figure 26:
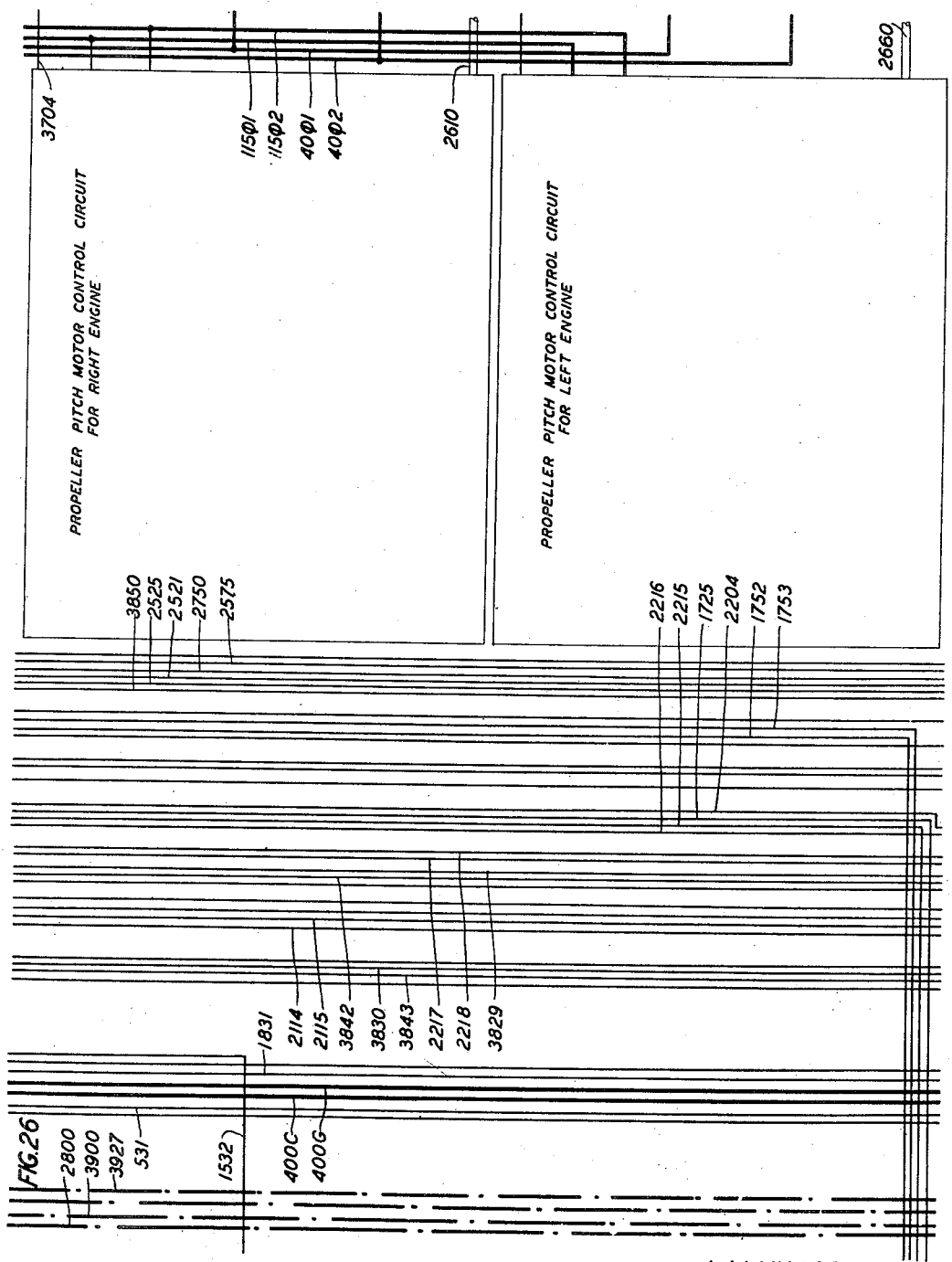
Figure 27:
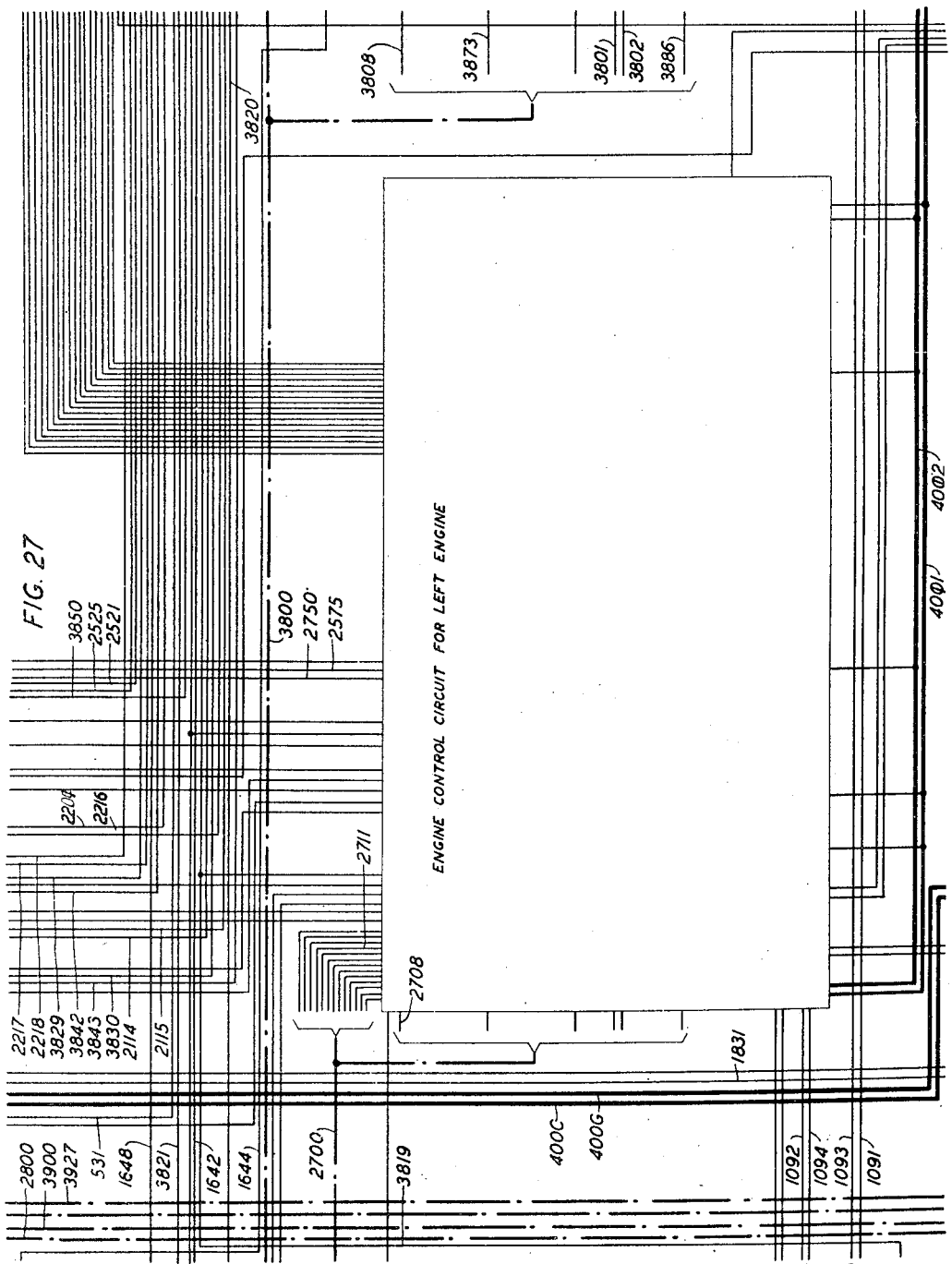
Figure 28:
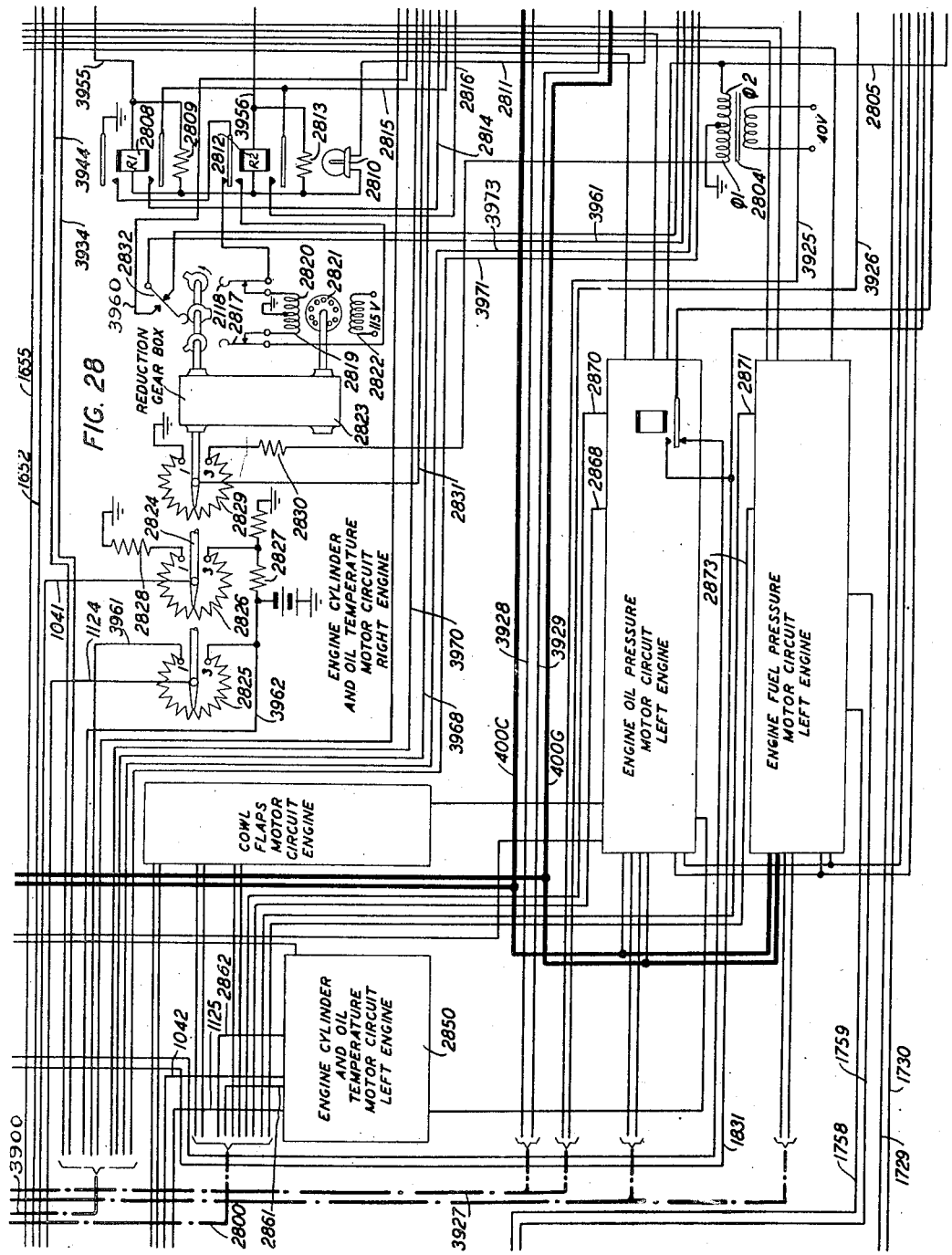
Figure 29:
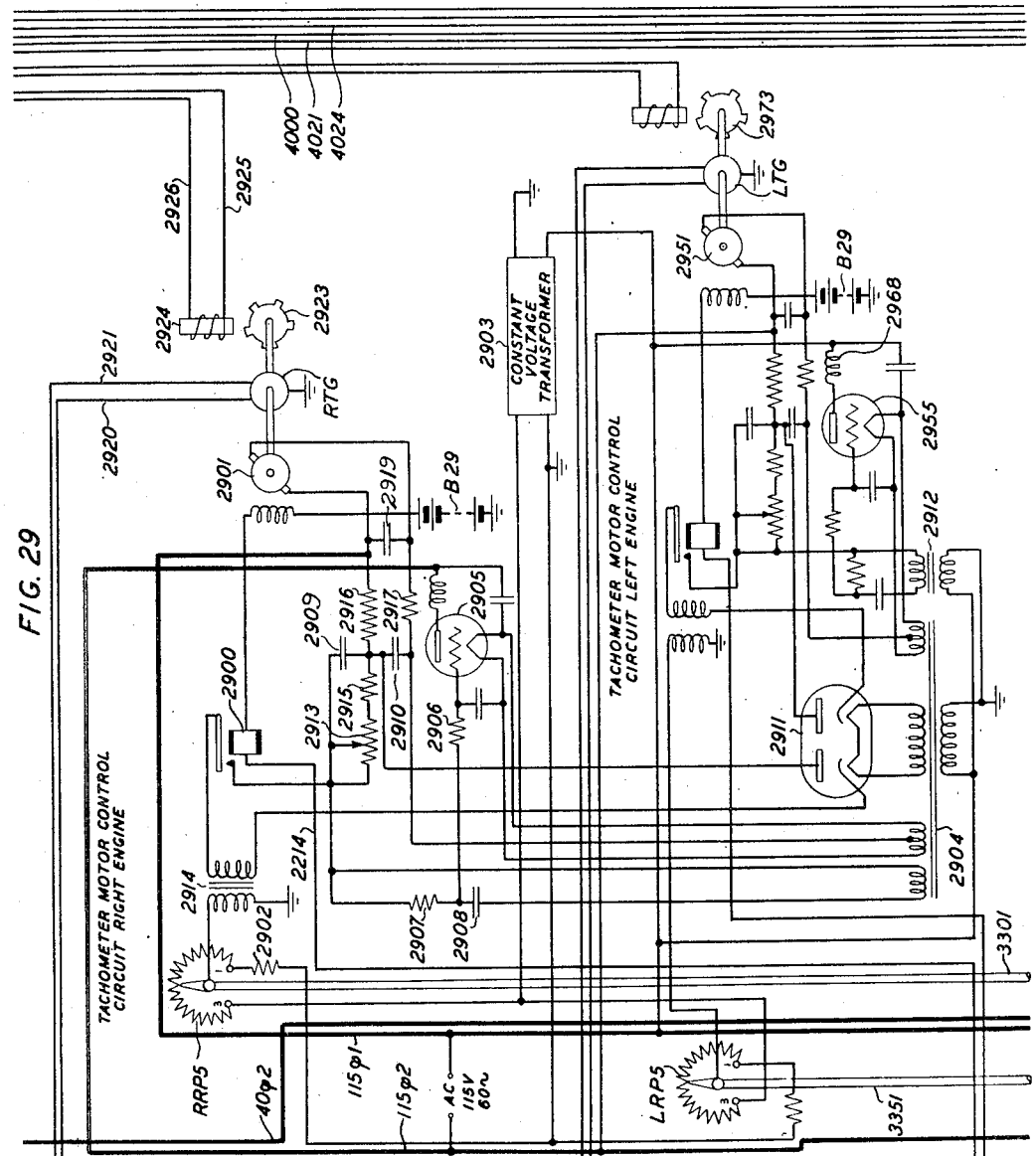
Figure 30:
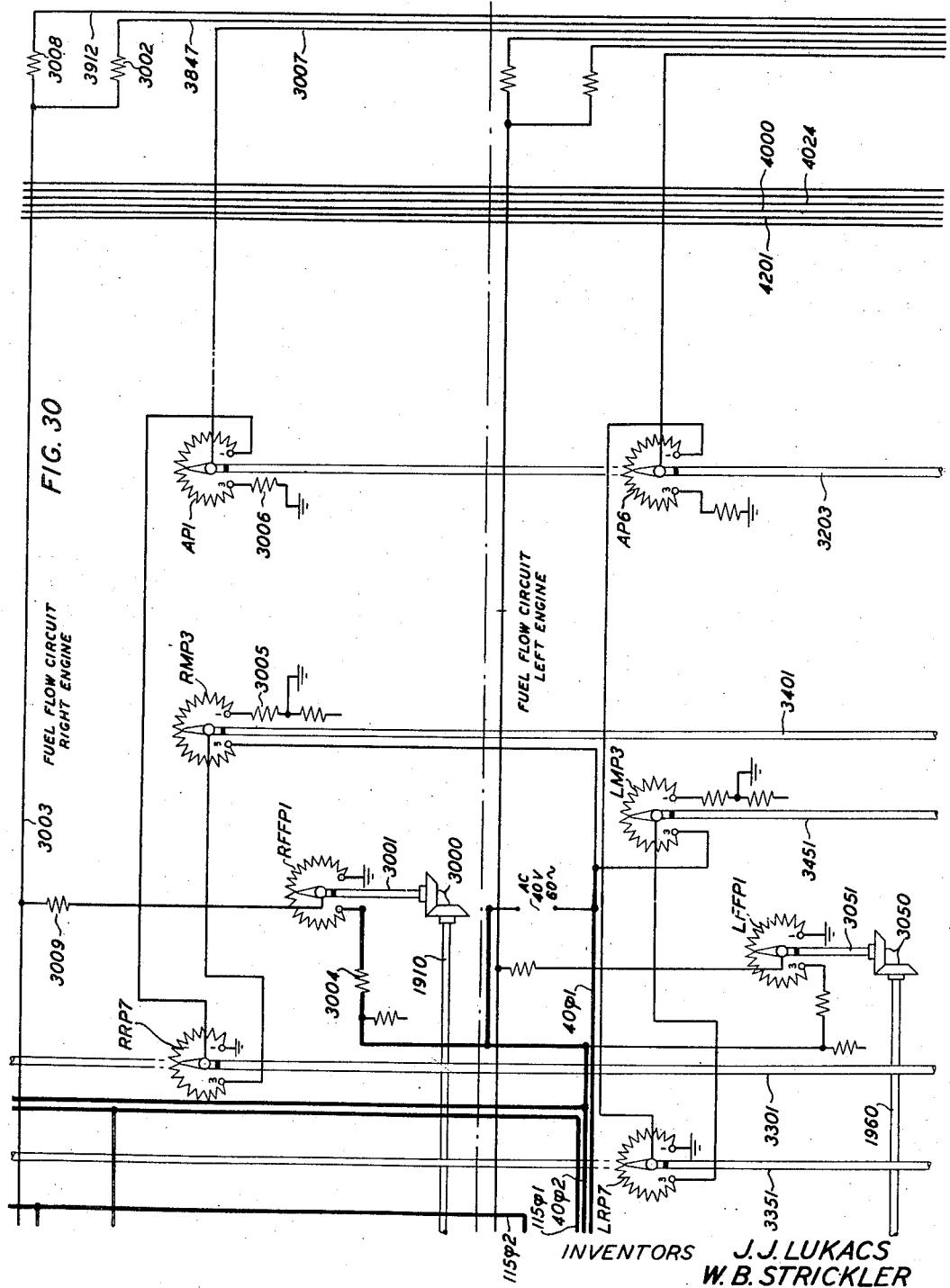
Figure 31:
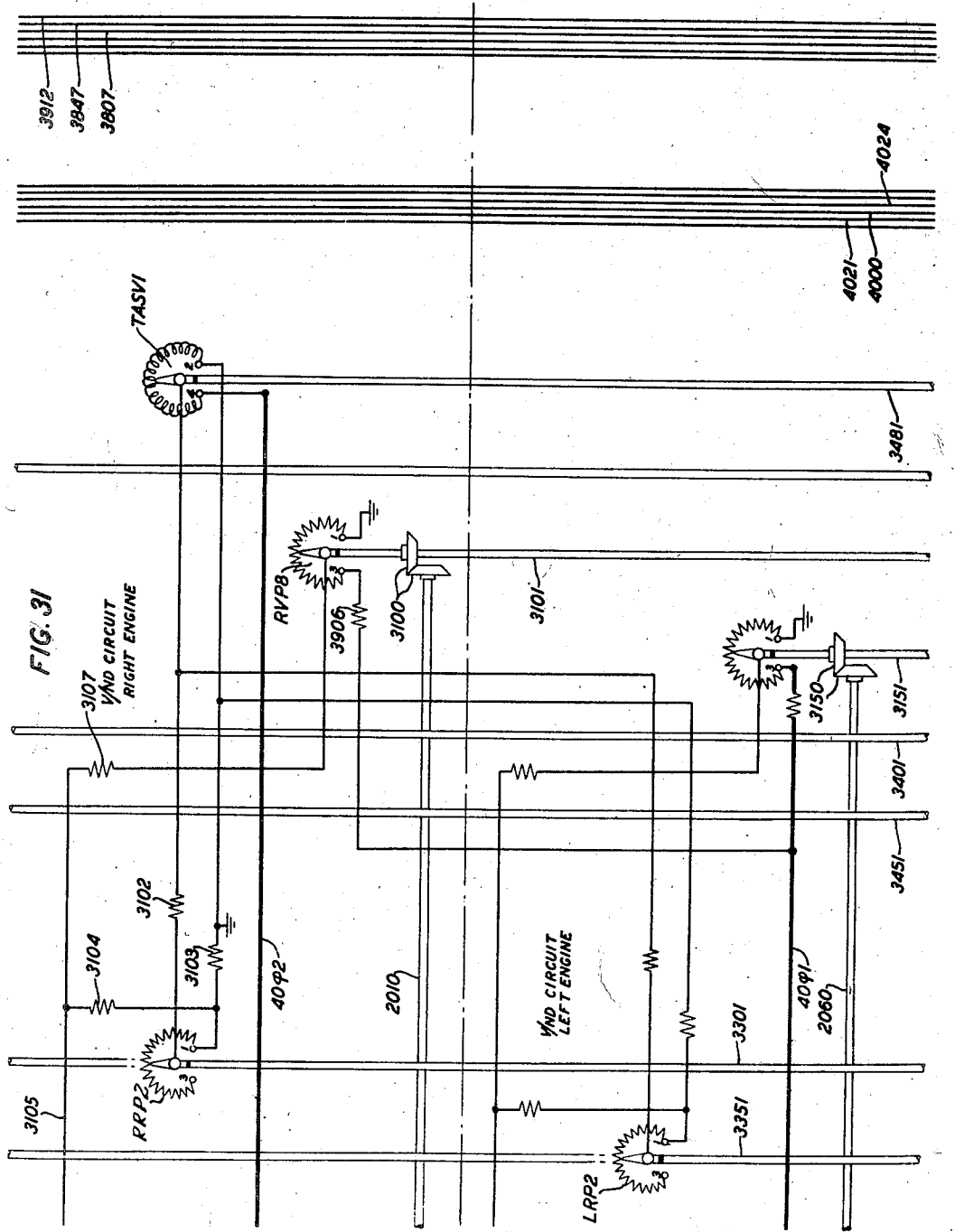
Figure 32:
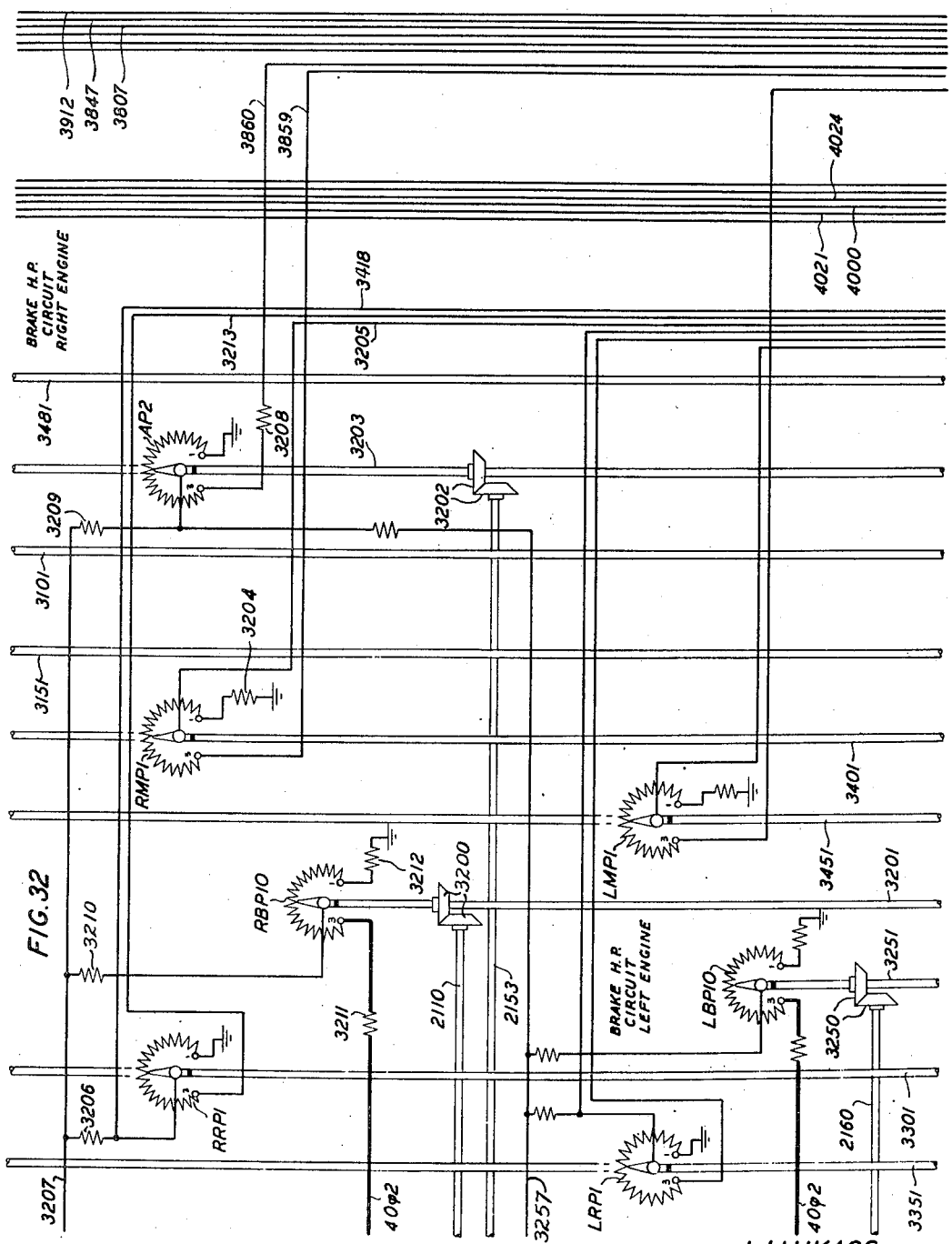
Figure 33:
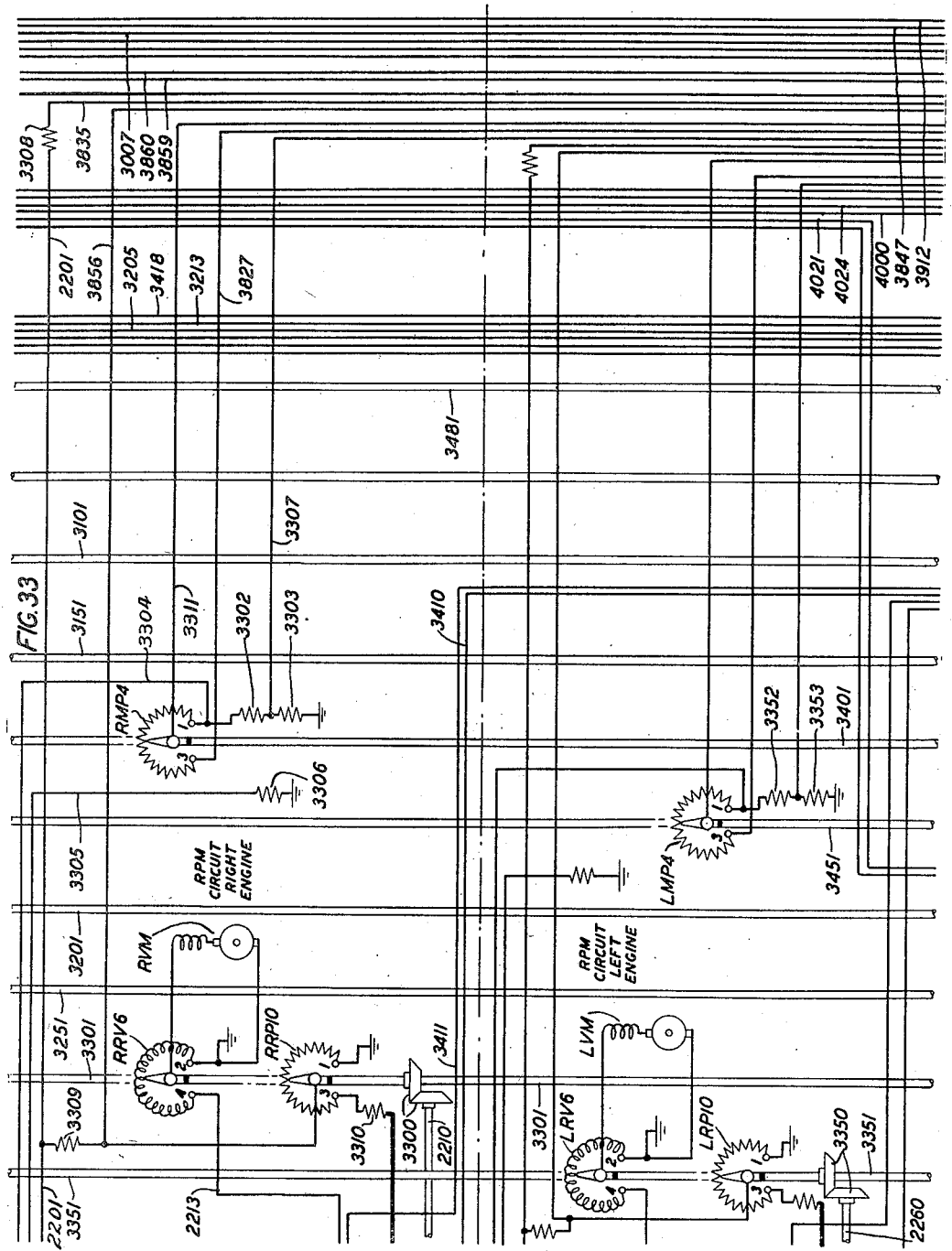
Figure 34:
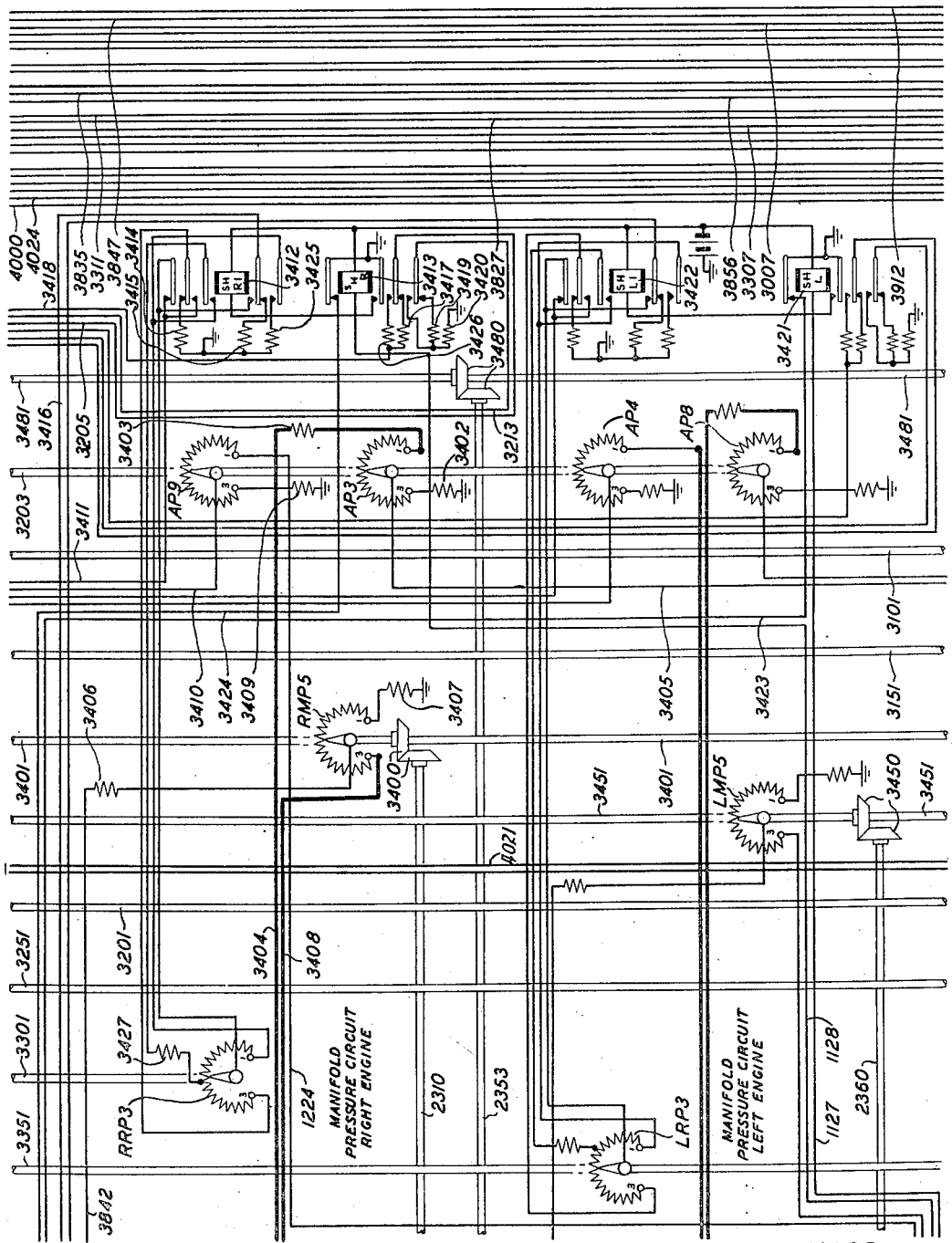
Figure 35:
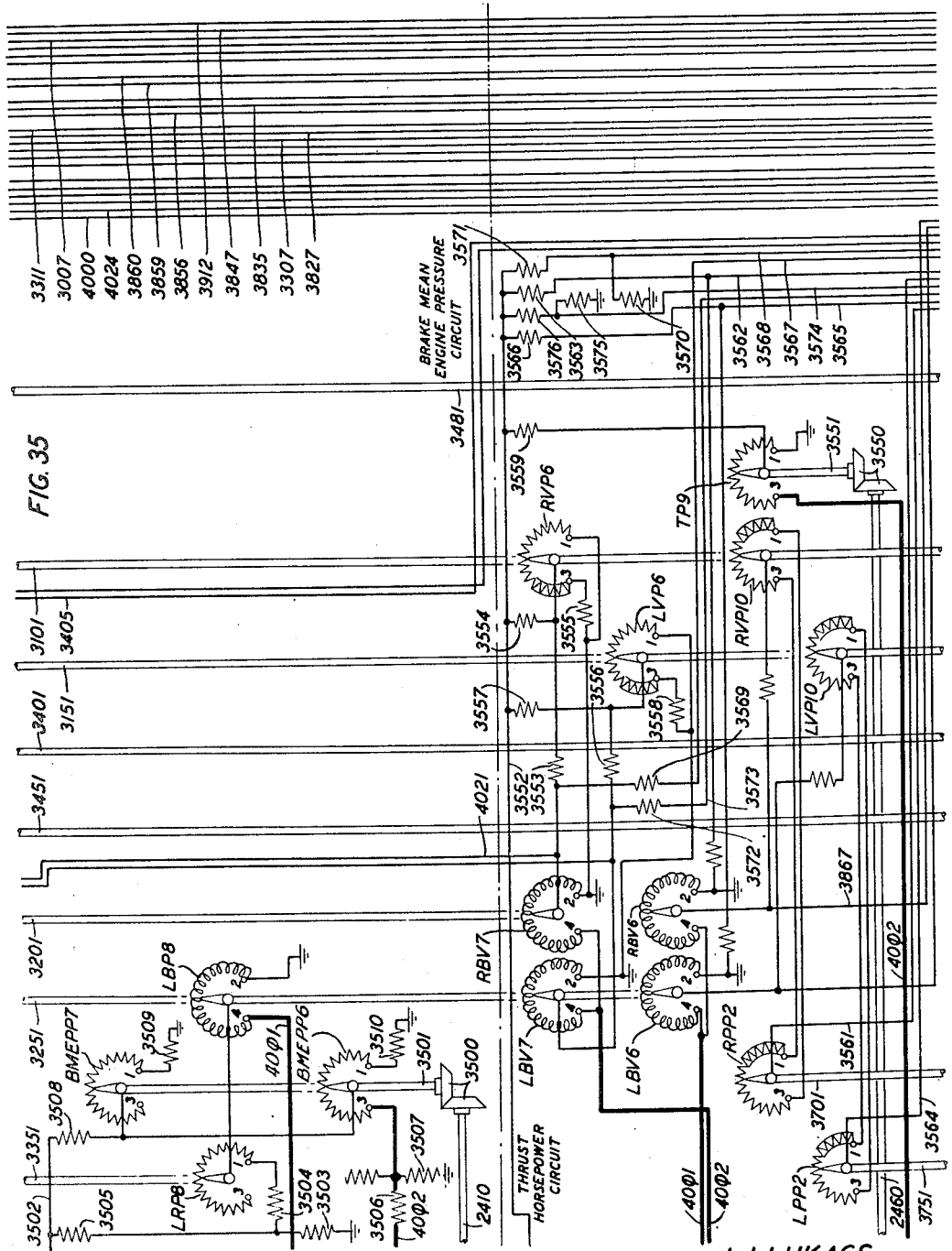
Figure 36:
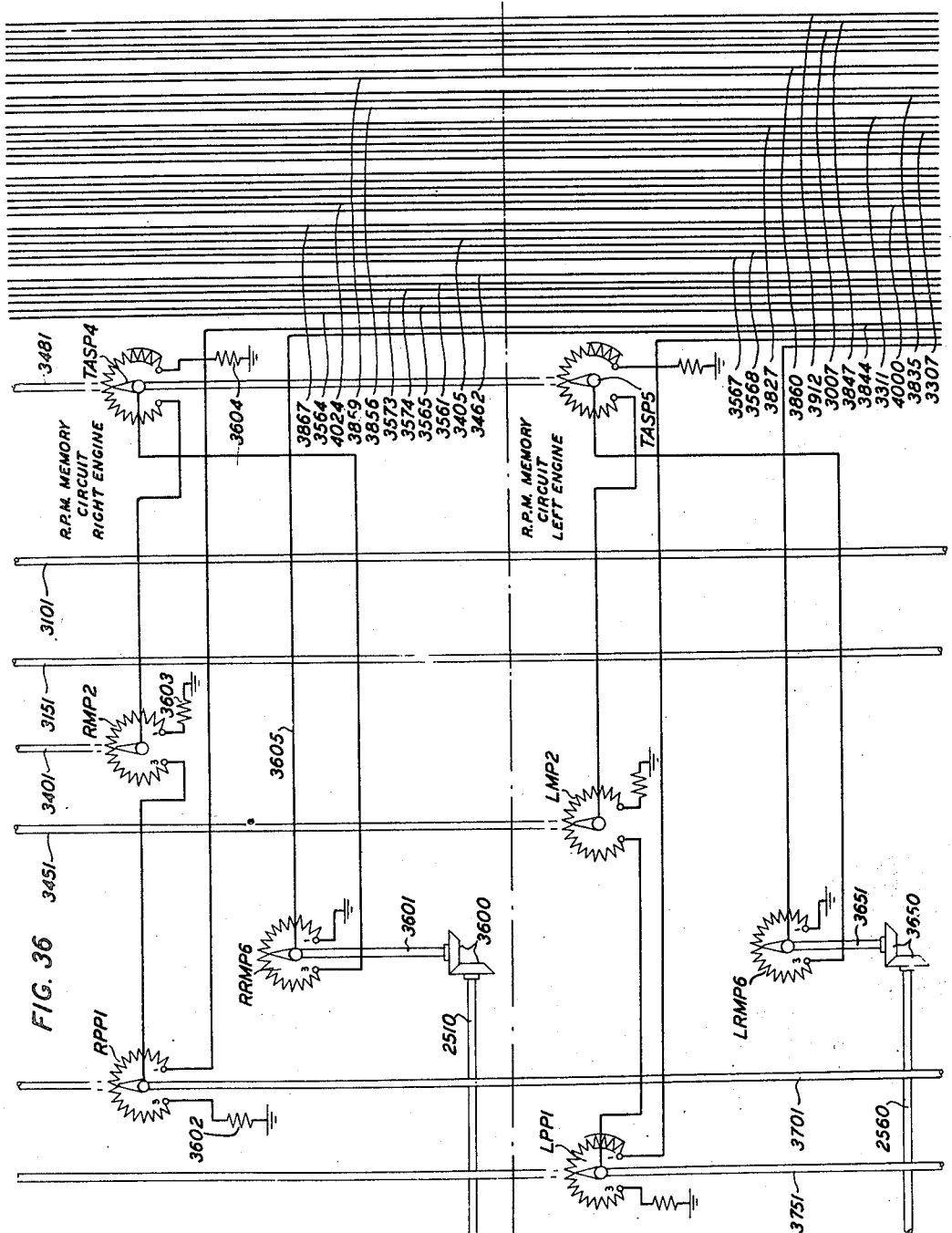
Figure 37:
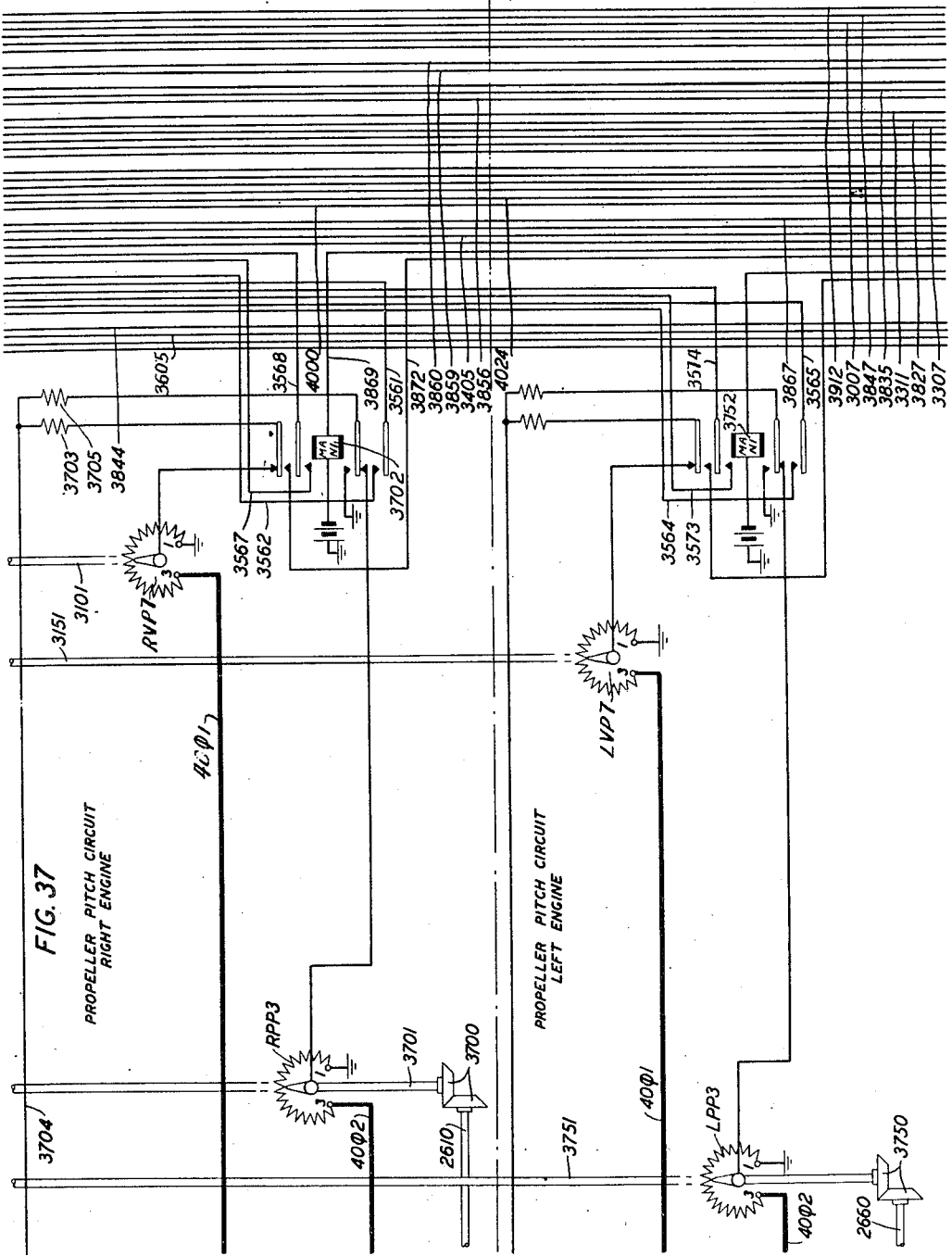
Figure 38:
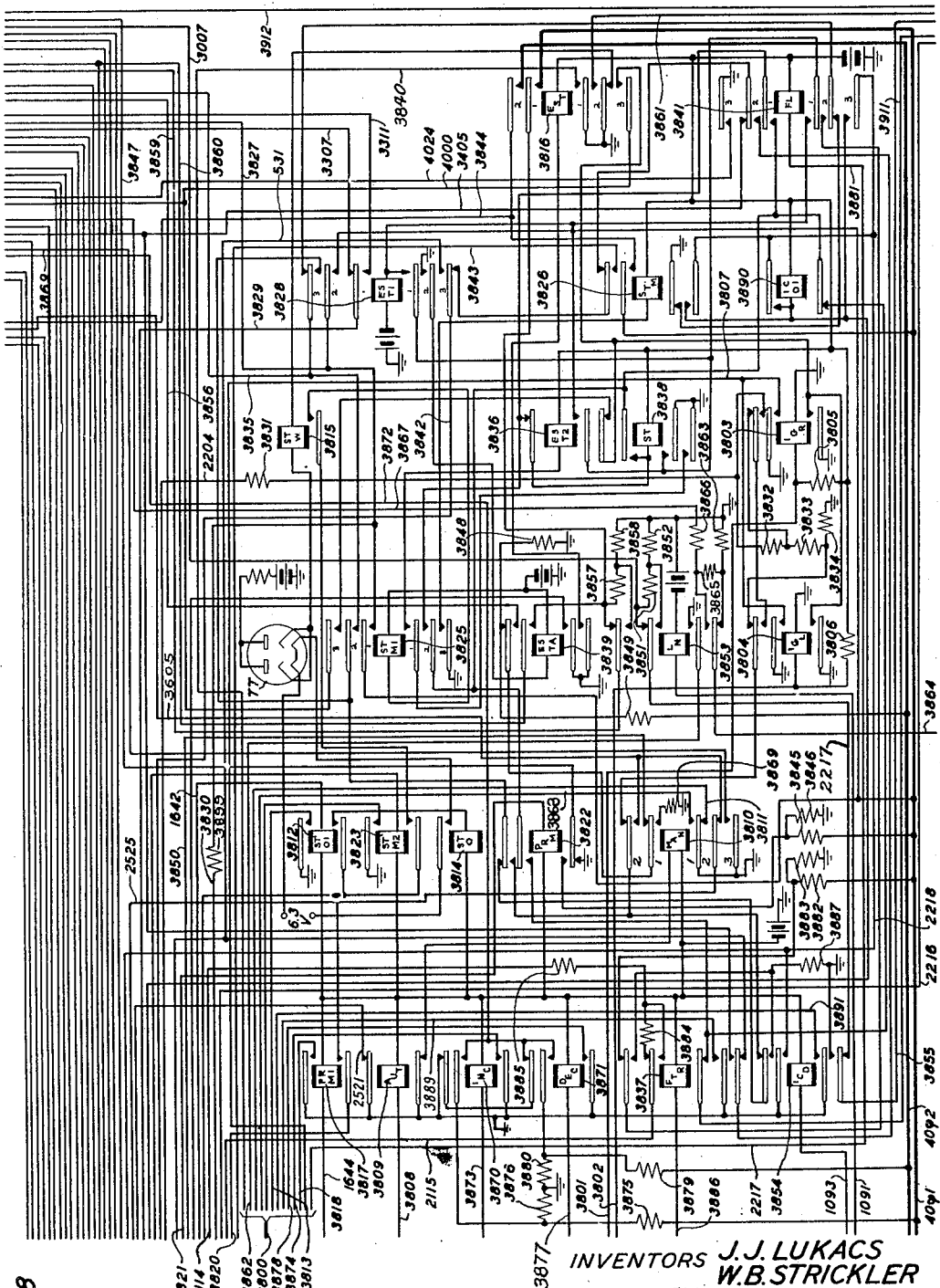

Other features of the invention will become apparent upon the consideration of the following detailed description of the invention when read in connection with the accompanying drawings in which:

Fig. 1 is a schematic representation of the essential elements of the trainer including a "mock-up" of the fuselage of the airplane which the trainer is designed to simulate, the instructor's desk and apparatus cabinets interconnected by suitable cables of control conductors;

Figs. 2 to 8, inclusive, disclose instruments, signal lamps and controls located on the instructor's desk;

Fig. 9 shows apparatus located at the navigator's station including such flight instruments as are required for observation by the navigator;

Figs. 10, 11 and 13 to 17, inclusive, disclose instruments, signals and controls mounted on the flight engineer's instrument and control panels together with relays and other equipment controlled thereby;

Fig. 12 shows the overhead ignition, throttle and governor-control equipment operable by either of the pilots;

Figs. 18 to 39, inclusive, disclose the interacting circuits which are responsive to the engine and propeller controls operable by the pilots or by the flight engineer and which are also subject to control by the instructor. Of these circuits, Fig. 18 shows the simulated auxiliary engine oil pressure motor control circuit, the cylinder and oil temperature motor control circuit, the suction motor control circuit and the deicer motor control circuit; Fig. 29 shows the tachometer motor control circuits for both the simulated main engines; Figs. 19 and 30 show the fuel flow motor control and fuel flow circuits for the simulated main engines; Figs. 20 and 31 show the V/ND motor control and V/ND circuits for the simulated main engines; Figs. 21 and 32 show the brake horse-power motor control and brake horse-power circuits for the simulated main engines; Figs. 22 and 33 show the R. P. M. motor control and R. P. M. circuits for the simulated main engines; Figs. 23 and 34 show the manifold pressure motor control and manifold pressure circuits for the simulated main engines; Figs. 24 and 35 show in the upper portions thereof the brake mean effective pressure motor control and brake mean effective pressure circuits and in the lower portions thereof the thrust horse-power motor control and thrust horse-power circuits; Figs. 25 and 36 show the R. P. M. memory motor control and R. P. M. memory circuits for the simulated main engines; Figs. 26 and 37 show the propeller pitch motor control and propeller pitch circuits for the simulated main engines; Fig. 38 shows the control circuit for the simulated right engine; Fig. 27 shows a box representing the control circuit for the simulated left engine; Fig. 39 shows the oil pressure, fuel pressure and cowl flaps motor circuits for the simulated right engine and in the upper left corner thereof and in the upper right corner of Fig. 28 the cylinder and oil temperature motor circuit for the simulated right engine; and Fig. 28 shows boxes representing similar oil pressure, fuel pressure, cowl flaps and cylinder oil and oil temperature motor circuits for the simulated left engine;

Fig. 40 shows in the upper portion thereof circuits for simulating the sounds produced in starting and operating the right engine and in the lower portion thereof a box representing similar circuits for simulating the sounds produced in starting and operating the left engine;

Fig. 41 discloses lamps for lighting the instrument panels and station of the radio operator;

Figs. 42 and 43 taken together disclose instruments and controls mounted on a pedestal located between the pilot's and copilot's seats and beneath the main instrument panel, and instruments mounted on the main instrument panel in the cowl of the fuselage and observable from either pilot's station; and Fig. 44 is a diagram illustrating how the several figures of the drawing should be assembled to completely disclose the invention.

Referring first to Fig. 1 the equipment of the trainer is disclosed schematically and comprises a "mock-up" 100 of the fuselage of an airplane so constructed as to closely resemble in size, arrangement and appearance the fuselage of the actual airplane which the trainer is designed to simulate. The pilot's and copilot's seats 101 and 102 are positioned side by side near the forward end of the fuselage with a set of trimming wheels 103 positioned between the seats and within easy reach of both the pilot and copilot. Positioned in front of the pilot's seat is a control yoke 105, associated aileron control wheel 106 and a pair of rudder control pedals 107. Similar controls are positioned in front of the copilot's seat 102.

Extending across the front of the fuselage and beneath the wind shield is an instrument panel 108 on which instruments for observation by the pilot, other instruments for observation by the copilot and instruments for observation by both the pilot and copilot are mounted. Also positioned beneath the instrument panel 108 and between the pilot's and copilot's seats is a pedestal 109 on the top and front face of which other instruments and control switches are mounted for the common use of both pilots.

Immediately back of the copilot's seat 102 and positioned against the side wall of the fuselage is the table and the radio panels 110 of the radio operator's station and back of the pilot's seat 101 and positioned against the other side wall of the fuselage is the navigator's table 111. Also back of the navigator's table are the control and instrument panels 112 of the flight engineer's station. The apparatus disclosed in Figs. 9 to 17, inclusive, and Figs. 41 to 43, inclusive, is mounted in the mock-up 100.

The mock-up is connected by a cable 113 of control conductors with the instructor's desk 114 and by cable 115 with the apparatus cabinets 116 which cabinets are also connected by cable 117 with the instructor's desk. Positioned on the desk 114 are instrument, control and signal panels 118 and 119 and other controls for the use of the instructor are positioned in drawers of the desk. The apparatus associated with the instructor's desk is disclosed in Figs. 2 to 8, inclusive.

The apparatus disclosed in Figs. 18 to 40, inclusive, together with power supply and switching equipment (not shown) are mounted in the apparatus cabinets 116.

The motor control circuits are in general associated in pairs. For example, the two fuel flow motor control circuits disclosed in Fig. 19 and all of the potentiometers and variacs controlled thereby constitute a single assembly. Each motor control circuit comprises a direct current reversible motor which, through a reduction gear box, drives a main driving shaft which in turn may drive one or more synchronous transmitters of the so-called "autosyn" type for controlling instruments remotely mounted on instrument panels of the trainer or on the instructor's desk, may drive potentiometers or variable autotransformers of the so-called "variac" type for controlling other motor control circuits of the trainer and in most cases drives limit switches to insure that the driving motor will be arrested before the brushes of potentiometers or variacs are driven beyond the ends of the windings with which they are associated. This equipment is mounted on a motor plate as schematically illustrated in the abandoned application of R. C. Davis and E. J. Fogarty, Serial No. 542,985, filed concurrently herewith. The relays, condensers, resistances, control rheostats, testing jacks and electronic devices associated with the equipment mounted on the motor plate are located on an apparatus mounting rack positioned above and secured to the motor plate. Several of these motor plate and mounting rack assemblies are mounted one above the other in the apparatus cabinets 116 of Fig. 1.

Each of the motor control circuits, for example, the circuits disclosed in Fig. 19, is of the type disclosed and fully described in Patent 2,428,767 to Albert, Davis, Gumley, and Holden of October 14, 1947. In general, the circuit for controlling the motor M19 comprises a dual triode amplifier tube 1900 which receives a signal incoming on conductor 3003, amplifies it and applies it through the step-up transformer 1902 to the anodes of the dual diode rectifying tube 1903. The tube 1903 serves as a full wave rectifier to rectify the input potential from the tube 1900 and to apply it as a positive potential to the grid of gas-filled tube 1904. The output potential from tube 1900 is also applied through the lower secondary winding of transformer 1902 to the control grid of the gas-filled tube 1905. Direct current for furnishing grid bias to the control grids of tubes 1904 and 1905 is supplied from the left secondary winding of power transformer 1909 through the dual diode rectifier tube 1916, under the control of the grid biasing control rheostats 1917 and 1918. Filament heating current for all of the tubes is supplied from the other secondary windings of power transformer 1909. Anode potential is supplied to the anodes of amplifier tube 1900 from the anode battery B19 and 60-cycle anode potentials 180 degrees apart in phase are applied to the anodes of tubes 1904 and 1905, potential of phase φ1 being supplied from the phase φ1 115-volt bus bar 115φ1, through the winding of anode relay RV to the anode of tube 1905 and potential of phase φ2 being applied from the phase φ2 115-volt bus bar 115φ2 to the anode of tube 1904.

The motor M19 is of the direct current reversible type whose stator circuit is energized by current from the direct current source B19 under the control of reversing relay RV1 which is in turn under the control of anode relay RV associated with the gas-filled tube 1905 and whose rotor winding is energized by positive impulses of current transmitted therethrough by the firing of the gas-filled tube 1904. When the input potential applied to conductor 3003 is in phase with the potential of phase φ1 applied to the anode of tube 1905 and out of phase with the potential of phase φ2 applied to the anode of tube 1904, relays RV and RV1 will not operate and motor M19 will be operated in response to the incoming signal in one direction of rotation and when the input potential is out of phase with the potential of phase φ1 applied to the anode of tube 1905 and in phase with the potential of phase φ2 applied to the anode of tube 1904, relays RV and RV1 will operate and motor M19 will be operated in response to the incoming signal in the reverse direction.

Potentiometers and variacs which are driven by a motor control circuit may enter into the control of several other motor control circuits of the trainer. For example, the R. P. M. motor control circuit disclosed in Fig. 22 has a variac RRV6, shown in Fig. 33, in the circuit of the vibrator motor RVM, a potentiometer RRP5 associated with the tachometer motor control circuit of Fig. 29, a potentiometer RRP7 associated with the fuel flow circuit of Fig. 30, a potentiometer RRP2 associated with the V/ND circuit of Fig. 31, a potentiometer RRP1 associated with the brake horse-power circuit of Fig. 32, a potentiometer RRP3 associated with the manifold pressure circuit of Fig. 34 and a potentiometer RRP10 associated with its own control circuit of Fig. 33.

As previously stated, these variacs and potentiometers would all be mounted on the motor plate of the R. P. M. motor control circuit and conductors would be extended from such variacs and potentiometers to the various parts of the trainer where their controls are to be exercised. However, for the purpose of simplifying the disclosure so that all variacs or potentiometers which enter into the control of any one motor control circuit may be shown grouped together adjacent to such motor control circuit, the driving shaft of each motor control circuit has been schematically illustrated as extending across the several circuits over which the variacs and potentiometers which it drives exercise control.

Reverting to the R. P. M. motor control circuit previously taken as an example, it will be noted that the driving shaft 2210 thereof is connected by the unity ratio bevel gears 3300 with the shaft 3301 upon which the brushes of the variac RRV6 and of the potentiometers RRP1, RRP2, RRP3, RRP5, RRP7 and RRP10 are mounted.

The motors 1820, 1826 and 1840 shown in Fig. 18 and the motor 3936 shown in Fig. 39 are of the reversible alternating current shaded pole type, each having a main stator winding and shaded pole windings. A motor of this type is caused to rotate in one direction by energizing its stator winding and short-circuiting one of its shaded pole windings and to rotate in the opposite direction by energizing its stator winding and short-circuiting its other shaded pole winding.

Figure 10:
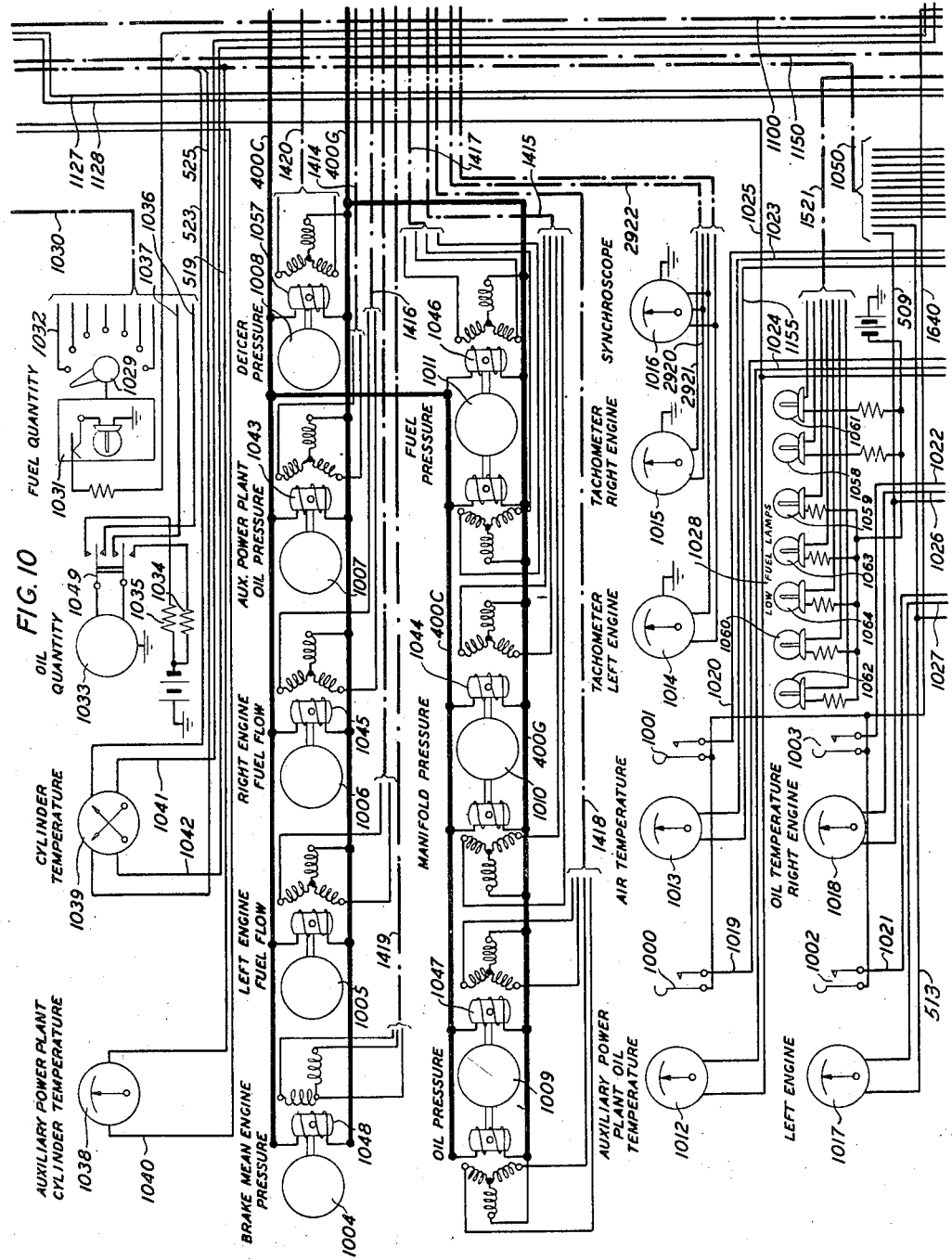

The instruments on the pilots' instrument panel illustrated in Fig. 42, the instruments on the navigator's table, Fig. 9, and the instruments on the flight engineer's instrument panel are identical in appearance to the instruments which would be found on the corresponding instrument panels of an actual airplane. However, these instruments, some of which in an actual airplane, would be constructed to be operated pneumatically, are all constructed to be operated electrically. Some of these instruments such as, for example, the fuel flow indicators 1005 and 1006 shown on the flight engineer's instrument panel, Fig. 10, are driven by synchronous receivers of the autosyn type associated therewith by which they are remotely controlled from synchronous generators or transmitters of the same type associated with motor control circuits. For example, the autosyn 1045 which drives the fuel flow indicator 1006 is driven by the transmitting autosyn 1925 associated with the fuel flow motor control circuit of Fig. 19.

Since the present invention is primarily concerned with those portions of the apparatus and circuits of the trainer which are applicable to the training of the flight engineer and pilots in the performance of their duties with respect to the operation and control of the power equipment of an aircraft which the trainer simulates, the flight controls, flight instruments and the motor control circuits of the trainer which are responsive to the flight control for simulating flight conditions and for simulating the operation of the flight instruments have not been disclosed herein. For a full disclosure of such apparatus and circuits reference may be had to the application of R. C. Davis, E. J. Fogarty and R. O. Rippere hereinbefore referred to. Since, however, the operation of the main engines of an aircraft is affected by the altitude at which a flight is being conducted and by the true air speed of the flight, these effects upon the circuits which simulate the operation of the engines are introduced by potentiometers AP1, AP2, AP3, AP4, AP6, AP8 and AP9, the brushes of which are driven from shaft 3203 driven through the unity ratio bevel gears 3202 from shaft 2153 of the altimeter motor control circuit represented by the box 2154 of Fig. 21 and by variac TASV1 and potentiometers TASP4 and TASP5 the brushes of which are driven from shaft 3481 through the unity ratio bevel gears 3480 from shaft 2353 of the true air speed motor control circuit represented by the box 2354 of Fig. 23.

The apparatus employed in carrying out the invention having now been described, the operation of the apparatus for crew training will now be described.

*Preparing the trainer for operation*

Figure 4:
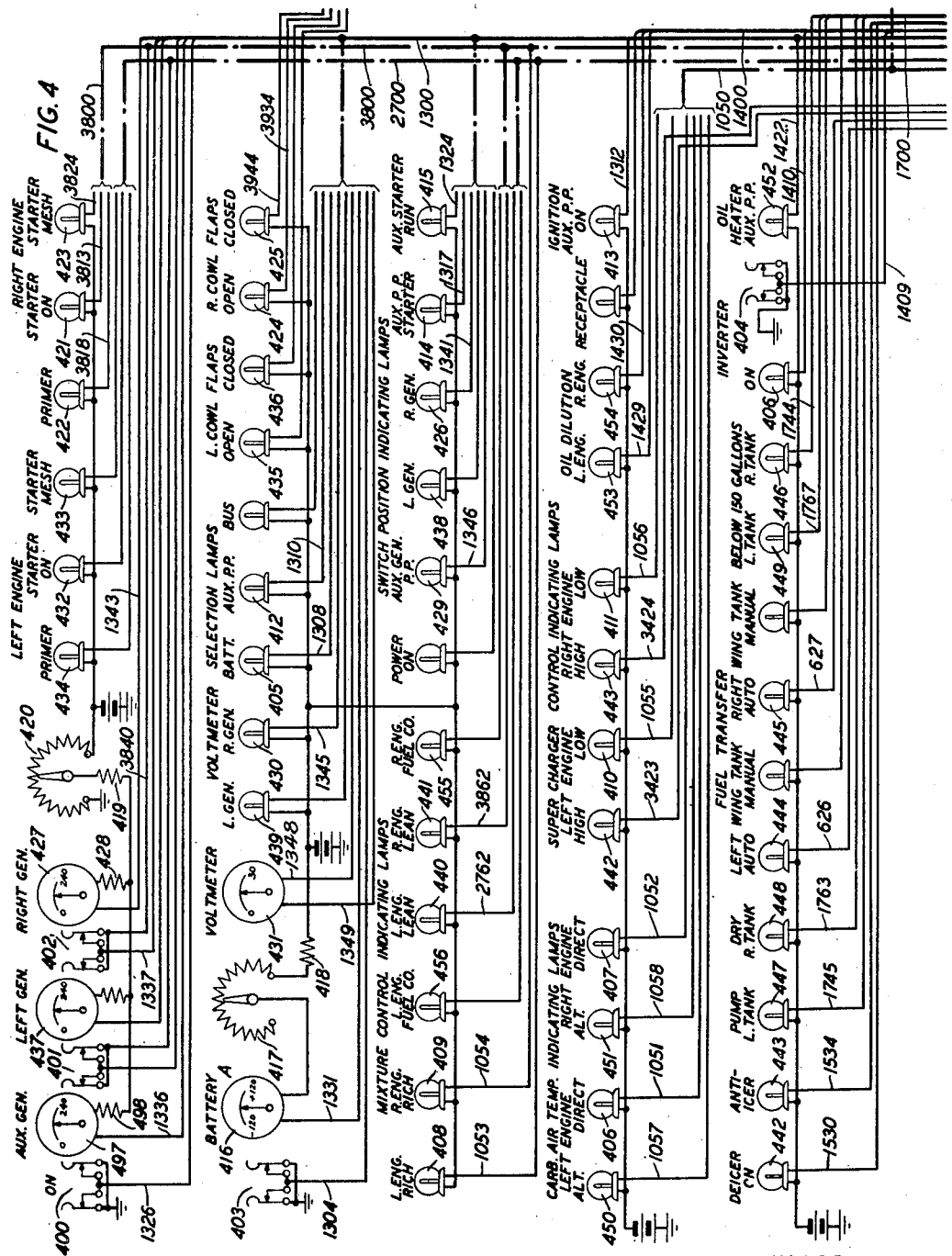
Figure 5:
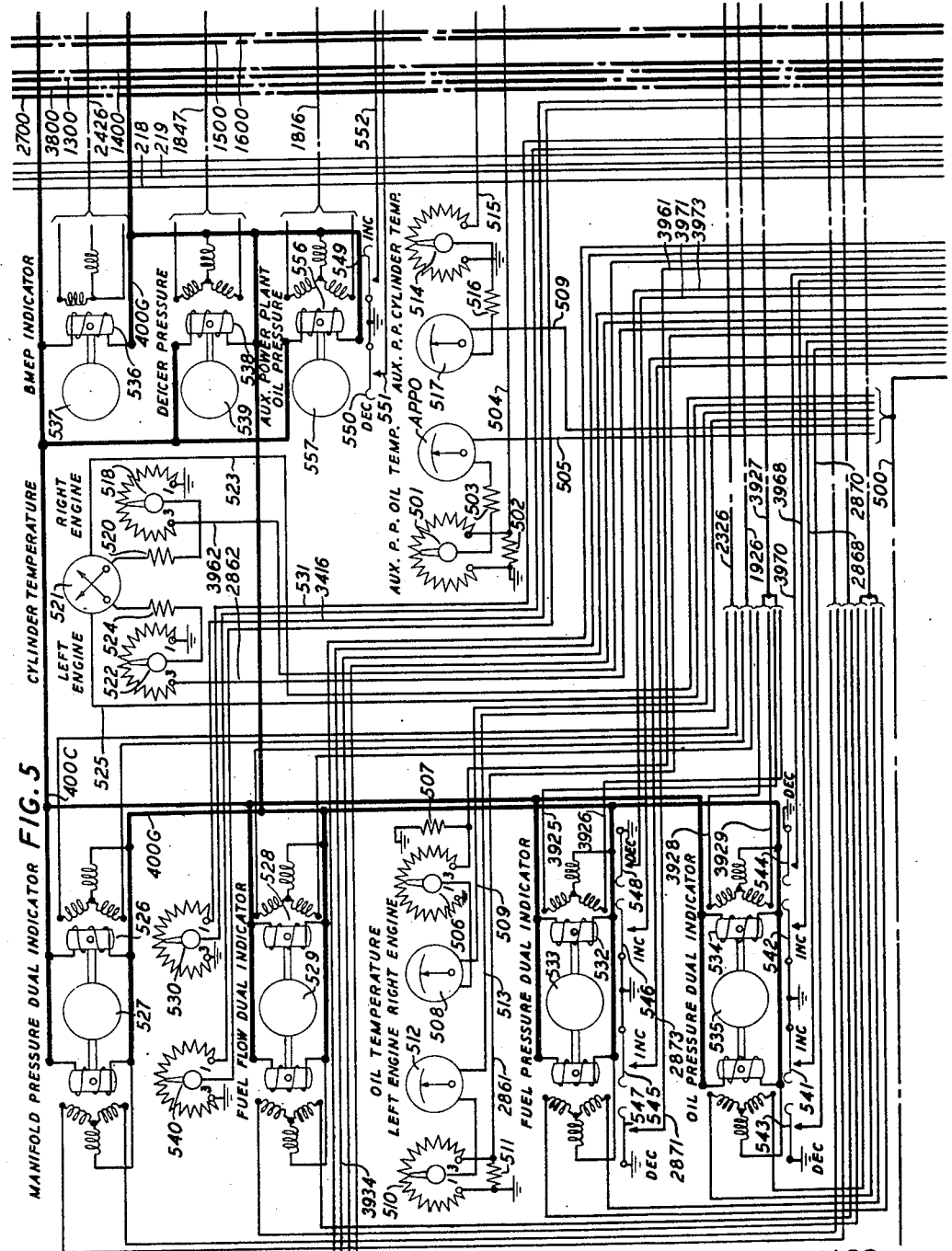
Figure 6:
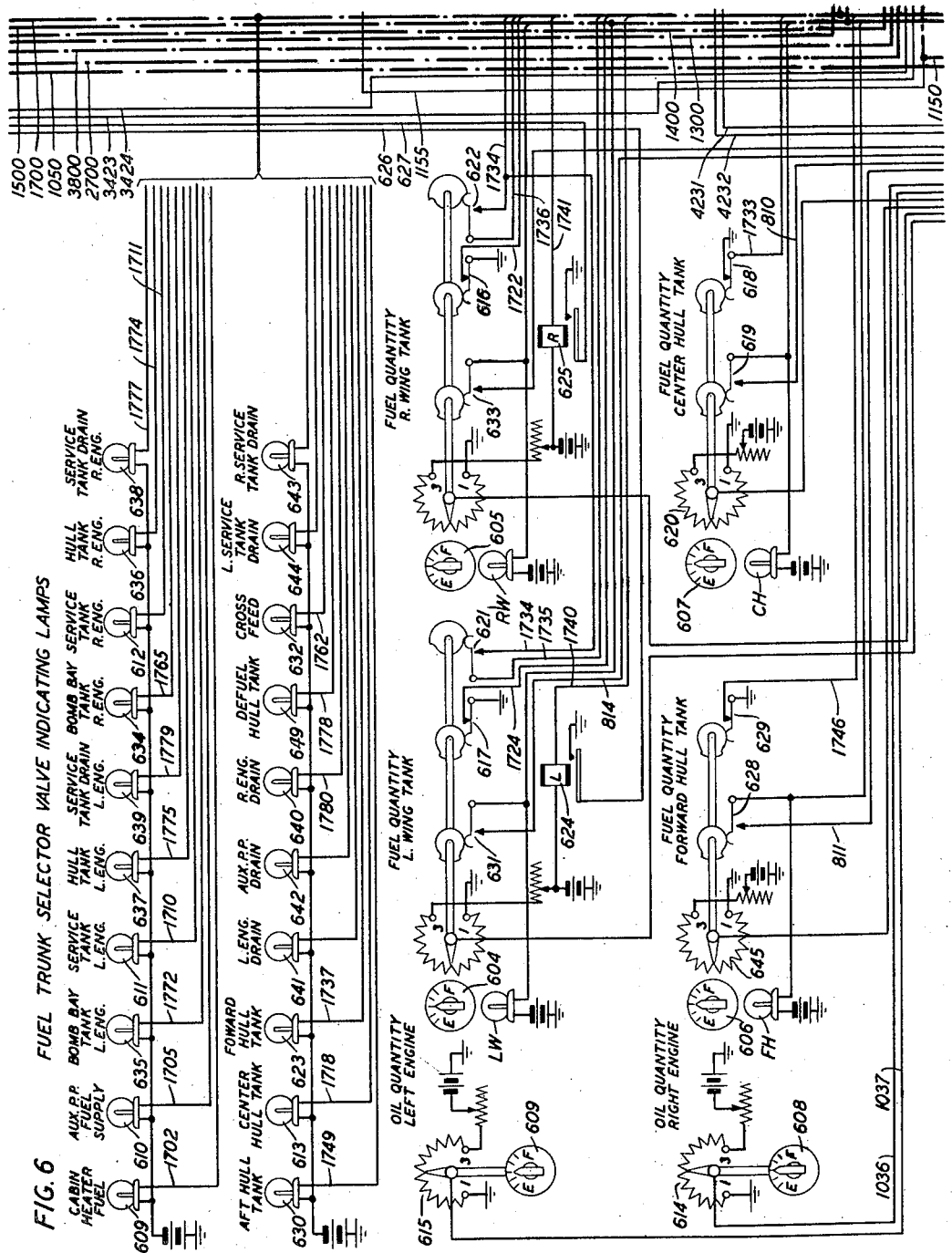
Figure 7:
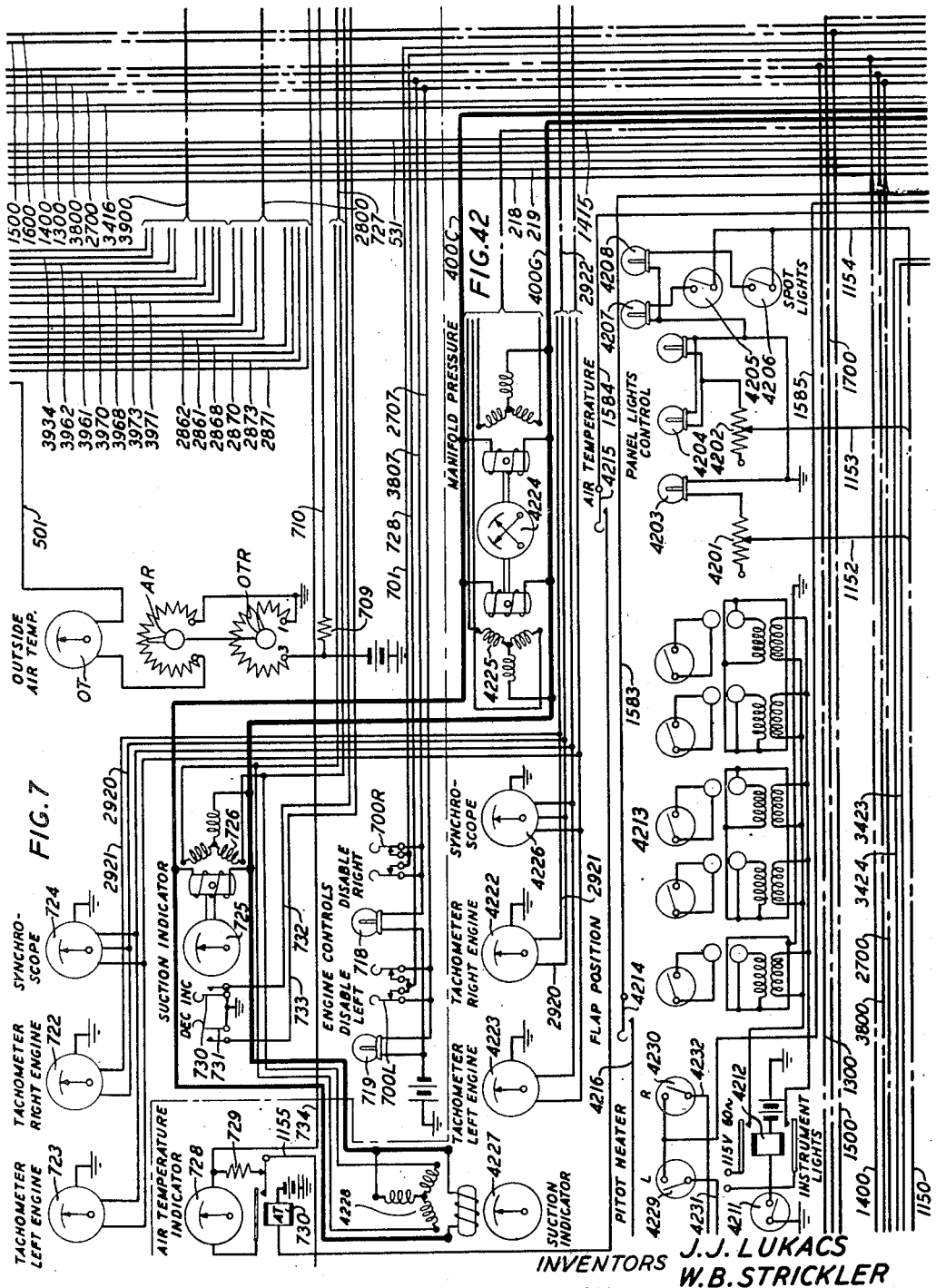

To start an operational test of the trainer with the members of the crew at their stations and the instructor at his desk, the instructor sets all controls and keys at the off or normal position with the following exceptions: The outside air temperature rheostat OTR is adjusted for an outside air temperature of +15° C.; the seven fuel quantity control knobs 604 to 607, inclusive, of Fig. 6 and 802, 803 and 804 of Fig. 8 are moved to the positions in which the brushes of the rheostats controlled thereby will be set to the positions indicative of full fuel tanks; the two oil quantity controls for the right and left engines, 608 and 609 of Fig. 6, are moved to indicate readings of 75 at which time the brushes of the rheostats controlled thereby will be set towards their No. 3 terminals; the switches for disabling the right and left engines 700R and 700L of Fig. 7 are set in their on or closed positions and auxiliary power plant generator switch 400, left generator switch 401, right generator switch 402, storage battery switch 403 and inverter switch 404 of Fig. 4 are operated to their on or closed positions.

At the flight engineer's station the flight engineer closes all of the circuit breakers shown at the extreme left of Figs. 13, 14, 15 and 16 thereby closing obvious circuits for the associated relays. For example, with the battery circuit breaker 1301 closed BAT SW (BS) relay 1302 is operated and establishes a circuit from ground over its inner lower front contact and conductor 1303 of cable 1300 to battery through the power battery lamp 300, Fig. 3, at the instructor's desk, whereupon lamp 300 lights to indicate that the battery power is on at the trainer. With the battery switch 403 at the instructor's desk closed a circuit is established from ground over the contacts of the switch, conductor 1304 of cable 1300, to battery through the winding of battery relay 1305 which upon operating connects ground over its lower contacts and the upper front contact of relay 1302 to the ground bus bar GB.

With ground connected to the ground bus bar GB, power on (PO) relay 1306 operates, closes an obvious circuit for lamp 1307 on the flight engineer's control panel and establishes a circuit from ground over its upper contacts and conductor 1308 of cable 1300 to battery through the battery lamp 405 at the instructor's desk to indicate that battery power has been switched on.

In response to the closure of circuit breakers 1601 to 1607, inclusive, of Fig. 16 circuits are established over conductors 1608 to 1613, inclusive, and 1673 of cable 1600 and thence to battery through lamps 200 to 205, inclusive, and lamp 301 at the instructor's desk and these lamps light indicative of the fact that the flight engineer has operated circuit breakers which in an actual airplane would supply power to those parts of the airplane indicated by the captions applied above such lamps.

In response to the closure of circuit breakers 1614 to 1619, inclusive, relays 1620 to 1625, inclusive, are operated in turn establishing circuits from ground over the upper contacts thereof and over conductors 1627 to 1632, inclusive, of cable 1600 and thence to battery through lamps 302, 303, 206, 208, 304 and 305, respectively, at the instructor's desk and these lamps light indicative of the fact that the flight engineer has operated circuit breakers which in an actual airplane would supply power to those parts of the airplane indicated by the captions applied above such lamps.

GO relay 1620 in operating also causes the operation of GO1 relay 1626 which controls the application of power to the intercommunication system (not disclosed) of the trainer. Power right wing and power left wing relays 1621 and 1622 over their lower contacts control the application of power to the bombardier's station of the trainer (not disclosed). Forward hull relay 1623 over its lower contacts connects operating ground from the bus bar GB, over conductor 1587 of cable 1580 to the armatures of relays 4300, 4302 and 4303 associated with the pilot's pedestal equipment disclosed in Figs. 42 and 43. Radio relay 1624 over its lower contacts establishes a circuit from ground on bus bar GB, over conductor 1633 to battery through the winding of relay 1101 of Fig. 11 whereupon relay 1101 operates and connects battery from the battery bus bar 1102 over conductors of cable 1100 through the rheostats 4100, 4101 and 4102 to ground through the radio unit lamps 4103, the table lamp 4104 and the floor lamp 4105 at the radio operator's station on Fig. 41. Motor wing flaps relay 1625 over its lower contacts connects operating ground from bus bar GB, over conductor 1502 of cable 1580 to the lower contact of wing flaps relay 4304 at the pilot's pedestal.

In response to the closure of circuit breakers 1634 and 1635 panel and flood lights and instrument panel relays 1636 and 1637 of Fig. 16 are operated. Relay 1636 upon operating connects ground from bus bar GB over its lower contacts, conductor 1638, and to battery through the winding of relay 1103 of Fig. 11 which operates to establish circuits from battery at the battery bus bar 1102, through rheostat 1104, over the lower contacts of relay 1103 and to ground through the lights 1105 on the instrument panel of the flight engineer's station, to establish circuits from battery at the bus bar 1102 through the rheostat 1107 and over upper contacts of relay 1103 to ground through the lights 1106 on the control panels of the flight engineer's station, and to establish a circuit from battery at the bus bar 1102, through rheostat 1108 and over the uppermost contacts of relay 1103 to ground through the flood light 1109 at the flight engineer's station. The flight engineer adjusts the rheostats 1104, 1107 and 1108 until the lights attain a desired brilliancy. Relay 1637 upon operating establishes an obvious circuit for relay 1639 and connects ground from bus bar GB over its lower contacts and conductor 1640 to keys 1000 to 1003, inclusive, on the flight engineer's instrument panel, Fig. 10.

In response to the closure of circuit breaker 1401, the navigator's station relay 1402 operates in turn operating relay 1403 which in turn establishes a circuit from battery on battery bus bar 1102, over conductor 1110, over the contacts of relay 1403, conductor 1551 of cable 1550, through the rheostat 902 and to ground through the compass lamp 903 and through the rheostat 904 and to ground through the instrument panel lamp 905 for lighting these lamps at the navigator's station. In response to the closure of circuit breaker 1505 flight deck relay 1506 operates in turn operating relay 1509 which establishes a circuit from battery on battery bus bar 1102, over conductor 1111, the lower contacts of relay 1509, conductors 1552 and 1553 of cable 1550 to ground through the table lamp 906 and to ground through the floor light 907 and rheostat 908 at the navigator's station. Relay 1509 also connects battery on conductor 1110 over its upper contacts and conductors 1510 and 1511 to the flight deck dome lights 1404 which light when the light switch 1405 is closed.

When stateroom lights relay 1512 operates in response to the closure of circuit breaker 1507, relay 1513 operates and connects battery from battery bus bar 1102, over conductor 1112, contacts of relay 1513, conductor 1514, and through passageway light 1406 which is thereupon lighted.

At the pilot's pedestal the pilot or copilot pushes in the circuit breaker buttons 4305 to 4309, inclusive, until he hears them click in the closed and locked positions and relays 4300 to 4304 are operated to prepare circuits under the control of the pilot. One of these circuits extends from ground applied as previously described to conductor 1587, thence over the front contact of relay 4303, conductor 1151 of cable 1150 and to battery through the winding of relay 1113. Relay 1113 thereupon operates and connects battery from the battery bus bar 1102 over conductors 1152 and 1153 of cable 1150, through rheostats 4201 and 4202 to ground through the panel and pedestal lights 4203 and 4204 for lighting such lights, and over conductor 1154 of cable 1150 to switches 4205 and 4206 whereby the pilot or copilot may control the lighting of their respective spotlights 4207 and 4208. The brightness of the panel lights 4203 and 4204 may be adjusted to the desired brightness by the rheostats 4201 and 4202. All lights for lighting instrument panels and stations of the trainer have now been lighted or prepared for lighting when they may be required.

The flight engineer may now operate the self-locking inverter switch 1407 thereby causing the operation of inverter relay 1408 over a circuit from battery through its winding, over the contacts of key 1407, conductor 1409 of cable 1400, to ground over the normally closed contacts of inverter key 404 at the instructor's desk, Fig. 4. Relay 1408 upon operating establishes a circuit from ground over its upper contacts and conductor 1410 of cable 1400 through inverter lamp 406 associated with key 404, to battery and lamp 406 lights to indicate to the instructor that the inverter key at the flight engineer's station has been operated. Relay 1408 at its lower contacts establishes a circuit from ground on bus bar GB to battery through the winding of relays 1411 and 1412 in parallel.

At its upper No. 6 contacts relay 1412 completes the connection of the source of 400-cycle 33-volt current of source 1413 to the bus bars 400C and 400G for supplying operating current to the instruments on the flight engineer's, pilot's, co-pilot's and navigator's instrument panels. Over their other contacts, relays 1411 and 1412 associate the stator windings of the receiving autosyns which operate the instruments 1004 to 1011, inclusive, on the flight engineer's instrument panel, Fig. 10 with the stator windings of the transmitting autosyns associated with the motor control circuits disclosed in Figs. 18, 19, 23, 24, 28 and 39.

At this time all other lamps at the instructor's desk are unlighted since the closure of the other circuit breakers at the flight engineer's station, not hereinbefore specifically identified, has resulted in the operation of their associated relays and the opening of the lamp circuits at the instructor's desk controlled thereby. For example, the closure of circuit breaker 1503 of Fig. 15 caused the operation of the associated boarding and anchor lights relay 1515 which at its upper back contact opens the circuit extending from ground thereover, over conductor 1516 of cable

1500 to battery through the boarding and anchor light 306.

Fuel trunk selection

The flight engineer now closes switch 1701 simulating the opening of the cabin heater fuel supply valve on the fuel control panel, Fig. 17, thereby establishing a circuit from ground over conductor 1702 of cable 1700 to battery through the cabin heater fuel lamp 609 at the instructor's desk, Fig. 6, thereby lighting such lamp. Switch 1703 is next closed to simulate the opening of the auxiliary power plant fuel supply valve thereby operating relay 1704 to establish a circuit over conductor 1705 of cable 1700 to battery through the auxiliary power plant fuel supply lamp 610 at the instructor's desk, thereby lighting such lamp. Switches 1706 and 1707 are now moved to their ST positions to simulate the operation of the left and right engine fuel valves to control the initial supply of fuel to the main engines from the right and left wing or service tanks. With the switches on these positions LST and RST relays 1708 and 1709 are operated to connect ground to conductors 1710 and 1711 of cable 1700 thereby causing the lighting of lamps 611 and 612 at the instructor's desk to indicate that the left and right wing or service tanks are being used. In addition, relays 1708 and 1709 establish circuits for operating the right and left fuel relays 1719 and 1720. The circuit of relay 1719 may be traced from battery through its winding, over the inner lower contacts of relay 1709, over the normal contacts of RTPI relay 1721, over the lower contacts of relay 1709 and conductor 1722 of cable 1700 to ground over the contacts of the right wing fuel quantity control switch 616 at the instructor's desk. The circuit of relay 1720 may be traced from battery through its winding, over the inner lower contacts of relay 1708, over the normal contacts of LTPI relay 1723, over the lower contacts of relay 1708 and conductor 1724 of cable 1700 to ground over contacts of left wing fuel quantity control switch 617 at the instructor's desk. Switches 616 and 617 are closed until the instructor decides to simulate the empty condition of the right and left wing or service tanks by turning the knobs 605 and 604.

With the left and right service tanks both full, LTP relay 1712 is operated over a circuit extending from battery through its winding over conductor 1735 of cable 1700, over closed contacts 621 of the left wing or service fuel quantity control switch, over conductor 1734 of cable 1700, over the lower contacts of FT relay 1539, operated upon the previous closure of circuit breaker 1540, to ground on bus bar GB. A similar circuit is also closed for RTP relay 1713 extending from battery through its winding over conductor 1736 of cable 1700, over closed contacts 622 of the right wing or service fuel quantity control switch, over conductor 1734 of cable 1700 and thence as traced to ground. Relays 1712 and 1713 both operate, relay 1712 upon operating opening at its back contact the circuit of the left fuel transfer pump dry lamp 1714 and relay 1713 upon operating opening at its back contact the circuit of the right fuel transfer pump dry lamp 1715. Over their upper front contacts relays 1712 and 1713 establish circuits for LTPI relay 1723 and RTPI relay 1721 extending over the inner upper front contacts of FH relay 1736 and the upper front contacts of FHI relay 1747 to ground, as soon as FHI relay 1736 operates as will be presently described. With relays 1721 and 1723 now operated, relays 1719 and 1720 are locked operated over the alternate contacts of relays 1721 and 1723 independent of the control switches at the instructor's desk.

Switch 1716 is now moved to its FH position to simulate the operation of the hull tank selector valve to select the forward hull tank whereupon relay 1736 is operated to connect ground to conductor 1737 of cable 1700 thereby causing the lighting of lamp 623 at the instructor's desk to indicate that the forward hull tank has been selected for use. Relay 1736 upon operating establishes a circuit from battery through the winding of FHI relay 1747, over the lower contacts of relay 1736 and conductor 1746 of cable 1700 to ground over contacts 629 of the fuel quantity forward hull tank fuel quantity control switch at the instructor's desk, which contacts are closed so long as the forward hull tank is assumed to be full. With relay 1747 now operated the previously traced circuits for relays 1721 and 1723 are completed and locking circuits are closed for relays 1712 and 1713 extending from battery through the windings of relays 1712 and 1713 over the lower contacts of relay 1747, over conductor 1734 to ground over the lower contacts of FT relay 1539 which operated upon the closure of circuit breaker 1540.

Fuel mixture control

Figure 11:
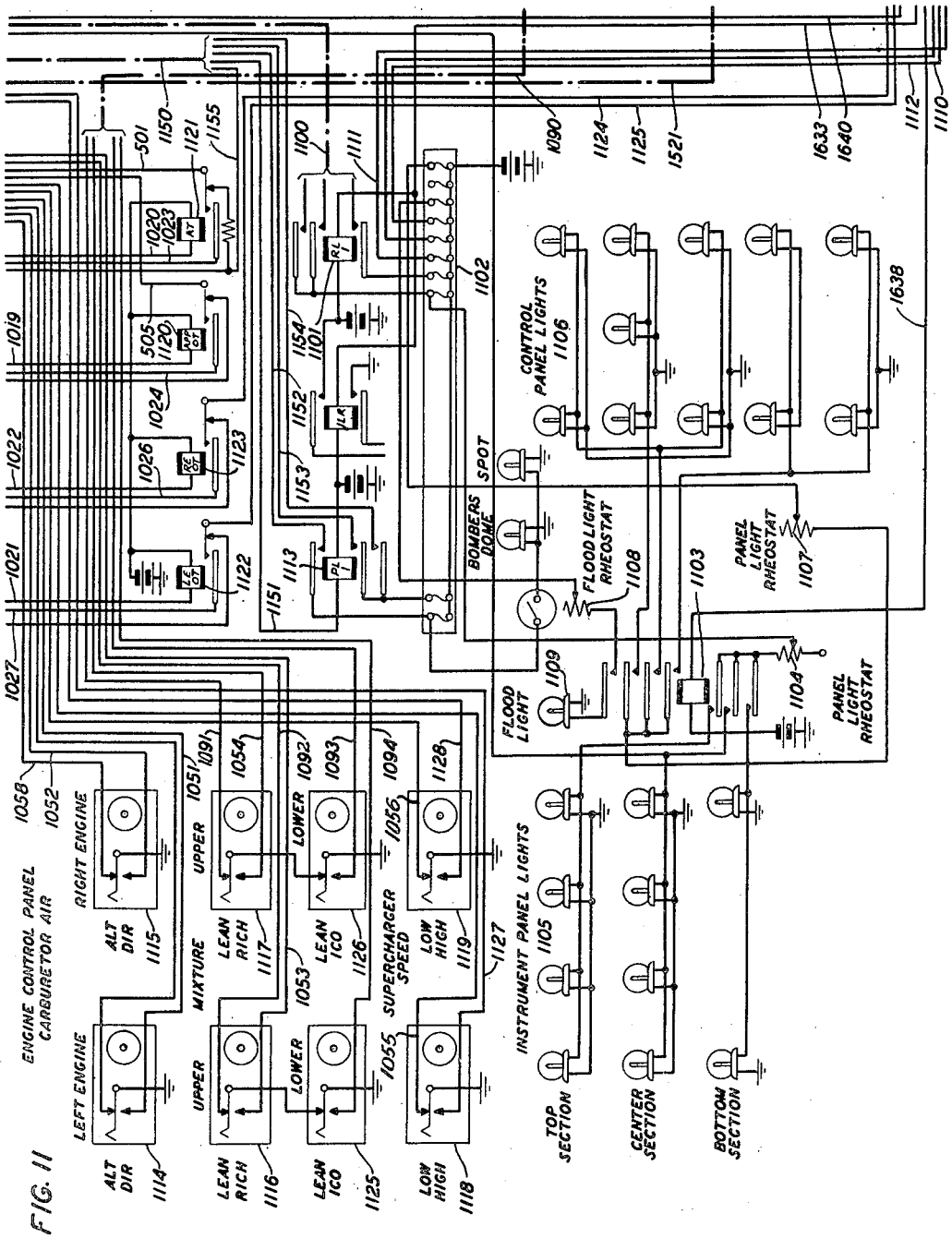

The flight engineer next operates the switches on the engine control panel disclosed in the upper left portion of Fig. 11. For starting the main engines the carburetor control switches 1114 and 1115 are operated to their direct air positions thereby establishing circuits from ground over their lower contacts and conductors 1051 and 1052 of cable 1050 for the direct carburetor air temperature indicating lamps 406 and 407 at the instructor's desk, Fig. 4. Mixture control switches 1116 and 1117 on the flight engineer's instrument control panel are also operated to their lower or rich positions thereby establishing circuits from ground over the upper contacts of switches 1125 and 1126, over the lower contacts of switches 1116 and 1117 and conductors 1053 and 1054 of cable 1050 for the rich mixture control indicating lamps 408 and 409 at the instructor's desk. Supercharger speed switches 1118 and 1119 on the flight engineer's engine control panel are also operated to their low speed positions thereby establishing circuits from ground over their upper contacts and conductors 1055 and 1056 of cable 1050 for the low speed supercharger control indicating lamps 410 and 411 at the instructor's desk.

Preparation of temperature indicating instruments

The flight engineer now operates keys 1000 to 1003, inclusive, associated with the auxiliary power plant oil temperature, the outside air temperature and the left and right engine oil temperature indicating instruments, and with ground connected to conductor 1640, as previously described, circuits are established over the contacts of such keys and conductors 1019, 1020, 1021 and 1022 to battery through the windings of relays 1120, 1121 and 1122 and 1123, respectively.

It will be recalled that battery power was applied to the trainer in response to the closure of circuit breaker 1301. With the power on, control circuits are conditioned for operating the indicators 1012, 1013, 1017 and 1018 on the flight engineer's instrument panel, Fig. 10. A circuit is established from battery through the winding of rheostat OTR, Fig. 7, to ground, and in parallel therewith from battery, through resistance 709, over conductor 710, through the winding of altimeter potentiometer AP5 of the altimeter motor control circuit 2154 of Fig. 21 and through resistance 2155 to ground. A circuit is also established from ground through the winding of rheostat 501 in parallel with resistance 502 at the instructor's desk, Fig. 5, over conductor 504, through the winding of the auxiliary power plant oil temperature rheostat 1800 to battery. A further circuit is established from ground through the winding of the right engine oil temperature rheostat 506 in parallel with resistance 507 over conductor 3961 of cable 3900 through the winding of the oil temperature potentiometer 2825 associated with the engine cylinder, oil and temperature motor circuit of Fig. 28 to battery. A further circuit is established from ground through the winding of the left engine oil temperature rheostat 510 in parallel with resistance 511, over conductor 2861 of cable 2800, through the winding of the oil temperature potentiometer associated with the left engine cylinder oil and temperature motor control circuit similar to that for the right engine and represented by the box 2850 of Fig. 28.

With the outside air temperature rheostat OTR of Fig. 7 at the instructor's desk set for an outside air temperature of +15° C. and the brush of the potentiometer AP5 of the altimeter motor control circuit of Fig. 21 positioned to indicate that the airplane has not yet left the water, current flows over the circuit extending from the brush of rheostat OTR of Fig. 7, over the rheostat AR, through the indicating meter OT, conductor 501 of cables 500 and 1050, over alternate contacts of relay 1121, conductor 1023, through the air temperature indicator 1013 on the flight engineer's instrument panel, conductor 1155 of cable 1150, normal contacts of relay 730 at the pilot's station, through resistance 729, over conductor 734 and to the brush of altimeter potentiometer AP5, Fig. 21, resulting in the operation of the indicator OT at the instructor's desk and indicator 1013 at the flight engineer's instrument panel to indicate a temperature of +15° C.

With the rheostat 501 also set at normal, the operation of relay 1120 establishes a circuit from the brush of rheostat 501, through resistance 503, through the auxiliary power plant oil temperature indicator APPO, conductor 505 of cables 500 and 1050 over the alternate contacts of relay 1120, conductor 1024, through the auxiliary power plant oil temperature indicator 1012 on the flight engineer's instrument panel and over conductor 1025 to the brush of the auxiliary power plant oil temperature potentiometer 1800 in preparation for the operation of indicator APPO at the instructor's desk and indicator 1012 at the flight engineer's instrument panel to indicate the oil temperature.

With rheostat 506 also set at normal, the operation of relay 1123 establishes a circuit from the brush of rheostat 506, through the right engine oil temperature indicator 508, over conductor 509 of cables 500 and 1050, through the right engine oil temperature indicator 1018 on the flight engineer's instrument panel, over conductor 1026, over the alternate contacts of relay 1123 and conductor 1124 to the brush of the right engine oil temperature potentiometer 2825 in preparation for the operation of indicator 508 at the instructor's desk and indicator 1018 on the flight engineer's instrument panel to indicate the oil temperature.

With rheostat 510 also set at normal, the operation of relay 1122 establishes a circuit from the brush of rheostat 510, through the left engine oil temperature indicator 512, over conductor 513 of cables 500 and 1050, through the left engine oil temperature indicator 1017 on the flight engineer's instrument panel, over conductor 1027, over the alternate contacts of relay 1122 and conductor 1125 to the brush of the left engine oil temperature potentiometer (not shown) but included in the apparatus represented by the box 2850 in preparation for the operation of indicator 512 at the instructor's desk and indicator 1017 on the flight engineer's instrument panel to indicate the oil temperature.

The flight engineer now momentarily depresses the warning light test switch 1517 and since the circuit breaker 1518 has been previously closed resulting in the operation of fuel level warning relay 1519 a circuit is established from ground on bus bar GB, over the lower contacts of relay 1519, over contacts of key 1517 and through the winding of fuel test relay 1520 to battery. Relay 1520 upon operating establishes circuits over conductors of cable 1521 to battery through the seven low fuel indicating lamps of the group 1028, Fig. 10; in parallel therewith over conductors of cable 1580 to battery through the low fuel indicating lamps of the group 4310 at the pilot's pedestal and also in parallel therewith over conductors of cable 1500 to battery through lamps LW, RW, FH, CH, RH, RBB and LBB associated with the fuel quantity controls, Figs. 6 and 8, at the instructor's desk. These lamps at the flight engineer's station, pilot's station and at the instructor's desk are all momentarily lighted. With relay 1519 operated a circuit is also closed over conductor 1537 of cable 1500 through the winding of relay 809 which operates to prepare circuits for low fuel lamps.

*Fuel and oil quantity check*

The flight engineer now checks the fuel quantity by operating the selector switch 1029 associated with the fuel quantity indicator 1031 mounted on the flight engineer's instrument panel. This indicator may be of the so-called "liquidometer" type. The operation of the switch 1029 connects the indicator successively with the conductors of cable 1030 extending to the fuel quantity controls Figs. 6 and 8, at the instructor's desk. For example, when the selector is set upon the first terminal of its arc the indicator 1031 is connected over conductor 1032 of cable 1030 to the brush of the rheostat 801. If the aft hull tank is full as it should be at the start of the flight the brush of rheostat 801 will have been set to the full position through the operation of the setting knob 802 by the instructor. The indicator 1031 should show each tank to be full as the selector switch 1029 is operated from position to position.

The flight engineer then proceeds to check the oil quantity by operating the oil quantity switch 1049 down and then up. In the down position a circuit is established from battery through resistance 1034, over contacts of switch 1049, through the oil quantity indicator 1033, over other contacts of switch 1049 and conductor 1036 of cable 1030 to the brush of rheostat 614. If the oil tank for the right engine is full as it should be at the start of the flight, the brush of rheostat 614 will have been set to the full position through the operation of the setting knob 608 by the instructor. In the up position of the switch 1049 a circuit is established from battery through resistance 1035, over contacts of switch 1049 through the indicator 1033 over other contacts of switch 1049 and conductor 1037 of cable 1030 to the brush of rheostat 615. If the oil tank for the left engine is full the brush of rheostat 615 will have been set to the full position through the operation of the setting knob 609 by the instructor.

*Cylinder temperature indicator check*

With battery power applied to the trainer in response to the closure of circuit breaker 1301 the auxiliary power plant cylinder temperature indicator 1038 and the dual indicator 1039 for indicating the cylinder temperatures of the main engines, disclosed in Fig. 10 are conditioned for operation. A circuit is established from ground through the winding of auxiliary power plant cylinder temperature rheostat 514 at the instructor's desk, Fig. 5, over conductor 515, through resistance 1802, and through the winding of potentiometer 1801 of the auxiliary power plant motor control circuit and through resistance 1803 to ground and through resistance 1860 to battery and ground. A circuit is also established from ground through the winding of the right engine cylinder temperature rheostat 518 at the instructor's desk, Fig. 5, over conductor 3962 of cable 3900 to battery, and in parallel with the rheostat 518 from ground through resistance 2828, through the winding of the right engine cylinder temperature rheostat 2826, and resistance 2827 at the right engine cylinder, oil and temperature motor control circuit of Fig. 28. A further circuit is also established from ground through the winding of left engine cylinder temperature rheostat 522 at the instructor's desk, Fig. 5, over conductors 2862 of cable 2800, to battery at the left engine cylinder, oil and temperature motor control circuit represented by the box 2850, Fig. 28, and in parallel with the rheostat 522 through the left engine cylinder temperature rheostat corresponding to rheostat 2826.

It being assumed that the cylinder temperature rheostats 514, 518 and 522 are set at normal, a circuit is effective from the brush of rheostat 514, through resistance 516, through the auxiliary power plant cylinder temperature indicator 517, over conductor 519 of cables 500 and 1050, through the auxiliary power plant cylinder temperature indicator 1038 and over conductor 1040 to the brush of the auxiliary power plant cylinder temperature potentiometer 1801, Fig. 18 in preparation for the operation of the indicator 517 at the instructor's desk and indicator 1038 on the flight engineer's instrument panel to indicate the cylinder temperature.

A circuit is also effective from the brush of rheostat 518, through resistance 520, through the right engine cylinder temperature indicator 521 of the dual instrument, over conductor 523 of cables 500 and 1050, through the right engine cylinder temperature indicator of dual instrument 1039 on the flight engineer's instrument panel and over conductor 1041 to the brush of the right engine cylinder temperature potentiometer 2826 of Fig. 28, and a circuit is effective from the brush of rheostat 522, through resistance 524, through the left engine cylinder temperature indicator of the dual instrument 521, over conductor 525 of cables 500 and 1050 through the left engine cylinder temperature indicator of dual instrument 1039 and over conductor 1042 to the brush of the left engine cylinder temperature potentiometer corresponding to potentiometer 2826 and included in the apparatus indicated by the box 2850. As a result the dual indicator 521 at the instructor's desk and the dual indicator 1039 on the flight engineer's instrument panel are prepared to indicate cylinder temperatures for the right and left engines.

*Starting the auxiliary power plant*

Figure 13:
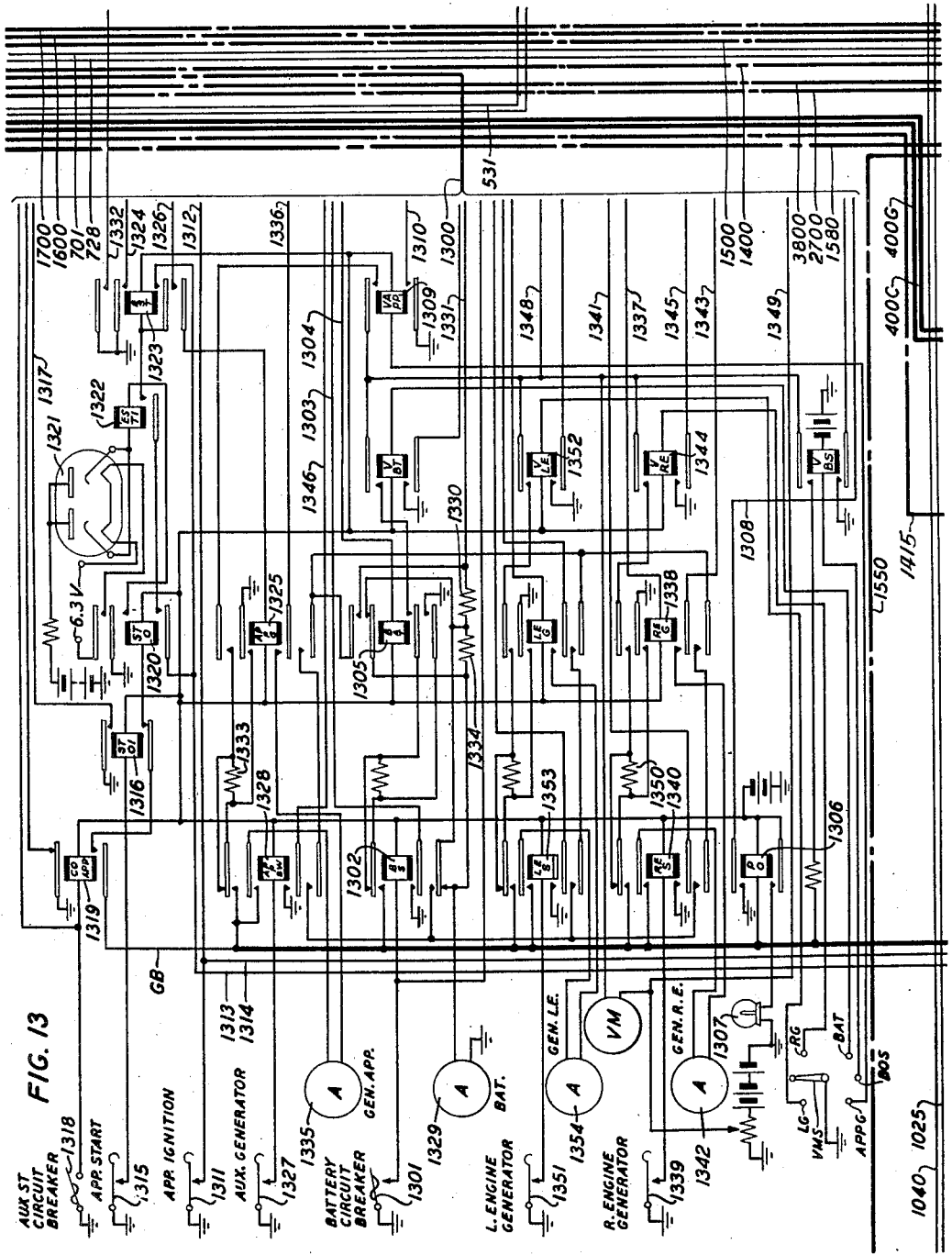

To start the auxiliary power plant the flight engineer first turns the voltmeter selector switch VMS, Fig. 13, to the APPG terminal thereby establishing a circuit from ground through the switch and the winding of VAPP relay 1309 to battery. Relay 1309 upon operating connects ground to conductor 1310 of cable 1300, through the auxiliary power plant voltmeter lamp 412, Fig. 4, at the instructor's desk. The auxiliary power plant ignition switch 1311 is next operated, establishing a circuit from ground thereover, over conductor 1312 of cable 1300 to battery through the auxiliary power plant ignition-on lamp 413, Fig. 4, at the instructor's desk. The flight engineer next operates the non-locking auxiliary power plant start key 1315 thereby operating STO1 relay 1316, which over its upper contacts establishes a circuit over conductor 1317 of cable 1300 to light the auxiliary power plant starter-on lamp 414 at the instructor's desk, and with COAPP relay 1319 operated through the previous operation of circuit breaker 1318, to close the circuit of STO relay 1320. Relay 1320 over its upper contacts closes the heater circuit for timing tube 1321. If the flight engineer holds the start key 1315 closed for approximately 6 seconds or an interval which should be sufficient to start the auxiliary power plant, the filament of timing tube 1321 will become sufficiently heated to render the tube conducting to cause the operation of EST1 relay 1322 over its cathode-anode circuit. With relay 1322 operated a circuit is established from ground over the ignition key 1311, conductor 1314, over the lower contacts of previously operated APP relay 1704, conductor 1313, lower contacts of relay 1322 through the winding of EST relay 1323 to battery. Relay 1323 upon operating locks over its inner lower contacts to ground applied to conductor 1313 and over the contacts of the ignition key 1311, and connects ground over its inner upper contacts and conductor 1324 of cable 1300 through the auxiliary power plant starter-run lamp 415 at the instructor's desk to indicate that the auxiliary power plant is running.

At its lower contacts relay 1323 establishes a circuit for APPG relay 1325 extending from battery through its winding, over the lower contacts of relay 1323 and over conductor 1326 of cable 1300 to ground over the contacts of auxiliary power plant generator key 400 at the instructor's desk. With BS and VAPP relays 1302 and 1309 previously operated, relay 1325 establishes a circuit from battery through the voltmeter VM on the flight engineer's power control panel, Fig. 13, over the upper contacts of relay 1309, over the upper contacts of relay 1325, over the upper back contact of APPSW relay 1328 to ground over the inner upper contacts of relay 1325 and in parallel with voltmeter VM over conductors 1348 and 1349 of cable 1300 through voltmeter 431 at the instructor's desk resulting in the operation of voltmeters VM and 431 to read 27 volts, or the potential being applied to the starter motor of the auxiliary power plant. A circuit is also closed through the operation of relay 1325 from ground through the battery ammeter 1329 on the flight engineer's power control panel, through resistances 1334 and 1330, over conductor 1331 of cable 1300, through the battery ammeter 416 at the instructor's desk, through rheostat 417 and resistance 418 to battery. These ammeters through the adjustment of the rheostat 417 should read —25 amperes indicating that in the simulation of the starting of the auxiliary power plant a current of 25 amperes is being drawn from the storage battery by the starting motor.

The flight engineer also operates the auxiliary power plant generator key 1327 thereby causing the operation of APPSW relay 1328. Over its inner lower contacts relay 1328 establishes a circuit from ground over such contacts and conductor 1346 of cable 1300 to battery through the auxiliary power plant generator lamp 429 at the instructor's desk. With relay 1328 operated the shunt of 100 ohms resistance 1333 is removed at its upper contacts whereby the circuit for voltmeter VM may be traced from battery therethrough over the upper contacts of relay 1309, the upper contacts of relay 1325, through resistance 1333 and the upper front contact of relay 1328 to ground on bus bar GB and in parallel over conductors 1348 and 1349 of cable 1300 through voltmeter 431 at the instructor's desk. The voltmeter readings are now reduced to 24 volts indicating that the operation of the starting motor has reduced the storage battery voltage. Relay 1328 also establishes a shunt around resistance 1330 whereupon a circuit is effective from ground through the battery ammeter 1329, through resistance 1334, over the lower front contact of relay 1302, the lower front contact of relay 1328, the lower front contact of relay 1325, the upper front contact of relay 1305, and thence as traced through the battery ammeter 416 and battery at the instructor's desk whereupon the ammeters 1329 and 416 are now caused to read +13 amperes or the current input from the auxiliary power plant to the storage battery. Relay 1328 also establishes a circuit from ground on bus bar GB over the inner upper contacts of relay 1328, through the auxiliary power plant generator ammeter 1335, inner lower contacts of relay 1325, conductor 1336 of cable 1300, through the auxiliary power plant generator ammeter 497 at the instructor's desk, through resistances 498 and 419 and rheostat 420 to battery, resulting in the operation of ammeters 1335 and 497 to read +55 amperes or the simulated output of the auxiliary power plant generator.

Relay 1323 also at its upper contacts establishes a circuit from ground thereover, over conductor 1332 through the winding of start relay 1804 of the auxiliary engine oil pressure, cylinder and oil temperature motor control circuit of Fig. 18. The field winding of motor 1805 is energized by current impressed thereon from the phase $\varphi 1$ portion of the secondary winding of the power transformer T18 and, with relay 1804 energized, the rotor circuit of motor 1805 is now energized over a circuit from ground through the rotor and resistance 1806, over the normally closed contacts of limit switch 1807, over the back contact of relay 1808, the upper back contact of relay 1809, the lower No. 2 contacts of relay 1804, over the back contact of DOP relay 1810 and through the left phase $\varphi 2$ portion of the secondary winding of transformer T18. Motor 1805 now operates in such a direction as, through the reduction gear box 1811, to rotate the shaft 1812 in a counterclockwise direction to rotate the rotor of the autosyn transmitter 1813 and the operating cams of the limit switches 1807 and 1815 and the cam of intermediate switch 1814. The stator of autosyn 1813 is energized from the 400-cycle 33-volt source of alternating current, two of the stator windings of which are coupled over the two conductors of cable 1816 with the stator winding of receiving autosyn 556 at the instructor's desk and over a branch of such cable, the upper Nos. 2 and 3 contacts of relay 1412 and the conductors of cable 1414 with two of the stator windings of receiving autosyn 1043 at the flight engineer's station. The third windings of these autosyns are interconnected through their connection to the grounded supply leads from the 400-cycle source of current. The rotors of the receiving autosyns 556 and 1043 are also energized as previously described from the 400-cycle bus bars 400C and 400G.

After an interval of approximately 8 seconds the rotor of transmitting autosyn 1813 will have rotated and caused the synchronous rotation of the rotors of receiving autosyns 556 and 1043 to move the pointers of the associated oil pressure indicators 557 and 1007 to indicate a simulated oil pressure of approximately 200 pounds at the auxiliary power plant.

Start relay 1804 upon operating also establishes a circuit from ground over its upper No. 1 front contact, through the left shaded pole winding 1818 of motor 1820 to ground. Since the main stator winding 1819 of the motor is energized from the 115-volt, 60-cycle source, motor 1820 which is of the reversible shaded pole type, through the reduction gear box 1861, drives shaft 1822 in a clockwise direction thereby moving the brushes of rheostats 1800 and 1801 toward their No. 1 terminals. After an interval of approximately two minutes, the brushes will have been moved to an extent sufficient to increase the current flowing over conductor 1025 through the auxiliary power plant oil temperature indicator APPO at the instructor's desk and indicator 1012 at the engineer's instrument panel whereby such indicators indicate a rise in the oil temperature from +15° C. to +25° C. and to increase the current flowing over conductor 1040 through the auxiliary power plant cylinder temperature indicator 517 at the instructor's desk and indicator 1038 at the engineer's instrument panel whereby such indicators indicate a rise in the cylinder temperature from +15° C. to +100° C. After the two-minute interval, the temperature switch TC closes to establish a circuit from ground over the upper No. 2 contacts of relay 1804, over the contacts of switch TC through the winding of T relay 1808 to battery. The motor 1820 continues in operation until the limit switch 1817 is operated by the cam on the shaft 1822 to open the circuit through the shaded pole winding 1818 whereupon the motor comes to rest.

Relay 1808 upon operating locks over its upper contacts to ground over the upper contacts of relay 1804, opens the rotor circuit previously traced for motor 1805 and establishes a new rotor circuit which may be traced from ground through the rotor, through the resistance 1806, the lower front contact of relay 1808, the lower back contact of NP relay 1809, the upper back contact of IOP relay 1823, through resistance 1824 and through the right phase φ1 portion of the secondary winding of transformer T18. Motor 1805 is now driven at a slower speed because of the inclusion of resistance 1824 in its rotor circuit and in the reverse direction whereupon the reverse operation of the rotor of autosyn transmitter 1813 causes the oil pressure indicators 557 and 1007 at the instructor's desk and the engineer's instrument panel to indicate a decreasing oil pressure until after about two minutes such indicators will indicate an oil pressure of about 60 pounds. At this time intermediate switch 1814 is operated by the motor 1805 and, since at this time relay 1808 is operated, a circuit is established from ground over the upper contacts of relay 1804, over the upper contacts of relay 1808, over the contacts of switch 1814 and through the winding of normal pressure relay 1809 to battery. Relay 1809 upon operating locks over its lower front contact under the control of start relay 1804 and at its lower back contact opens the rotor circuit of motor 1805 which comes to rest. The simulated starting and running of the auxiliary power plant is now completed and the simulated oil pressure, oil temperature and cylinder temperature thereof under normal running conditions are indicated at both the instructor's desk and at the flight engineer's instrument panel.

*Starting the main engines*

The pilot preparatory to starting the main engines operates the instrument light switch 4211, Fig. 42, thereby operating relay 4212 to light the fluorescent instrument panel lights 4213 and operates the lower and upper panel light rheostats 4201 and 4202 to the "on" position and then adjusts them to light the lamps 4203 and 4204 to the desired brightness and then checks to see that all other light switches are in the "off" positions. The pilot then momentarily operates the fuel light test switch 4311 thereby establishing a circuit from battery through the winding of FLT relay 1520, over conductor 1581 of cable 1580 and over the contacts of key 4311, conductor 1582 of cable 1580, over the lower contacts of FLW relay 1519 to ground on bus bar GB. Relay 1520 thereupon operates and, in the manner previously described in connection with the operation of the flight engineer's warning light test switch 1517, lights all of the low level fuel lamps 4310 on the pilot's pedestal and the low fuel lamps 1028 at the flight engineer's station.

At the copilot's instrument panel the flap and air indicator keys 4214 and 4215 are operated to their "on" positions. The operation of key 4214 establishes a circuit from ground on bus bar GB, over the lower contacts of FP relay 1522 operated through the closure of circuit breaker 1523, conductor 1583 of cable 1580, contacts of key 4214 and over conductor 4216 through the winding of a relay (not shown) for rendering the wing flaps indicator on the pilot's instrument panel operable. The operation of key 4215 establishes a circuit from ground on bus bar GB, over the lower contacts of AT relay 1524 operated in response to the closure of circuit breaker 1525, over conductor 1584 of cable 1580, contacts of key 4215 and through the winding of relay 730 to battery for connecting the pilot's air temperature indicator 728 in place of resistance 729 in the circuit previously traced.

Before simulating the starting of the main engines the pilot places the right and left propeller governor controls 1212 and 1213 of the overhead equipment adjacent the pilot's and copilot's stations, in the maximum R. P. M. increase positions thereby moving the similar overhead equipment (not shown) but adjacent to the flight engineer's station to the same positions; pushes the ignition switch 1214 in; closes the right and left ignition keys 1215 and 1216 to the both-closed positions as indicated in Fig. 12; operates the right and left throttles to their extreme lower or closed positions in which the brushes of the rheostats 1217R, 1218R and 1219R controlled by the right engine throttle and the brushes of the rheostats 1217L, 1218L and 1219L controlled by the left engine throttle are all moved to the lower C terminals of their windings, and whereby the throttles (not shown) but positioned adjacent to the flight engineer's station are simultaneously moved; checks to see that the right and left propeller control safety switches 4312 and 4313 are closed thereby operating the associated relays 4314 and 4315; operates the right and left propeller control switches 4316 and 4317 to their upper or automatic positions and checks to see that the switches 4318 and 4319 are in their "on" positions.

With the ignition key 1216 operated to the "both" position, indicating that both the right and left magnetos are to be used in starting the right engine, circuits over conductors 3801 and 3802 of cable 3800 to the left terminals of the windings of the right and left ignition relays 3803 and 3804 associated with the right engine control circuit of Fig. 38 are opened thereby removing shunts from such relays which thereupon operate. Relay 3803 operates over a circuit from battery through resistance 3805 to ground through its winding and relay 3804 operates over a circuit from battery through resistance 3806 to ground through its winding. With these relays both operated a circuit is established from ground over their inner upper contacts, conductor 3807 of cable 3800 to battery through the right engine ignition lamp 718 at the instructor's desk which thereupon lights to indicate that an ignition circuit has been established for the right engine. With ignition key 1215 operated to the "both" position circuits are closed over conductors 2701 and 2702 of cable 2700 whereupon relays of the engine control circuit for the left engine corresponding to relays 3803 and 3804 are operated to in turn close a circuit over conductor 2707 of cable 2700 for lighting the left engine ignition lamp 719 at the instructor's desk which thereupon lights to indicate that an ignition circuit has been established for the left engine.

With the right propeller control switch 4316 closed in its upper or automatic position a circuit is established from ground over conductor 1587, over the lower contacts of relay 4314, switch 4318, switch 4316, conductor 3808 of cable 3800 to battery through the winding of AUT relay 3809. Relay 3809 upon operating removes ground at its upper contact from conductor 2521 thereby releasing relay 2520 in the R. P. M. memory motor control circuit, Fig. 25, for the right engine for permitting the motor M25 of that circuit to be subsequently operated and at its lower back contact opens the circuit of relay 3810 which operated when battery power was connected to the trainer by the flight engineer, whereupon relay 3810 now releases and over its lower No. 1 back contact connects ground to conductor 3811 of cable 3800 thereby completing the circuit through the right propeller automatic lamp 307 at the instructor's desk, such lamp lighting to indicate that the propeller pitch control for the right engine has been placed on the automatic setting. With the left propeller control switch 4317 operated to the upper or automatic position relays similar to relays 3809 and 3810 are controlled in the engine control circuit for the left engine whereby the R. P. M. memory motor control circuit for the left engine is conditioned for operation and a circuit is established over conductor 2711 of cable 2700 for lighting the left propeller-automatic lamp 207 at the instructor's desk, Fig. 2.

The flight engineer to simulate the starting of the right engine now operates the right engine start key 1641 to its left or "on" position for approximately twelve seconds thereby establishing a circuit from ground over the left contact of key 1641, conductor 1642 to battery through the winding of STO1 relay 3812. Relay 3812 thereupon operates establishing a circuit over its upper contacts and conductor 3813 of cable 3800 to battery through the right engine starter on lamp 421 at the instructor's desk which remains lighted so long as the key 1641 is held in the start position to indicate that the simulated inertia starter is being brought up to the required speed. Relay 3812 also establishes a circuit for STO relay 3814 which may be traced from battery through its winding over the lower contacts of relay 3812, conductor 3819, over the front contact of main engine start relay 1645 to ground on bus bar GB, relay 1645 being operated in response to the closure of circuit breaker 1646 by the flight engineer. Relay 3814 upon operating closes the filament heating circuit for the timing tube TT. After an interval of approximately twelve seconds the filament will become sufficiently heated to cause the tube TT to conduct and establish the circuit of FTW relay 3815 over a circuit from anode battery over the anode-cathode path through the tube, through the winding of relay 3815 to ground at the back contact of EST relay 3816.

After the expiration of approximately twelve seconds the flight engineer operates the key 1641 to its right or mesh position and at the same time operates the right engine priming key 1643, it being assumed that the starting of a cold engine is being simulated. The operation of key 1643 establishes a circuit from ground thereover, over conductor 1644 and through the winding of PRM1 relay 3817. Relay 3817 upon operating establishes a circuit from ground over its upper contacts, conductor 3818 of cable 3800 to the right engine primer lamp 422 to battery for indicating to the instructor that the primer switch for the right engine has been closed. Relay 3817 also establishes a circuit from ground over conductor 3819, over its lower contacts over conductor 3820, the lower contacts of right fuel relay 1719 and over conductor 3821 through the winding of PRM relay 3822 to battery thereby operating relay 3822.

Relay 3822 upon operating establishes a control circuit for the right engine fuel flow motor control circuit of Fig. 19 since fuel will be consumed in priming the engine and in operating it under the control of the inertia starter. This circuit may be traced from a point between resistances 3845 and 3846, which are connected in series between the bus bar 40φ1 and ground, over the lower front contact of PRM relay 3822, over conductor 3847, through resistance 3002 and conductor 3003 to the input of amplifier tube 1900 of the fuel flow motor control circuit. This potential is amplified by tube 1900, is rectified by tube 1903, and is impressed upon the control grids of tubes 1904 and 1905. As a result tube 1904 fires but tube 1905 does not and the RV and RV1 relays 1906 and 1907 do not operate and the motor M19 is operated to rotate shaft 1910 at a slow speed in one direction of rotation and through the unity ratio bevel gears 3000 to rotate the shaft 3001 in such a direction as to move the brush of the potentiometer associated with such shaft from the No. 1 toward the No. 3 terminal of its winding. As soon as the brush of the balancing potentiometer RFFP1 has moved to a position such that the potential of phase φ2 supplied thereover balances the control potential of phase φ1 the motor M19 comes to rest. Potential of phase φ2 is supplied from bus bar 40φ2 over resistance 3004 through the winding of potentiometer RFFP1 to ground. The movement of shaft 1910 will be only slight at this time as the rate of fuel consumption until the engine starts running is at a very slow rate.

The shaft 1910 upon rotating rotates the rotor of transmitting autosyn 1925, the rotor winding of which is energized from the 400-cycle bus bars 400C and 400G and the stator windings of which are connected over conductors of cable 1926 with the stator windings of the receiving autosyn 528 which drives the right unit of the dual fuel flow indicator 529 at the instructor's desk. The rotor winding of the receiving autosyn is energized from the 400C and 400G bus bars. The stator windings of the transmitting autosyn 1925 are also connected over a branch of cable 1926, over the lower Nos. 2 and 3 contacts of relay 1412 and conductors of cable 1416 with the stator windings of the receiving autosyn 1045 which drives the fuel flow indicator 1006 mounted on the flight engineer's instrument panel, Fig. 10. The rotor winding of this autosyn is energized from the 400C and 400G bus bars. These indicators 529 and 1006 now indicate the rate of fuel consumption during the time that the driving of the right engine by the inertia starter is being simulated.

With the key 1641 in the mesh position a circuit is established from ground over the right contacts of key 1641, conductor 1648 and through the winding of STM2 relay 3823 to battery whereupon relay 3823 operates and connects ground over its upper contacts and conductor 3824 of cable 3800 to battery through the right engine starter mesh indicating lamp 423 at the instructor's desk. With relay 3815 operated after the expiration of the twelve-second interval, relay 3823 also establishes a circuit for STM1 relay 3825 over a circuit from battery through its winding, over the contacts of relay 3815 and the lower contacts of relay 3823 to ground on conductor 3819. Upon the operation of key 1641 from the start position to the mesh position the circuit of STO1 relay 3812 is opened and this relay releases STO relay 3814. The release of relay 3814 opens the filament heating circuit of tube TT and after the expiration of approximately twenty seconds tube TT ceases to conduct and FTW relay 3815 releases, if it has not previously released.

Relay 3825 establishes an obvious circuit over its lower No. 3 contacts for STM relay 3826. However, prior to its operation a circuit was effective for starting the motor of the manifold pressure motor control circuit of Fig. 23 extending from ground through resistance 3402, through potentiometer AP3 driven from the altimeter motor control circuit (the winding of which potentiometer is energized over a circuit from ground through resistance 3402, through resistance 3403 and conductor 3404 from the bus bar 40φ1), thence over conductor 3405, over the upper No. 2 back contact of FL relays 3841, the upper back contact of STM relay 3826, the lower back contact of EST1 relay 3828 to the control conductor 3842 of the manifold pressure motor control circuit of Fig. 23. The potential applied to conductor 3842 is amplified by an amplifier tube (not shown) but similar to tube 1900 of Fig. 19, is rectified by a tube (not shown) but similar to tube 1903 of Fig. 19 and is impressed upon the control grids of motor control tubes (not shown) but similar to tubes 1904 and 1905 of Fig. 19. As a result the tube corresponding to tube 1904 fires but the tube corresponding to tube 1905 does not and the motor (not shown) is operated to rotate shaft 2310 at a slow speed in one direction of rotation and through the unity ratio bevel gears 3400 to rotate the shaft 3401 in such a direction as to move the brushes of the potentiometers controlled thereby from the No. 1 toward the No. 3 terminals of their windings. As soon as the brush of balancing potentiometer RMP5 has moved to a position such that the potential of phase $\varphi 2$ applied through resistance 3406 to conductor 3842 from the brush of potentiometer RMP5 balances the control potential of phase $\varphi 1$ applied to conductor 3842 the motor of the manifold pressure motor control circuit will stop. Potential of phase $\varphi 2$ is applied to the winding of potentiometer RMP5 over a circuit from ground through resistance 3407 through the potentiometer winding and over conductor 3408 to the bus bar $40\varphi 2$. The potentiometers controlled by shaft 3401 will now be adjusted to positions commensurate with the barometric pressure at sea level.

Rotation of shaft 2310 has also resulted in the movement of the rotor winding of the autosyn transmitter 2325, the rotor winding of which is energized from the 33-volt, 400 cycle source over the 400C and 400G bus bars and whose stator windings are connected over conductors of cable 2326 with the stator windings of the receiving autosyn 526 associated with the dual manifold pressure indicator 527 at the instructor's desk, the rotor winding of which is also energized from the bus bars 400C and 400G and over another branch of cable 2326 over the lower Nos. 1 and 2 contacts of relay 1411, conductors of cable 1415, with the stator windings of the receiving autosyn 4225 associated with the dual manifold pressure indicator 4224 on the pilot's pedestal and with the stator windings of the receiving autosyn 1044 associated with the dual manifold pressure indicator 1010 on the flight engineer's instrument panel. The right portions of these dual indicators are thus operated to indicate a barometric sea level pressure of 30 inches of mercury.

As soon as the STM relay 3826 operates, the circuit previously traced for applying potential of phase $\varphi 1$ to the control conductor 3842 of the manifold pressure motor control circuit is opened and a new circuit is established which extends from conductor 3842 over the lower No. 3 back contact of EST1 relay 3828, over the upper front contact of STM relay 3826, conductor 3843, over the throttle controlled rheostat 1218R, to the $40\varphi 1$ bus bar. The winding of rheostat 1218R is energized over a circuit extending from ground therethrough, through resistance 1222R and over conductor 1223 from the bus bar $40\varphi 1$. The potential now applied to conductor 3842 is somewhat less than formerly applied due to the fact that the engine is now assumed to be turning over under the control of the inertia starter and will therefore produce a suction on its manifold to reduce the manifold pressure slightly below the 30-inch barometric pressure. The amount of the reduction of the pressure will depend upon the setting of the throttle for the right engine.

When the MAN relay 3810 released as previously described in response to the setting of the propeller control for automatic operation, a circuit was established from a point between resistances 3848 and 3849, over the upper back contact of ESTA relay 3839, over the upper No. 1 back contact of MAN relay 3810, over conductor 3850 through resistance 2522 to control conductor 2523 of the R. P. M. memory motor control circuit for the right engine. Potential from the bus bar $40\varphi 2$ being supplied to the potential divider comprising resistances 3848 and 3849, potential of phase $\varphi 2$ is applied to control conductor 2523 and as a consequence the motor M25 is operated to rotate shaft 2510 at a slow speed until the cam carried thereby operates the L1 limit switch 2511 to open the circuit of motor M25 at which time through the unity ratio bevel gears 3600 and shaft 3601 the brush of potentiometer RRMP6 associated therewith will be driven to the No. 1 terminal end of its winding.

The R. P. M. memory motor unit is a circuit arrangement whereby by means of the potentiometer RRMP6 controlled thereby the potential from the propeller potentiometer RPP1, manifold pressure potentiometer RMP2 and true air speed potentiometer TASP4 is maintained precisely equal to the potential in the R. P. M. balancing potentiometer RRP10 so that at the instant of throw-over from automatic to manual control of the propeller the R. P. M. motor control circuit of Fig. 22 will not cause any change in the setting of its associated potentiometers. This simulates the action in an actual aircraft since at the instant of the throwover the conditions affecting the R. P. M. are not changed and the R. P. M. remains the same. Subsequent changes in the propeller pitch, manifold pressure or true air speed of course will affect the R. P. M.

When relay 3826 later operates a circuit is established from the bus bar $40\varphi 1$, over its inner upper contacts, conductor 3844, through the winding of the right propeller pitch potentiometer RPP1 and resistance 3602 to ground. A potential derived therefrom is applied through the winding of the right engine manifold potentiometer RMP2 and resistance 3603 to ground. A further potential derived from the latter potentiometer is applied through the winding of the true air speed potentiometer TASP4 and through resistance 3604 to ground from which latter potentiometer a potential is derived and applied through the winding of the R. P. M. memory potentiometer RRMP6 and a potential derived from the latter potentiometer is applied over conductor 3605, over the lower No. 2 back contact of relay 3810, conductor 2525, through resistance 2524 to control conductor 2523 of the R. P. M. memory motor control circuit of Fig. 25. The motor control circuit is thus operated to rotate the shafts 2510 and 3601 until the brush of potentiometer RRMP6 is adjusted to render the potential of phase $\varphi 1$ applied thereover, as just described, equal to the potential of phase $\varphi 2$ applied to the control conductor 2523 over the brush of the balancing potentiometer RRP10 of the R. P. M. motor unit. This latter potential is applied from the brush of potentiometer RRP10, over conductor 3856, over the upper front contact of ESTA relay 3839, over the upper No.

1 back contact of MAN relay 3810, conductor 3850, through resistance 2522 to control conductor 2523.

Relay 3825 also upon operating connects 40-volt phase φ1 current from bus bar 40φ1 over its upper No. 1 contacts to conductor 3827, through the winding of manifold pressure potentiometer RMP4 of Fig. 33 and through resistances 3302 and 3303 in series to ground and in parallel with such resistances over conductor 3304, through the right engine throttle rheostat 1217R in the closed or low resistance position, Fig. 12 and, over conductor 3305 through resistance 3306 to ground. From the junction point between resistances 3302 and 3303 of Fig. 33 conductor 3307 extends over the upper No. 1 back contact of EST1 relay 3828, over conductor 3829 to the upper terminal of the primary winding of transformer T22 of the R. P. M. motor control circuit of Fig. 22. Potential from the bus bar 40φ1 is also applied over the upper No. 1 contacts of relay 3825, through resistance 3899, over conductor 3830, through the winding of the right propeller governor rheostat 1212, Fig. 12, in the maximum R. P. M. or low resistance position and conductor 1221 to the lower terminal of the primary winding of transformer T22 of the R. P. M. motor control circuit of Fig. 22.

Potential of phase φ1 is therefore connected to both terminals of the primary winding of transformer T22 but these potentials being of different value will cause current to flow through the primary winding of transformer T22 with the result that during the positive half cycles of the current positive potential will be applied to the control grid of tube VT22. Biasing potential is applied to the control grid of tube VT22 over the secondary winding of transformer T22, through the bias adjusting rheostat R22 and through the diode rectifier tube VT21 and the left secondary winding of power transformer T23 to ground, rheostat R22 being connected through resistance 2200 in series with the left secondary winding of transformer T23 across the cathode-anode path through the tube VT21. The filaments of tubes VT22 and VT21 are heated by current applied from the middle secondary winding of transformer T23 and anode potential of phase φ1 is supplied through retard coil 2205 through the winding of the MPC relay 2202 in parallel with the resistance 2203 from 115-volt phase φ1 bus bar 115φ1. With the control potential of phase φ1 applied to the primary winding of transformer T22 potential of phase φ1 is impressed upon the control grid of tube VT22 and with potential of the same phase φ1 applied to its anode tube VT22 becomes conducting during each positive half cycle and operates relay 2202 to short-circuit resistance 2200 and to thereby increase the positive grid bias of tube VT22 to insure that relay 2202 will be held operated so long as tube VT22 continues to conduct in response to the control potential.

With relay 2202 operated potential of phase φ1 connected over the No. 1 contact of relay 3825, conductor 3827, through the winding of manifold pressure potentiometer RMP4 of Fig. 33, through resistance 3302, conductor 3307, the upper No. 1 back contact of relay 3828 and conductor 3829 is further connected over the upper front contact of relay 2202, over conductor 2204, through resistance 3831 and resistances 3832, 3833 and 3834 in series to ground and in parallel with the latter resistances over the upper front contacts of IGR and IGL relays 3803 and 3804, over the upper No. 2 back contact of MAN relay 3810, the upper front contact of PRM relay 3822, over the upper No. 2 front contact of STM1 relay 3825, conductor 3835, through resistance 3308 and conductor 2201 to the R. P. M. motor control circuit for the right engine, Fig. 22.

In response to the potential of phase φ1 applied to conductor 2201, this potential is amplified by an amplifier tube (not shown) but similar to tube 1900 of Fig. 19, is rectified by a tube (not shown) but similar to tube 1903 of Fig. 19, and is impressed upon the control grids of motor control tubes (not shown) but similar to tubes 1904 and 1905 of Fig. 19. As a result the tube corresponding to tube 1904 becomes conducting but the tube corresponding to tube 1905 does not and the RV and RV1 relays 2206 and 2207 do not operate and the motor (not shown) is operated to rotate shaft 2210 at a slow speed in one direction of rotation and through the unity ratio bevel gears 3300 to rotate the shaft 3301 in such a direction as to move the brushes of the potentiometers from the No. 1 terminals of their windings towards the No. 3 terminals thereof. As soon as the brush of balancing potentiometer RRP10 has moved to a position such that the potential of phase φ2 applied therefrom to conductor 2201 through resistance 3309 as derived from the potentiometer, whose winding is connected in a circuit from ground through such winding and resistance 3310 to the 40-volt 60-cycle bus bar 40φ2, balances the signal potential of phase φ1 applied to conductor 2201 as previously described, the motor of the R. P. M. motor control circuit stops. The potentiometers controlled by shaft 3301 will now be adjusted to positions commensurate with the simulated speed at which the right engine is being turned over by the inertia starter.

As soon as shaft 2210 leaves its normal position the L1 limit switch 2208 closes its right contacts thereby causing the operation of "on" relay 2209. Relay 2209 upon operating establishes a circuit from ground over its upper No. 4 contacts and conductor 2214 through the winding of relay 2900 and the field winding of motor 2901 of the tachometer motor control circuit of Fig. 29 to battery B29. The rotor of motor 2901 is energized by 230-volt current applied from bus bar 115φ1 through the rotor circuit, through resistance 2917, through the next to left secondary winding of transformer 2904, across the cathode-anode path through the gas-filled tube 2905 to the bus bar 115φ2. The tube 2905 rectifies this current so that in response to each firing of the tube a unidirectional impulse of current is transmitted through the rotor winding of the motor. The connections from the bus bars 115φ1 and 115φ2 to the lower rotor brush of motor 2901 and to the anode of tube 2905 are such that the motor will run in such a direction as to cause tachometers driven by the tachometer generator RTG coupled to the motor shaft of the motor 2901 to give positive indications.

For controlling the motor 2901 the gas-filled tube 2905 is provided, the filament of which is heated by alternating current supplied from the next to left secondary winding of power transformer 2904 and the anode of which is supplied with anode potential from the bus bar 115φ2 as previously described. Alternating current biasing potential is applied between the grid and cathode of tube 2905 over a circuit which extends from the grid through resistance 2906 and through resistance 2907 which has an alternating current potential with a leading phase angle impressed upon it by the condenser 2908, through the left secondary winding of transformer 2904, through condensers 2909 and 2910 to the mid-point of the next to left secondary winding of transformer 2904, thence through the filament of tube 2905 which serves as a cathode.

For producing the direct current potential which is superposed on the alternating biasing potential of tube 2905, the dual rectifier tube 2911 is provided having its filament heated by alternating current supplied from the next to right secondary winding of transformer 2904. The primary winding of transformer 2904 is energized from the bus bar 115φ1 in parallel with the primary winding of the biasing transformer 2912 for the tube 2955 of the left engine tachometer motor control circuit and in parallel with the primary winding of the constant voltage transformer 2903. The winding of potentiometer RPP5 is connected through resistance 2902 to the secondary winding of the constant voltage transformer 2903 and the brush of such potentiometer is connected through the primary winding of input transformer 2914 to ground whereby the movement of the brush of the potentiometer by the rotational movement of shaft 3301 driven by the motor of the R. P. M. motor control circuit is instrumental in deriving a potential from the potential impressed upon its winding and impressing such derived potential upon the primary winding of transformer 2914.

The secondary winding of transformer 2914 is connected over a circuit extending from the left cathode of rectifier tube 2911, through such secondary winding, over the contacts of relay 2900, through the right portion of the winding of rheostat 2913 and resistance 2915 in series to the left anode of tube 2911. Tube 2911 thus rectifies the input control potential. This rectified potential is regulated by the adjustment of the slider of rheostat 2913. A potential derived from this potential is superimposed upon the alternating current grid biasing potential and applied between the cathode and grid of tube 2905 over a path which may be traced from the grid of the tube, through resistances 2906 and 2907, through the right portion of the winding of rheostat 2913, through resistances 2915 and 2916, through the rotor circuit of motor 2901, through resistance 2917 to the mid-point of the next to left secondary winding of transformer 2904 and to the filament or cathode of tube 2905.

As the brush of potentiometer RRP5 moves in response to the motor of the R. P. M. motor control circuit a potential is impressed upon the secondary winding of transformer 2914. The potential is rectified by tube 2911 and impressed as a grid control potential between the grid and cathode of tube 2905 superimposed upon the alternating current biasing potential impressed between the grid and cathode of such tube. At the same time alternating current of phase φ2 is applied as an anode potential upon the anode of tube 2905 as previously described. The alternating current grid biasing potential and the resultant alternating current grid potential are opposite and leading in phase with respect to the anode potential. Thus during each positive half cycle of the anode potential the tube 2905 will fire when the resultant biasing potential rises to an amount which is equal to or slightly in excess of the critical grid potential.

Each time that the tube 2905 fires an impulse of current flows through the rotor circuit of motor 2901 over a path which may be traced from the lower brush of the motor to the bus bar 115φ1 returning over bus bar 115φ2 through choke coil 2918 across the anode-cathode path through tube 2905 to the mid-point of the next to left secondary winding of transformer 2904, thence through resistance 2917 to the other brush of the motor. With its stator winding energized from the direct current source B29 the motor in response to the impulses of current transmitted through its rotor winding by the repeated firing of tube 2905 rotates at an accelerating speed. During each interval that the tube 2905 is non-conducting motor 2901 is operating at a substantially uniform speed by reason of the discharge of condenser 2919 through its rotor winding and is thereby producing a counter-electromotive force which is proportional to the speed of the motor. This counter-electromotive force is applied between the grid and cathode of tube 2905 in opposition to the control potential produced in response to the incoming control potential as modified by the potentiometers RRP5 over a path which extends from the lower brush of motor 2901, through resistance 2916, resistance 2915, the right portion of the winding of rheostat 2913 and through resistance 2907 and 2906 to the grid of tube 2905 and from the filament of tube 2905 to the mid-point of the next to left secondary winding of transformer 2904 thence through the resistance 2917 to the upper brush of motor 2901. The effect of this counter-electromotive force is to tend to neutralize the impressed direct current grid component when the motor 2901 attains a speed commensurate with the setting of the brush of potentiometer RRP5. When this occurs firing of the tube 2905 is retarded to a point where the average current is just enough to keep the motor 2901 running at a speed corresponding to the input potential. For a more complete description of the operation of the tachometer motor control circuit reference may be had to the disclosure of Patent 2,493,064 to C. E. Germanton of January 3, 1950.

The tachometer motor control circuit disclosed in the lower portion of Fig. 29 is provided for operation in connection with the R. P. M. motor control circuit for the simulated left engine and functions with the right unit of the rectifier tube 2911. Since the engines of a two-engined aircraft rotate in opposite directions, the motor 2951 is arranged to rotate in the opposite direction from the motor 2901 by the connection of the anode of tube 2955 through the choke coil 2968 to the bus bar 115φ1 and the connection of the lower brush of the motor to the bus bar 115φ2. Thus the tachometer generators RTG and LTG driven by the motors 2901 and 2951 are driven in opposite directions to cause the tachometers at the instructor's desk and at the pilot's pedestal and on the flight engineer's instrument panel to be driven in opposite directions.

As the tachometer generator RTG rotates through its coupling over conductors 2920 and 2921 of cable 2922 with the right engine tachometer 722 at the instructor's desk and the right engine tachometer 4222 at the pilot's pedestal and over a branch of cable 2922 with the right engine tachometer 1015 on the flight engineer's instrumental panel, the tachometers 4222, 722 and 1015 are driven to indicate the speed of the simulated right engine in revolutions per minute.

Relay 3825 of Fig. 38 also upon operating establishes a circuit from ground over the lower front contacts of IGR and IGL relays 3803 and 3804, over the lower back contact of relay 3836, over the upper No. 3 contacts of relay 3836, over conductor 4000, through the winding of relay 4001 of the sound effects circuit of Fig. 40 provided for simulating the sound due to the operation of the right engine whereby such sound effects circuit is rendered effective. The shaft of the tachometer motor 2901 also carries the toothed disc 2923 of a sound effects generator which revolves in the field 2924 of such generator and generates therein pulsations of current which are transmitted over conductors 2925 and 2926 through the primary winding of input transformer 4003.

The pulsations are impressed upon the input of the dual amplifier tube 4003, are amplified thereby and impressed through the volume regulating rheostat 4004 upon the control grid of the detector tube 4005, the cathode-anode path through which is connected in series with the primary winding of the output transformer 4006, the secondary winding of which transformer is connected through a power amplifier 4007 with one or more loud-speakers 4008 conveniently located in different parts of the trainer. Anode potential is applied from the source B40 through resistance 4009 to the anode bus bar 4010 and from this bus bar through resistances 4011, 4012 and 4013 to the anodes of tubes 4003 and 4005. Direct current bias is impressed upon the grid 4014 of tube 4005, through resistance 4015, across the cathode-anode path through the left unit of the dual rectifier tube 4016 and through the secondary winding of transformer 4017 to ground, this cathode-anode path being bridged across the secondary winding of transformer 4017 and energized by potential from the 40-volt, 60-cycle bus bar 40φ2, impressed through the rheostat 4018 and from the brush thereof through resistance 4019 and through the primary winding of transformer 4017, and by potential from the 40φ2 bus bar applied from the brush of the brake horse-power variac RBV7, over conductor 4021, through the winding of rheostat 4022 and from the brush thereof through resistance 4023 and the primary winding of transformer 4017. This latter potential increases as the brake horse-power output of the engine increases thereby increasing the simulated engine noise. The filaments of all of the tubes of both sound effects circuits are energized by 6.3-volt current obtained from the secondary winding of filament current transformer 4020.

With relay 4001 normally deenergized, the secondary winding of input transformer 4002 is short-circuited and no incoming signal from the sound effects generator 2923 is impressed upon the input circuit of tube 4003. As the generator 2923 rotates slowly while the starting of the right engine by the inertia starter is being simulated the pulses generated thereby are amplified and sounds are produced by the loud-speakers in simulation of the sound of firing explosions of an engine while it is being started.

With "on" relay 2209 of the R. P. M. motor control circuit operated a circuit is also established from ground over the inner upper front contact of RF relay 1719 at the flight engineer's fuel trunk panel, over conductor 1725, over the lower No. 3 contacts of relay 2209, conductor 2215 and through the winding of RFS relay 1726 to battery. Relay 1726 thereupon operates establishing an obvious circuit for RFS1 relay 1727 which thereupon locks over its inner upper contacts to ground on the back contacts of RFS2 relay 1728. Relay 1727 upon operating connects ground over its inner lower contacts and conductor 1729 through the winding of start relay 3950 of the right engine fuel pressure circuit of Fig. 39. Relay 3950 thereupon operates and connects 57-volt, 60-cycle alternating current from the upper or phase φ1 portion of the secondary winding of power transformer 3901, over the back contact of DFP relay 3902, over the upper contacts of relay 3950, the back contact of UL relay 3903, through resistance 3904 and the rotor winding of motor 3905 to ground. The stator winding 3906 of this motor is energized in a circuit extending therethrough and through the lower or phase φ2 portion of the secondary winding of transformer 3901, whereupon the motor is started and through the reduction gear box 3907 drives shaft 3908 and the cams and the rotor of the transmitting autosyn 3924 mounted thereon in a counter-clockwise direction. As soon as the shaft moves off normal the contacts of switch 3909 close thereby establishing an obvious circuit for LL relay 3910.

The rotor winding of autosyn 3924 is energized by 400-cycle current from the bus bars 400C and 400G and its stator windings are connected over conductors 3925 and 3926 of cable 3927 with the stator windings of the receiving autosyn 532, which drives the right unit of the dual fuel pressure indicator 533 at the instructor's desk, the rotor winding of which autosyn is energized from the bus bars 400C and 400G, and over a branch of cable 3927 over the upper Nos. 5 and 6 contacts of relay 1411 and conductors of cable 1417 with the stator windings of receiving autosyn 1046 which drives the right unit of the dual fuel pressure indicator 1011 on the flight engineer's instrument panel. The rotor winding of the latter autosyn is energized from the bus bars 400C and 400G. The indicators 533 and 1011 now indicate the pressure of the fuel supply to the right engine which now rises to about 7 pounds.

Relay 3910 upon operating establishes a circuit which may be traced from ground over the inner upper contacts of ignition relays 3803 and 3804, over conductor 3807, the contacts of the right engine disabling key 700R at the instructor's desk, over conductor 701, the lower contacts of relay 1727, conductor 1730, over the lower contacts of relay 3910, conductor 3911, over the inner lower contacts of FTR relay 3837, over the inner upper contacts of PRM relay 3822, over the lower No. 2 contacts of STM1 relay 3825, over the upper back contact of EST2 relay 3836 through the winding of ST relay 3838 to battery. Relay 3838 operates and locks over its upper contacts, over the lower No. 2 contacts of relay 3825, thence to ground as traced over the contacts of disabling key 700R at the instructor's desk and establishes a circuit from ground over its lower contacts and the lower No. 1 contacts of STM1 relay 3825, through the winding of EST2 relay 3836 to battery. Relay 3836 thereupon operates opening at its upper back contact the initial operating circuit of ST relay 3838, opening at its lower back contact the circuit previously traced for enabling the sound effects circuit of Fig. 40 and establishes a circuit from ground over the inner lower contacts of ST relay 3838, over the front contacts of EST2 relay 3836 through the winding of EST1 relay 3828 to battery.

Relay 3828 upon operating locks over its lower No. 1 contacts to ground over the inner lower contacts of ST relay 3838, establishes bridges around the upper Nos. 2 and 3 contacts of STM1 relay 3825 over its upper Nos. 2 and 3 contacts for maintaining the continuity of the circuits extending thereover following the subsequent release of relay 3825, and over its lower No. 2 contacts establishes an obvious circuit for ESTA relay 3839. Relay 3839 upon operating closes an obvious circuit for EST relay 3816 which operates and opens the circuit of STW relay 3815 which may be traced over the cathode-anode path of tube TT thereby releasing relay 3815 and extinguishing the tube. Relay 3815 upon releasing in turn releases STM1 relay 3825 which in turn releases STM relay 3826 and EST2 relay 3836. At its lower No. 3 contacts relay 3816 establishes a circuit from ground over the lower contacts of relays 3803 and 3804, over the lower No. 3 contacts of relay 3816 and conductor 4000 for reconditioning the sound effects circuit and over its lower No. 1 contacts establishes a circuit from ground over conductor 3840 of cable 3800, over the contacts of the right engine generator key 432 at the instructor's desk, Fig. 4, over conductor 1337 of cable 1300 through the winding of REG relay 1338 at the flight engineers' power panel. Relay 1338 thereupon operates for a purpose to be presently described.

The EST1 relay 3828 upon operating modifies the circuit previously traced for controlling the R. P. M. motor control circuit of Fig. 22 to increase the potential applied to control conductor 2201 thereof. The modified control circuit may be traced from the bus bar 40$\varphi$1, over the upper No. 2 contacts of EST1 relay 3828, over conductor 3827, through the winding and over the brush of the manifold pressure potentiometer RMP4, over conductor 3311, over the upper No. 1 front contact of EST1 relay 3828, over conductor 3829 and thence as traced to control conductor 2201. With the increase of potential thus resulting the motor of the R. P. M. motor control circuit is again started and advances the potentiometer brushes carried by the shaft 3301 further toward the No. 3 terminals of their windings until the motor is arrested when the balancing potentiometer RRP10 reaches a position to apply a potential from bus bar 40$\varphi$2 to control conductor 2201 which balances the control potential of phase $\varphi$1 applied to such conductor. Through the new setting of the brush of potentiometer RRP5, the tachometer motor 2901 is controlled to increase the speed of the tachometer generator RTG driven thereby so that the tachometer 4222 of the pilots' panel, the tachometer 722 at the instructor's desk and the tachometer 1015 at the flight engineer's instrument panel are driven to indicate the simulated idling speed of the right engine of approximately 650 revolutions per minute.

The change in the speed of rotation of the tachometer motor 2901 and the consequent increase in speed of the sound effects generator 2923, with relay 4001 now reoperated, causes the sound effects circuit to produce sounds by the loud-speaker 4008 simulating the increased noise due to the increased speed of the started engine, the periodicity of the explosion noises produced by the loud-speaker increasing as the rotational speed of the engine increases and the intensity increasing as the brake horse-power output of the engine increases.

When the shaft 2210 of the R. P. M. motor control circuit has been rotated to a position corresponding to an R. P. M. speed of approximately 400 R. P. M., the contacts 2211 become closed to establish a circuit from the 115-volt supply 2212, over the contacts of switch 2211 and conductor 2213 through the winding of the variable autotransformer or "variac" RRV6 from which power is derived for driving the right vibrator motor RVM bolted to the right side of the trainer mock-up 100. The shaft of this motor carries an eccentrically mounted weight whereby the operation of the motor sets up a vibration in the right portion of the mock-up simulating the vibration due to the operation of the right engine and the vibration due to the right engine propeller. This vibration increases in intensity as the right engine speed increases.

Since the engine is now running at a higher speed the fuel consumption will be greater and therefore a new control circuit is established for the right engine fuel flow motor control circuit of Fig. 19. Potential of phase $\varphi$1 is now applied from bus bar 40$\varphi$1, through the winding of the manifold pressure potentiometer RMP3 and through resistance 3005 from which a derived potential is applied through the winding of R. P. M. potentiometer RRP7. The potential derived from this potentiometer is applied through the winding of altimeter potentiometer AP1 and resistance 3006 to ground and the resulting potential derived from the latter potentiometer is applied over conductor 3007 through resistances 3851 and 3852 to ground. From this latter potential divider a potential of phase $\varphi$1 is applied over the inner upper back contact of LN relay 3853, over the lower back contact of ICO relay 3854, over conductor 3855, over the upper front contact of relay 3910, conductor 3912 and through resistance 3008 to control conductor 3003 of the fuel flow motor control circuit, Fig. 30.

The motor M19 of this circuit now positions the shaft 1910 until the balancing potentiometer RFFP1 assumes a position in which the potential of phase $\varphi$2 applied thereover through resistance 3009 to the control conductor 3003 balances the potential of phase $\varphi$1 on conductor 3003. When this balance is reached the motor M19 stops. The fuel flow indicators 529 and 1006 at the instructor's desk and on the flight engineer's instrument panel will now indicate the fuel flow commensurate with the operation of the right engine at the idling speed of approximately 650 revolutions per minute. It will be noted that this fuel flow is dependent upon or a function of the manifold pressure, the R. P. M. and the altitude, and may be expressed by the equation as follows:

$$\text{Fuel flow} = f(MP) \times f(R.\ P.\ M.) \times f(ALT)$$

In the above equation the terms, such as $f(MP)$, indicate that such a term is a function of the manifold pressure, etc.; that is, whenever the symbol $f$ is shown as part of a term it means that that term of the equation is a function of whatever follows it in that term.

The R. P. M. potentiometer RRP7 has been set as previously described for an engine speed of 650 revolutions per minute, the brush of the altimeter potentiometer AP1 will at this time be adjacent its No. 1 winding terminal since the aircraft has not left the water and will therefore interpose no correction for the fuel flow measurement, and the manifold pressure potentiometer RMP3 will have been set to a position commensurate with the manifold pressure of approximately ten inches of mercury for the engine idling at the speed 650 revolutions per minute at sea level.

Following the operation of EST1 relay 3828 the manifold pressure motor control circuit is operated to adjust the potentiometers controlled thereby to settings corresponding to a manifold pressure of approximately ten inches. To accomplish this, potential of phase φ1 is applied from bus bar 40φ1 over conductor 1223, through the winding of variac 1219R to ground and the potential derived therefrom is applied over conductor 1224, through the winding of altitude potentiometer AP9 and through resistance 3409 to ground. The potential derived from the latter potentiometer is applied over conductor 3410, over the upper No. 1 contacts of ON relay 2209, conductor 3411, over the upper back contact of SHR1 relay 3412 to the brush of the R. P. M. potentiometer RRP3, over the left portion of the winding of this potentiometer and the upper middle back contact of relay 3412, through resistance 3414 to ground and over resistance 3415, the inner lower back contact of relay 3412, conductor 3416, through the right engine manifold pressure rheostat 530, conductor 531, over the lower front contact of EST1 relay 3828 and to control conductor 3842 of the manifold pressure motor control circuit of Fig. 23. The motor of this circuit is thereupon controlled to rotate the shafts 2310 and 3401 to set the potentiometers controlled thereby to positions commensurate with the reduced manifold pressure resulting from the operation of the engine at the idling speed of 650 revolutions per minute. The shaft 2310 also through the autosyn 2325 operated thereby causes the operation of the manifold pressure indicator 527 at the instructor's desk, the manifold pressure indicator 1010 at the flight engineer's instrument panel, and the manifold pressure indicator 4224 at the pilot's panel.

It is to be noted that when the engine is running the manifold pressure varies with the altitude, with the R. P. M. and with the throttle opening and may be expressed by the equation $$MP = f(ALT) \times f(R.\ P.\ M.) \times \text{throttle opening}$$

and decreases as the altitude increases, increases as the R. P. M. increases and increases as the throttle opens. The symbol $f$ used in the equation signifies, as previously mentioned, that the term of the equation containing the symbol is a function of what follows the symbol. With the aircraft on the water and the brush of the altimeter potentiometer AP9 then near its No. 1 winding terminal, with the brush of manifold pressure rheostat 530 at the instructor's desk adjacent the No. 1 terminal of its winding and the throttle variac 1219R set in the closed throttle position, the indicators 4224, 527 and 1010 will indicate approximately ten inches of manifold pressure.

The ESTA relay 3839 upon operating connects control conductor 3850 extending to the R. P. M. memory motor control circuit of Fig. 25, over the upper No. 1 back contact of MAN relay 3810, the upper front contact of ESTA relay 3839, over conductor 3856 and thence through resistance 3309 to control conductor 2201 of the R. P. M. motor control circuit of Fig. 22 whereby the movement of the brush of the balancing potentiometer RRP10 of the R. P. M. circuit will apply potential of phase φ2 from the bus bar 40φ2 to bring the shaft 3301 to rest when it has assumed a position commensurate with the idling speed of 650 revolutions per minute. The balancing potentiometer RRP10 also applies balancing potential to the control conductor 3850 of the R. P. M. memory motor control circuit to also bring the shaft 3601 thereof to rest in a similar position.

The EST relay 3816 upon operating establishes a circuit from bus bar 40φ1 over its upper No. 1 contacts to a point in the potential divider extending from ground through resistances 3857 and 3858, over the upper back contact of LN relay 3853, over conductor 3859, through the winding of manifold pressure potentiometer RMP1 and resistance 3204 to ground. A potential determined by the position assumed by the brush of potentiometer RMP1 is applied over conductor 3205, over the middle back contact of SHR relay 3413, through resistance 3417, over conductor 3418 to the brush of the R. P. M. potentiometer RRP1, and over the potential divider extending from ground through the potentiometer winding, over conductor 3213, over the lower back contact of relay 3413, through resistances 3419 and 3420 to ground and, in parallel with the latter potential divider, through resistance 3206 to the control conductor 3207 of the brake horse-power motor control circuit of Fig. 21. Potential is also applied from the junction between the back contact of relay 3853 and resistance 3857, over the inner upper front contact of ESTA relay 3839, over conductor 3860, through resistance 3208, through the winding of altimeter potentiometer AP2 to ground and potential derived at the brush of this potentiometer is applied through resistance 3209 to the control conductor 3207.

The brake horse-power motor control circuit is thereby controlled to rotate the shaft 2110 and through the unity ratio bevel gears 3200 to rotate the shaft 3201 until the brush of the balancing potentiometer RBP10 reaches a position in which the potential of phase φ2 applied thereover, through resistance 3210 to control conductor 3207 equals the potential of phase φ1 applied to conductor 3207. When the state of balance is reached the rotation of shaft 3201 ceases. Potential of phase φ2 over the brush of potentiometer RBP10 is derived from the winding of the potentiometer which is energized in a circuit from bus bar 40φ2 through resistance 3211, through the winding of such potentiometer and through resistance 3212 to ground. The brake horse-power therefore varies in accordance with the equation $$BHP = [f(MP) \times f(R.\ P.\ M.) \times (\text{fuel mixture})] + f(ALT) - F_{\text{engine}}$$

where the function $f(MP)$ is determined by the potentiometer RMP1, the function $f(R.\ P.\ M.)$ is determined by the potentiometer RRP1, the fuel mixture function by the condition of LN relay 3853, the function $f(ALT)$ by the potentiometer AP2 and the function $F_{\text{engine}}$ by the condition of the supercharger relay SHR. When the R. P. M. passes a certain value the resistance network of the brake horse-power control circuit is so designed that a further increase in R. P. M. as indicated by the movement of the brush of potentiometer RRP1 then causes a decrease in brake horse-power as would be the case in an aircraft.

As a result of the movement of the shaft 3301 by the R. P. M. motor control circuit of Fig. 22, the potentiometer RRP2 is operated and potential is applied to the control circuit for the right engine V/ND motor control circuit, Fig. 20. The winding of variac TASV1 controlled by shaft 3481 which in turn is rotated by the motor of the true air speed motor control circuit schematically illustrated by the box 2354 of Fig. 23, is energized by potential of phase φ2 from the bus bar 40φ2 and a potential of phase φ2 derived therefrom is applied from the brush of this variac through resistance 3102, through the winding of the R. P. M. potentiometer RRP2, through resistance 3103 to ground and through resistance 3104 to control conductor 3105 extending to the V/ND motor control circuit. This potential will be negligible until the aircraft attains sufficient speed to cause the movement of the brush of the variac from the No. 2 terminal of its winding and consequently the motor of the motor control circuit will move the shaft 2010 and through the unity ratio bevel gears 3100 move the shaft 3101 to a very slight extent at this time. When the shaft 3101 has rotated to a position in which potential of phase φ1 derived from the winding of balancing potentiometer RVP8, through resistance 3107 to control conductor 3105 balances the potential of phase φ2 the motor of the V/ND motor control circuit stops. Potential of phase φ1 is applied to the winding of potentiometer RVP8 from bus bar 40φ1 through resistance 3106. The setting of the shaft 3101 is in accordance with the equation $$\frac{V}{ND} = \frac{Vt}{R.\ P.\ M.}$$

The term V/ND means the velocity V divided by the number of revolutions per minute N of the propeller times the diameter D of the propeller. The position of the shaft 3101 represents the quotient of the true air speed Vt by the R. P. M., the R. P. M. as previously stated, being a function of the propeller pitch. Since the diameter of the propeller is constant the V/ND term increases directly with the true air speed as determined by the setting of variac TASV1 and inversely with the R. P. M. as determined by the setting of potentiometer RRP2. There is no instrument showing the value of V/ND.

In response to the rotation of the V/ND shaft 3101 and the consequent adjustment of the potentiometer RVP7 and, with MAN relay 3702 unoperated which is the condition when the propeller governor is set for automatic operation as previously assumed, potential of phase φ1 is applied to control conductor 3704 for the propeller pitch motor control circuit for the right engine, Fig. 26. For this purpose potential is applied from the bus bar 40φ1 through the winding of potentiometer RVP7 and potential derived therefrom is applied from the brush of this potentiometer over the upper back contact of relay 3702, through resistance 3703 to control conductor 3704. This potential will cause the operation of the motor of the propeller pitch motor control circuit of Fig. 26 to rotate the shaft 2610 and through the unity ratio bevel gears 3700 to rotate the shaft 3701 until the balancing potentiometer RPP3 whose winding is energized by potential of phase φ2 from the bus bar 40φ2 applies potential from its brush over the lower back contact of relay 3702, through resistance 3705 to conductor 3704 which balances the potential of phase φ1 applied to such conductor. When this condition of balance occurs the motor of the propeller pitch motor control circuit stops. The propeller pitch motor control circuit is thus controlled by the setting V/ND potentiometer RVP7 when the propeller governor is set for automatic operation and the MAN relay 3702 is deenergized but is controlled by the increase and decrease R. P. M. keys 4316 and 4317 on the pilot's pedestal when the MAN relay 3702 is energized as will be later described. There is no instrument showing the value of propeller pitch.

Right engine oil pressure indications

In response to the operation of the ON relay 2209 of the R. P. M. motor control circuit, Fig. 22, a circuit is established from ground over its lower No. 2 contact, conductor 2216 to battery through the winding of ST relay 3913 of the right engine oil pressure circuit of Fig. 39. With relay 3913 operated and the EST relay 3816 also operated a circuit is established over the lower No. 2 contacts of relay 3816, over conductor 3861, over the lower No. 2 contacts of relay 3913 to battery through the winding of ST1 relay 3914. Relay 3913 also establishes a circuit through the rotor circuit of motor 3915, through resistance 3916, over the back contact of L2 relay 3917, the lower back contact of NP relay 3918, over the lower No. 4 contacts of relay 3913, over the back contact of DOP relay 3919 and through the lower or phase φ2 portion of the secondary winding of power transformer 3901. At this time the field or stator winding 3920 of motor 3915 is energized from the upper or phase φ1 portion of the secondary winding of transformer 3901 and as a consequence the motor 3915 operates and through the reduction gear box 3921 rotates the shaft 3922, the cams and the rotor of the transmitting autosyn 3923 mounted thereon, in a counter-clockwise direction.

The rotor winding of autosyn 3923 is energized by 400-cycle current from the bus bars 400C and 400G and its stator windings are connected over conductors 3928 and 3929 of cable 3927 with the stator windings of the receiving autosyn 534 which drives the right unit of the dual oil pressure indicator 535 at the instructor's desk. The rotor winding of the receiving autosyn is energized from the bus bars 400C and 400G. The stator windings of the transmitting autosyn 2923 are also connected over a branch of cable 3927, over the lower Nos. 3 and 4 contacts of relay 1412 and conductors of cable 1418 with the stator windings of receiving autosyn 1047 which drives the right unit of the dual oil pressure indicator 1009 on the flight engineer's instrument panel, the rotor winding of this receiving autosyn being energized from the bus bars 400C and 400G. The indicators 535 and 1009 now indicate an oil pressure for the right engine which in eight seconds, with the engine starting cold, rises to about 200 pounds.

As soon as the shaft 3922 leaves normal, the off-normal contacts 3930 close thereby preparing a circuit for restoring the shaft to its normal position. When the shaft is rotated to the position commensurate to an oil pressure of 200 pounds, a circuit is established from battery through the winding of L2 relay 3917, over the contacts of switch 3931 to ground over the lower No. 1 contacts of ST relay 3913. Relay 3917 upon operating locks over its lower contacts to ground over the lower No. 1 contacts of relay 3913 and at its upper back contact opens the previously traced operating circuit for motor 3921 which now stops.

Control of right engine cowl flaps

In the meantime upon the operation of ST1 relay 3914 a circuit is established for controlling the right engine cylinder oil and temperature motor control circuit disclosed in the upper portion of Figs. 28 and 39. It will be assumed that the engine cowl flaps are open at which time the brush of the cowl flaps potentiometer 3975 would be at the No. 1 end of potentiometer winding and the limit switch 3932 would be open. To open the cowl flaps the flight engineer has operated the right engine cowl flaps control switch 1649 to the right and, with RCF relay 1650 operated under the control of the previously operated circuit breaker 1651, a circuit is established from ground on bus bar GB, over the lower contacts of relay 1650, over the right contact of switch 1649, conductor 1652 and through the winding of OP relay 3933 to battery. Relay 3933 upon operating closes a circuit from ground over its upper contacts and conductor 3934 of cable 3900 through the lamp 424 to battery whereupon this lamp lights to indicate at the instructor's desk that the cowl flaps on the right engine have been opened. Relay 3933 over its lower contacts and the contacts of limit switch 3932 establishes a shunt of the right shaded pole winding 3935 of motor 3936 whereupon the motor is driven by its main stator winding 3937 which is energized from the 115-volt supply source, and through the reduction gear box 3939 drives the shaft 3940 in a counter-clockwise direction until the switch 3932 is opened by the associated cam carried by shaft 3940 and the motor 3936 is thereupon stopped.

Had the flight engineer desired to close the cowl flaps then he would have operated switch 1649 to the left and, with RCF relay 1650 operated through the prior closure of circuit breaker 1651, the operation of switch 1649 to the left would have established a circuit from ground on bus bar GB, over the lower contacts of relay 1650, over the contacts of switch 1649, over conductor 1655, through the winding of CL relay 3941. Relay 3941 upon operating closes a circuit from ground over its upper contacts and conductor 3944 of cable 3900 through lamp 425 to battery, whereupon this lamp lights at the instructor's desk to indicate that the cowl flaps on the right engine have been closed. Relay 3941 over its lower contacts and the contacts of limit switch 3943, establishes a shunt of the left shaded pole winding 3942 of motor 3936 whereupon the motor is operated to drive the shaft 3940 and the brush of potentiometer 3975 in a clockwise direction until the switch 3943 is opened.

*Control of right engine cylinder oil and temperature motor control circuit*

Upon the operation of ST1 relay 3914 and with the engine cowl flaps assumed to be open and the brush of potentiometer 3975 adjacent its lower or No. 1 winding terminal, a circuit is established for applying potential of phase φ2 from the 40-volt phase φ2 right secondary winding of power transformer 2804, over conductor 2805, over the lower contacts of ST1 relay 3914, through the winding of potentiometer 3975 and through resistance 3945 to ground. Potential of phase φ2 is derived over the brush of this potentiometer from the potential divider extending from ground through resistance 3945 over the lower portion of the winding of potentiometer 3975 and the brush thereof, through resistances 3946 and 3966, over conductor 3864, over the lower back contact of LN relay 3853 and through resistance 3863 to ground, is applied through resistance 3946 to the input of dual amplifier tube 3947, is amplified thereby and impressed upon the secondary windings of step-up transformer 3948. The potential impressed upon the upper divided secondary winding of transformer 3948 is rectified by the dual diode rectifier tube 3949 and is impressed as a positive biasing potential of phase φ2 upon the control grid of the gas-filled control tube 3950. The potential impressed upon the lower secondary winding of transformer 3948 is impressed as a positive potential of phase φ2 upon the control grid of gas-filled tube 3951. The dual diode rectifier tube 3952 serves to rectify potential received from the secondary winding of transformer 3938 and to apply it through the grid potential adjusting rheostats 3953 and 3954 to the control grids of tubes 3950 and 3951 to bias them to points just below their critical breakdown potentials.

Tubes 3947, 3949, 3950, 3951 and 3952 are supplied with filament heating current from the secondary winding of transformer 3938. Anode potential is applied to the anodes of amplifier tube 3947 from the battery B39 over obvious circuits. Anode potential of phase φ2 is applied to the anode of tube 3950, over conductor 3955, through the R1 anode relay 2808 in parallel with resistance 2809, through resistance lamp 2810 and over conductor 2811 through the lower phase φ2 portion of the secondary winding of transformer 3901, and anode potential of phase φ2 is applied to the anode of tube 3951, over conductor 3956, through the winding of the R2 anode relay 2812 in parallel with resistance 2813 and thence through the lower phase φ2 portion of the secondary winding of transformer 3901. With potential of phase φ2 applied to the input circuit of amplifier tube 3947 and anode potentials of phase φ2 applied to the anode of tubes 3950 and 3951 to the windings of relays 2808 and 2812, both of these relays operate.

Relay 2808 upon operating establishes a shunt over its lower contacts and conductors 2814 and 2815 around resistance 3957 and relay 2809 establishes a shunt over its lower contacts and conductors 2815 and 2816 around resistance 3958 for increasing the grid biases of tubes 3950 and 3951 to insure that relays 2808 and 2809 will be held operated. With both relays 2808 and 2809 operated a circuit is also established from ground over the upper front contacts of such relays, over the limit switch contacts 2817 and through the left shaded pole winding 2819 of motor 2821 thereby shunting such winding and, since the main stator winding 2822 of the motor is energized from the 115-volt supply source, the motor operates and through the reduction gear box 2823 rotates the shaft 2824 in such a direction as to rotate the brushes of potentiometers 2825 and 2826 and the brush of the balancing potentiometer 2829 from the No. 1 terminals toward the No. 3 terminals of their respective windings.

The balancing potentiometer 2829 is energized from a source of current of phase φ1 connected thereto over a circuit from ground through such winding, through resistance 2830 and through the phase φ1 left portion of the secondary winding of transformer 2804 and a potential of phase φ1 derived therefrom is then applied from the potentiometer brush over conductor 2831 through resistance 3959 to the input circuit of the amplifier tube 3947. When this potential balances the potential of phase φ2 applied through resistance 3946 tubes 3950 and 3951 cease to conduct and relays 2808 and 2809 release and open the circuit of motor 2821 which thereupon comes to rest.

As a result of the movement of the brush of the oil temperature potentiometer 2825, the right engine oil temperature indicators 508 and 1018 at the instructor's desk and on the flight engineer's instrument panel will be operated over the circuit previously traced to indicate after about two minutes a rise in the oil temperature to about 25° C., and also as the result of the movement of the brush of the cylinder temperature potentiometer 2826, the right engine cylinder temperature indicators 521 and 1039 at the instructor's desk and on the flight engineer's instrument panel will be operated over the circuit previously traced to indicate after about two minutes a rise in the cylinder temperature to about 100° C.

After the shaft 2824 has rotated for two minutes the cam operates contacts 2832 become closed thereby completing a circuit from ground over the upper contacts of ST1 relay 3914, over conductor 3960, over the contacts 2832 and conductor 3961 through the winding of T relay 3962 to battery. Relay 3962 thereupon operates, locks to ground over its inner lower contacts and the upper contacts of relay 3914 and over its inner upper contacts establishes a new operating circuit for motor 3915 which may be traced from ground through the rotor circuit of such motor through resistance 3916, over the upper front contact of L2 relay 3917, over the inner upper contacts of relay 3962, the upper back contact of NP relay 3918, over the upper back contact IOP relay 3963 and through resistance 3864 through the upper phase φ1 portion of the secondary winding of transformer 3901. Motor 3915 is now operated in the opposite direction of rotation and due to the inclusion of resistance 3964 in the rotor circuit at a lower speed than formerly. The rotor of transmitting autosyn 3923 is now rotated in the opposite direction resulting after the elapse of about two minutes in the reduction of the oil pressure indication given by the indicators 535 and 1009 at the instructor's desk and on the flight engineer's instrument panel from 200 pounds to 90 pounds.

At the expiration of the two-minute period the cam carried by the shaft 3922 and associated with the contacts 3965 operates such contacts thereby closing a circuit from ground over the lower contacts of relay 3962, over such cam-operated contacts and to battery through the winding of NP relay 3918. Relay 3918 thereupon operates, locks over its inner lower contacts to ground at the lower No. 1 contacts of ST relay 3913 and at its upper back contact opens the rotor circuit of motor 3915 whereby the motor is brought to rest.

It will be recalled that the flight engineer has operated the start key 1641 to the mesh position and has operated the primer key 1643. He will hold these keys closed until the engine starts as will be indicated by the sound effects, the vibration effects, the change in the observed manifold pressure of the indicator 1010 to 10 inches and the change in the observed R. P. M. indication of the tachometer 1015 to approximately 650 revolutions per minute.

During the starting of the right engine, the voltmeter selector switch VMS, Fig. 13, has been positioned on the RG terminal thereby resulting in the operation of VRE relay 1344 and the release of VAPP relay 1309. The release of relay 1309 opens the circuit of lamp 412 at the instructor's desk and the operation of relay 1344 establishes a circuit over conductor 1345 of cable 1300 to cause the lighting of lamp 439 to indicate that the voltmeter 431 is to be read in connection with the starting of the right engine. With relay 1338 previously operated, a circuit is established from battery through voltmeter VM on the flight engineer's power control panel, Fig. 13, over the upper contacts of relay 1344, over the upper contacts of relay 1338, over the upper back contacts of relay 1340 to ground over the upper inner contacts of relay 1338 and in parallel therewith over conductors 1348 and 1349 of cable 1300 through the voltmeter 431 at the instructor's desk resulting in the operation of voltmeters VM and 431 to read 27 volts as the potential being applied to the inertia starter motor for starting the right engine.

Following the restoration of the start key 1641 and the primer key 1643, the flight engineer operates the right engine generator switch 1339. With switch 1339 operated, an obvious circuit is establish for RES relay 1340 which establishes a circuit from ground over its inner lower contacts and conductor 1341 of cable 1300 to battery through the right engine generator lamp 426 at the instructor's desk which lamp lights to indicate that the flight engineer is making a check on the right engine generator. With relay 1338 operated, a circuit is now established from ground on bus bar GB, over the inner upper contacts of relay 1340, through the right engine generator ammeter 1342, over the inner lower contacts of REG relay 1338, over conductor 1343 of cable 1300 through the right engine generator ammeter 427 at the instructor's desk and thence through resistances 428 and 419 and rheostat 420 to battery. The ammeters 1342 and 427 now indicate the current output of the right engine generator which should be 40 amperes.

Relay 1340 at its upper back contact now removes the shunt from resistance 1350 whereupon a circuit is established from battery through the voltmeter VM over the upper contacts of relay 1344, the upper contacts of relay 1338, through resistance 1350 and over the upper contacts of relay 1340 to ground on bus bar GB, and in parallel with voltmeter VM over conductors 1348 and 1349 of cable 1300 through the voltmeter 431 at the instructor's desk resulting in the operation of these voltmeters to read 24 volts indicating that the operation of the starter motor has reduced the storage battery voltage.

*Starting the left engine*

The flight engineer now simulates the starting of the left engine by first operating the start key 1656 first to the left or start position, holding it there about 12 seconds and then operating it to the right or mesh position simultaneously with the operation of the primer key 1657. The engine control circuit indicated by the box in Fig. 27 now functions in the manner previously described in connection with the engine control circuit of Fig. 38. The simulated starting of the left engine has caused the rotation of the shafts 1960 and 3051 driven by the fuel flow motor control circuit for the left engine, the rotation of the shafts 2160 and 3251 driven by the brake horsepower motor control circuit of the left engine, the rotation of the shafts 2260 and 3351 driven by the R. P. M. motor control circuit for the left engine, the rotation of the shafts 2360 and 3451 driven by the manifold pressure motor control circuit for the left engine, the rotation of the shafts 2560 and 3651 driven by the R. P. M. memory motor control circuit for the left engine, the rotation of the shafts 2060 and 3151 driven by the V/ND motor control circuit for the left engine and the rotation of shafts 2660 and 3751 by the propeller pitch motor control circuit for the left engine in the manner previously described in connection with similar circuits for simulating the functioning of the right engine.

The operation of the shafts 2260 and 3351 of the R. P. M. motor control circuit has also resulted in the operation of the motor 2951 of the tachometer motor control circuit for the left engine, the operation of the tachometer generator LTG driven thereby and the operation of the sound effects generator 2973 resulting in the operation of the left engine tachometers at the flight engineer's, pilot's and instructor's stations as previously described to indicate the rotational speed of the left engine and in the operation of the vibrator motor LVM located in the left portion of the trainer mock-up to simulate the vibrations set up due to the operation of the left engine. The operation of the sound effects generator 2973 is instrumental in controlling the sound effects circuits indicated by the box in the lower portion of Fig. 40 to simulate the sounds incident to the operation of the left engine.

In response to the starting of the left engine, the left unit of the manifold pressure indicator 1010, the left engine fuel flow indicator 1005, the left engine tachometer 1014, the left unit of the oil pressure indicator 1009, the left unit of the fuel pressure indicator 1011, the left engine oil temperature indicator 1017 and the left unit of the cylinder temperature indicator 1039 on the flight engineer's instrument panel are operated. Also, the left unit of the manifold pressure indicator 527, the left unit of the fuel flow indicator 529, the left engine tachometer 723, the left unit of the oil pressure indicator 535, the left unit of the fuel pressure indicator 533, the left engine oil temperature indicator 512 and the left unit of the cylinder temperature indicator 521 at the instructor's desk are operated. Also, the left engine tachometer 4223 and the left unit of the manifold pressure indicator 4224 on the pilot's panel are operated. The operations of these instruments give the flight engineer, the instructor and the pilots information concerning the starting and operation of the left engine.

In addition, starter on lamp 432, starter mesh lamp 433, primer lamp 434 and either the cowl flaps open lamp 435 or cowl flaps closed lamp 436 at the instructor's desk and relating to the left engine are lighted to indicate the performance of acts necessary to the starting of the left engine. To determine the ammeter and voltmeter readings in connection with the starting and operation of the left engine, the voltmeter selector switch VMS of Fig. 13 is moved to the LG terminal and the left engine generator switch 1351 at the flight engineer's power panel is operated resulting in the operation of VLE relay 1352, the operation of LES relay 1353, the establishment of circuits for the voltmeter VM on the flight engineer's power panel and voltmeter 431 at the instructor's desk, the establishment of circuits for the left engine ammeter 1354 at the flight engineer's panel and the left engine ammeter 437 at the instructor's desk and the lighting of the left generator switch position lamp 438 and left generator voltmeter selection lamp 439 at the instructor's desk. This apparatus is controlled in the manner fully described in connection with the operation of similar apparatus for indicating the steps in starting the right engine.

Upon the starting of the left engine, potential of phase $\varphi 1$ is connected to the control conductor 3502 of the brake mean effective pressure motor control circuit of Fig. 24. For this purpose potential of phase $\varphi 1$ is applied from bus bar $40\varphi 1$ to the winding of variac LBP8, the brush of which is mounted on the shaft 3251 rotated by the motor of the brake horse-power motor control circuit for the left engine and from which brush potential is applied over the brush and through the winding of potentiometer LRP8 through resistance 3504 and thence through resistance 3503 to ground and in parallel with resistance 3503 through resistance 3505 to control conductor 3502. The application of potential to conductor 3502 causes the motor of the brake mean effective pressure circuit of Fig. 24 to rotate shaft 2410 and through the unity ratio bevel gears 3500 to rotate shaft 3501 until the balancing potentiometers BMEPP6 and BMEPP7 attain settings in which potential of phase $\varphi 2$ applied therethrough to conductor 3502 balances the potential of phase $\varphi 1$ applied to conductor 3502. Potential of phase $\varphi 2$ is applied from the bus bar $40\varphi 2$ through resistance 3506 and through the winding of potentiometer BMEPP6 and resistance 3510 to ground and in parallel through resistance 3507 to ground and the potential derived at the brush of this potentiometer is applied through resistance 3508 to conductor 3502 but is further attenuated through the potentiometer BMEPP7 and resistance 3509 to ground. When the potential of phase $\varphi 2$ applied balances the potential of phase $\varphi 1$ applied to conductor 3502 the motor of the control circuit arrests the further rotation of shafts 2410 and 3501.

It is to be noted that the positions which the shafts 2410 and 3501 assume is a function of the brake horse-power and the R. P. M. The brake mean effective pressure is decreased as the R. P. M. is increased and the brake horse-power maintained constant. The shaft 2410 drives the rotor of the transmitting autosyn 2425 the rotor winding of which is energized from the 400C and 400G bus bars. The stator windings of the autosyn are connected over conductors of cable 2426 with the stator windings of the receiving autosyn 536 which drives the BMEP indicator 537 at the instructor's desk and over a branch of cable 2426, over the lower Nos. 4, 5 and 6 contacts of relay 1412 and over the conductors of cable 1419 with the stator winding of receiving autosyn 1048 which drives the BMEP indicator 1004 on the flight engineer's panel. Rotors of autosyns 536 and 1048 are energized from the 400C and 400G bus bars. The BMEP indicators 537 and 1004 indicate the efficiency of operation of the left engine. No similar instruments are provided for indicating the efficiency of the right engine.

With both engines now functioning the thrust horse-power motor control circuit of Fig. 24 is operated to cause the rotation of shaft 2460 and through the unity ratio bevel gears 3550 to cause a rotation of shaft 3551 to a degree commensurate with the aggregate thrust horse-power of the two propellers driven by the engines. To control the thrust horse-power motor control circuit a potential of phase $\varphi 1$ is applied to control conductor 3552 under the control of the brake horse-power variac RBV7 and the V/ND potentiometer RVP6 for the right engine and a potential of phase $\varphi 1$ is applied to conductor 3552 under the control of the brake horse-power variac LBV7 and the V/ND potentiometer LVP6 for the left engine. To accomplish this, potential from bus bar $40\varphi 1$ is applied through the winding of variac RBV7 and the potential derived therethrough the setting of its brush is applied through resistance 3553 and through resistance 3554 to conductor 3552 and in parallel with resistance 3553 through the winding of potentiometer RVP6 shunted by resistance 3555 to ground. Similarly, potential from bus bar 40φ1 is applied through the winding of variac LBV7 and the potential derived therefrom through the setting of its brush is applied through resistance 3556 and resistance 3557 to conductor 3552 and in parallel with resistance 3556 through the winding of potentiometer LVP6 shunted by resistance 3558 to ground. Thus with both propellers functioning on automatic operation the thrust horsepower developed by the two propellers may be expressed by the following equation $$THP = \left[ BHP \times f\left(\frac{V}{ND}\right) \right]_{LE} + \left[ BHP \times f\left(\frac{V}{ND}\right) \right]_{RE}$$

In the foregoing equation the thrust horsepower is indicated by the term THP, the brake horse-power by the term BHP, the first bracketed term of equation signifying the thrust horsepower developed by the left engine (LE) and the second bracketed term of the equation signifying the thrust horse-power developed by the right engine (RE).

As soon as the motor of the thrust horsepower motor control circuit has rotated shafts 2460 and 3551 to a position in which the potential of phase $\varphi 2$ derived from the winding of the balancing potentiometer TP9 and applied through resistance 3539 to conductor 3552 equals the combined potentials of phase $\varphi 1$ previously applied to conductor 3552, the motor of the thrust horse-power circuit stops and the further rotation of shafts 2460 and 3551 is arrested.

*Preparation by the pilot for take-off*

Preparatory to taking off the pilot checks to see that the suction indicator 4227 on his instrument panel, Fig. 42, reads seven pounds. This indicator and a similar indicator 725 at the instructor's desk are driven by the receiving autosyns 4228 and 726 whose rotor windings are energized from the 400C and 400G bus bars and whose stator windings are connected over the conductors of cable 727 with the stator windings of the transmitting autosyn 1825 driven by the motor 1826 of the suction motor circuit of Fig. 18. The motor 1826 is of the shaded pole type. Its main stator winding 1827 is energized from the 115-volt, 60-cycle current supply of the trainer. When the main right engine is started a shunt is established around the left shaded pole winding 1828, over the upper back contact of LS relay 1829, over the normal contacts of limit switch 1830, over conductor 1831 and the lower No. 3 front contacts of ST relay 3913 of the oil pressure circuit for the right engine, Fig. 39, and thence to ground. Motor 1825 now operates and through the reduction gear box 1832 drives the shaft 1833 and the limit switch operating cams and rotor of autosyn 1825 mounted thereon. When the shaft 1833 has rotated to an extent sufficient to cause the autosyn 1825 to drive the receiving autosyns 4228 and 726 to set the suction indicators 4227 and 725 to indicate 7 pounds, the switch 1830 is moved to its alternate position, opening the shunt of the shaded pole winding 1828 to stop the motor and closing the circuit of relay 1829 which operates, locks over its lower contacts to ground on conductor 1831 and at its upper contacts further opens the shunt of shaded pole winding 1828.

If the indicators 4227 and 725 indicate a suction of 7 pounds the pilot knows that there is sufficient suction to operate such instruments on his instrument panel as would in an actual aircraft require air suction for their operation.

With the propeller governor controls of the overhead equipment set in their max.-R. P. M. positions in which the brushes of rheostats 1212 and 1213 of Fig. 12 are moved to the lower terminals of their windings, the two throttles are moved together to move the brushes of the throttle rheostats, Fig. 12, toward their upper or open positions. In response to this movement of the throttles the manifold pressure motor control circuits of Fig. 23 are controlled to rotate the shafts 3401 and 3451 to new positions thereby readjusting the potentiometers RMP4 and LMP4 to control the R. P. M. motor control circuits of Fig. 22 to rotate the shafts 3301 and 3351 to new positions. With the readjustment of the potentiometers RRP5 and LRP5 the tachometer motor control circuits of Fig. 29 are operated to increase the speed of the tachometer generators RTG and LTG resulting in the tachometers on the pilot's, flight engineer's and instructor's desk instrument panels indicating an increase of engine speed. The throttles are thus operated until engine speeds of 1900 revolutions per minute are indicated.

To determine if both of the magnetos associated with the right engine are functioning, the pilot first turns the right engine ignition key 1216, Fig. 12, to the position in which ground is removed from the R terminal, but remains connected to the L terminal. This causes the shunting down of the IGL relay 3804 of Fig. 38, resulting in the removal of resistances 3832 and 3833 from the potential divider including resistances 3832, 3833 and 3834, connected into the previously traced control circuit for the right engine R. P. M. motor control circuit of Fig. 22, resulting in a readjustment of the potentiometers controlled thereby whereby the right engine tachometer generator RTG is slowed down to cause the tachometers to indicate a right engine speed of 1800 or 1850 revolutions per minute. The right engine ignition key is now turned to the position in which ground is removed from the L terminal but is connected to the R terminal. This causes the shunting down of the IGR relay 3803 of Fig. 38 resulting in the removal of resistances 3832 from the potential divider including resistances 3832, 3833 and 3834 connected into the control circuit for the right engine R. P. M. motor control circuit. No change in the indicated R. P. M. will be noted if both magnetos are functioning. The ignition key is then moved to the position in which the IGR and IGL relays 3803 and 3804 are both operated resulting in the return of the R. P. M. indicators to read 1900 R. P. M. These operations are then repeated with the left engine ignition key 1215.

The pilot now gradually moves both throttles of the overhead equipment forward whereby the brushes of variacs 1219R and 1219L included in the control circuits of Fig. 34 of the manifold pressure motor control circuits, Fig. 23, previously traced, are moved towards their upper or open throttle positions. As a result the shafts 2310, 3401 and 2360, 3451 of the manifold pressure motor units assume new positions resulting in the readjustment of the RMP4 and LMP4 potentiometers included in the control circuits of the R. P. M. motor control circuits of Fig. 22. The shafts 3301 and 3351 of the R. P. M. motor units now assume new positions resulting in the readjustment of the potentiometers controlled thereby including the potentiometers RRP5 and LRP5. The readjustment of the latter potentiometers results in an increase in speed of the tachometer generators RTG and LTG. The movement of the shafts 2310 and 2360 operate the transmitting autosyns driven thereby whereby the manifold pressure indicators 4224, 527 and 1010 on the pilot's panel, Fig. 42, at the instructor's desk, Fig. 5, and on the flight engineer's instrument panel, Fig. 10, are driven by their associated autosyn receivers to indicate an increase of manifold pressure for each engine to about 44 inches of mercury.

The propeller governor controls of the overhead equipment are now adjusted thereby adjusting the associated rheostats 1212 and 1213, Fig. 12, included in the previously traced control circuits for the R. P. M. motor control circuits until the two engines are running at substantially the same speed of 2650 R. P. M. as will be indicated by the similar readings of the right and left engine tachometers 4222 and 4223 at the pilot's instrument panel. The right and left engine tachometers 722 and 723 at the instructor's desk and the right and left engine tachometers 1015 and 1014 on the flight engineer's instrument panel will read similarly. The associated synchroscopes 4226, 724 and 1016 will revolve as little as possible when the engines are substantially synchronized.

As the R. P. M. motor control circuits set the shafts 2210 and 2260 in the new positions commensurate with the increased engine speeds, the sound effects circuits are controlled to produce the increased noise of the engines, the speeds of the vibrator motors are increased, and new positions are given to the fuel flow shafts 3001 and 3051, to the V/ND shafts 3101 and 3151, to the brake horse-power shafts 3201 and 3251, to the R. P. M. memory shafts 3601 and 3651, to the propeller pitch shafts 3701 and 3751, to the brake mean effective pressure shafts 3501 and to the thrust horse-power shaft 3551 in the manner previously described. The simulated engine speeds are now such as would be required for take-off.

As soon as the air-borne condition of the flight is simulated, a circuit is established from ground, over conductor 3881 of cable 3800, through the winding of FL relay 3841, Fig. 38, to battery and ground, relay 3841 remaining operated so long as an air-borne or flight condition of a flight is being simulated. With relay 3841 operated, the operation of the sound effects circuit of Fig. 40 is modified to simulate the change in the sounds which the pilot hears when an aircraft takes to the air.

For this purpose relay 3841 establishes a circuit which may be traced from ground over its upper No. 3 contacts, over conductor 4024 and through the enabling relay 4025 of the sound effects circuit to battery and ground. Relay 4025 upon operating removes a short-circuit from across the input circuit of the dual amplifier tube 4026. For simulating the wind noise of an aircraft in flight, the oscillator tube 4027, the dual amplifier tube 4026 and the detector tube 4028 are provided. The oscillator tube 4027 functions with the condenser 4029 to generate a sawtooth wave which, when relay 4025 is energized, is impressed upon the input circuit of the dual amplifier tube 4026, is amplified thereby and impressed through the volume regulating rheostat 4030 upon the control grid of the detector tube 4028, the cathode-anode path through which is connected in series with the primary winding of the output transformer 4006. Anode potential is applied from the source B40, through resistance 4009 to the anode bus bar 4031 and from this bus bar through resistances 4032, 4033 and 4034 to the anodes of tubes 4026 and 4027. Direct current bias is impressed upon the grid 4035 of tube 4028 through resistance 4036 across the cathode-anode path through the right unit of the dual rectifier tube 4016 and through the secondary winding of transformer 4037 to ground, this cathode-anode path being bridged across the secondary winding of transformer 4037 and energized by potential from the 40φ2 bus bar impressed through the rheostat 4038 and from the brush thereof through resistance 4039 and through the primary winding of transformer 4037.

A potential of phase φ2 is also applied from the brush of an indicated air speed variac (not shown), over conductor 4040, through the winding of rheostat 4041 and from the brush thereof through resistance 4042 and through the primary winding of transformer 4037. The filaments of tubes 4026, 4027 and 4028 are energized from the filament current transformer 4020.

The output from the oscillator tube 4027, as amplified by the tube 4026 and detected by the tube 4028 and impressed upon the output of transformer 4007, simulates the rushing sound of the air when an aircraft is in flight which is varied in intensity in accordance with the indicated air speed as the air speed increases and which rushing sound is superposed on the engine explosion noise impressed upon the output transformer 4006 by the detector tube 4005.

*Changing mixture to cruising lean*

It will now be assumed that the simulated flight has progressed to an air-borne condition and that a cruising condition is to be simulated. At the flight engineer's station the mixture control switches 1116 and 1117 are now operated into engagement with their upper or cruising lean mixture contacts. With switches 1116 and 1117 thus set circuits are established from ground over the upper contacts of switches 1125 and 1126 over the upper contacts of switches 1116 and 1117, conductors 1091 and 1092 of cable 1090, to battery through the winding of the LN relay 3853 of the right engine control circuit, Fig. 38, and to battery through the winding of the similar LN relay of the left engine control circuit of Fig. 27. The operation of the switches opens the previously traced circuits for the rich mixture lamps 408 and 409 at the instructor's desk and the operation of the LN relays establishes circuits for the lean mixture lamps 440 and 441. The circuit of lamp 441 may be traced from battery through such lamp over conductor 3862 of cable 3800 and over the inner lower contacts of LN relay 3853 to ground. A similar circuit is established for lamp 440 over conductor 2762 of cable 2700 to ground over a contact of the LN relay (not shown) of Fig. 27. The instructor is thus informed of the fact that the flight engineer has changed the engine mixtures from rich to cruising lean.

With the mixture thus changed the operation of LN relay 3853 for the right engine connects resistance 3865 in series with resistance 3863 in the potential divider extending over conductor 3864 through resistances 3966 and 3946 through the winding of potentiometer 3975 and resistance 3945 to ground, whereby the potential applied to the input of the control circuit of the cylinder and oil temperature motor control circuit is decreased to cause the right engine oil temperature indicator 508 and the right engine unit of the cylinder temperature indicator 521 at the instructor's desk and the right engine oil temperature indicator 1018 and the right engine unit of the cylinder temperature indicator 1039 on the flight engineer's instrument panel to show decreased temperature readings. The operation of the corresponding LN relay of the left engine control circuit of Fig. 27 likewise causes the left engine oil temperature indicator 512 and the left engine unit of the cylinder temperature indicator 521 at the instructor's desk and the left engine oil temperature indicator 1017 and left engine unit of the cylinder temperature indicator 1039 on the flight engineer's instrument panel to show decreased temperature readings.

At its inner transfer contacts LN relay 3853 removes the 6000-ohm resistance 3851 from its series connection with resistance 3852 and connects resistance 3851 in series between the brush of altimeter potentiometer API and the control conductor 3003 of the right engine fuel flow motor control circuit whereupon this control circuit is controlled to operate the transmitting autosyn 1925 driven by its shaft 2910 to cause the right unit of the fuel flow indicator 529 at the instructor's desk and the right engine fuel flow indicator 1006 on the flight engineer's instrument panel to indicate a reduction in the fuel flow to 950 pounds per hour. The corresponding LN relay of Fig. 27 similarly controls the left engine fuel flow motor control circuit whereby the left unit of the indicator 529 at the instructor's desk and the left engine fuel flow indicator 1005 at the flight engineer's instrument panel indicate a fuel flow of 950 pounds per hour.

At its upper transfer contacts LN relay 3853 removes the 45-ohm resistance 3857 from its series connection with resistance 3858 to ground and connects resistance 3857 in series in the connection from the 40φ1 bus bar, over the upper No. 1 contacts of EST relay 3816, through resistance 3857, over the upper front contacts of relay 3853, thence over conductor 3859 through the winding of the potentiometer RMP1 in the control circuit of the right engine brake horsepower motor control circuit thereby causing the motor of the brake horse-power motor control circuit to operate the shafts 2110 and 3201 to adjust the potentiometers controlled thereby in a direction indicative of a reduction in the brake horse-power output of the right engine. The corresponding LN relay of the left engine control circuit of Fig. 27 similarly controls the left engine brake horse-power motor control circuit to operate shafts 2160 and 3251 to adjust the potentiometers controlled thereby in a direction indicative of a reduction in the brake horse-power output of the left engine.

*Stopping the auxiliary power plant*

The engines should now be operating at their best efficiency for the selected speed. Since the engines through the generators driven thereby, are supplying the power for operating all of the auxiliary apparatus of the simulated aircraft the operation of the auxiliary power plant is no longer necessary and the flight engineer may now stop the auxiliary power plant by opening the auxiliary power plant ignition key 1311 thereby opening the locking circuit of EST relay 1323 which releases and removes ground from conductor 1312 of cable 1300 to extinguish the auxiliary power plant ignition on lamp 413 at the instructor's desk. Relay 1323 upon releasing removes ground from conductor 1324 of cable 1300 thereby extinguishing the auxiliary power plant starter-run lamp 415, opens the circuit of APPG relay 1325 which releases, opening the previously traced circuit through the auxiliary generator ammeter 1335 on the flight engineer's power panel and through the ammeter 497 at the instructor's desk and opening the circuit extending over conductor 1332, through the winding of ST relay 1804 of the auxiliary engine oil and cylinder temperature motor control circuit of Fig. 18.

Relay 1804 upon releasing establishes over its upper No. 1 back contact a shunt of the shaded pole winding 1834 of the oil temperature motor 1820, such circuit extending over the normal contact of the L1 limit switch 1835. The motor 1820 thereupon operates to rotate the shaft 1822 in such a direction as to return the brushes of potentiometers 1800 and 1801 towards the No. 1 terminals of their windings. When the brushes reach the No. 1 terminals the limit switch 1835 operates to open the shunt of winding 1834 whereupon the motor 1820 stops. In the normal position of shaft 1822 the L2 limit switch contacts are again closed. The movement of the brushes of potentiometers 1800 and 1801, causes the auxiliary power plant oil temperature and cylinder temperature indicators APPO and 517 at the instructor's desk and the oil temperature and cylinder temperature indicators 1012 and 1038 at the flight engineer's instrument panel to return to normal.

Relay 1804 upon releasing also releases the T relay 1808 and the NP relay 1809 whereupon potential of phase φ1 is applied from the right portion of the secondary winding of transformer T18, over the lower No. 1 back contact of relay 1804, over the L1 limit switch 1815, through resistance 1806 and the rotor circuit of motor 1805 whereupon the motor is operated to rotate shaft 1812 back to its normal position in which the cam carried by such shaft will open the L1 limit switch contacts 1815 to stop the motor. The return of shaft 1812 to normal permits the L2 limit switch contact 1807 to close and rotates the rotor of the transmitting autosyn 1813 to its normal position whereupon the auxiliary power plant oil pressure indicator 557 at the instructor's desk and the corresponding oil pressure indicator 1007 on the flight engineer's instrument panel return to normal.

It will now be assumed that the pilot is directed to simulate a flight at an altitude of 7000 feet. In response to such instructions the pilot pushes both throttles forward until the manifold pressure indicators read 35 inches mercury. This will result in the manner previously described in an increase of the simulated engine speeds as indicated by the tachometers and the readjustment of the thrust horse-power shaft 2460 indicative of an increase in thrust horse-power. The pilot will then pull the yoke (not shown) back for climbing until the altimeter on the pilot's instrument panel indicates that an altitude of 7000 feet has been attained when he will push the yoke forward until level flight is attained as indicated by the zero readings of the rate of climb indicator on the pilot's instrument panel.

The repositioning of the shaft 2153 of the altimeter motor control circuit 2154 has now caused the movemenet of the brush of potentiometer AP5 in such a direction as to reduce the current flowing in the circuit previously traced from the brush of such potentiometer through the outside air temperature indicator 728 on the pilot's instrument panel, through the outside air temperature indicator 1013 on the flight engineer's instrument panel and through the outside air temperature indicator OT at the instructor's desk, to the slider of rheostat OTR whereupon these indicators will show an air temperature of +1° C.

Simulated operations of deicer

To simulate the operation of deicing equipment to remove or prevent the formation of ice on the wings of an aircraft the deicer motor control circuit of Fig. 18 is provided. The motor of this circuit rotates first in one direction and then in the other between limit switches to cause the deicer indicators to oscillate from minimum to maximum. To control the motor circuit the flight engineer operates the deicer key 1526 and, with DAI relay 1527 previously operated by the closure of circuit-breaker 1528, a circuit is established for the IC relay 1529 which may be traced from ground on bus bar GB, over the lower contacts of relay 1527, over the contacts of key 1526 and through the winding of relay 1529. Relay 1529 upon operating establishes a circuit from ground over its contacts, over conductor 1530 of cable 1500 to battery through lamp 442 at the instructor's desk to indicate that the deicer has been started. Relay 1529 over its lower contacts establishes an obvious circuit for deicer lamp 1531 on the flight engineer's control panel to indicate that the deicer is operating and establishes a circuit from ground over its middle upper contacts and start conductor 1532, over the upper back contact of D relay 1836 of the deicer motor control circuit, Fig. 18, and through the left shaded pole winding 1837 of the motor 1840 to ground thus short-circuiting such winding. With the main stator winding 1839 energized from the source of 115-volt 60-cycle alternating current, the motor 1840 operates and through the reduction gear box 1841 rotates the shaft 1842 in a direction to permit the L1 limit switch contacts 1843 to close thereby closing an obvious circuit for LL relay 1844. Relay 1844 upon operating connects ground over its upper contacts to start conductor 1532 to insure that the motor 1840 will return shaft 1842 to its normal position even though the flight engineer should release the deicer key 1526, and over its lower contacts prepares a locking circuit for D relay 1836.

After an interval simulating the time required for the deicing equipment of an aircraft to build up a pressure of seven pounds the L2 limit switch contacts 1845 close thereby establishing an obvious circuit for relay 1836 which operates and locks over its lower contacts under the control of relay 1844 and, at its upper transfer contacts opens the previously traced shunt of the left shaded pole winding 1837 of motor 1840 and closes a shunt around the right shaded pole winding 1838. The motor 1840 now rotates in the opposite direction, opening at the L2 limit switch contacts 1845 the operating circuit for the relay 1836 and, after an interval simulating the time required for the deicing equipment of an aircraft to reduce the pressure to zero, the L1 limit switch contacts 1843 are opened thereby releasing relay 1844 and in turn opening the locking circuit of relay 1836 which also releases. With relay 1836 released the direction of rotation of motor 1840 is reversed and the motor circuit repeats the cycle of operations so long as the flight engineer maintains ground connected to start conductor 1532 by the operation of the deicer key 1526.

In response to the movement of shaft 1842 the rotor of transmitting autosyn 1846 is rotated first in one direction and then in the other. The rotor winding of this autosyn is energized from the 400C and 400G bus bars and the stator windings thereof are connected over conductors of cables 1847 with the stator windings of the receiving autosyn 538 which drives the deicer pressure indicator 539, Fig. 5, at the instructor's desk and, over the upper No. 4 and 5 contacts of relay 1412 and over conductors of cable 1420, with the stator windings of the receiving autosyn 1057 which drives the deicer pressure indicator 1008 on the flight engineer's panel, Fig. 10. The rotor windings of these receiving autosyns are energized from the 400C and 400G bus bars. Under the control of the transmitting autosyn 1846 the pointers of the deicer pressure indicators 539 and 1008 oscillate from a minimum pressure indication of zero pounds to a maximum pressure indication of seven pounds. As a further result of the operation of IC relay 1529 in response to the operation of deicer key 1526 a circuit is closed from ground over the inner upper contacts of relay 1529 and conductor 1534 of cable 1500 to battery through the anti-icer lamp 443 of the instructor's desk. The rheostat 1533 which in an actual aircraft controls the anti-icer is made ineffective in the trainer by a short-circuit of its winding.

Simulation of ice in the Pitot tube

In an aircraft the air speed indicator is operated by a change in barometric pressure, pressure being supplied for operating it through a Pitot tube. If ice collects in the Pitot tube the indicator will cease to function accurately. To clear the ice from the Pitot tube heaters are provided in an aircraft. The functioning of these heaters is simulated in the trainer. For this purpose the left and right Pitot switches 4229 and 4230 at the pilot's pedestal are operated to the on-position whereupon, with PH relay 1535 operated by the previous closure of the circuit breaker 1536, a circuit is established from ground on bus bar GB over the front contact of relay 1535, over conductor 1585 of cable 1580, over the contacts of switches 4229 and 4230 and over conductors 4231 and 4232 to battery through the left and right Pitot heater-on lamps 807 and 808 at the instructor's desk, Fig. 8.

To simulate the high speed operation of the supercharger blowers which would be required for a higher altitude flight of an aircraft, the flight engineer now operates the supercharger switches 1118 and 1119, Fig. 11, from their low to their high speed settings thereby establishing circuits from ground over the lower contacts of these switches, over conductors 1127 and 1128 to battery and ground through the windings of SHL (supercharger high speed relay for the left engine) 3421 and the SHR (supercharger high speed relay for the right engine) 3413. Relay 3421 upon operating closes an obvious circuit for SHL1 relay 3422 and relay 3413 closes an obvious circuit for SHR1 relay 3412. Over their upper front contacts relays 3421 and 3413 also establish circuits extending from ground over such contacts, over conductors 3423 and 3424 and to battery and ground through the lamps 442 and 443 at the instructor's desk, indicating that the superchargers for the left and right engine have been set for high speed operation. The low speed lamps 410 and 411 become extinguished when the switches 1118 and 1119 were operated to disengage their upper contacts.

SHR1 and SHL1 relays 3412 and 3422 also affect the manifold pressure motor control circuits to cause an increase of the indicated manifold pressure for the respective engines to simulate the increase in manifold pressures which would result in an aircraft by increasing the speed of the supercharger blowers. A higher potential of phase φ1 is now applied to control conductor 3842 of the manifold pressure motor control circuit for the right engine. To derive this potential, potential of phase φ1 is applied from bus bar 40φ1 over conductor 1222 through the winding of throttle variac 1219R to ground and the potential derived therefrom is applied over conductor 1224 through the winding of altitude potentiometer AP9 and through resistance 3409 to ground. The potential derived from the latter potentiometer is applied over conductor 3410, over the upper No. 1 contacts of ON relay 2209, conductor 3411, over the middle upper front contact of relay 3412, through the winding of the R. P. M. potentiometer RRP3, over the lower front contact of relay 3412 and through resistance 3425 to ground. With relay 3412 operated the right half of the winding of potentiometer RRP3 is bridged over the inner upper contacts of relay 3412 through resistance 3427. From the brush of potentiometer RRP3 the derived potential of phase φ1 is applied over the inner lower contacts of relay 3412, over conductor 3416, through the right engine manifold pressure rheostat 530, conductor 531, over the lower front contact of EST1 relay 3828 and to control conductor 3842. The change in the resistance network caused by the operation of relay 3412 is effective to cause an increase of the potential applied to conductor 3842 over the potential applied to conductor 3842 prior to the operation of relay 3412. Similarly the potential of phase φ1 applied to the control conductor of the manifold pressure motor control circuit for the left engine is increased.

It will be noted that with relay 3412 operated the right half of the winding of R. P. M. potentiometer RRP3 is short-circuited. This is to cause the manifold pressure to increase at one rate at lower engine speeds when the brush is engaging with the shunted half of the potentiometer winding, and to increase at a higher rate when the brush is engaging the unshunted half of the winding, in simulation of the manner in which the manifold pressure varies in accordance with R. P. M. when the supercharger is being operated at high speed. Relay 3422 similarly controls R. P. M. potentiometer LRP3.

The manifold pressure motor control circuits are thereupon operated to cause the rotation of the shafts driven thereby indicative of an increase in manifold pressures and to cause the manifold pressure indicators to show such increases in manifold pressures. The manifold pressures are now varied with the altitude, increasing as the throttles open and increasing as the R. P. M. increases.

As a further result of the operation of the SHR and SHL relays 3413 and 3421, the circuits previously traced for applying potentials of phase φ1 to the control conductors of the brake horsepower motor control circuits of Fig. 21 are changed to simulate the reduction of the brake horse-power outputs of the engines of an aircraft due to the extra power consumed in running the supercharger blowers at higher speeds. For example, with relay 3413 now operated, potential of phase φ1 is now applied from the brush of manifold pressure potentiometer RMP1, over conductor 3205, over the middle lower front contact of relay 3413, through resistance 3426, over conductor 3418 to the brush of the R. P. M. potentiometer RRP1 and over the potential divider extending from ground through the RRP1 potentiometer winding, over conductor 3213, over the lower front contact of relay 3413 and through resistance 3420 to ground, and from a point between resistance 3426 and this potential divider, through resistance 3206 to the control conductor 3207 of the brake horse-power motor control circuit for the right engine. A similar circuit is established to control conductor 3257 of the brake horse-power motor control circuit for the left engine by the operation of SHL relay 3421. These motor control circuits are now controlled by the manifold pressure potentiometers RMP1 and LMP1 and the R. P. M. potentiometers RRP1 and LRP1 to show increases in the brake horse-power as the manifold pressures increase, and increases in the brake horse-power as the R. P. M. increases but, as the R. P. M. increases above a certain amount, the resistance networks cause the brake horse-powers to fall off as would be the case in an actual aircraft.

As a result of the increase in manifold pressures due to the simulation of the increased speed of the supercharger blowers and the increase in the simulated brake horse-power outputs of the engines, the thrust horse-power motor control circuit of Fig. 24 is controlled to rotate its shaft 2460 into a position indicative of an increase in thrust horse-power, thereby causing an increase in the indicated air speed and an increase in the rate of climb which the pilot will note from the rate of climb indicator as fully described in the application of Davis, Fogarty, Rippere hereinbefore referred to. The pilot may now resume level flight by pulling back both throttles to reduce the manifold pressures and thus the speeds of the engines, the thrust horse-power and the indicated air speed until the rate of climb indicators indicate a zero rate of climb. Level flight is thus resumed without changing the position of the yoke.

*Manual propeller control*

It will now be assumed that the right and left propeller control switches 4316 and 4317 on the pilot's pedestal, Fig. 43, are operated from their upper or automatic positions to their normally open or manual positions thereby opening the circuit of the AUT relay 3809 at the right engine control circuit, Fig. 38, and the circuit of the corresponding relay at the left engine control circuit, Fig. 27. These relays thereupon release in turn establishing the circuits of the MAN relays, such as 3810 at each control circuit. Relay 3809 upon releasing also establishes the circuit previously traced over conductor 2521 for relay 2520 of the R. P. M. memory motor control circuit for the right engine which relay, upon operating, opens the circuit of motor M25 to prevent further operation of such motor control circuit. The R. P. M. memory motor control circuit for the left engine is similarly controlled from the left engine control circuit of Fig. 27.

Relay 3810 upon operating disconnects ground from conductor 3811 of cable 3800 to extinguish the automatic propeller pitch lamp 307 and over its lower No. 1 front contact connects ground to conductor 3868 of cable 3800 for lighting the manual propeller pitch lamp 309 at the instructor's desk. The MAN relay of the engine control circuit of Fig. 27 similarly causes lamp 207 to become extinguished and lamp 209 to become lighted at the instructor's desk. Relay 3810 at its upper No. 1 and lower No. 2 contacts opens the circuits previously traced over conductors 3850 and 2525 to the control conductor 2523 of the R. P. M. memory motor control circuit for the right engine and the MAN relay of the engine control circuit of Fig. 27 opens similar circuits over conductors 2750 and 2575 to the control conductor 2573 of the R. P. M. memory motor control circuit from the left engine. At its lower No. 3 contacts relay 3810 establishes a circuit from ground over such contacts, over conductor 3869 through the winding of MAN1 relay 3702 associated with the propeller pitch motor control circuit for the right engine. A similar circuit is established by the MAN relay of Fig. 27 for the MAN1 relay 3752 associated with the propeller pitch motor control circuit for the left engine. Relay 3810 also connects ground through resistance 3898 over its upper No. 1 front contact, over the upper front contact of ESTA relay 3839 and conductor 3856 to the junction point between the brush of potentiometer RRP10 and resistance 3309 to replace the resistance 2522 previously connected over conductor 3850 and the upper No. 1 back contact of relay 3810 to such junction point so that the R. P. M. motor control circuit of Fig. 22 will not react to the operation of relay 3810. The corresponding MAN relay of Fig. 27 performs a similar function with respect to the R. P. M. motor control circuit for the left engine.

With relay 3702 operated, direct ground is applied over its inner lower front contact, through resistance 3705 to control conductor 3704 of the propeller pitch motor control circuit for the right engine and ground is applied over the upper back contact of INC relay 3870, over the upper back contact of DEC relay 3871, over conductor 3872, over the upper contacts of relay 3702 and through resistance 3703 to control conductor 3704. At the same time connections to the brushes of potentiometers RVP1 and RPP3 are opened whereby the propeller pitch motor control circuit is rendered unresponsive and the shaft 2610 controlled thereby is maintained in its previously adjusted position. Relay 3702 over its lower contacts connects the brush of propeller pitch potentiometer RPP2 over conductors 3561 and 3562 and through resistance 3563 to control conductor 3552 of the thrust horse-power motor control circuit and similarly relay 3752, over its lower contacts, connects the brush of propeller pitch potentiometer LPP2 over conductors 3564 and 3565 and through resistance 3566 to control conductor 3552 of the thrust horse-power motor control circuit whereby the latter circuit is now placed under the control of the propeller pitch potentiometers RPP2 and LPP2. Relay 3702 over its inner upper contacts also connects the brush of brake horse-power variac RBV7 through resistance 3569 over conductors 3567 and 3568 to ground through resistance 3570 and through resistance 3571 to control conductor 3552 of the thrust horse-power motor control circuit, and similarly relay 3752, over its inner upper contacts, also connects the brush of brake horse-power variac LBV7 through resistance 3572 and over conductors 3573 and 3574 to ground through resistance 3575 and, through resistance 3576 to control conductor 3552 of the thrust horse-power motor control circuit whereby the control of the thrust horse-power motor control circuit by the brake horse-power motor control circuits is not altered. These changes do not affect the thrust horse-power position of the shaft 2460 controlled by the thrust horse-power motor control circuit and the rate of climb indicators will still indicate a zero rate of climb. This simulates the condition which would exist in an actual aircraft when the propeller control is shifted from automatic to manual.

*Decrease of propeller pitch*

The simulation of the decrease of propeller pitch under manual control is controlled by the movement of the propeller control switches 4316 and 4317 to their middle positions. With the switch 4316 in its middle position ground on conductor 1587 is connected over the front contact of PR relay 4314, through switch 4318, over switch 4316 and conductor 3873 of cable 3800 through the winding of INC relay 3870 to battery ground. Relay 3870 upon operating establishes a circuit from ground over its lower contacts and conductor 3874 of cable 3800 to battery through the propeller pitch R. P. M. increase lamp 310 for the right engine to light such lamp at the instructor's desk indicating that the propeller R. P. M. has been increased. At its back contact relay 3870 removes ground from conductor 3872 and over its upper front contact supplies potential of phase $\varphi 1$ from the potential divider extending from the $40\varphi 1$ bus bar through resistances 3875 and 3876, over conductor 3872 and thence as traced over the upper front contact of MAN1 relay 3702 and through resistance 3703 to the propeller pitch motor control circuit. The propeller pitch motor control circuit is now operated to rotate shaft 2610 in a direction indicative of a decrease of propeller pitch so long as the switch 4316 is held in the propeller R. P. M. increase position. The rotation of shaft 2610 rotates the brushes of the propeller pitch potentiometers toward the No. 1 terminals of their windings. The adjustment of potentiometer RPP2 is effective to control the thrust horse-power motor control circuit over the circuit as modified by the operation of MAN1 relay 3702 to operate the shafts controlled by the thrust horse-power motor control circuit in directions indicative of a decrease in thrust horse-power.

The propeller pitch potentiometer RPP1 is effective at this time to control the R. P. M. motor control circuit. For this purpose potential of phase $\varphi 2$ applied over conductor 3844 through the winding of potentiometer RPP1, as modified by the manifold pressure potentiometer RMP2, as further modified by the true air speed potentiometer TASP4 and the R. P. M. potentiometer RRMP6, is applied over conductor 3605, over the upper No. 2 front contact of MAN relay 3810, over the upper back contact of relay 3854, the upper back contact of PRM relay 3822, over the upper No. 3 contact of EST1 relay 3828, over conductor 3835 and through resistance 3308 to control conductor 2201 of the R. P. M. motor control circuit for the right engine. This motor control circuit is controlled to rotate the shafts 2210 and 3301 controlled thereby in directions indicative of an increase in the R. P. M. whereupon the potentiometer RPP5 driven from shaft 3301 is adjusted to increase the speed of rotation of the right engine tachometer generator RTG, Fig. 29, to cause the right engine tachometers on the instrument panels to show an increasing engine speed. When the tachometers indicate a right engine speed of, for example, 2400 R. P. M., the switch 4316 is moved to the open position. INC relay 3870 thereupon releases opening the circuit for controlling the propeller pitch motor control circuit whereupon the motor thereof comes to rest. Relay 3870 also opens the circuit of the increase R. P. M. propeller pitch lamp 310 for the right engine which becomes extinguished.

The movement of switch 4317 to its middle position causes similar operations in connection with the left engine control circuit of Fig. 27 and the associated motor control circuits for the left engine. The fact that the switch 4317 has thus been operated is indicated at the instructor's desk by the lighting of lamp 210.

Increase of propeller pitch

The simulation of the increase of propeller pitch under manual control is controlled by the movement of the propeller pitch switches 4316 and 4317 to their lower positions. With switch 4316 in its lower position a circuit is established from ground thereover, over conductor 3877 of cable 3800 and to battery through the winding of DEC relay 3871, Fig. 38. Relay 3871 upon operating establishes a circuit from ground over its lower contacts and conductor 3878 of cable 3800 to battery through the propeller pitch decrease R. P. M. lamp 311 for the right engine to light such lamp at the instructor's desk indicating that the propeller R. P. M. has been decreased, at its back contact removes ground from conductor 3872 and over its upper front contact applies potential of phase φ2 from the potential divider extending from the 40φ2 bus bar through resistances 3879 and 3880 and conductor 3872, and thence as traced over the upper front contact of MAN1 relay 3702 and through resistance 3703 to the propeller pitch motor control circuit. The propeller pitch motor control circuit is now operated to rotate shaft 2610 in a direction indicative of an increase of propeller pitch so long as the switch 4316 is held in the propeller R. P. M. decrease position. The rotation of shaft 2610 rotates the brushes of the propeller pitch potentiometers towards the No. 3 terminals of their windings. The adjustment of potentiometer RPP2 is effective to control the thrust horse-power motor control circuit as previously described to cause an increase in thrust horse-power.

The propeller pitch potentiometer RPP1 is effective at this time to control the R. P. M. motor control circuit over the circuits previously traced in connection with the discussion of increasing the propeller pitch whereby the shafts 2210 and 3301 are rotated in directions indicative of a decrease in R. P. M. whereupon the potentiometer RPP5 driven from the shaft 3301 is adjusted to decrease the speed of operation of the right engine tachometer generator RTG to cause the right engine tachometers on the instrument panels to show a decreasing engine speed. When the tachometers indicate a right engine speed of, for example, 2,000 R. P. M., switch 4316 is moved to the open position. DEC relay 3871 thereupon releases opening the circuit for controlling the propeller pitch motor control circuit whereupon the motor thereof comes to rest. Relay 3871 also opens the circuit of decrease R. P. M. propeller pitch lamp 311 for the right engine which thereupon becomes extinguished.

The movement of switch 4317 to its lower position causes similar operations in connection with the left engine control circuit of Fig. 27 and the propeller pitch and R. P. M. motor control circuit for the left engine. The fact that the switch 4317 has been operated is indicated at the instructor's desk by the lighting of lamp 211.

The right and left propeller control switches are now returned to their upper or automatic positions causing the reoperation of AUT relay 3809 and the release of MAN relay 3810 and MAN1 relay 3702 of the right enginge control circuit and the similar relays of the left engine control circuit. With the circuits restored to the condition previously described when functioning on automatic propeller controls and the throttle settings unchanged, the tachometers for both engines will indicate about 1800 R. P. M.

Disabling the right engine

It will now be assumed that the instructor, to simulate the disabling of the right engine of an aircraft, operates the right engine disabling key 100R to the off position thereby opening the locking circuit of ST relay 3838 of the right engine motor control circuit, Fig. 38. Relay 3838 thereupon releases in turn releasing EST1 relay 3828, ESTA relay 3839 and EST relay 3816. Relay 3828 upon releasing modifies the circuit previously traced over which potential of phase φ1 was applied to control conductor 2201 of the R. P. M. motor control circuit of Fig. 20, so that this motor control circuit operates the shafts 2210 and 3301 controlled thereby in directions indicative of a reduction in the speed of the right engine. FL relay 3841 will at this time be operated since a simulated flight altitude of 7,000 feet has been assumed. Upon the release of relay 3828 with FL relay 3841 operated, potential of phase φ1 is applied from the 40φ1 bus bar through the potential divider comprising resistances 3882 and 3883 to ground, and potential of phase φ1 derived at the junction point between the resistances is applied over the upper back contact of FTR relay 3837, over the lower No. 2 front contact of FL relay 3841, over the upper No. 3 back contact of EST1 relay 3828, conductor 3835 and through resistance 3308 to control conductor 2201 of the R. P. M. motor control circuit. This potential being substantially less than that of phase φ1 applied over the previously traced circuit prior to the release of relay 3828, the motor of the R. P. M. motor control circuit is operated to rotate the shafts controlled thereby to positions indicative of a reduction of engine speed to about 800 R. P. M. In response to the repositioning of R. P. M. potentiometer RPP5 the right engine tachometer generator RTG is now rotated at a reduced speed whereby the right engine tachometers on the instrument panels indicate a right engine speed of about 800 R. P. M. Because of the reduced speed of the tachometer generator RTG the sound effects circuit of the right engine, Fig. 40, is also controlled to produce a greatly reduced simulated engine noise.

As a result of the further reduction in the right engine speed and the operation of the brush of R. P. M. potentiometer RRP3 toward the No. 3 terminal of its winding, the potential of phase φ1 applied to control conductor 3842 of the right engine manifold pressure control circuit is reduced whereby the motor of such circuit rotates the shafts 2310 and 3401 in directions indicative of a reduction in manifold pressure which will be indicated by the right engine manifold pressure indicators on the instrument panels. The movement of R. P. M. potentiometer brush RRP7 towards the No. 1 terminal of its winding reduces the potential of phase $\varphi 1$ applied to the control conductor 3003 of the right engine fuel flow motor control circuit whereby the motor of such circuit rotates the shafts 1910 and 3001 in directions indicative of a lower fuel consumption for the right engine which will be indicated by the right engine fuel flow indicators on the instrument panels.

With ESTA relay 3839 released, a potential of phase $\varphi 2$ applied from the 40$\varphi$2 bus bar through resistances 3849 and 3848 to ground, is applied from a point between resistances 3848 and 3849, over the back contact of relay 3839, over the upper No. 1 back contact of MAN relay 3810, over conductor 3850 through resistance 2522 to control conductor 2523 of the R. P. M. memory motor control circuit for the right engine whereby the motor M25 of such circuit drives the shafts 2510 and 3601 to return the brush RRMP6 to the normal or No. 1 terminal of its winding, at which time the L1 limit switch 2511 opens the circuit of motor M25.

The release of relay EST 3816 opens at its upper No. 1 contacts the circuit previously traced over which potential of phase $\varphi 1$ was applied to control conductor 3207 of the brake horse-power motor control circuit for the right engine whereupon potential of phase $\varphi 2$ applied over the balancing potentiometer RBP10 is effective to cause the motor of the brake horse-power circuit to drive the shafts 2110 and 3201 into their normal positions or until the L1 limit switch 2113 is operated to open the circuit of ON relay 2112 which, upon releasing, opens the circuit of the motor of the control circuit at which time the brushes of the brake horse-power potentiometers will be at the No. 1 terminals of their windings. With the brake horse-power output potential supplied through brake horse-power variac RBV7 to control conductor 3552 of the thrust horse-power motor control circuit reduced to zero, such motor control circuit is controlled to rotate shafts 2460 and 3551 in directions indicative of a reduction in thrust horse-power to the amount delivered through the operation of the left engine only.

To remove the drag imposed by the windmilling of the disabled engine propeller, the pilot closes the propeller feathering switch 4323 on the pilot's pedestal thereby establishing a circuit from ground over conductor 1587, over the lower contacts of PR relay over the contacts of switch 4323 and conductor 3886 of cable 3800 to battery and ground through the winding of FTR relay 3837 of the right engine control circuit, Fig. 38. At its middle lower front contact relay 3837 establishes a circuit from ground over such contact and conductor 3889 of cable 3800 through feather propeller lamp 312 at the instructor's desk to battery and ground to inform the instructor that the feathering of the right propeller by the pilot has been simulated. At its upper transfer contacts relay 3837 disconnects potential of phase $\varphi 1$ applied from the potential divider comprising resistances 3882 and 3883, from the circuit previously traced over conductor 3885 and through resistance 3308 to control conductor 2201 of the right engine R. P. M. control circuit and connects the 10,000-ohm resistance 3887 to control conductor 2201. Potential of phase $\varphi 2$ applied through balancing potentiometer RPP10 and resistance 3309 is now effective to control the R. P. M. motor control circuit to rotate the shafts 2210 and 3301 controlled thereby into their normal positions in which the L1 limit switch 2208 will open the circuit of ON relay 2209 and the circuit of the driving motor of the motor control circuit will be opened to stop further rotation of the shafts. The return of potentiometer RRP5 to its No. 1 terminal, slows down the motor 2901 of the tachometer motor control circuit of Fig. 29 until when the ON relay 2209 releases, relay 2900 of the right engine tachometer motor control circuit is opened to stop the motor 2901. The tachometer generator RTG being now stopped the right engine tachometers on the instrument panels will return to zero indicating that the right engine has ceased to rotate. As a further result of the movement of the brush of R. P. M. variac RRV6 towards the No. 2 terminal of its winding, the vibration motor RVM slows down to decrease the simulated right engine vibration until when the shaft 2210 reaches its normal position the cam operated contacts 2211 will open to stop the vibration motor.

With ON relay 2209 released, the circuit previously traced over the upper No. 1 contacts thereof whereby the manifold pressure motor control circuit was controlled to change the reading of the right engine manifold pressure indicators in accordance with the throttle opening, as indicated by the setting of the throttle variac 1219R, in accordance with the altitude as determined by the setting of the altitude potentiometer AP9, by the condition of the supercharger speed relay SHR1, by the R. P. M. potentiometer RRP3 now having its brush at the No. 1 terminal of its winding, and by the propeller governor rheostat 1212 is opened and the manifold pressure motor control circuit is now controlled in accordance with the barometric pressure at the altitude at which the simulated flight is being flown. This control circuit may be traced from the brush of altitude potentiometer AP3, the winding of which is supplied with potential of phase $\varphi 1$ as previously described, over conductor 3405, the lower front contact of FTR relay 3837, the upper No. 2 front contact of FL relay 3841, the upper back contact of STM relay 3826, the lower No. 3 back contact of EST1 relay 3828 to control conductor 3842 of the manifold pressure motor control circuit for the right engine, whereupon the manifold pressure control circuit for the right engine positions the shafts 2310 and 3401 to positions commensurate with the barometric pressure at the altitude determined by the adjustment of the altitude potentiometer AP3. The pressure is now indicated by the right engine manifold pressure indicators on the instrument panels.

As a further result of the release of ON relay 2209, the circuit of ST relay 3913 of the right engine oil pressure circuit of Fig. 39 is opened at the lower No. 2 contacts of relay 2209 and relay 3913 releases followed by the release of ST1 relay 3914, L2 relay 3917 and NP relay 3918. Potential of phase $\varphi 1$ is now applied through the rotor circuit of motor 3915, through resistance 3916, over the contacts of cam operated switch 3930, over the upper No. 1 back contact of ST relay 3913 and the upper phase $\varphi 1$ portion of the secondary winding of power transformer 3901, whereupon motor 3915 operates in such a direction as to move shaft 3922 back to its normal position in which the switch contacts 3930 open to stop the motor. The rotation of shaft 3922 has through the transmitting autosyn 3923 operated the right engine oil pressure indicators on the flight engineer's and instructor's instrument panels to indicate zero oil pressure for the right engine. ST1 relay 3914 upon releasing removes potential of phase φ2 from the winding of cowl flaps potentiometer 3975 whereupon the engine cylinder and oil temperature motor control circuit is operated under the control of its balancing potentiometer 2829 to return shaft 2824 slowly toward its normal position whereby the engine oil temperature and cylinder temperature indicators for the right engine mounted on the flight engineer's and instructor's instrument panels are slowly operated to indicate the cooling of the oil and of the engine cylinders.

Relay 2209 also opens at its lower No. 3 contacts the previously traced circuit for RFS relay 1726, Fig. 17, which relay upon releasing, with RFS1 relay 1727 locked operated under the control of RFS2 relay 1728, establishes a filament heating circuit for timing tube 1731. After about ten seconds delay tube 1731 becomes conducting and relay 1728 operates over the cathode-anode path therethrough and opens the locking circuit of relay 1727 which, upon releasing, opens the circuit of ST relay 3950 of the fuel pressure motor control circuit Fig. 39, which latter relay upon releasing in turn releases UL relay 3903. A circuit is now established from the phase φ2 portion of the secondary winding of power transformer 3901, over the back contact of IFP relay 3961, over the back contact of ST relay 3950, over the inner upper front contact of LL relay 3910, through resistance 3904 and the rotor winding of motor 3905 to ground, whereupon the motor rotates shaft 3908 back to its normal position in which the cam operated contacts 3909 open to release LL relay 3910 and to thereby stop the motor. The rotation of shaft 3908, through the autosyn 3924, has returned the right engine fuel pressure indicators on the flight engineer's and instructor's instrument panels to read zero fuel pressure.

Relay 3910 upon releasing, at its upper transfer contacts substitutes a direct ground for resistance ground connected to conductor 3912 and thence through resistance 3008 to control conductor 3003 of the right engine fuel flow motor control circuit and such circuit is now controlled by phase φ2 potential supplied to control conductor 3003 over the brush of the balancing potentiometer RFFP1 to drive the shafts 1910 and 3001 in directions indicative of a reduction of the fuel flow. When the shaft reaches its normal position in which the brush of potentiometer RFFP1 is at the No. 1 terminal of its winding, the L1 switch 1908 operates to open the circuit of motor M19. Through the rotation of shaft 1910 the transmitting autosyn 1925 has controlled the right engine fuel flow indicators on the flight engineer's and instructor's instrument panels to indicate a reduction of the fuel flow to the right engine to the zero rate.

FTR relay 3837 at its inner lower back contact opens a point in the circuit of start relay 3838 of the right engine control circuit and at its inner upper transfer contacts removes the 60-ohm resistance 3884 from the circuit not shown through the winding of a thrust horse-power potentiometer, over which potentiometer potential of phase φ1 is applied to the control conductor of the indicated air speed motor control circuit as fully disclosed in the application of Davis-Fogarty-Rippere hereinbefore referred to. Potential of phase φ1 is thus increased and the indicated air speed motor control circuit now functions to cause a resetting of the shafts driven thereby indicative of the increase in air speed which would result through the feathering of the propeller driven by the disabled engine. This increase in indicated air speed is indicated by the indicated air speed indicators on the instrument panels and would also become apparent to the pilot by a yawing of the simulated flight toward the right. To offset this the pilot will operate the trim wheels 103 until a straight level flight path is indicated by the instruments.

The left engine could be disabled in a similar manner by the operation of the left engine disabling key 700L. In this case, however, the left engine control circuit of Fig. 27 and the motor control circuits appertaining to the left engine would function and the flight conditions which would result would be in the opposite directions to those previously described in connection with the disabling of the right engine. When the left engine propeller feathering relay similar to relay 3837 is operated, the circuit of propeller feather lamp 212 is controlled over conductor 2789 of cable 2700 to indicate to the instructor that the pilot has closed the feathering switch 4324 on the pilot's pedestal.

Restarting the right engine

To simulate the starting of the right engine while it is still being driven by the windmilling of its propeller, it is only necessary to reclose the disabling key 700R. With the engine still rotating, the ON relay 2209 of the R. P. M. motor control circuit is still operated and consequently the circuit changes just described which would result from its release have not taken place and the FTR relay 3837 of Fig. 38 has not been operated. With key 700R released the circuit of ST relay 3838 is now established from ground over the inner upper contacts of relays 3803 and 3804, conductor 3807, the contacts of key 700R at the instructor's desk, over conductor 701, the lower contacts of relay 1727, conductor 1730, over the lower contacts of relay 3910, conductor 3911, over the inner lower contacts of FTR relay 3837, over the back contact of ICO1 relay 3890, over the upper No. 1 contacts of FL relay 3841 and over the upper back contact of relay 3836 through the winding of ST relay 3838 to battery and ground. Relay 3838 thereupon operates, locks over its inner upper front contact and over the back contact of relay 3890 to the start conductor and establishes the circuit of EST1 relay 3828 from ground over its inner lower contacts and over the lower No. 1 contacts of FL relay 3841 to battery and ground through the winding of relay 3828. Relay 3828 upon operating locks directly under control of relay 3838 and establishes the previously traced circuit for ESTA relay 3839 which in turn establishes the previously traced circuit for EST relay 3816. From this point the simulated operation of the right engine proceeds in the manner previously described, the sound effects circuit of Fig. 40 again functioning to simulate the sound of the engine as it picks up speed, the speed of the tachometer generator RTG increasing to control the tachometers to indicate the increasing engine speed which, with the previous throttle opening, will increase to the indicated speed of 1800 revolutions per minute, the manifold pressure motor control circuit functioning to control the right engine manifold pressure indicators to show an increase in the indicated manifold pressure and the flight circuits being controlled as a result of the returning power delivered by the right engine. With the right engine delivering power a yawing of the simulated flight to the left and nosing up will be indicated by the flight instruments since the pilot has previously operated the trimming wheels to offset the nosing down and yawing to the right condition due to the disabled right engine. The pilot will therefore readjust the left engine throttle until both engines are operating at the same speed of, for example, 1800 revolutions per minute and will reoperate the trim wheels 103 until a straight level flight course is again simulated as indicated by the flight instruments.

*Disabling both engines while in flight*

Both engines may be disabled at the same time by pulling out the main ignition switch 1214, Fig. 12, thereby connecting ground to conductors 3801 and 3802 extending through cable 3800 to the junction points between the windings of IGR and IGL relays 3803 and 3804 and resistances 3805 and 3806, whereupon relays 3803 and 3804 become shunted and released, and at the same time connecting ground to conductors 2701 and 2702 extending through cable 2700 to the left engine control circuit of Fig. 27 whereby the corresponding ignition relays therein also release. Relays 3803 and 3804 upon releasing open the previously traced holding circuit for ST relay 3838 whereupon relay 3838 releases followed by the release of EST1 relay 3828, the release of ESTA relay 3839 and the release of EST relay 3816. With these relays released the right engine slows down to the speed at which it is driven by the windmilling propeller or to about 800 revolutions per minute as indicated by the right engine tachometers. The manifold pressure of such engine as indicated by the right engine manifold pressure indicators is reduced, the fuel flow to the right engine as indicated by the right engine fuel flow indicators is reduced, the vibration motor RVM, which simulates the vibration incident to the operation of the right engine, becomes slowed down, and the sound effects produced by the circuits of Fig. 40 with respect to the right engine are greatly reduced in volume, all in the manner previously described in connection with the disabling of the right engine. At the same time through the release of the relays of the left engine control circuit corresponding to relays 3803, 3804, 3838, 3828, 3839 and 3816 the left engine slows down to the speed at which it is driven by the windmilling of its propeller or about 800 revolutions per minute as indicated by the left engine tachometers. The manifold pressure of such engine as indicated by the left engine manifold pressure indicators is reduced, the fuel flow to the left engine as indicated by the left engine fuel flow indicators is reduced, the vibration motor LVM, which simulates the vibration resultant from the operation of the left engine, becomes slowed down, and the sound effects produced by the circuits of Fig. 40 with respect to the left engine are greatly reduced in volume.

The brake horse-power motor control circuits of Fig. 21 for both engines are now controlled in the manner previously described indicative of a reduction in brake horse-power thereby causing the thrust horse-power motor control circuit of Fig. 24 to be controlled in the manner previously described indicative of a reduction in the thrust horse-power output of the engines. Since the two engines are operating at the same reduced speed no yawing tendency is introduced in the flight course as indicated on the instruments on the pilots' instrument panels.

To maintain a simulated air speed of at least 110 knots, the pilot pushes the yoke forward and thereby, in the manner described in the application of Davis-Fogarty-Rippere hereinbefore referred to, causes the flight circuits to function to simulate a nose down condition as indicated by the rate of climb indicators and the elevation of the horizon bars of the artificial horizon instruments. When the air speed increases above 150 knots, the pilot pulls the yoke back. In addition the pilot operates the propeller feathering switches 4323 and 4324 to their "on" positions, whereupon the engine control circuits function in the manner previously described in connection with the disabling of the right engine and the R. P. M. indications of both engines are reduced to zero. With the propeller feathering switches operated, the automatic propeller control lamps 207 and 307 at the instructor's desk are extinguished and the propeller feathering lamps 212 and 312 are lighted.

*Restarting the engines*

Preparatory to restarting the engines, the pilot restores the propeller feathering switches 4323 and 4324 to their off positions, thereby releasing the FTR relays such as 3837 at the engine control circuits, Figs. 27 and 38. These relays upon releasing extinguish the propeller feathering lamps 212 and 312 at the instructor's desk and cause the operation of the propeller pitch motor control circuits of Fig. 26 to repitch the propellers, whereupon the propellers start into rotation. The pilot also pushes in the ignition switch 1214, thereby removing ground from conductors 3801, 3802, 2701 and 2702 whereupon the IGR and IGL relays, such as 3803 and 3804, of the engine control circuits reoperate.

The flight engineer now operates both supercharger speed controls 1118 and 1119 to their upper or low speed positions thereby opening the previously traced circuit for the SHR and SHL relays 3413 and 3421 which release and in turn release the SHR1 and SHL1 relays 3412 and 3422. These relays upon releasing restore the manifold pressure and brake horse-power control circuits to the condition simulating low speed supercharger blower operation and open the circuits of the lamps 443 and 442 at the instructor's desk, which have been lighted to indicate that high speed supercharger blower operation has been simulated. Also the operation of the controls 1118 and 1119 to their upper or low speed positions has reestablished the previously traced circuits for lamps 410 and 411 at the instructor's desk to indicate that the low speed operation of the supercharger blowers is being simulated. The throttles are also moved to their extreme rear or closed positions in which the sliders of the throttle rheostats and variacs will be at the lower ends of their windings.

With the main ignition switch pushed in and the propellers rotating both engines start since they are assumed to be driven by the windmilling of their propellers, as will be indicated by the sound effects and by the operation of the engine tachometers to read 800 R. P. M. The engine throttles are then adjusted so that the manifold pressure indicators for both engines indicate a manifold pressure of 27.5 inches of mercury. It will be assumed that by the time the engines are both reoperating, the altitude at which the simulated flight is being flown will have decreased to 1000 feet and that thereupon the flight is leveled off at this altitude.

Low fuel condition

In an aircraft of the type which the trainer under consideration is designed to simulate three fuel tanks are located in the hull, one forward, one at the center and one aft. Two additional tanks are located in the wings adjacent to the engines and designated as left wing service tank and right wing service tank respectively, and two tanks are located in the bomb bays designated left and right bomb bay tanks. Two main fuel trunks are provided, one for serving the right side of the aircraft and the other for serving the left side. Four selector valves are provided, one of which is called the hull tank selector valve, two of which are called the right and left engine selector valves and the fourth of which is called a cross-over and defuel valve. These valves are controlled from the flight engineer's fuel trunk panel. The hull tank selector valve has an off and three selection positions and when operated connects the suction pipe from any one of three hull tanks to both of the main fuel trunks. Each of the main fuel trunks after leaving the hull selector valve passes through a check valve which prevents fuel from flowing back into the hull tanks, then passes through a fuel transfer pump to an inlet port of one of the engine selector valves.

Each of the engine selector valves has an off and four selection positions. In one of the selection positions the main fuel trunk inlet port is connected to one outlet port which is connected by a pipe with the top of the wing service tank on the side of the aircraft which the valve serves and the outlet pipe from the wing service tank, which is connected with a second inlet port of the valve, is connected to a second outlet port which is connected through an engine driven fuel pump with the carbureter of the engine on the same side of the aircraft, whereby fuel is transferred from the selected hull tank to the wing service tank and from the wing service tank to the engine. In a second selection position, the main fuel trunk inlet port is connected to a second outlet port, whereby fuel is fed directly from the selected hull tank to the engine. In a third selection position the suction pipe from the bomb bay tank which is connected with a third inlet port valve, is connected with the second outlet port whereby fuel is fed directly from the bomb bay tank to the engine on the same side of the aircraft. In the fourth position of the valve, the outlet pipe from the wing service tank which is connected to the second inlet port, in addition to being connected to the second outlet port and to the engine is also connected to the main fuel trunk whereby fuel from the wing tank may be fed directly to the associated engine and to the main fuel trunk from which fuel may also be fed to the other engine or to a defueling trunk as may be desired and as determined by the selective operation of the cross-over valve.

The cross-over valve has an off position, a cross-over position and a defuel position. In the cross-over position, one inlet port connected with one fuel trunk is connected with one outlet port connected with the other fuel trunk whereby fuel flowing back from the engine selection valve of either trunk is permitted to flow to the other fuel trunk. Thus, for example, fuel from either wing service tank, which might become damaged, may be transferred through the associated engine selector valve, as previously described, to the main fuel trunk, thence through the cross-over valve to the other fuel trunk and to the other engine so that both engines could be operated from the same service tank to keep them both running and to exhaust the fuel from the disabled tank more quickly. In the second selection position of the cross-over valve, both inlet ports are connected to both outlet ports, the second of which outlet ports is connected with a refueling drain trunk. Thus in the second selection position the fuel from the disabled tank in addition to being fed to both engines may also be allowed to drain away to even more quickly drain the disabled tank.

Each of the wing service tanks is provided with an automatic level mechanism which is controlled in accordance with the fuel level, whereby the valves may be selectively operated to control the fuel transfer.

In the trainer the functions of the hull tank selector valve are simulated by the group of relays disclosed in the lower portion of Fig. 17 comprising AH relay 1748 and AHI relay 1750, CH relay 1717 and CHI relay 1732, FH relay 1736 and FHI relay 1747. The functions performed by the right engine selector valve are simulated by RST relay 1709, RBB relay 1764 and RHT relay 1768 and the function performed by the left engine selector valve are simulated by the LST relay 1708, LBB relay 1769 and LHT relay 1770. The functions of the right fuel transfer pump are simulated by RTP relay 1713 and RTPI relay 1721 and of the left fuel transfer pump by LTP relay 1712 and LTPI relay 1723. The functions of the cross-over and defueling valves are simulated by CO relay 1761 of Fig. 17 and LSD relay 1657, DF relay 1658 and RSD relay 1659 of Fig. 16.

The operations simulating the selection of a hull tank, the transfer of fuel from such tank to the wing service tanks from which the engines are supplied will first be described. It has been assumed that the hull tank selector valve switch 1716 has been moved to the FH position to simulate the selection of the forward hull tank for supplying fuel to the right and left engine service tanks and that FH relay 1736 has been operated. It will now be assumed that the instructor operates the knob 606 of the forward hull tank fuel quantity control switch to the E or empty position in which cam operated contacts 629 are opened and cam operated contacts 628 are closed. The opening of contacts 629 opens the circuit of FHI relay 1747 on the flight engineer's fuel control panel, which relay operated following the operation of the FH relay 1736, over conductor 1746 of cable 1700 and contacts 629. The closure of contacts 628 establishes a circuit from ground over the No. 1 right contacts of relay 809, over conductor 811, contacts 628, through lamp FH to battery and ground and over conductors of cables 1500 and 1521 to battery through lamp 1059 of the low fuel indicating lamps at the flight engineer's panel and over a conductor of cable 1580 to battery through lamp 4325 at the pilot's pedestal indicating the low fuel in the forward hull tank.

The movement of knob 606 has also moved the slider of potentiometer 645 towards the No. 1 terminal of its winding and with the selector 1029 of the fuel indicator 1031 at the flight engineer's panel set in a position to indicate the fuel quantity in the forward hull tank, such indicator is controlled over a circuit extending from the slider of potentiometer 645 over a conductor of cable 1000 and the brush of selector 1029 to operate the indicator 1031 to indicate the quantity of decreasing fuel in the forward hull tank.

It will now be assumed that the instructor moves the knob 605 of the right wing service tank fuel quantity control switch to the No. 1 or 100 gallon position. With less than 180 gallons left in this tank, the cam operated contacts 622 are opened thereby opening the operating circuit of RTP relay 1713 extending from ground on bus bar DB, over the lower contacts of FT relay 1539 operated upon the previous closure of circuit breaker 1540, over conductor 1734 of cable 1700, over contacts 622, conductor 1736 of cable 1700 to battery through the winding of RTP relay 1713. Relay 1713 thereupon releases, its locking circuit having been opened by the release of the FHI relay 1747, in turn releasing RTPI relay 1721 and closing the circuit of the right fuel transfer pump dry lamp 1715. The circuit of lamp 1715 extends from battery through such lamp, over the back contact of relay 1713 and over the inner upper contacts of relay 1709 to ground on bus bar on DB. A circuit is also closed in parallel with lamp 1715 over conductor 1763 of cable 1700 and to battery through fuel pump dry lamp 448 at the instructor's desk. These lamps become lighted through the closure of the cam operated contacts 628 as soon as the fuel quantity control switch for the forward hull tank is moved into a position indicative that the tank is less than 10 per cent full. Lamp 1715 lights as a warning to the flight engineer that the pump which has been transferring fuel from the forward hull tank to the right wing or service tank is about to run dry and that the hull tank selector valve switch should be operated to render another hull tank available for supplying fuel to the wing service tanks.

The flight engineer thereupon moves the fuel selector valve switch 1716 to the CH or center hull tank position thereby releasing FH relay 1736 and extinguishing the forward hull tank indicating lamp 623 at the instructor's desk and establishing an obvious circuit for the CH relay 1717 which, upon operating, establishes a circuit from ground over its upper contacts and conductor 1718 of cable 1700 to battery through the center hull indicating lamp 613 at the instructor's desk to inform the instructor that the flight engineer has now operated the selector valve switch to make fuel from the center hull tank available. Relay 1717 upon operating establishes a circuit from battery through the winding of the CHI relay 1732, over the lower contacts of relay 1717 and conductor 1733 of cable 1700, over contacts 618 to ground, whereupon relay 1732 operates. He also operates the fuel quantity indicator control switch 1029 to a position in which the fuel quantity indicator 1031 is controlled to indicate the quantity of fuel in the center hull tank.

The flight engineer now operates the left and right wing tank switches 1738 and 1739 to their right or automatic positions. The operation of switch 1738 establishes a circuit from ground over its right contact and over conductor 1740 of cable 1700, to battery through L relay 624 associated with the fuel quantity control switch for the left wing service tank at the instructor's desk. The operation of switch 1739 establishes a circuit from ground over its right contact and over conductor 1741 of cable 1700, to battery through the R relay 625 associated with the fuel quantity control switch for the right wing service tank at the instructor's desk. Relay 624 upon operating establishes a circuit over conductor 626 through the left wing tank automatic lamp 444 to battery and relay 625 upon operating establishes a circuit over conductor 627 through the right wing tank automatic lamp 445 to battery.

The flight engineer now operates tank switch 1742 to the right tank position momentarily thereby establishing the circuit of RWT relay 1743 which establishes a circuit from ground over its upper contacts and conductor 1744 of cable 1700 through lamp 446 to battery, which lamp lights to indicate to the instructor that the right wing service tank has less than 180 gallons of fuel left in it. Relay 1743 also establishes a circuit from ground over the right contact of switch 1739, over the lower contacts of relay 1743 and through the winding of RTP relay 1713 to battery. Relay 1713 thereupon operates, locks over its lower contacts and the lower contacts of CHI relay 1732 to ground on conductor 1734, establishes the operating circuit for RTPI relay 1721 extending over its upper front contact, the inner upper contacts of CH relay 1717 and over the upper contacts of CHI relay 1732 to ground and opens the circuit of pump dry lamp 1715 at the flight engineer's panel and the circuit of right transfer pump dry lamp 448 at the instructor's desk which lamps become extinguished. At this time fuel is being pumped from the center hull tank into the left and right wing service tanks.

It will now be assumed that the instructor turns the knob 607 of the fuel quantity control switch for the center hull tank to the empty position in which position the cam operated contacts 619 become closed and the cam operated contacts 618 become opened. The closure of contacts 619 establishes a circuit from the ground over the No. 2 right contacts of relay 809, over conductor 810, over contacts 619, through the low fuel lamp CH to battery and in parallel with lamp CH over conductors of cable 1500, 1580 and 1521 through the low fuel lamp 1058 on the flight engineer's panel to battery and through the low fuel lamp 4324 on the pilot's pedestal to battery, to indicate a low fuel condition with respect to the center hull tank. The opening of contacts 618 now opens the previously traced circuit of CHI relay 1732 which releases, in turn releasing relay 1713. Relay 1713 upon releasing now recloses the previously traced circuit for the right transfer fuel pump lamp 1715 and lamp 448 which again light as a warning that the pump which has been transferring fuel from the center hull tank to the right wing tank is about to run dry and that the hull selector valve switch 1716 should be operated to render another fuel tank available for supplying fuel to the service tanks.

The flight engineer thereupon moves the hull selector valve switch 1716 to the AH or aft hull tank position thereby releasing CH relay 1717 and extinguishing the center hull tank indicating lamp 613 at the instructor's desk and establishing an obvious circuit for the AH relay 1748 which upon operating establishes a circuit from ground over its upper contacts and conductor 1749 of cable 1700 to battery through the aft hull tank indicating lamp 630 at the instructor's desk to inform the instructor that the flight engineer has now operated the selector valve switch to make fuel from the aft hull tank available. Upon the release of CH relay 1717 and with CHI relay 1732 released, there is no circuit for holding RTP relay 1713 and RTP1 relay 1721 operated and they release. Relay 1748 upon operating establishes a circuit from battery through the winding of relay AR1 relay 1750, over the lower contacts of relay 1748 and conductor 1751 of cable 1700 to ground over the cam operated contact 812 of the fuel quantity control switch for the aft hull tank which contacts are closed as it is assumed that this tank is full.

It will now be assumed that the instructor turns the knob 605 of the fuel quantity control switch for the right wing service tank to the empty position in which position the cam operated contacts 633 close and the cam operated contacts 616 open. The closure of contacts 633 establishes a circuit from ground over the No. 4 right contacts of relay 809, conductor 816, over contacts 633, through the low fuel lamp RW to battery and in parallel therewith over conductors of cables 1500, 1580 and 1521 through the low fuel lamp 1060 at the flight engineer's station to battery and through the low fuel lamp 4326 on the pilot's pedestal to battery to indicate a low fuel condition with respect to the right wing service tank which is supplying the right engine. The opening of contacts 616 removes ground from conductor 1722 of cable 1700 and releases RF relay 1719 which upon releasing opens the circuit from ground over its upper contacts, over conductor 1725 extending to the R. P. M. motor control circuit of Fig. 22 for the right engine and thence over the lower No. 3 contacts of the ON relay 2209, over conductor 2215 through the winding of RFS relay 1726 to battery. Relay 1726 releases and with RFS1 relay 1727 locked operated under the control of RFS2 relay 1728, relay 1726 closes the filament circuit for the timing tube 1731 which after about 10 seconds becomes conductive and operates relay 1728 over the cathode-anode circuit to release relay 1727. Relay 1727 upon releasing opens the filament circuit of tube 1731, removes ground from conductor 1729 and disconnects conductor 1730 from conductor 701 extending to the right engine disabling key 700R, in the start circuit for the right engine, whereupon the ST relay 3838 of the right engine control circuit of Fig. 38 releases to cause the right engine to stop but to continue to be driven at 800 R. P. M. by the windmilling of its propeller. The trainer circuits now respond to the disabled condition of the right engine in the manner previously described. The flight engineer becomes aware of the fact that the right engine has stopped by the decrease in the engine noise and by the indication given by the right engine tachometer 1015. The timing tube 1731 after an interval becomes conducting and opens the circuit of relay 1728 which releases. This condition might, for example, signify that the right fuel transfer pump has failed to operate or that the flight engineer has failed to make the aft hull tank available.

The flight engineer will now operate the crossover defuel valve switch 1760 to the left or crossover position thereby establishing an obvious circuit for CO relay 1761. Relay 1761 upon operating establishes a circuit from ground over its inner upper contacts and conductor 1762 of cable 1700 through the cross feed lamp 632 to battery whereupon this lamp lights to inform the instructor that the cross feed valve switch on the fuel transfer panel has been operated. Relay 1761 also connects the winding of RTP1 relay 1721 over its upper contacts in parallel with the winding of LTP1 relay 1723 to the inner upper front contact of LTP relay 1712 and since LTP relay 1712 is assumed to be operated at this time, RTP1 relay 1721 now operates in parallel with LTP1 relay 1723 in a circuit from ground over the upper contacts of AH1 relay 1750, over the inner upper contacts of AH relay 1748, over the upper front contact of LTP relay 1712 over the upper contacts of CO relay 1761 and through the winding of RTP1 relay 1721 to battery. Relay 1721 upon operating now establishes the circuit of RF relay 1719 from battery through the winding of such relay over the inner lower contact of RST relay 1709 to ground over the alternate contacts of RTP1 relay 1721. With relay 1719 reoperated, the circuit of the RFS relay 1726 is reestablished and relay 1726 operates in turn causing the operation of relay 1727 which locks under the control of relay 1728, now released, and reestablishes the circuit of ST relay 3838 of Fig. 38 whereupon the right engine is again started in the manner previously described. When this engine starts in response to the simulated receipt of fuel from the left wing service tank, it increases in speed to 1800 R. P. M. and the sound effects circuit of Fig. 40 is controlled to cause a corresponding increase in the simulated engine noise.

The flight engineer will now operate the tank switch 1742 momentarily to the right tank position or to the right, thereby causing the momentary operation of RWT relay 1743 which again causes the lighting of lamp 446 at the instructor's desk and closes over its lower contacts and the right contacts of switch 1739, the circuit of RTP relay 1713 which now operates and opens the circuit of the right fuel transfer pump dry lamp 1715 at the flight engineer's panel and the circuit of the corresponding lamp 448 at the instructor's desk.

It will now be assumed that the right wing service tank has now become full through the operation of the transfer pump and to simulate this condition the instructor turns the knob 605 to the F or full position in which position the cam operated contacts 616 are closed, the cam operated contacts 622 and 633 are opened, lamp RW at the instructor's desk, lamp 4326 at the pilot's pedestal, and lamp 1060 on the flight engineer's panel are now extinguished by the opening of contacts 633 and the previously traced circuit for RTP relay 1713 is closed over contacts 622.

It will now be assumed that the instructor instead of simulating the conditions in which the fuel supply in the right wing tank becomes depleted and causes the disabling of the right engine, simulates the depletion of the fuel supply in the left wing service tank thereby causing the disabling of the left engine. It will be assumed that the lamps FH, 1059 and 4325 have lighted indicative of a low fuel condition in the forward hull tank. The instructor now moves the knob 604 of the fuel quantity control switch for the left wing service tank for indicating that only 100 gallons of fuel are left in such tank, whereupon the cam operated contacts 621 open thereby opening the circuit of LTP relay 1712. Relay 1712 thereupon releases since its locking circuit has been opened by the release of the CH1 relay 1732, in turn releasing LTP1 relay 1723 and closing the circuit of the left fuel transfer pump dry lamp 1714. The circuit of lamp 1714 extends from battery through such lamp over the back contact of relay 1712 and over the inner upper contact of relay 3508 to ground on bus bar GB and in parallel over conductor 1745 of cable 1700 through lamp 447 at the instructor's desk to battery. Lamps 1714 and 447 light to indicate that the transfer pump which has been transferring fuel from the forward hull tank to the left wing service tank is about to run dry and that the fuel trunk selector valve switch should be operated to render another fuel tank available for supplying fuel to the wing service tank.

The flight engineer thereupon moves the fuel selector valve switch 1716 to the CH or center hull position thereby releasing the FH relay 1736 and extinguishing the forward hull lamp 623 at the instructor's desk and establishing the circuit of CH relay 1717 which in turn causes the lighting of lamp 613 at the instructor's desk as previously described. With relay 1717 operated the previously traced circuit for CHI relay 1732 is established. The flight engineer now operates the left and right wing tank switches 1738 and 1739 to their right or automatic position thereby causing the operation of relays 624 and 625 and the lighting of lamps 444 and 445 at the instructor's desk as previously described. Thereafter the flight engineer operates the tank switch 1742 to the left tank position momentarily, thereby establishing the circuit of LWT relay 1766 which in turn establishes a circuit from ground over its upper contacts and conductor 1767 of cable 1700 through lamp 449 to battery, which lamp lights to indicate to the instructor that the left wing service tank has less than 180 gallons of fuel in it. Relay 1766 also establishes a circuit from ground over the right contacts of switch 1738, over the lower contacts of relay 1766 and through the winding of LTP relay 1712 to battery. Relay 1712 thereupon operates, locks over its lower contacts and the lower contacts of CHI relay 1732 to ground on conductor 1734, establishes the operating circuit for the LTPI relay 1723 over its upper front contact and the inner upper contacts of CH relay 1717 and over the upper contacts of CHI relay 1732 to ground, and opens the circuit of left pump dry lamps 1714 and 447. At this time fuel is being pumped from the center hull tank into the wing service tanks.

It will now be assumed that the instructor turns the knob 607 of the fuel quantity control switch for the center hull tank to the empty position in which position contacts 619 are closed to establish the circuits of lamps CH, 4324 and 1058 as previously described to indicate the low fuel condition of the center hull tank, and in which position the contacts 618 are opened to cause the release of CHI relay 1732 which in turn causes the release of LTP relay 1712. Relay LTP upon releasing restores the previously traced circuits for the left fuel pump lamps 1714 and 447 which again light as a warning that the pump which has been transferring fuel from the center hull tank to the left wing service tank is about to run dry and that the hull tank selector valve switch should be operated to render another fuel tank available for supplying fuel to the service tank.

The flight engineer thereupon moves the fuel selector valve switch 1716 to the AH or aft hull position thereby releasing CH relay 1717 and extinguishing lamp 613 and operating AH relay 1748 and lighting lamp 630 as previously described. Relay 1748 upon operating establishes the previously traced circuit for AHI relay 1750. It will now be assumed that the instructor turns the knob 604 of the fuel quantity switch for the left wing service tank to the empty position in which position the cam operated contacts 631 close and the cam operated contacts 617 open. The closure of contact 631 establishes a circuit from ground over the No. 3 right contacts of relay 809, conductor 814, over contacts 631 through the low fuel lamp LW to battery and in parallel therewith over a conductor of cables 1500, 1580 and 1521 through the low fuel lamp 1062 at the flight engineer's station to battery and through the low fuel lamp 4328 on the pilot's pedestal to battery to indicate a low fuel condition with respect to the left wing service tank which is supplying the left engine. The opening of contacts 617 removes ground from conductor 1724 of cable 1700 and thereby releases LF relay 1720 which removes ground from conductor 1752 extending to the R. P. M. motor control circuit of Fig. 22 for the left engine, thence over the lower No. 3 contact of the ON relay of such control circuit corresponding to relay 2209, over conductor 1753, through the winding of LFS relay 1754 to battery. Relay 1754 releases and, with LFSI relay 1755 locked operated under the control of LFS2 relay 1756, closes the filament circuit of timing tube 1757 whereby after an interval of about ten seconds, the tube becomes conducting and operates relay 1756 over its cathode-anode circuit. Relay 1756 upon operating, releases relay 1755 which opens the filament heating circuit of tube 1757 whereupon relay 1756 releases. Relay 1755 upon releasing removes ground from conductor 1758 and disconnects conductor 1759 from conductor 728 extending to the left engine disabling key 700L in the start circuit for the left engine, whereupon the ST relay of Fig. 27 corresponding to relay 3838 of Fig. 38 releases to cause the left engine to stop but the engine continues to be driven at 800 revolutions per minute by the windmilling of its propeller. The trainer circuits now respond in the manner previously described. The flight engineer becomes aware of the fact that the left engine has stopped by the decrease in the engine noise and by the indication given by the left engine tachometer 1014.

The flight engineer will now operate the crossover switch 1730 to the left or cross-over position thereby establishing an obvious circuit for CO relay 1761 which in turn establishes the circuit of lamp 632, as previously described, and connects the winding of LTPI relay 1723 over its upper contacts in parallel with the winding of RTPI relay 1721. Since RTP relay 1713 is assumed to be operated at this time, relay 1723 now operated in parallel with relay 1721 in the circuit previously traced and relay 1723 upon operating reestablishes the circuit of LF relay 1720 which may be traced from battery through the winding of such relay, over the inner lower contacts of LST relay 1708 to ground over the alternate contacts of LTPI relay 1723. With relay 1720 reoperated, the circuit of the LFS relay 1754 is reestablished and relay 1754 operates in turn causing the operation of relay 1755 which locks under the control of relay 1756, now released, and reestablishes the circuit of the ST relay of Fig. 27 whereupon the left engine is again started in the manner previously described. When this engine starts in response to the simulated receipt of fuel from the right wing service tank it increases its speed to 1800 revolutions per minute and the sound effects circuit is controlled to cause a corresponding increase in the engine noise.

The flight engineer will now operate the tank switch 1742 momentarily towards the left thereby causing the momentary operation of LWT relay 1766 which again causes the lighting of lamp 449 at the instructor's desk and closes over its lower contacts and the right contacts of switch 1738, the circuit of LTP relay 1712 which now operates and opens the circuit of the left fuel transfer pump dry lamp 1714 at the engineer's panel and of the corresponding lamp 447 at the instructor's desk.

It will now be assumed that to simulate the empty condition of the aft hull tank, the instructor now turns the knob 802 of the fuel quantity control switch for the aft hull tank to the empty position thereby opening the cam operated contacts 812 and closing the cam operated contacts 813. With contacts 813 closed, a circuit is established from ground over the left No. 2 contacts of relay 809, over contacts 813 and through lamp AH to battery and in parallel with such lamp over conductors of cable 1500, 1580 and 1521 through lamp 1061 on the flight engineer's panel to battery and through lamp 4327 on the pilot's pedestal to battery to indicate a low fuel condition of the aft hull tank. The opening of contacts 812 causes AH1 relay 1750 to release thereby opening the locking circuit of RTP relay 1713 which now releases in turn releasing RTP1 relay 1721 and closing the circuit of the right fuel transfer pump dry lamp 1715. The circuit of lamp 1715 may be traced from battery through such lamp, over the upper back contact of RTP relay 1713 and over the inner upper contacts of RST relay 1709 to the ground bus bar GB. In parallel with lamp 1715, a circuit is also established over conductor 1763 of cable 1700 through lamp 448 at the instructor's desk to battery. Lamps 1715 and 448 light to indicate that the right fuel pump is about to run dry. RTP relay 1713 upon releasing causes the release of RTP1 relay 1721 but RF relay 1719 does not release being held operated from ground supplied over the contacts 616, conductor 1722 of cable 1700, over the lower contacts of RST relay 1709, the normal contacts of RTP1 relay 1721, over the inner lower contacts of relay 1709 through the winding of relay 1719 to battery. Consequently the right engine continues to operate. The flight engineer now turns the cross-over switch 1760 to the off position thereby releasing CO relay 1761 and extinguishing lamp 632 but without further effect.

The flight engineer now turns the selector valve switch 1707 for the right engine to the BB or bomb bay tank position whereupon RST relay 1709 releases and RBB relay 1764 operates. Relay 1709 upon releasing opens the circuit of lamp 612 at the instructor's desk and lamp 634 lights over a circuit which may be traced from battery through such lamp over conductor 1765 of cable 1700 to ground over the upper contacts of RBB relay 1764. The release of RST relay 1709 opens the previously traced circuit of RF relay 1719 which functions to release RFS relay 1726 and render the timing tube 1731 conducting. The tube 1731 requires about ten seconds to become conductive and to operate RFS2 relay 1728 to release RFS1 relay 1727 and thereby cause the stopping of the right engine as previously described. This ten second time delay simulates the time required to drain the right engine carbureter should the flight engineer be slow in operating the right engine selector valve switch or not properly operate it. If he operates it soon enough and properly, then the operation of RBB relay 1764 will reestablish the circuit of RF relay 1719 and the circuit of RFS relay 1726 to prevent relay RFS1 1727 from releasing to stop the right engine. Relay 1764 establishes the new circuit for RF relay 1719 extending through the winding thereof over the inner lower contacts of relay 1764, conductor 1771 of cable 1700 to ground over the cam operated contacts 815 of the fuel quantity control switch for the right bomb bay tank which contacts are closed since this tank is assumed to be full.

It will now be assumed that to simulate the empty condition of the right bomb bay tank, the instructor operates the knob 803 of the fuel quantity control switch for the right bomb bay tank to the empty position thereby closing the cam operated contacts 817 and opening the cam operated contacts 815. The closure of contacts 817 establishes a circuit from ground over the left No. 1 contacts of relay 809, over contacts 817 and to battery through lamp RBB and in parallel therewith over conductors of cables 1500, 1580 and 1521 to battery through lamp 4329 at the pilot's pedestal and lamp 1063 at the flight engineer's panel to indicate a low fuel condition of the right bomb bay tank. The opening of contacts 815 opens the circuit of RF relay 1719 whereupon relay 1719 releases and in the manner previously described causes the right engine control circuit to function to simulate the stopping of the right engine which stopping becomes evident to the flight engineer through the reduced engine noise and the indication of the right engine tachometer 1015.

After the depletion of the fuel supply in the hull tanks, the flight engineer also operated the left engine selector valve switch 1706 to the BB position thereby releasing LST relay 1708 and extinguishing lamp 611 and causing the operation of LBB relay 1769 which establishes a circuit from ground over its upper contacts and conductor 1772 of cable 1700 to battery through lamp 635 at the instructor's desk to inform the instructor that the left bomb bay tank has been selected by the flight engineer. Relay 1769 now establishes a new circuit for LF relay 1720 which may be traced through the winding thereof, over the inner lower contacts of relay 1769, conductor 1773 of cable 1700 to ground over the cam operated contacts 818 of the fuel quantity control switch for the left bomb bay tank which contacts are closed since this tank is assumed to be full.

It will now be assumed that to simulate the empty condition of the left bomb bay tank, the instructor operates the knob 804 of the fuel quantity control switch for the left bomb bay tank to the empty position, thereby closing the cam operated contacts 819 and opening cam operated contacts 818. The closure of contacts 819 establishes a circuit from ground over the left No. 3 contacts of relay 809, over contacts 819 and thence to battery through lamp LBB and in parallel therewith over conductors of cables 1500, 1580 and 1521 to battery through lamp 4330 of the pilot's pedestal and lamp 1064 at the flight engineer's panel to indicate a low fuel condition of the left bomb bay tank. The opening of contacts 818 opens the circuit of LF relay 1720 whereupon this relay releases and in the manner previously described causes the left engine control circuit to function to simulate the stopping of the left engine, which stopping becomes evident to the flight engineer through the reduction of the engine noise and the reduction of the reading of the left engine tachometer 1014 to 800 revolutions per minute.

Should it be assumed that one of the wing service tanks becomes damaged so that no fuel may be fed from it to the engine on the same side of the aircraft, that engine could be fed from one of the hull tanks should there be fuel left in the hull tank. To simulate this condition and assuming that there is fuel for example in the center hull tank and that therefore CH relay 1717 and CHI relay 1732 are both operated as previously described, and assuming that the right service tank has become damaged, the flight engineer operates the right engine selector valve switch 1707 to the HT position thereby releasing RST relay 1709, assumed to be operated and operating RHT relay 1768. Relay 1709 upon releasing opens the circuit of lamp 612 at the instructor's desk and relay 1768 closes the circuit of the right hull tank lamp 636 over a circuit extending over conductor 1774 of cable 1700 and over the inner upper contacts of relay 1768 to ground. Relay 1768 also estabilshes a circuit from battery through the winding of RTP relay 1713, over the upper contacts of relay 1768, over the lower contacts of relay 1732 and to ground on conductor 1734 and relay 1713 operates establishing the previously traced circuit for RTPI relay 1721. With relay 1721 operated the circuit of RF relay 1719 is established over the inner lower contacts of relay 1768 and to ground over the alternate contacts of relay 1721.

It will now be assumed that to simulate the exhaustion of the fuel in the center hull tank, the instructor turns the knob 607 of the fuel quantity control switch for the center hull tank to the empty position thereby closing contacts 619 to light lamps CH, 4324 and 1058 and opening contacts 618 to release the CHI relay 1732. Relay 1732 upon releasing opens the operating circuit of RTP relay 1713. If it also be assumed that the instructor has operated knob 605 of the fuel quantity control switch for the right wing service tank to the empty position thereby opening cam operated contacts 622 to remove ground from conductor 1736, there is no circuit for relay 1713 and it releases to close the circuit of the right fuel transfer pump dry lamp 1115 which lights. Relay 1713 upon releasing also releases RTPI relay 1721 which opens the circuit of relay 1719 to cause the right engine to stop. The flight engineer will then operate the hull tank selector switch 1716 to select the aft hull tank if it has fuel, whereupon the CH relay 1717 will release and AH relay 1748 will operate in turn operating AHI relay 1750 as previously described. With RHT relay 1768 still operated, relay RF will again operate to start the right engine. With RHT relay 1768 operated, ground is applied directly to conductor 1729 from the upper contacts of relay 1719 over the lower contacts of relay 1768 to cause an immediate operation of ST relay 3950 of the fuel pressure motor control circuit whereby such circuit responds at once to cause an indication of fuel pressure rather than to wait for the reoperation of RFSI relay 1727 signifying the right engine has been restarted. This is to simulate the condition in an actual aircraft whereby when the engine is being supplied directly from the fuel transfer pump, the fuel pressure will rise more quickly than when supplied from a wing service tank under pressure supplied by the engine driven fuel pump.

The same procedure may be followed to simulate the supplying of fuel from the hull tank directly to the left engine by the operation of the left engine selector valve to the HT position thereby releasing the previously operated LST relay 1708 and operating the LHT relay 1770. Relay 1770 upon operating connects ground to conductor 1775 of cable 1700 over its inner upper contacts whereby lamp 637 at the instructor's desk is lighted and causing the operation of LTP relay 1712, LTPI relay 1723 and LF relay 1720, the latter relay maintaining the left engine in operation if the flight engineer made the fuel transfer without delay.

The simulation of the operation of the cross-over valve to the cross-over position whereby both engines may be operated from one or the other of the wing service tanks has been previously described. The cross-over may also be effected whereby both engines may be supplied with fuel from a hull tank by the same fuel transfer pump. It will now be assumed that this latter condition is to be simulated and that at this time the right and left engine selector valve switches 1706 and 1707 are both operated to the HT position in which position RHT relay 1768 and LHT relay 1770 are operated. The flight engineer now operates the cross-over valve switch 1760 to the CO position thereby causing the operation of CO relay 1761. With fuel in the hull tank which has been selected for use RTP relay 1713 and LTP relay 1712 will both be locked operated in turn holding RTPI relay 1721 and LTPI relay 1723 operated. With relay 1721 operated, the RF relay 1719 is operated over the inner lower contacts of relay 1768 and the alternate contacts of relay 1721 and, with relay 1723 operated, the LF relay 1720 is operated over the inner lower contacts of relay 1770 and the alternate contacts of relay 1723. With CO relay 1761 operated, the front contacts of both relays 1721 and 1723 are tied together over the upper contacts of relay 1761 so that the ground supplied to the front contact of either relay 1721 or 1772 will hold the RF and LF relays 1719 and 1720 operated to maintain both engines in operation.

To simulate the operation of the valves to quickly defuel a hull tank by supplying both engines from the same tank and permitting fuel to be drained away at the same time, the cross-over valve switch 1760 is operated to the DF position thereby establishing the circuit of the DF relay 1658 which operates to establish a circuit from ground over its upper contacts and conductor 1778 of cable 1700 to battery through the hull tank defuel lamp 649 at the instructor's desk to inform the instructor that a hull tank is being defueled. It will be assumed that the hull tank selector switch 1716 is operated into the AH position to defuel the aft hull tank, thereby operating AH relay 1748 and lighting aft hull tank lamp 630 and causing AHI relay 1750 to become operated. The right engine selector valve switch 1707 will be set to the HT position thereby operating RHT relay 1768 and the left engine selector valve switch 1706 will be set to the HT position thereby operating LHT relay 1770. With relay 1768 operated the RTP relay 1713 will be operated under the control of AHI relay 1750 in turn causing the operation of RTPI relay 1721 in the manner previously described. With relay 1770 operated the LTP relay 1712 will be operated under the control of AHI relay 1750 in turn causing the operation of LTPI relay 1723 in the manner previously described. Now with DF relay 1658 operated, the front contacts of RTPI relay 1721 and LTPI relay 1723 are interconnected and therefore so long as either the RTPI relay 1721 or the LTPI relay 1723 remain operated or until AHI relay 1750 releases, when the instructor moves the knob 802 of the fuel quantity control switch for the aft hull tank to the position indicating the complete defueling of the aft hull tank, both RF relay 1719 and LF relay 1720 will be held operated and both engines will continue to run. The circuit for relay 1719 is established over the inner lower contacts of relay 1768 to ground over the alternate contacts of relay 1721 and also over the lower contacts of DF relay 1658 and over the alternate contacts of relay 1723 to ground, and similarly the circuit of relay 1720 is established over the inner lower contacts of relay 1770 to ground over the alternate contacts of relay 1723 and also over the lower contacts of DF relay 1658 and over the alternate contacts of relay 1721 to ground. The flight engineer may determine when the hull tank is about to become defueled from the fuel quantity indicator 1031. Each of the other hull tanks may be defueled in the same manner.

To simulate the operation of the valve switches to quickly defuel a wing service tank by supplying both engines from that tank and also permitting fuel from the tank to be drained away, a condition which might occur if the service tank became damaged, the cross-over valve switch 1760 is set to its DF position thereby operating DF relay 1658 and lighting the defuel lamp 649. If it be assumed that it becomes desirable to defuel the right wing service tank, the right engine selector valve switch 1707 is operated to the STD position and the left engine selector valve switch 1706 is set to the ST position. With switch 1707 set to the STD position, the circuit of RSD relay 1659 is established from ground over the contacts of switch 1707 and over conductor 1776 through the winding of relay 1659 to battery. With relay 1659 operated, the right wing service tank drain lamp 638 at the instructor's desk is lighted over a circuit extending from ground over the upper contacts of relay 1659 and conductor 1777 of cable 1700 to battery through lamp 638 to indicate to the instructor that the right wing service tank is being drained. With relay 1659 operated, a circuit is established from ground over the cam operated contacts 616 of the fuel quantity control switch for the right wing service tank, over conductor 1722, over the lower contacts of relay 1659, over the normal contacts of RTPI relay 1721, over the lower contacts of DF relay 1658, over the inner lower contacts of LST relay 1708 through the winding of LF relay 1720 to battery and in parallel over the inner lower contacts of RSD relay 1659 through the winding of RF relay 1719 to battery. With the LF relay 1720 and the RF relay 1719 both operated, both engines continue to run, supplied from the left wing service tank, until the instructor operates the knob 605 of the fuel quantity control switch for the right wing service tank to the empty position indicating that the right wing service tank has become completely defueled. The flight engineer may follow the depletion of the fuel by observing the operation of the fuel quantity indicator 1031 in response to the movement of the right wing service tank fuel quantity control switch toward the empty position and take steps to operate the selector switches to maintain the engine running from fuel supplied from another tank.

A similar procedure may be followed to defuel the left wing service tank. In this case the left engine selector valve switch 1706 is operated to the STD position thereby causing the operation of the LSD relay 1657 which in turn establishes a circuit from ground over its upper contacts and conductor 1779 of cable 1700 to battery through lamp 639 which lights to inform the instructor that the left service tank is to be defueled. The right engine selector valve switch 1707 is set to its ST position in which LST relay 1708 is operated. The cross-over switch 1760 is also operated to its DF position thereby causing the operation of DF relay 1658. Until the instructor operates the fuel quantity control switch for the left wing service tank to indicate the empty condition thereof, both RF relay 1719 and LF relay 1720 are maintained operated to keep both engines running on fuel supplied from the left wing service tank. The flight engineer may follow the depletion of the fuel by observing the operation of the full quantity indicator 1031 in response to the operation by the instructor of the fuel quantity control switch toward its empty position and may take steps to operate the selectors to maintain the engines running on fuel supplied from another tank.

To simulate the draining of the wing service tanks, the auxiliary power plant and the main engines by a drain valve on the flight engineers panel, the drain switch 1799 is provided. If for example this switch is operated to the RE position indicative of the establishment of a drain condition to drain the right engine, a circuit is established from ground thereover, over conductor 1780 of cable 1700 to battery through RE drain lamp 640 at the instructor's desk to inform the instructor that the right engine line is being drained. Similar circuits are established in the LE, APP, RST and LST positions of switch 1799 for the corresponding lamps 641, 642, 643 and 644 at the instructor's desk.

*Engine performance control*

The instructor may simulate a change in the manifold pressures of both engines by turning the manifold pressure rheostats 530 and 540 in counter-clockwise directions, thereby reducing the potentials applied to the control conductors of the manifold pressure motor control circuits of Fig. 23 until the manifold pressure indicators controlled thereby indicate reductions of manifold pressures to, for example, 19 inches of mercury. The reduction in manifold pressures, will, as previously described, also result in a reduction of the engine speeds indicated by the tachometers mounted on the instrument panels.

To counteract this condition, the flight engineer should move the carburetor air control switches 1114 and 1115 to their upper or alternate air positions. In these positions the direct air lamps 406 and 407 at the instructor's desk become extinguished and circuits are established over the upper contacts of the switches and conductors 1057 and 1058 of cable 1050 to battery through the alternate air lamps 450 and 451 at the instructor's desk to indicate that the carbureters have been set for the alternate air supplies. The manifold pressure rheostats 530 and 540 may now be restored to their normal positions whereupon the indicated manifold pressures will return to their former values and the engine speed will return to the assumed 1800 revolutions per minute.

The instructor may simulate increases in the cylinder temperatures of both engines by turning the cylinder temperature rheostats 518 and 522 in counter-clockwise directions, thereby increasing the currents flowing through the cylinder temperature indicators 521 and 1039 to cause them to show increased cylinder temperatures, for example, of 150° C. The instructor may simulate increases in the right and left engine oil temperatures by turning the oil temperature rheostats 506 and 510 in clockwise directions thereby increasing the currents flowing through the engine oil temperature indicators 508, 512, 1017 and 1018 to cause them to show increased oil temperatures, for example, of 60° C. The increases in cylinder and oil temperatures, might, for example be due to the fact that the flight engineer had failed to open the cowl flaps of the engines.

The flight engineer upon observing the increased temperature readings of the cylinder temperature indicators 1039 and oil temperature indicators 1017 and 1018, will take steps to open the engine cowl flaps by the operation of the cowl flap keys 1649 and 1658 to their right or open positions thereby operating the OP relays such as 3933 of the cowl flaps motor control circuits of Figs. 39 and 28 and controlling these motor circuits to operate in the manner previously described in simulation of the opening of the cowl flaps. As these circuits operate, the brushes of their potentiometers, such as 3975 are moved toward the No. 1 terminals of their windings thereby controlling the engine cylinder and oil temperature motor control circuits of Figs. 39 and 28 in such a manner that the potentiometers controlled thereby, for example, the potentiometers 2825 and 2826, are adjusted to reduce the current flowing through the cylinder temperature and oil temperature indicators. The flight engineer will hold the keys 1649 and 1658 operated until the temperature readings of the cylinder temperature indicator 1039 are reduced to 100° C. and the temperature readings of oil temperature indicators 1017 and 1019 are reduced to 25° C. The instructor is informed concerning the opening of the engine cowl flaps by the lighting of the cowl flaps open lamps 424 and 435 in the manner previously described and by the reduction of the indications on the cylinder temperature indicator 521 and the oil temperature indicators 508 and 512 at his desk.

The instructor now returns the cylinder temperature rheostats 518 and 522 to normal in which positions, with the new settings of the cylinder temperature potentiometers, such as 2826, the cylinder temperature indicators 521 and 1039 are controlled to reduce their temperature indications to approximately 50° C. At the same time the instructor also operates the oil temperature rheostats 506 and 510 to normal whereupon, with the new setting of the cylinder temperature potentiometers, such as 2825, the oil temperature indicators 508 and 512 at the instructor's desk and 1017 and 1018 at the flight engineer's instrument panel will be operated to change their readings, for example, to approximately 20° C.

To simulate a decrease in the cylinder temperatures of both engines, the instructor may turn the cylinder temperature rheostats 518 and 522 in a clockwise direction, thereby decreasing the currents flowing through the cylinder temperature indicators 521 and 1039 to cause them to show decreased cylinder temperatures, for example, of 50° C. The instructor may simulate a decrease in the right and left engine oil temperatures by turning the oil temperature rheostats 506 and 510 in a counter-clockwise direction thereby decreasing the currents flowing through the engine oil temperature indicators 508, 512, 1017 and 1018 to show decreased oil temperatures, for example of 20° C. These decreases in temperature might, for example, be due to high altitude flying with the engine cowl flaps open.

The flight engineer observing the decreased temperature readings would then cause the closure of the engine cowl flaps through the operation of the cowl flap keys 1649 and 1658 to their left or closed positions thereby operating the CL relays such as 3941 of the cowl flaps motor control circuits of Figs. 39 and 28. In the manner previously described, these motor control circuits operate their potentiometers, such as 3975, to cause the cylinder and oil temperature control circuits to reset the brushes of potentiometers 2825 and 2826 in directions indicative of an increase in the cylinder and oil temperatures until, for example, the cylinder temperature indicators 521 and 1039 show temperatures of 100° C. and the oil temperature indicators 508, 512, 1017 and 1018 show temperatures of 25° C. Keys 1649 and 1658 are then moved to their open positions. The instructor is informed of the action taken by the flight engineer by the lighting of the cowl flaps closed lamps 425 and 436 and by the increased temperature reading of the indicators 521, 508 and 512.

The instructor may simulate an increase in the engine oil pressures by the operation of increase pressure keys 541 and 542 and a decrease in the oil pressures by the operation of decrease pressure keys 543 and 544. When key 544 is operated, a circuit is established from ground over its contacts, over conductor 3970 of cable 3900 to battery through the winding of DOP relay 3919 of the right engine oil pressure motor circuit of Fig. 39. Relay 3919 upon operating closes at its lower contacts, a circuit extending through the upper secondary winding of power transformer 3901, through resistance 3964, over the lower contacts of relay 3919, over the cam operated contacts 3930 and through the resistance 3916 and the rotor winding of motor 3915 whereby potential of phase φ1 is applied across the rotor winding and the motor turns the shaft 3922 in such a direction that the transmitting autosyn 3923 operates the right engine oil pressure indicators 535 at the instructor's desk and 1009 at the flight engineer's instrument panel to show a decreasing oil pressure. When the indicated oil pressure reaches 40 pounds, for example, the instructor opens the key 544 thereby releasing relay 3919 to stop the motor 3915. In a similar manner the closure of the contacts of key 543 establishes a circuit over conductor 2870 of cable 2800 to control the engine oil pressure motor circuit for the left engine, Fig. 28, to cause the oil pressure indicators 535 and 1009 at the instructor's desk and on the flight engineer's panel to show a decreasing left engine oil pressure. When the indicated oil pressure reaches 40 pounds, for example, the instructor releases the key 543 whereupon the motor of the left engine oil pressure circuit stops.

When the pressure increase key 542 is operated, a circuit is established from ground over the contacts of such key, over conductor 3968 of cable 3900 to battery through the winding of IOP relay 3963 of the right engine oil pressure motor circuit of Fig. 39. Relay 3963 upon operating closes at its lower contacts a circuit extending through the lower secondary winding of the power transformer 3901, through resistance 3969, over the lower contacts of relay 3963, over the upper No. 2 contacts of ST relay 3913, through resistance 3916, and through the rotor winding of motor 3915 whereby potential of phase φ2 is applied across the rotor winding and the motor turns shaft 3922 in such a direction that the transmitting autosyn 3923 operates the right engine oil pressure indicators 534 and 1009 to show an increasing oil pressure. When the indicated oil pressure rises to 90 pounds, the instructor releases key 542 thereby releasing relay 3963 to stop the motor 3915. In a similar manner the closure of the contacts of key 541 establishes a circuit over conductor 2868 of cable 2800 to control the engine oil pressure motor circuit for the left engine, Fig. 28, to show an increasing oil pressure. When the indicated oil pressure reaches 90 pounds, for example, the instructor releases key 541 whereupon the motor of the left engine oil pressure circuit stops.

The instructor may simulate an increase in the fuel pressures to the engines by the operation of the increase pressure keys 545 and 546 and a decrease in the fuel pressure by the operation of the decrease pressure keys 547 and 548. When the decrease pressure key 548 is operated, a circuit is established from ground over its contacts, over conductor 3973 of cable 3900 to battery through the winding of DFP relay 3902 of the right engine fuel pressure motor circuit of Fig. 39. Relay 3902 upon operating closes at its lower contacts a circuit extending through the lower secondary winding of power transformer 3901, through resistance 3974, over the lower contacts of relay 3902, over the inner upper contacts of relay 3910, through resistance 3904 and through the rotor winding of motor 3905, whereby potential of phase φ2 is applied across the rotor winding of the motor. The motor turns the shaft 3908 in such a direction that the transmitting autosyn 3924 operates the right engine fuel pressure indicator 533 at the instructor's desk and indicator 1011 at the flight engineer's instrument panel to show a decreasing fuel pressure. When the indicated fuel pressure falls to 2 pounds, for example, the key 548 is released thereby releasing relay 3902 to stop the motor 3905. In a similar manner the closure of the contacts of key 547 establishes a circuit over conductor 2873 of cable 2800 to control the fuel pressure circuit for the left engine, Fig. 28, to cause the left engine fuel pressure indicators 533 and 1011 to show a falling fuel pressure. When the indicated fuel pressure has fallen to 2 pounds, key 547 is released whereupon the motor of the left engine fuel pressure circuit stops.

When fuel pressure increase key 546 is operated, a circuit is established from ground over its contacts and over conductor 3971 of cable 3900 to battery through the winding of IFP relay 3967. Relay 3967 upon operating closes a circuit extending through the upper secondary winding of power transformer 3901, through resistance 3972, over the upper contacts of relay 3967, through resistance 3904 and the rotor winding of motor 3905 whereby potential of phase φ1 is applied across the rotor winding and the motor turns the shaft 3908 in such a direction that the autosyn 3924 operates the right engine fuel pressure indicators 533 and 1011 to show an increasing fuel pressure. When the indicated fuel pressure rises to about 7 pounds, the key 546 is released to release relay 3967 to stop motor 3905. In a similar manner, the closure of the contacts of key 545 establishes a circuit over conductor 2871 of cable 2800 to control the fuel pressure circuit for the left engine, Fig. 28, to cause the left engine fuel pressure indicators 533 and 1011 to show an increasing fuel pressure. When the indicated fuel pressure rises to about 7 pounds, key 545 is released whereupon the motor of the left engine fuel pressure circuit stops.

The instructor may simulate a decrease in the cylinder temperature of the auxiliary power plant by turning the rheostat 514 in a counter-clockwise direction until the indicator 517 at the instructor's desk and the indicator 1038 on the flight engineer's instrument panel indicate, for example, a cylinder temperature of 80° C. and may simulate a decrease in the oil temperature of the auxiliary power plant by turning the rheostat 501 in a counter-clockwise direction until the indicator APPO at the instructor's desk and the indicator 1012 on the flight engineer's instrument panel indicate for example an oil temperature of 20° C. These temperatures might result from the simulation of a flight at a high altitude.

The flight engineer observing the lower temperature readings of the indicators should now operate auxiliary power plant oil heater switch 1421 of Fig. 14 to its "on" position, thereby simulating the turning on of the auxiliary power plant oil heater of an actual aircraft. When this switch is operated, a circuit is established from ground over its contacts and conductor 1422 of cable 1400 and to battery through lamp 452 at the instructor's desk to inform the instructor that the heater has been turned on. With the heater on the oil and cylinder temperature of the auxiliary power plant should go up and this the instructor simulates by the movement of the cylinder temperature rheostat 514 in a clockwise direction until the indicators 517 and 1038 indicate a cylinder temperature of about 100° C. and by the movement of the auxiliary power plant oil temperature rheostat 501 in a clockwise direction until the indicators APPO and 1012 indicate an oil temperature of about 25° C.

To simulate a change in oil pressure at the auxiliary power plant, the instructor may operate the increase and decrease pressure keys 549 and 550. If the decrease pressure key 550 is operated, a circuit is established from ground over its contacts, over conductor 551 to battery through DOP relay 1810 of Fig. 18. Relay 1810 upon operating connects potential of phase φ1 through resistance 1824, over the lower contacts of relay 1810, over contacts 1815, through resistance 1806 and the rotor circuit of motor 1805 whereupon the motor drives the shaft 1812 in such a direction that the transmitting autosyn 1813 operates the auxiliary power plant oil pressure indicator 557 at the instructor's desk and the oil pressure indicator 1007 at the flight engineer's instrument panel to indicate a decreasing oil pressure. When, for example, the pressure has fallen to say 20 pounds, the instructor opens key 550, thereby releasing the DOP relay 1810 and stopping the motor 1805.

To simulate an increase in pressure, key 549 is operated, thereby establishing a circuit from ground over its contacts and conductor 552 to battery through the winding of IOP relay 1823, Fig. 18. Relay 1823 upon operating connects potential of phase φ2 through resistance 1848, over the lower contacts of relay 1823, the lower No. 3 contacts of ST relay 1804, through resistance 1806 and the rotor winding of motor 1805 whereupon the motor drives the shaft 1812 in such a direction that the transmitting autosyn 1813 operates the auxiliary power plant oil pressure indicators 557 and 1007 to show an increasing oil pressure. When, for example, the pressure rises to say 60 pounds, the instructor opens the key 549 thereby releasing IOP relay 1823 to stop the motor 1805.

To simulate a change in the suction pressure the instructor may operate the increase and decrease pressure keys 730 and 731. If the increase pressure key 730 is operated a circuit is established from ground over its contacts, over conductor 732, to ground through the shaded pole winding 1828 of motor 1826 of the suction motor control circuit of Fig. 18. The motor 1826 thereupon turns the shaft 1833 in such a direction that transmitting autosyn 1825 drives the indicators 725 at the instructor's desk and 4227 at the pilot's pedestal to indicate an increasing pressure. If the decrease pressure key 731 is operated a circuit is established from ground over its contacts, over conductor 733, over switch contacts 1849 and to ground through the right shaded pole winding 1850 of motor 1826 whereupon the motor turns the autosyn 1825 in such a direction as to cause the indicators 725 and 4227 to indicate a decreasing suction.

The instructor may at any time cause any circuit-breaker on the flight engineer's panel or on the pilot's pedestal to be thrown out to simulate a circuit trouble. Should the instructor operate any one of the keys disclosed in Figs. 2 and 3 and hold such key in its operated position for approximately 6 seconds, the corresponding circuit-breaker will be thrown out. For example, the operation of bow turret key 212, establishes a circuit from battery over the contacts of such key, over conductor 1608 of cable 1600 and through the bow turret circuit breaker 1601 to ground. This circuit-breaker is of the thermal type and in response to the direct battery connected to conductor 1608 by the key 220, the thermal element becomes heated sufficiently after about 6 seconds to trip the circuit-breaker whereupon the lamp 200 becomes extinguished, indicating that the circuit-breaker has opened. If the instructor operates key 213, a circuit is established from battery over the contacts of such key, and conductor 1660 of cable 1600 to a point between the winding of PLW relay 1622 and the circuit-breaker 1616, whereupon after about 6 seconds, the circuit-breaker is tripped thereby opening the circuit of PLW relay 1622 which upon releasing opens the circuit extending from ground over its contacts and conductor 1629 of cable 1600 through lamp 206 and battery. Lamp 206 now becomes extinguished. If the instructor operates the panel and flood light key 214, a circuit is established from battery over the contacts of such key, conductor 1662 of cable 1600 to a point between the winding of PF relay 1636 and the circuit-breaker 1634 whereupon after about 6 seconds, the circuit-breaker is tripped thereby opening the circuit of PF relay 1636 which releases closing the circuit from ground over its back contact and conductor 1661 of cable 1600 to battery through the lamp 215. Lamp 215 thereupon lights. When the flight engineer restores the tripped circuit-breakers 1601 and 1616, the lamps 200 and 206 again light and lamp 215 becomes extinguished when the flight engineer restores the tripped circuit-breaker 1634.

If the instructor operates the left safety-on key 216, the right safety-on key 316 or any one of the keys 820 to 824, inclusive, corresponding circuit-breakers on the pilot's pedestal become tripped after about 6 seconds. For example, the operation of key 216 establishes a circuit from battery over the contacts of such key, over conductor 218 to a point between the winding of PL relay 4315 and the circuit-breaker 4313 whereupon the circuit-breaker becomes tripped and opens the circuit of relay 4315 which releases. Relay 4315 upon releasing establishes a circuit from ground over its back contact and conductor 219 to battery through lamp 217 which lamp lights. When the pilot restores the circuit-breaker 4313 and PL relay 4315 operates the circuit of lamp 217 is opened and the lamp becomes extinguished.

To simulate the firing of torpedoes, the pilot operates the firing key 4331 to the "on" position and then operates either the left or right torpedo release key 4332 or 4333. The operation of these keys establishes a circuit from ground over conductor 1587 over the lower contacts of relay 4300, through key 4331 and through either key 4332 or 4333 and over either conductor 4351 or 4352 of cable 4350 and to battery through either the left or right torpedo release lamps 825 or 826 at the instructor's desk.

To simulate the lighting of the navigation lamps the pilot may operate the switches 4334 to 4342, inclusive, switches 4334 and 4335 controlling the section lights, switch 4336 controlling the anchor light, switches 4337 and 4338 controlling the wing and tail running lights, switches 4339 and 4340 controlling the formation lights and switches 4341 and 4342 controlling the left and right landing lights. If, for example, the section lights switch 4334 is operated to the "on" position, and then the switch 4335 is operated to its upper or bright position, a circuit is established from ground on conductor 1587, over the lower contacts of EL relay 4302, over the contacts of switch 4334, over the upper contact of switch 4335 and conductor 4371 of cable 4370 to battery through the section lights on-bright lamp 870 at the instructor's desk to indicate that the section lights have been turned on bright. If the switch 4335 is operated to its lower or dim position, a circuit is established as traced to such switch and thence over conductor 4372 of cable 4370 to battery through the section lights on dim lamp 828. Similar circuits are established over conductors of cable 4370 for lamps 827 to 832, inclusive, to indicate to the instructor when the running lights are turned on bright or dim, for lamps 833 and 834 to indicate when the formation lights are on bright or dim, for lamps 835 to 838 to indicate when the landing lights are on bright or dim and for lamp 839 to indicate when the anchor lights are on.

In shutting down an aircraft in cold weather, it is the practice to dilute the engine oil with kerosene or a light lubricant to enable easier starting at a later time. To simulate this procedure, the flight engineer is provided with timing switches 1423 and 1424 for the left and right engines, respectively, each of which switches when closed times for four minutes or the time usually measured for oil dilution. With OD relay 1425 operated by the previous closure of circuit breaker 1426 and after switches 1422 and 1424 become closed four minutes following the initiation of their operation, circuits are established from ground on bus bar GB over the upper contacts of relay 1425, over the contacts of switches 1423 and 1425 to battery through lamps 1427 and 1428 on the flight engineer's panel and over conductors 1429 and 1430 of cable 1400 to battery through oil dilution lamps 453 and 454 at the instructor's desk.

Simulation of landing

Preparing to land, it having been assumed that a flight course at 1000 feet altitude was being simulated, the pilot adjusts the propeller governor controls to their maximum R. P. M. positions in which the sliders of rheostats 1212 and 1213 are at the lower terminals of their windings and moves both throttles back so that the sliders of the throttle rheostats and variacs move toward their lower or closed positions thereby reducing the simulated speeds of the engines. As before described, this will result in a reduction of the indicated air speed which in turn will reduce the rate of climb resulting in a descent at the rate of 200 feet per minute which will be indicated by the rate of climb indicators. The altimeter motor control circuit is also controlled by the rate of climb potentiometer whereby the altimeters are operated to show a reduction in the altitude.

When the altitude of the simulated flight has been reduced to 500 feet, the pilot operates the wing flaps switch 4320 to its lower or down position, whereupon the wing flaps motor control circuit is controlled indicative of the movement of the wing flaps to their down positions. The pilot now proceeds to make a landing in the manner fully disclosed in the Davis-Fogarty-Rippere application hereinbefore referred to.

To stop the engines, the pilot may pull the main ignition switch 1214 as previously described, but it is more customary if the aircraft is to be anchored for some time for the flight engineer to operate the mixture control switches to their idling cut-off positions whereby the fuel feeds to the engines are closed and the engines run until all fuel in their carbureters is consumed. This procedure reduces the fire hazard. To simulate this procedure the flight engineer operates the mixture control switches 1125 and 1126 to their lower positions. Upon leaving their upper positions, switches 1125 and 1126 open the previously traced circuits over conductors 1053 and 1054 of cable 1050 through the rich mixture lamps 408 and 409 at the instructor's desk. Upon making their lower contacts, the switches establish circuits over conductors 1093 and 1094 of cable 1090 to battery through the winding of ICO relay 3854 of the right engine control circuit of Fig. 38 and to battery through the winding of the similar relay of the left engine control circuit of Fig. 27. Relay 3854 upon operating establishes a circuit from ground over its inner lower contacts and conductor 3891 of cable 3800 to battery through the right engine fuel cut-off lamp 455 at the instructor's desk. The relay in Fig. 27 corresponding to relay 3854 closes a similar circuit over conductor 2791 of cable 2700 for lamp 456. The lighting of these lamps informs the instructor that the flight engineer has operated the mixture control switches to their idling cut-off positions.

At its lower transfer contacts, relay 3854 substitutes direct ground for resistance ground in the circuit previously traced over conductor 3855, over the upper front contact of LL relay 3910, over conductor 3912 and through resistance 3008 to control conductor 3003 of the fuel flow motor control circuit for the right engine, whereby this circuit under the control of its balancing potentiometer RFFP1 rotates shafts 1910 and 3001 controlled thereby in directions indicative of the reduction of the fuel flow to zero whereby the fuel flow indicators on the instrument panels are operated to reduce their fuel flow indications to zero. At its upper contacts, relay 3854 establishes a circuit from ground through resistance 3887, over such contacts over the upper bank contact of PRM relay 3822, over the upper No. 3 front contacts of EST1 relay 3828, over conductor 3835, through resistance 3308 to control 2201 of the R. P. M. motor control circuit for the right engine, whereupon this motor control circuit operates under the control of its balancing potentiometer RRP10 to rotate the shafts 2210 and 3301 in directions indicative of the reduction of the R. P. M. of the right engine to zero, which reduction is indicated by the tachometers on the instrument panels. When the engine speed reaches zero relay 2209 releases and establishes a circuit from ground over the inner upper contacts of ICO relay 3854, over conductor 2218, over the upper No. 3 contacts of relay 2209, conductor 2217, through the winding of ICO1 relay 3890 to battery. Relay 3890 now operates and locks over its upper contacts to ground on conductor 2218 and at its lower contacts opens the locking circuit of ST relay 3838 which now releases in turn releasing EST1 relay 3828, ESTA relay 3839 and EST relay 3816. With these relays released, the right engine control circuit of Fig. 38 and all of the motor control circuits relating to the right engine restore to normal in the manner previously described.

Similarly, the relays of the left engine control circuit of Fig. 27 corresponding to ICO relay 3854 and ICO1 relay 3890 of Fig. 38, cause the restoration of the left engine control circuit and of the motor control circuits relating to the left engine.

The flight engineer preparatory to leaving the aircraft, operates the auxiliary generator switch 1327, the right engine generator switch 1339, the left engine generator switch 1351, the cabin heater fuel valve switch 1701, the inverter switch 1407, the auxiliary power plant fuel supply valve switch 1703, the main engine selector valve switches 1706 and 1707 and the hull tank selector valve switch 1716 to their "off" positions, thereby extinguishing the corresponding lamps controlled thereby as previously described.

The flight engineer also restores the carbureter air switches 1114 and 1115 to their direct air positions, restores the mixture control switches 1116, 1117, 1125 and 1126 to their rich mixture position and restores the supercharger speed control switches 1118 and 1119 to their low speed positions.

The pilot turns off all panel and instrument lights and the navigator turns off all panel and instrument lights at his station.

The flight engineer then turns off all panel and flood lights controllable from his panel and opens all of the circuit breakers thereby removing all power from the trainer. All apparatus of the trainer will now be restored to its normal condition.

What is claimed is:

1. In an aircraft trainer wherein the starting of an engine is simulated, an engine ignition simulating key, an engine start simulating key, a timing means for measuring a time interval simulating the time required for an engine starter to start an engine, a starter-on relay responsive to the operation of said start key for initiating the operation of said timing means, a second relay operable at the expiration of the measurement of said time interval if said start key has been held operated for the time requisite to start an engine, an engine start relay responsive to the operation of said ignition key and said second relay, means responsive to the operation of said latter relay to indicate that the simulated engine has started, an instructor's desk and signals at said desk responsive to the operation of said ignition key, said starter-on relay, and said engine start relay for indicating the operation of said apparatus.

2. In an aircraft trainer wherein the starting of an engine is simulated, an engine ignition simulating key, an engine start simulating key, an electronic device for measuring a time interval simulating the time required for an engine starter to start an engine, a starter-on relay responsive to the operation of said start key for establishing the filament circuit of said device to initiate the measurement of the time interval, an anode relay operable over the cathode-anode circuit of said device at the expiration of an interval if said start key has been held operated for the time requisite to start the engine, an engine start relay responsive to the operation of said ignition key and said anode relay, means responsive to the operation of said latter relay to indicate that the simulated engine has started, an instructor's desk and signals at said desk responsive to the operation of said ignition key, said starter-on relay, and said engine start relay for indicating the operation of said apparatus.

3. In an aircraft trainer wherein the starting of an airplane engine is simulated, a flight engineer's station, an engine start simulating key at said station, said start key having a starter-on position and a starter-mesh position, a timing means for measuring a time interval simulating the time required for bringing an inertia starter up to a speed sufficient for starting an airplane engine, a starter-on relay responsive to the operation of said start key to its starter-on position for initiating the operation of said timing means, a second relay operable at the expiration of said time interval if said start key has been held operated for the time requisite for an inertia starter to attain its proper speed, a starter-mesh relay responsive to the operation of said start key to its mesh position simulating the meshing of the inertia starter with the engine, a relay responsive to the operation of said second relay and said starter-mesh relay, means responsive to the operation of said latter relay to indicate that the engine is being operated under the control of the inertia starter, an instructor's desk and signals at said desk responsive to the operation of said starter-on and starter-mesh relays for indicating that the simulated starting and meshing of the inertia starter has been accomplished.

4. In an aircraft trainer wherein the starting of an airplane engine is simulated, a flight engineer's station, an engine start simulating key at said station, an engine ignition simulating key, said start key having a starter-on position and a starter-mesh position, a timing means for measuring a time interval simulating the time required for bringing an inertia starter up to a speed sufficient for starting an airplane engine and for thereafter measuring a second time interval simulating the time for the inertia starter after being meshed with the engine to start the engine, a starter-on relay responsive to the operation of said start key to its starter-on position for initiating the operation of said timing means, a second relay operable at the expiration of the first time interval if said start key has been held operated for the time requisite for an inertia starter to attain its proper speed, a starter-mesh relay responsive to the operation of said start key to its mesh position simulating the meshing of the inertia starter with the engine, means responsive to the operation of said second relay and said starter-mesh relay for indicating the simulated operation of the engine at a low speed by the inertia starter, and means effective at the termination of the second time interval if said ignition key has been operated for causing said latter means to be operated to indicate that the engine has ceased to operate indicative of the lack of ignition.

5. In an aircraft trainer wherein the starting of an airplane engine is simulated, a pilot's station, an engine ignition simulating key at said station, a flight engineer's station, an engine start simulating key and a fuel selector valve simulating switch at said flight engineer's station, said start key having a starter-on position and a starter-mesh position, a timing means for measuring a first time interval simulating the time required for bringing an inertia starter up to a speed sufficient for starting an airplane engine and for thereafter measuring a second interval simulating the time for the inertia starter after being meshed with the engine to start the engine, a starter-on relay responsive to the operation of said start key to its starter-on position for initiating the operation of said timing means, a second relay operable at the expiration of said first time interval if said start key has been held operated for the time requisite for an inertia starter to attain its proper speed, a starter-mesh relay responsive to the operation of said start key to its mesh position simulating the meshing of the inertia starter with the engine, means responsive to the operation of said second relay and said starter-mesh relay for indicating the simulated operation of the engine at a low speed by the operation of the inertia starter, and means effective at the termination of said second time interval if said ignition key has not been operated or if said fuel selector valve switch has not been operated in simulation of the valving of fuel for the engine for causing said latter means to be operated to indicate that the engine has ceased to operate because of a lack of ignition or a lack of fuel.

6. In an aircraft trainer wherein the starting of an airplane engine is simulated, a pilot's station, an engine ignition simulating key at said station, a flight engineer's station, an engine start simulating key and a fuel selector valve simulating switch at said flight engineer's station, said start key having a starter-on position and a starter-mesh position, a timing means for measuring a first time interval simulating the time required for bringing an inertia starter up to a speed sufficient for starting an airplane engine and for thereafter measuring a second time interval simulating the time required for an inertia starter after being meshed with the engine to start the engine, a starter-on relay responsive to the operation of said start key to its starter-on position for initiating the operation of said timing means, a second relay operable at the expiration of said first time interval if said start key has been held operated for the time requisite for an inertia starter to attain its proper speed, a starter-mesh relay responsive to the operation of said start key to its mesh position simulating the meshing of the inertia starter with the engine, means responsive to the operation of said second relay and said starter-mesh relay for indicating the simulated operation of the engine at a low speed by the inertia starter, means responsive to the operation of said engine if said selector valve switch has been operated for simulating the feeding of fuel to said engine, means responsive to the operation of said latter means if said ignition key has been operated for controlling said engine operation indicating means to indicate the simulated operation of said engine under its own power, and means effective at the termination of the second time interval if said ignition key has not been operated or if said fuel selector valve switch has not been operated for causing said engine operation indicating means to indicate that the engine has ceased to operate because of a lack of ignition or a lack of fuel.

7. In an aircraft trainer wherein the starting of an airplane engine is simulated, a pilot's station, an engine ignition simulating key at said station, a flight engineer's station, an engine start simulating key, an engine priming simulating key, a mixture control simulating switch and a fuel selector valve simulating switch at said flight engineer's station, said mixture control switch having an idle cut-off position and a rich mixture position, means under the control of said start key for simulating the operation of an engine starter, means operable if said ignition key has been operated, if said fuel selector valve switch has been operated and if said mixture control switch has been operated to its rich mixture position for simulating the operation of said engine by fuel supplied thereto under the control of said fuel selector valve switch, first circuit modifying means operable if said mixture control switch is operated to its idle cut-off position for rendering said engine operation simulating means ineffective, and second circuit modifying means operable if said priming key has been operated to nullify the effect of said first circuit modifying means.

8. In an aircraft trainer wherein the operation of an airplane engine is simulated, a flight engineer's station, an engine start simulating key at said station, means effective in response to the operation of said key for simulating the operation and meshing of an inertia starter with the simulated engine, a source of current, a control conductor, means responsive to said first means for deriving a potential from said source and for applying it to said conductor, a balancing potentiometer for deriving a potential from said source and for applying it to said conductor, a motor responsive to an unbalanced potential condition on said conductor for adjusting said potentiometer until the sum of the potentials applied to said conductor becomes zero, means controlled by said motor for introducing integration factors into other motor control circuit networks of the trainer commensurate with the simulated speed of rotation of the engine as it is driven by the inertia starter, an instructor's desk, crew stations in said trainer including said flight engineer's station, and simulated tachometers at said desk and at said stations controlled by said motor for indicating the revolutions per minute made by the simulated engine while it is being driven by the inertia starter.

9. In an aircraft trainer wherein the operation of an airplane engine is simulated, a pilot's station, an engine ignition simulating key at said station, a flight engineer's station, an engine start simulating key at said flight engineer's station, means effective in response to the operation of said start key for simulating the operation and meshing of an inertia starter with the simulated engine, a source of current, a control conductor, means responsive to said first means for deriving a potential from said source and for applying it to said conductor, a balancing potentiometer for deriving a potential from said source and for applying it to said conductor, a motor responsive to an unbalanced potential condition on said conductor for adjusting said potentiometer until the sum of the potentials applied to said conductor becomes zero, means controlled by said motor for introducing integration factors into other motor control circuit networks of the trainer commensurate with the simulated speed of rotation of the engine as it is driven by the inertia starter, an instructor's desk, simulated tachometers at said desk and at said stations controlled by said motor for indicating the revolutions per minute made by the simulated engine while it is being driven by the inertia starter, and means operative if said ignition key has been operated for modifying said first potential whereupon said motor is operated to control said integration factor introducing means and said tachometers indicative of an increase in the engine speed to an idling speed.

10. In an aircraft trainer wherein the operation of an airplane engine is simulated, a pilot's station, an engine ignition simulating key and a simulated throttle control at said station, a flight engineer's station, an engine start simulating key at said flight engineer's station means effective in response to the operation of said start key for simulating the operation and meshing of an inertia starter with the simulated engine, a source of current, a control conductor, means responsive to said first means for deriving a potential from said source commensurate with the speed of rotation of the engine when it is being driven by the inertia starter, means thereafter effective if said ignition key has been operated to increase said potential to an amount commensurate with the idling speed of rotation of the engine, a potentiometer for modifying said latter potential in accordance with the manifold pressure of the simulated engine, a rheostat controlled by said throttle control for further modifying said potential, means for applying said modified potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means controlled by said motor for introducing integration factors into other motor control circuit networks of said trainer commensurate with the simulated speed of the engine under the control of the throttle, an instructor's desk, and simulated tachometers at said desk and at said stations controlled by said motor for indicating the revolutions per minute made by the simulated engine.

11. In an aircraft trainer wherein the operation of an airplane engine is simulated, a pilot's station, a simulated propeller governor control at said station, a source of current, a control conductor, a rheostat operated by said governor control for deriving a potential from said source which varies with the setting of said control and for applying it to said conductor, a balancing potentiometer for deriving a potential from said source and for applying it to said conductor, a motor responsive to an unbalanced potential condition on said conductor for adjusting said potentiometer until the sum of the potentials applied to said conductor becomes zero, means controlled by said motor for introducing integration factors into other motor control circuit networks of said trainer commensurate with the speed of rotation of the simulated engine, an instructor's desk, and simulated tachometers at said desk and at crew stations in the trainer including said pilot's station controlled by said motor for indicating the revolutions per minute made by the simulated engine whereby said integration factors and said tachometer readings are caused to follow the setting of said propeller governor control.

12. In an aircraft trainer wherein the operation of an airplane engine is simulated, a pilot's station, a simulated propeller governor control and a simulated throttle at said station, a source of current, means for simulating the production of the manifold pressure of a simulated engine, a control conductor, a rheostat controlled by said throttle for deriving a first potential from said source which varies with the throttle opening, a potentiometer for modifying said potential in accordance with the manifold pressure of the simulated engine and for applying it to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, an instructor's desk, simulated tachometers at said desk and at crew stations of said trainer including said pilot's station controlled by said motor for indicating the revolutions per minute made by the simulated engine, a rheostat controlled by said propeller governor control for deriving a potential from said source and for applying it to said conductor for controlling the operation of said motor, and means for substituting said latter potential control of said motor for said first potential control when the manifold pressure of the engine is great enough to produce an engine speed in revolutions per minute equal to the engine speed resulting from the setting of the propeller governor control.

13. In an aircraft trainer wherein the operation of an airplane engine is simulated, a pilot's station, a simulated propeller governor control and a simulated throttle at said station, a source of current, means for simulating the production of the manifold pressure of a simulated engine, a control conductor, a rheostat controlled by said throttle for deriving a first potential from said source which varies with the throttle opening, a potentiometer operable by said means for modifying said potential in accordance with the manifold pressure of the simulated engine and for applying it to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, an instructor's desk, simulated tachometers at said desk and at crew stations of said trainer including said pilot's station controlled by said motor for indicating the revolutions per minute made by the simulated engine, a rheostat controlled by said propeller governor control for deriving a potential from said source and for ap-
plying it to said conductor, a relay, an electronic device for controlling said relay, means for applying said first and said latter potentials to said device whereby until said potentials become equal said device maintains said relay operative to render said motor controllable by said first potential and whereby when said potentials become equal, the condition which exists when the manifold pressure of the simulated engine is great enough to produce an engine speed in revolutions per minute equal to the engine speed resulting from the setting of the propeller governor control, said device becomes extinguished to release said relay and to thereby render said latter potential effective to control said motor.

14. In an aircraft trainer wherein the operation of an airplane engine is simulated, a pilot's station, an engine ignition simulating key at said station, said key having a left magneto-on, a right magneto-on and a both magnetos-on position, a source of current, a control conductor, a first and a second relay responsive to the operation of said ignition key to its both magnetos-on position for deriving a potential from said source and for applying it to said conductor, a balancing potentiometer for deriving a potential from said source and for applying it to said conductor, a motor responsive to an unbalanced potential condition on said conductor for adjusting said potentiometer until the sum of the potentials applied to said conductor becomes zero, means controlled by said motor to a degree indicative of the fact that said engine is operating under ignition control supplied from both the magnetos operated thereby, and mean effective upon the release of either of said relays in response to the operation of said keys to the right or left magneto-off positions for controlling said motor to cause a reduction in the settings of said means indicative that the simulated engine is being furnished with ignition from only one of its associated magnetos.

15. In an aircraft trainer wherein the operation of an airplane engine is simulated, a source of current, a control conductor, means for deriving a potential from said source indicative of the fact that the simulated engine is functioning to maintain the airplane in flight and for applying said potential to said conductor, a balancing potentiometer for deriving a potential from said source and for applying it to said conductor, a motor responsive to an unbalanced potential condition on said conductor for adjusting said potentiometer until the sum of the potentials applied to said conductor becomes zero, means controlled by said motor to a degree indicative of the fact that the engine is operating at a speed requisite for operating an airplane in flight, and means effective upon the simulated disabling of the engine during a simulated flight for controlling said motor to cause a reduction in the settings of said means indicative of the fact that the simulated engine is being driven only through the windmilling action of the propeller driven thereby.

16. In an aircraft trainer wherein the operation of an airplane engine is simulated, a source of current, a control conductor, means for deriving a potential from said source indicative of the fact that the simulated engine is being driven only through the windmilling action of the propeller driven thereby and for applying said potential to said conductor, a balancing potentiometer for deriving a potential from said source and for applying it to said conductor, a motor responsive to an unbalanced potential condition on said conductor for adjusting said potentiometer until the sum of the potentials applied to said conductor becomes zero, means controlled by said motor to a degree indicative of the fact that the engine is being driven only by the windmilling of its propeller, a pilot's station, a propeller feathering simulation switch at said station and means responsive to the operation of said switch for modifying said first potential whereby said motor controls said means in a manner indicative of a reduction of the engine speed to zero.

17. In an aircraft trainer wherein the operation of an airplane engine is simulated, a source of current, a control conductor, means for deriving a potential from said source commensurate with the speed at which a simulated engine is assumed to operate in response to control conditions and for applying said potential to said conductor, a balancing potentiometer for deriving a potential from said source and for applying it to said conductor, a motor responsive to an unbalanced potential condition on said conductor for adjusting said potentiometer until the sum of the potentials applied to said conductor becomes zero, a vibrator for simulating the vibrations set up in an airplane by the operation of its engine and propeller, a motor for operating said vibrator and means controlled by said first motor for causing said second motor to drive said vibrator at a speed commensurate with the simulated speed of the simulated engine.

18. In an aircraft trainer wherein the operation of an airplane engine is simulated, a source of current, a control conductor, means for deriving a potential from said source commensurate with the speed at which a simulated engine is assumed to operate in response to control conditions and for applying said potential to said conductor, a balancing potentiometer for deriving a potential from said source and for applying it to said conductor, a motor responsive to an unbalanced potential condition on said conductor for adjusting said potentiometer until the sum of the potentials applied to said conductor becomes zero, a potentiometer adjustable by said motor to a degree commensurate with the speed of rotation of the engine, a tachometer generator, a motor for driving said generator controlled by said latter potentiometer whereby said generator is driven at a speed which is an integration of the adjustment of said potentiometer with respect to time, and simulated tachometers operated by said generator.

19. In an aircraft trainer wherein the operation of an airplane engine is simulated, a source of current, a control conductor, means for deriving a potential from said source commensurate with the speed at which a simulated engine is assumed to operate in response to control conditions and for applying said potential to said conductor, a balancing potentiometer for deriving a potential from said source and for applying it to said conductor, a motor responsive to an unbalanced potential condition on said conductor for adjusting said potentiometer until the sum of the potentials applied to said conductor becomes zero, a potentiometer adjustable by said motor to a degree commensurate with the speed of rotation of the engine, an impulse generator, a motor for driving said generator controlled by said latter potentiometer whereby said generator is driven at a speed which is an integration of the adjustment of said potentiometer with respect to time, a loudspeaker, an amplifier and detector system for amplifying the output of said impulse generator and for applying it to said loudspeaker, and means which varies with the brake horsepower output of the simulated engine for varying the gain of said amplifier whereby said loudspeaker is controlled to simulate the recurrent explosions of an aircraft engine, said simulated explosions increasing in rapidity and volume as the speed of the simulated engine increases.

20. In an aircraft trainer wherein the operation of an airplane engine is simulated, a source of current, a control conductor, a potentiometer for deriving a potential from said source commensurate with the manifold pressure of the simulated engine, a potentiometer for modifying said derived potential in accordance with the speed of rotation of the simulated engine, a potentiometer for further modifying said potential in accordance with the altitude at which a simulated flight is being conducted, means operative in response to the simulation of the building up of a fuel pressure in the fuel feed line to the simulated engine for rendering said modified potential applicable to said control conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, an instructor's desk, a flight engineer's station in said trainer, and indicators at said instructor's desk and at said station controlled by said motor for indicating the simulated rate of fuel flow to the simulated engine, said rate of fuel flow increasing with increases in the manifold pressure, engine speed and altitude.

21. In an aircraft trainer wherein the operation of an airplane engine is simulated, a source of two phase alternating current, a control conductor, an instructor's desk, a flight engineer's station, means responsive to the operation of an engine priming simulation key at said flight engineer's station for indicating at said instructor's desk that said key has been operated and for applying potential of one phase from said source to said conductor, a balancing potentiometer for deriving a potential of the opposite phase from said source and for applying it to said conductor, a motor responsive to an unbalanced potential condition on said conductor for adjusting said latter potentiometer until the sum of the potentials applied to said conductor becomes zero, and indicators at said instructor's desk and at said station controlled by said motor for indicating the simulated rate of fuel flow for priming the simulated engine.

22. In an aircraft trainer wherein the operation of an airplane engine is simulated, a source of two phase alternating current, a control conductor, an instructor's desk, a flight engineer's station, means responsive to the operation of an engine priming simulation key at said flight engineer's station for applying potential of one phase from said source to said conductor, means for simulating the production of the manifold pressure of the simulated engine, means for simulating the speed of rotation of the simulated engine, means for simulating the altitude at which a simulated flight is being conducted, means for simulating the building up of pressure in the fuel feed line to a simulated engine, a balancing potentiometer for deriving a potential of the opposite phase from said source and for applying it to said conductor, a motor responsive to an unbalanced potential condition on said conductor for adjusting said potentiometer until the sum of the potentials applied to said conductor becomes zero, indicators at said instructor's desk and at said station controlled by said motor for indicating the simulated rate of fuel flow for priming the simulated engine, means for deriving a potential of the first phase from said source which varies with the manifold pressure and with the speed of rotation of the simulated engine and which further varies in accordance with the altitude at which a simulated flight is being conducted, and means operated in response to the simulation of the building up of a fuel pressure in the fuel feed line to the simulated engine for rendering said latter potential applicable to said control conductor whereby said motor is further responsive to cause said indicators to show an increase in the rate of fuel flow incident to the starting of the simulated engine.

23. In an aircraft trainer wherein the operation of an airplane engine is simulated, a source of current, a control conductor, means for simulating the production of the manifold pressure of the simulated engine, means for simulating the speed of rotation of the simulated engine, means for simulating the altitude at which a simulated flight is being conducted, means for deriving a potential from said source which varies with the manifold pressure and with the speed of rotation of the simulated engine and which futher varies with the altitude at which a simulated flight is being conducted, means for applying said potential to said control conductor, a balancing potentiometer for deriving a potential from said source and applying it to said conductor, a motor responsive to an unbalanced potential condition on said conductor for adjusting said latter potentiometer until the sum of the potentials applied to said conductor becomes zero, an instructor's desk, a flight engineer's station, indicator at said instructor's desk and at said station controlled by said motor for indicating the simulated rate of fuel flow to the simulated engine, a mixture control simulation switch at said station, mixture indicating means at said instructor's desk, and means responsive to the operation of said switch from its rich mixture position to its lean mixture position for controlling said mixture indicating means at said instructor's desk and for causing a reduction of said first potential applied to said conductor whereupon said motor is caused to control said indicators to show a reduction in the rate of fuel flow incident to the operation of the simulated engine on a leaner mixture.

24. In an aircraft trainer wherein the operation of an airplane engine is simulated, a source of current, a control conductor, means for simulating the production of the manifold pressure of the simulated engine, means for simulating the speed of rotation of the simulated engine, means for simulating the altitude at which a simulated flight is being conducted, means for deriving a potential from said source which varies in accordance with the manifold pressure and with the speed of rotation of the simulated engine and which further varies with the altitude at which a simulated flight is being conducted, a relay operable in response to the simulation of the building up of a fuel pressure in the fuel feed line to the simulated engine, a balancing potentiometer for deriving a potential from said source and for applying it to said conductor, a motor responsive to an unbalanced potential condition on said conductor for adjusting said potentiometer until the sum of the potentials applied to said conductor becomes zero, an instructor's desk, a flight engineer's station, and indicators at said desk and at said station controlled by said motor for indicating the simulated rate of fuel flow to the simulated engine, said relay upon releasing in response to a failure of fuel pressure being effective to cause the reverse operation of said motor to control the return of said indicators to show a zero rate of fuel flow.

25. In an aircraft trainer wherein the operation of an airplane engine is simulated, a source of current, a control conductor, means for simulating the production of the manifold pressure of the simulated engine, means for simulating the speed of rotation of the simulated engine, means for simulating the altitude at which a simulated flight is being conducted, means for deriving a potential from said source which varies in accordance with the manifold pressure and with the speed of rotation of the simulated engine and which further varies with the altitude at which a simulated flight is being conducted, a relay which upon being operated controls the application of said potential to said conductor, a balancing potentiometer for deriving a potential from said source and for applying said potential to said conductor, a motor responsive to an unbalanced potential condition on said conductor for adjusting said potentiometer until the sum of the potentials applied to said conductor becomes zero, an instructor's desk, a flight engineer's station, indicators at said desk and at said station controlled by said motor for indicating the simulated rate of fuel flow to the simulated engine, a mixture control simulating switch at said station which when operated to its idle cut-off position causes the operation of said relay to signal its operation at said instructor's desk and to cause the reverse operation of said motor to control the return of said indicators to show a zero rate of fuel flow.

26. In an aircraft trainer wherein the operation of an airplane engine is simulated, a source of current, a control conductor, means for deriving a potential from said source commensurate with the true air speed of the simulated flight, a potentiometer for modifying said derived potential in accordance with the simulated speed of rotation of the propeller of the simulated engine and for applying said modified potential to said control conductor, said potential having the value $V/ND$ where V is the velocity, N is the number of revolutions per minute of the propeller, and D is the diameter of the propeller, and said potential varying directly with the air speed and inversely with the propeller speed in revolutions per minute, a balancing potentiometer for deriving a potential from said source and applying it to said conductor, a motor responsive to an unbalanced potential condition on said conductor for adjusting said latter potentiometer until the sum of the potentials applied to said conductor becomes zero, and means operated by said motor for introducing integration factors into other motor control circuit networks in the trainer in accordance with the quantity $V/ND$.

27. In an aircraft trainer wherein the operation of an airplane engine is simulated, a source of current, a control conductor, a potentiometer for deriving a potential from said source which varies with the quantity $V/ND$ and for applying said potential to said conductor, a balancing potentiometer for deriving a potential from said source and for applying said potential to said conductor, a motor responsive to an unbalanced potential condition on said conductor for adjusting said balancing potentiometer until the sum of the potentials applied to said conductor becomes zero, and means controlled by said motor for introducing integration factors into other motor control circuit networks of said trainer in simulation of the effects incident to the automatic control of the pitch of the blades of an airplane propeller.

28. In an aircraft trainer wherein the operation of an airplane engine is simulated, a source of current, a control conductor, a potentiometer for deriving a potential from said source which varies with the quantity V/ND, a relay which when unoperated applies said potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means controlled by said motor for introducing integration factors into other motor control circuit networks of said trainer in simulation of the effects incident to the automatic control of the pitch of the blades of an airplane propeller, an instructor's desk, a simulated propeller pitch control at the pilot's station of said trainer which when operated from its automatic to its manual position causes the operation of said relay to signal at the instructor's desk that the propeller pitch control has been changed from automatic to manual, to render the control of said motor by said potentiometers ineffective and to render said motor responsive to the application of potentials to said conductor under manual control at the pilot's station whereby the introduction of said integration factors is rendered subject to the manual control of the pilot in simulation of the effects incident to the manual control of the pitch of the blades of the propeller.

29. In an aircraft trainer wherein the operation of an airplane engine is simulated, a source of current, a control conductor, an instructor's desk, a relay, a switch at the pilots station of said trainer for causing the operation of said relay indicative of the fact that the manual control of the pitch of the blades of the airplane propeller is being simulated, a signal at said instructor's desk thereupon operable to indicate that manual control is being simulated, a second relay operable when said switch is operated to its propeller pitch increase position, a signal at said instructor's desk operable when said switch has been so operated, said latter relay being also effective to supply potential from said source to said conductor, a motor rotatable in one direction in response to said potential so long as said switch is operated to its propeller pitch increase position, and means operable by said motor for introducing integration factors into other motor control circuit networks of said trainer commensurate with the amount of the simulated increase in propeller pitch.

30. In an aircraft trainer wherein the operation of an airplane engine is simulated, a source of current, a control conductor, an instructor's desk, a relay, a switch at the pilot's station of said trainer for causing the operation of said relay indicative of the fact that the manual control of the pitch of the blades of the airplane propeller is being simulated, a signal at said instructor's desk thereupon operable to indicate that manual control is being simulated, a second relay operable when said switch is operated to its propeller pitch decrease position, a signal at said instructor's desk operable when said switch has been so operated, said latter relay being also effective to apply potential from said source to said conductor, a motor rotatable in one direction in response to said potential so long as said switch is operated to its propeller pitch decrease position, and means operable by said motor for introducing integration factors into other motor control circuit networks of said trainer commensurate with the amount of the simulated decrease in propeller pitch.

31. In an aircraft trainer wherein the operation of an aricraft engine is simulated, a source of current, a control conductor, means for deriving a potential from said source commensurate with the simulated brake horse-power output of the simulated engine, a potentiometer for modifying said potential in accordance with the rotational speed of said engine and for applying said modified potential to said conductor, a balancing potentiometer for deriving a potential from said source and for applying said potential to said conductor, a motor responsive to an unbalanced potential condition on said conductor for adjusting said balancing potentiometer until the sum of the potentials applied to said conductor becomes zero, an instructor's desk, indicators at said instructor's desk and at the flight engineer's station in said trainer for indicating the simulated brake mean effective pressure of the engine, and means operable by said motor for controlling said indicators, said indicated pressure increasing as the engine speed increases and as the brake horsepower remains constant.

32. In an aircraft trainer wherein the operation of the engines of a multiengined airplane is simulated, a source of current, a control conductor, means for deriving a potential from said source commensurate with the simulated tential in accordance with the V/ND efficiency engines, a potentiometer for modifying said derived potential in accordance with the V/ND efficiency of the engine driven propeller and for applying said potential to said conductor, similar means for deriving and applying a potential to said control conductor for each of the other simulated engines, a balancing potentiometer for deriving a potential from said source and for applying it to said conductor, a motor responsive to an unbalanced potential condition on said conductor for adjusting said balancing potentiometer until the sum of the potentials applied to said conductor becomes zero, and means operable by said motor for introducing integration factors into other motor control circuit networks of the trainer indicative of the total simulated thrust horse-power output of the propellers driven by the simulated engine.

33. In an aircraft trainer wherein the operation of the engines of a multiengined airplane is simulated, a source of current, a control conductor, a relay corresponding to each simulated engine, a switch at the pilot's station of said trainer corresponding to each of said relays for operating the corresponding relay in simulation of the change from the automatic to the manual control of the setting of the pitch of the propeller driven by the corresponding engine, means under the control of each of said relays for applying a potential derived from said source to said conductor, which potential is commensurate with the simulated thrust horsepower output of the corresponding engine as affected by the efficiency of the propeller driven thereby, a balancing potentiometer for deriving a potential from said source and for applying it to said conductor, a motor responsive to an unbalanced potential condition on said conductor for adjusting said balancing potentiometer until the sum of the potentials applied to said conductor becomes zero, and means operable by said motor for introducing integration factors into other motor control circuit networks of the trainer indicative of the total simulated thrust horse-power output of the propellers driven by the simulated engines.

34. In an aircraft trainer wherein the operation of the engines of a multiengined airplane is simulated, a source of two-phase alternating current, a control conductor, means for deriving a potential of one phase from said source commensurate with the simulated brake horsepower output of one of the simulated engines, a potentiometer for modifying the derived potential in accordance with the V/ND efficiency of the engine driven propeller and for applying said potential to said conductor, means for deriving a potential of the opposite phase from said source commensurate with the simulated brake horse-power output of said one engine, a potentiometer for modifying said potential in accordance with the V/ND efficiency of said engine driven propeller, a potentiometer for further modifying said latter potential in accordance with the propeller pitch setting of the propeller operated by said one engine, a relay, a switch at the pilot's station of said trainer for causing the operation of said relay to change the potential of said first phase applied to said conductor and to cause the application of potential of said second phase to said conductor indicative of the manual control of the propeller pitch, similar means for deriving and applying potentials of opposite phase to said conductor for each other simulated engine, a balancing potentiometer for deriving a potential of the second phase from said source and for applying it to said conductor, a motor responsive to an unbalanced potential condition on said conductor for adjusting said balancing potentiometer until the sum of the potentials applied to said conductor becomes zero, and means operable by said motor for introducing integration factors into other motor control circuit networks of the trainer indicative of the total thrust horse-power output of the propellers driven by the simulated engines, said thrust horse-power output increasing as the efficiency of the propellers increases due to more efficient adjustments of their blades.

35. In an aircraft trainer wherein the operation of an airplane engine is simulated, a source of two-phase alternating current, a reversible alternating current motor, means operable in response to the simulation of the starting of said engine for applying potential of one phase from said source to said motor whereupon said motor is operated in one direction of rotation, an instructor's desk, a flight engineer's station in said trainer, indicators at said instructor's desk and at said station for indicating simulated temperatures appertaining to the operation of said engine, means controlled by said motor for controlling said indicators, and means operable in response to the simulation of the stopping of said engine for applying potential of the opposite phase from said source to said motor whereupon said motor is operated in the reverse direction of rotation to cause said indicators to return to their normal readings.

36. In an aircraft trainer wherein the operation of an airplane engine is simulated, a source of current, a control conductor, means operable to apply potential from said source to said conductor indicative of the fact that the simulated engine has been started, a balancing potentiometer for deriving a potential from said source and for applying it to said conductor, a motor responsive to an unbalanced potential condition on said conductor for adjusting said potentiometer until the sum of the potentials applied to said conductor becomes zero, an instructor's desk, a flight engineer's station in said trainer, indicators at said instructor's desk and at said station for indicating the simulated oil temperature of said engine, and means controlled by said motor for controlling said indicators.

37. In an aircraft trainer wherein the operation of an airplane engine is simulated, a source of current, a control conductor, means operable to apply potential from said source to said conductor indicative of the fact that the simulated engine has been started, a balancing potentiometer for deriving a potential from said source and for applying it to said conductor, a motor responsive to an unbalanced potential condition on said conductor for adjusting said potentiometer until the sum of the potentials applied to said conductor becomes zero, an instructor's desk, a flight engineer's station in said trainer, indicators at said instructor's desk and at said station for indicating the simulated oil temperature of said engine, a potentiometer controlled by said motor for controlling the temperature readings of said indicators, and a rheostat at said instructor's desk for varying said temperature readings.

38. In an aircraft trainer wherein the operation of an airplane engine is simulated, a source of current, a control conductor, means operable to apply potential from said source to said conductor indicative of the fact that the simulated engine has been started, a balancing potentiometer for deriving a potential from said source and for applying it to said conductor, a motor responsive to an unbalanced potential condition on said conductor for adjusting said potentiometer until the sum of the potentials applied to said conductor becomes zero, an instructor's desk, a flight engineer's station in said trainer, indicators at said instructor's desk and at said station for indicating the simulated cylinder temperature of said engine, and means controlled by said motor for controlling said indicators.

39. In an aircraft trainer wherein the operation of an airplane engine is simulated, a source of current, a control conductor, means operable to apply potential from said source to said conductor indicative of the fact that the simulated engine has been started, a balancing potentiometer for deriving a potential from said source and for applying it to said conductor, a motor responsive to an unbalanced potential condition on said conductor for adjusting said potentiometer until the sum of the potentials applied to said conductor becomes zero, an instructor's desk, a flight engineer's station in said trainer, indicators at said instructor's desk and at said station for indicating the simulated cylinder temperature of said engine, a potentiometer control'ed by said motor for controlling the temperature readings of said indicators, and a rheostat at said instructor's desk for varying said temperature readings.

40. In an aircraft trainer wherein the operation of an airplane engine is simulated, a source of current, a control conductor, means operable to apply potential from said source to said conductor indicative of the fact that the simulated engine has been started, means for increasing said potential in simulation of a closed engine cowl flaps condition and for decreasing the potential in simulation of an open engine cowl flaps condition, a balancing potentiometer for deriving a potential from said source and for applying it to said conductor, a motor responsive to an unbalanced potential condition on said conductor for adjusting said potentiometer until the sum of the potentials applied to said conductor becomes zero, an instructor's desk, a flight engineer's station in said trainer, indicators at said instructor's desk and at said station for indicating simulated temperatures appertaining to said engine, and means controlled by said motor for controlling said indicators.

41. In an aircraft trainer wherein the operation of an airplane engine is simulated, a source of current, a control conductor, means operable to apply potential from said source to said conductor indicative of the fact that the simulated engine has been started, a flight engineer's station in said trainer, a mixture control simulating switch at said station, a relay operable when said switch is operated from its rich to its lean mixture position, means controlled by said relay for varying said potential in accordance with whether said engine is assumed to be operating on a rich or on a lean fuel mixture, a balancing potentiometer for deriving a potential from said source and for applying said potential to said conductor, a motor responsive to an unbalanced potential condition on said conductor for adjusting said potentiometer until the sum of the potentials applied to said conductor becomes zero, an instructor's desk, indicators at said instructor's desk and at said flight engineer's station for indicating simulated temperatures appertaining to said engine, and means controlled by said motor for controlling said indicators.

42. In an aircraft trainer wherein the operation of an airplane engine is simulated, a source of two-phase alternating current, a reversible alternating current motor, an instructor's desk, a flight engineer's station in said trainer, an engine cowl flops control simulating key at said station, a first relay operable when said key is operated to the cowl flaps' open position for applying potential of one phase from said source to said motor whereby said motor is operated in one direction of rotation, a second relay operable when said key is operated to the cowl flaps' closed position for applying potential of the opposite phase from said source to said motor whereby said motor is operated in the opposite direction, signals at said desk controlled by said relays for indicating whether said motor is being operated in a direction to simulate the opening of the cowl flaps or in a direction to simulate the closing of the cowl flaps, simulated temperature indicators at said instructor's desk and at said station, and means operable by said motor for controlling said indicators to indicate a rise in said temperature readings when said motor is operated in a direction simulating the closing of the cowl flaps and to indicate a lowering of the temperature readings when said motor is operating in a direction simulating the opening of the cowl flaps.

43. In an aircraft trainer wherein the operation of the fuel pressure pump for supplying fuel to an engine is simulated, a source of two-phase alternating current, a reversible alternating current motor, means responsive to the simulated starting of said engine for applying potential of one phase from said source to said motor whereupon said motor is operated in one direction of rotation, an instructor's desk, a flight engineer's station in said trainer, indicators at said desk and at said station for indicating the pressure at which fuel is assumed to be supplied to said engine, means controlled by said motor for operating said indicators, means operated by said motor when said indicators show a specified pressure for arresting the operation of said motor, and means responsive to the simulated stopping of said engine for connecting potential of said opposite phase to said motor whereupon said motor is operated in a direction to return said indicators to normal.

44. In an aircraft trainer wherein the operation of the fuel pressure pump for supplying fuel to an engine is simulated, a source of two-phase alternating current, a reversible alternating current motor, a flight engineer's fuel trunk panel, means on said panel operable to simulate the availability of fuel in the feed trunk for supplying said engine, means responsive to the simulated starting of said engine and under the control of said latter means for applying potential of one phase from said source to said motor whereupon said motor is operated in one direction of rotation, an instructor's desk, indicators at said desk and at said station for indicating the pressure at which fuel is assumed to be supplied from said trunk to said engine, means controlled by said motor for operating said indicators, means operated by said motor when said indicators show a specified pressure for arresting the operation of said motor, and means responsive to the stopping of said engine for connecting potential of the opposite phase from said source to said motor whereby said motor operates in the reverse direction of rotation to return said indicators to normal.

45. In an aircraft trainer wherein the operation of the fuel pressure pump for supplying fuel to an engine is simulated, a source of two-phase alternating current, a reversible alternating current motor, means responsive to the simulated starting of said engine for applying full potential of one phase from said source to said motor whereby said motor is operated at one speed and in one direction of rotation, an instructor's desk, a flight engineer's station in said trainer, indicators at said desk and at said station for indicating the pressure at which fuel is assumed to be supplied to said engine, means controlled by said motor for operating said indicators, means operated by said motor when said indicators show a specified pressure for arresting the operation of said motor, an increase pressure simulating key at said instructor's desk, a relay responsive to said key for applying a reduced potential of said one phase to said motor to cause said motor to operate at a reduced speed in the direction of rotation to cause said indicators to show an increase in pressure, a decrease pressure simulating key at said instructor's desk, a relay responsive to said latter key for applying a reduced potential of the opposite phase from said source to said motor to cause said motor to operate in the reverse direction at a reduced speed to cause said indicators to show a decrease in pressure, and means responsive to the simulated stopping of said engine to connect full potential of said opposite phase to said motor whereby said motor operates in a direction to return said indicators to normal.

46. In an aircraft trainer wherein the operation of an airplane engine is simulated, a source of two-phase alternating current, a reversible alternating current motor, means responsive to the simulated starting of said engine for applying potential of one phase from said source to said motor whereupon said motor is operated in one direction of rotation, an instructor's desk, a flight engineer's station, indicators at said desk and at said station for indicating the simulated oil pressure at said engine, means controlled by said motor for operating said indicators, means operable by said motor when said indicators show a specified oil pressure following the starting of said engine for arresting the operation of said motor, means for simulating the rise in temperature of the oil supplied to said engine incident to the operation of said engine, means effective when said simulated temperature reaches a specified amount to cause the connection of potential of the opposite phase from said source to said motor whereupon said motor is operated in the reverse direction to cause a reduction in the readings of said indicators, means thereafter operable by said motor when said indicators show a specified reduced oil pressure for arresting the operation of said motor, and means responsive to the stopping of said engine for reconnecting potential of said opposite phase to said motor whereupon said motor operates to return said indicators to normal.

47. In an aircraft trainer wherein the operation of an airplane engine is simulated, a source of two-phase alternating current potential, a reversible alternating current motor, means responsive to the simulated starting of said engine for applying full potential of one phase from said source to said motor whereupon said motor is operated in one direction of rotation, an instructor's desk, a flight engineer's station, indicators at said desk and at said station for indicating the simulated oil pressure at said engine, means controlled by said motor for operating said indicators, means operable by said motor when said indicators show a specified oil pressure following the starting of said engine for arresting the operation of said motor, means for simulating the rise in temperature of the oil supplied to said engine incident to the operation of said engine, means effective when said simulated temperature reaches a specified amount to cause the connection of reduced potential of the opposite phase from said source to said motor whereupon said motor is operated at a lower speed in the reverse direction to cause a reduction in the readings of said indicators, means thereafter operable by said motor when said indicators show a specified reduced oil pressure for arresting the operation of said motor, an increase pressure simulating key at said instructor's desk, a relay responsive to said key for applying a reduced potential of said one phase to said motor whereupon said motor is operated at a reduced speed in a direction to cause said indicators to show an increase in pressure, a decrease pressure simulating key at said instructor's desk, a relay responsive to said latter key for applying a reduced potential of said opposite phase to said motor whereupon said motor is operated at a reduced speed in a direction to cause said indicators to show a decrease in pressure, and means responsive to the stopping of said engine for applying full potential of said opposite phase to said motor whereupon said motor is operated to return said indicators to normal.

48. In an aircraft trainer, an instructor's desk, a flight engineer's station in said trainer, a deicer simulating key at said station and means responsive to the operation of said key for simulating the operation of the deicing equipment of an airplane comprising a source of current, a reversible motor, means for causing said motor to be operated from said source first in one direction of rotation and then in the opposite direction of rotation so long as said key is maintained operated, and indicators at said instructor's desk and at said station operable by said motor to indicate alternately increasing and decreasing pressures indicative of the varying operating pressure produced in an airplane for deicing purposes.

49. In an aircraft trainer, an instructor's desk, a flight engineer's station in said trainer, a deicer simulating key at said station, a relay responsive to the operation of said key, a signal at said instructor's desk operable by said relay to indicate that said key has been operated, and means for simulating the application of a varying operating pressure to the deicing equipment of an airplane, said means comprising a source of current, a reversible motor operable from said source in one direction of rotation in response to the operation of said relay, a first limit switch controlled by said motor after said motor has operated to a specified extent for causing said motor to reverse its direction of rotation, a second limit switch controlled by said motor after said motor has operated to a specified extent in the opposite direction of rotation for causing said motor to again rotate in the first direction of rotation, said motor continuing to rotate first in one direction and then in the other direction so long as said key is held operated, and indicators at said instructor's desk and at said station operable by said motor to indicate alternating increasing and decreasing pressures simulative of the varying operating pressure produced in an airplane for deicing purposes.

50. In an aircraft trainer, an instructor's desk, a flight engineer's station in said trainer, a deicer simulating key at said station, a relay responsive to the operation of said key, a signal at said instructor's desk operable by said relay to indicate that said key has been operated, and means for simulating the application of a varying operating pressure to the deicing equipment of an airplane, said means comprising a source of alternating current, a reversible motor having a stator winding energized from said source and first and second shaded pole windings, a circuit established by the operation of said relay for short-circuiting said first shaded pole winding whereupon said motor rotates in one direction, a first limit switch controlled by said motor after said motor has operated to a specified extent for opening the short-circuit of said first shaded pole winding and for establishing a short circuit of said second shaded pole winding whereupon said motor rotates in the opposite direction, a second limit switch controlled by said motor after said motor has operated to a specified extent in its opposite direction of rotation for causing the opening of the short circuit of said second shaded pole winding and for reestablishing the short circuit of said first shaded pole winding, said motor continuing to rotate first in one direction and then in the other direction so long as said key is held operated, and indicators at said instructor's desk and at said station operable by said motor to indicate alternately increasing and decreasing pressures indicative of the varying operating pressure produced in an airplane for deicing purposes.

51. In an aircraft trainer, an instructor's desk, a pilot's station in said trainer, means for simulating the operation of the engine of an airplane, and means for simulating the production of air suction for operating suction driven apparatus of said airplane, said means comprising a source of current, a reversible motor operable from said source in one direction of rotation in response to the simulated starting of said engine, a limit switch controlled by said motor after said motor has operated to a specified extent for arresting the operation of said motor, indicators at said instructor's desk and at said station for indicating the simulated suction produced, and a circuit effective upon the simulated stopping of said engine for causing said motor to rotate in the opposite direction until said indicators are returned to their normal or zero positions.

52. In an aircraft trainer, an instructor's desk, a pilot's station in said trainer, means for simulating the operation of the engines of a multi-engine airplane, and means for simulating the production of air suction for operating suction driven apparatus of said airplane, said means comprising a source of current, a reversible motor operable from said source in one direction of rotation in response to the simulated starting of any one of said engines, a limit switch controlled by said motor after said motor has operated to a specified extent for arresting the operation of said motor, indicators at said instructor's desk and at said station for indicating the simulated suction produced, and a circuit effective upon the simulated stopping of all of said engines for causing said motor to rotate in the opposite direction until said indicators are restored to their normal or zero positions.

53. In an aircraft trainer, an instructor's desk, a pilot's station in said trainer, means for simulating the operation of an engine of an airplane, and means for simulating the production of air suction for operating suction driven apparatus of said airplane, said means comprising a source of alternating current, a reversible motor having a stator winding energized from said source and first and second shaded pole windings, a circuit established in response to the simulated starting of said engine for short-circuiting said first shaded pole winding whereupon said motor rotates in one direction of rotation, a first limit switch controlled by said motor after it has operated to a specified extent for opening the short circuit of said first shaded pole winding to arrest the operation of said motor, indicators at said instructor's desk and at said station for indicating the simulated suction produced, a circuit effective upon the simulated stopping of said engine for short-circuiting said second shaded pole winding whereupon said motor operates in the opposite direction to cause said indicators to return to their normal or zero positions, and a second limit switch controlled by said motor when it has operated to an extent to return said indicators to normal to open said latter short circuit to arrest the operation of said motor.

54. In an aircraft trainer, an instructor's desk, a pilot's station in said trainer, means for simulating the operation of an engine of an airplane, and means for simulating the production of air suction for operating suction driven apparatus of said airplane, said means comprising a source of current, a reversible motor operable from said source in one direction of rotation in response to the simulated starting of said engine, a limit switch controlled by said motor after said motor has operated to a specified extent for arresting the operation of said motor, indicators at said instructor's desk and at said station for indicating the simulated suction produced, a circuit effective upon the simulated stopping of said engine for causing said motor to rotate in the opposite direction until said indicators are returned to their normal position, a suction increase simulating key and a suction decrease simulating key at said instructor's desk, and circuits controlled by said keys for causing said motor to operate in one or the other direction of rotation whereby said indicators are operated to show either an increase or a decrease in the simulated suction.

55. In an aircraft trainer wherein the operation of an airplane engine is simulated, a source of current, a control conductor, a potentiometer for deriving a potential from said source commensurate with the manifold pressure of a simulated airplane engine, means for modifying said derived potential in accordance with whether said engine is assumed to be operating on a rich or a lean fuel mixture, a potentiometer for further modifying said potential in accordance with the speed of rotation of the simulated engine, means for further modifying said potential in accordance with the speed of a simulated supercharger blower, said modified potential being applied to said conductor, a potentiometer for deriving a potential from said source in accordance with the altitude at which a simulated flight is being conducted and for applying it to said conductor, means effective in response to the simulated starting of said engine for enabling said potentials to be derived, a balancing potentiometer for deriving a potential from said source and for applying it to said conductor, a motor responsive to an unbalanced potential condition on said conductor for adjusting said balancing potentiometer until the sum of the potentials applied to said conductor becomes zero, and means operated by said motor for introducing integration factors into other motor control circuit networks in the trainer in accordance with the brake horsepower output of the simulated engine.

56. In an aircraft trainer wherein the operation of an airplane engine is simulated, a source of current, a control conductor, means for simulating the production of the manifold pressure of the simulated engine, means for simulating the speed of rotation of the simulated engine, means for deriving a potential from said source which varies with the manifold pressure and with the speed of rotation of the simulated engine and for applying it to said conductor, a potentiometer for deriving a potential from said source which varies in accordance with the altitude at which a simulated flight is being conducted and for applying it to said conductor, means effective in response to the simulated starting of said engine for enabling said potential to be derived, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means operated by said motor for introducing integration factors into other motor control circuit networks in the trainer in accordance with the brake horsepower output of the simulated engine, a flight engineer's station, a mixture control simulating switch at said station, and means responsive to the operation of said switch from its rich mixture position to its lean mixture position for causing a reduction in said first potential applied to said conductor, whereupon said motor is caused to reduce said integration factors indicative of the reduction in the brake horsepower output of said engine incident to the leaner fuel mixture.

57. In an aircraft trainer wherein the operation of an airplane engine is simulated, a source of current, a control conductor, means for simulating the production of the manifold pressure of the simulated engine, means for simulating the speed of rotation of the simulated engine, means for deriving a potential from said source which varies with the manifold pressure and with the speed of rotation of the simulated engine and for applying it to said conductor, a potentiometer for deriving a potential from said source which varies in accordance with the altitude at which a simulated flight is being conducted and for applying it to said conductor, means effective in response to the simulated starting of said engine for enabling said potentials to be derived, a balancing potentiometer for deriving a potential from said source and for applying it to said conductor, a motor responsive to an unbalanced potential position on said conductor for adjusting said balancing potentiometer until the sum of the potentials applied to said conductor becomes zero, means operated by said motor for introducing integration factors into other motor control circuit networks in the trainer in accordance with the brake horsepower output of the simulated engine, a flight engineer's station, a supercharger blower speed control simulation switch at said station, and means responsive to the operation of said switch from its low speed position to its high speed position for causing a reduction in said first potential applied to said conductor, whereupon said motor is caused to reduce said integration factors indicative of a reduction in the brake horsepower output of said engine incident to the fact that more power from the engine is required to drive the supercharger blower at the higher speed.

58. In an aircraft trainer wherein the operation of an airplane engine is simulated, a source of current, a control conductor, means for simulating the production of the manifold pressure of the simulated engine, means for simulating the speed of rotation of the simulated engine, means for deriving a potential from said source which varies with the manifold pressure, a first potentiometer for modifying said potential in accordance with the speed of rotation of the simulated engine and for applying it to said conductor, a potentiometer for deriving a potential from said source which varies in accordance with the altitude at which a simulated flight is being conducted and for applying it to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means operated by said motor for introducing integration factors into other motor control circuit networks in the trainer in accordance with the brake horsepower output of the engine, a flight engineer's station, a supercharger blower speed control simulation switch at said station, a resistance network associated with said first potentiometer and a relay operative in response to the operation of said switch to its high speed position for altering the association of said resistance network with said first potentiometer whereupon said motor is controlled to cause said integration factors to increase as the engine speed increases until the engine speed reaches a specified amount and then to decrease as the engine speed further increases.

59. In an aircraft trainer wherein the operation of an airplane engine is simulated, a motor, means operated thereby to introduce integration factors into motor control circuit networks of the trainer in accordance with the speed of rotation of the simulated engine, a control conductor for said motor, a source of two-phase alternating current, a balancing potentiometer operable by said motor for deriving a balancing potential of one phase from said source and for applying it to said conductor, a pilot's station, a relay controlled from said station in the simulation of the change of the control of the pitch of the propeller driven by the simulated engine from automatic to manual, means operable prior to the operation of said relay and while the propeller is assumed to be operating under automatic pitch control for deriving a potential from said source equal and opposite in phase to said balancing potential and means effective upon the operation of said relay to simulate the change in the control of the propeller pitch from automatic to manual to apply said oppositely phased potential to said control conductor, whereby said motor is held inoperative at the instant of changeover and consequently causes no change in said integration factors.

60. In an aircraft trainer wherein the operation of an airplane engine is simulated, a first motor, means operated thereby to introduce integration factors into motor-control circuit networks of the trainer in accordance with the speed of rotation of the simulated engine, a first control conductor for said motor, a source of two-phase alternating current, a balancing potentiometer operable by said motor for deriving a balancing potential of one phase from said source, a second control conductor, a potentiometer for deriving a potential of the opposite phase from said source commensurate with the simulated adjustment of the pitch of the blades of the propeller driven by the simulated engine, a potentiometer for modifying said latter potential in accordance with the manifold pressure of the simulated engine, a potentiometer for further modifying said latter potential in accordance with the true air speed of the simulated flight, a balancing potentiometer for further modifying said latter potential, a pilot's station, a switch at said station for simulating the change of the control of said propeller pitch from automatic to manual, a relay responsive to said switch, means effective in response to the starting of the simulated engine and with said relay unoperated to apply said potential to said second conductor, and a motor responsive to an unbalanced potential condition on said second conductor for adjusting said latter balancing potentiometer until the potentials applied to said second conductor become equal, said relay being effective upon its operation to disconnect said potentials from said second control conductor and to apply said latter potential to said first control conductor whereby said first motor is held inoperative at the instant of change-over and consequently causes no change in said integration factors.

61. In an aircraft trainer wherein the operation of an airplane engine is simulated, a source of current, a control conductor, a potentiometer for deriving a potential from said control commensurate with the altitude at which a simulated flight is being conducted, means effective prior to the starting of the simulated engine and prior to the establishment of an air-borne condition of said flight for applying said potential to said conductor, a balacing potentiometer for deriving a potential from said source and for applying it to said conductor, a motor responsive to an unbalanced potential condition on said conductor for adjusting said balancing potentiometer until the sum of the potentials applied to said conductor becomes zero, means operated by said motor for introducing integration factors into other motor control circuit networks of the trainer commensurate with the manifold pressure of the simulated engine, an instructor's desk, crew stations in the trainer, and indicators at said desk and at said stations controlled by said motor to indicate the simulated manifold pressure, which prior to the starting of the engine and prior to the initiation of flight will be the barometric pressure at the takeoff level.

62. In an aircraft trainer wherein the operation of an airplane engine is simulated, a source of current, a control conductor, a potentiometer for deriving a potential from said source commensurate with the altitude at which a simulated flight is being conducted, means effective after the initiation of flight and with the speed of rotation of the simulated engine at zero, the condition which would exist with the propeller blades of a disabled engine feathered while the airplane is still in flight, for applying said potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means operated by said motor for introducing integration factors into other motor control circuit networks of the trainer commensurate with the manifold pressure, an instructor's desk, crew stations in said trainer, and indicators at said desk and at said stations controlled by said motor to indicate the simulated manifold pressure, which with the engine not running and with the airplane in flight, will be the barometric pressure at the altitude of the simulated flight.

63. In an aircraft trainer for simulating the operation of an airplane engine, a source of current, a control conductor, a pilot's station in said trainer, a simulated engine throttle controllable therefrom, a rheostat operable by said throttle for deriving a potential from said source commensurate with the degree of throttle opening, means effective in response to the simulated starting of an airplane engine and prior to the running of the engine under its own power for applying said potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means operated by said motor for introducing integration factors into other motor control circuit networks of the trainer commensurate with the manifold pressure of the simulated engine, an instructor's desk, crew stations including said pilot's station in said trainer, and indicators controlled by said motor to indicate the simulated manifold pressure of said engine, said pressure decreasing as the throttle is opened.

64. In an aircraft trainer wherein the operation of an airplane engine is simulated, a source of current, a control conductor, means effective prior to the starting of the simulated engine for applying a potential from said source to said conductor, a balancing potentiometer for deriving a potential from said source and for applying it to said conductor, a motor responsive to an unbalanced potential condition on said conductor for adjusting said potentiometer until the sum of the potentials applied to said conductor becomes zero, means operated by said motor for introducing integration factors into other motor control circuit networks of the trainer commensurate with the simulated manifold pressure of the simulated engine, an instructor's desk, crew stations in said trainer, indicators at said desk and at said stations controlled by said motor to indicate the simulated manifold pressure of the engine, which with the engine not running and the flight not initiated will be the takeoff level barometric pressure, a simulated engine control throttle operable from the pilot's station, a rheostat controlled thereby for deriving a potential from said source which varies with the throttle opening, and means operable in response to the starting of the simulated engine for disconnecting said first potential from said conductor and for connecting said latter potential thereto whereby said motor is controlled to cause said means to vary in accordance with the throttle opening and to cause said indicators to change their readings in accordance with the throttle opening.

65. In an aircraft trainer wherein the operation of an airplane engine is simulated, a source of current, a control conductor, an instructor's desk, a pilot's station, a simulated engine throttle controlled from said station, means operable by said throttle for deriving a potential from said source which varies with the throttle opening, a potentiometer for modifying said derived potential in accordance with the altitude at which a simulated flight is being conducted, a potentiometer for further modifying said potential in accordance with the speed of rotation of the simulated engine, means for further modifying said potential in accordance with whether the low or high speed operation of a supercharger blower is being simulated and for applying said modified potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means operated by said motor for introducing integration factors into other motor control circuit networks of the trainer commensurate with the manifold pressure of the simulated engine, and instruments at said desk and at crew stations in said trainer controlled by said motor for indicating the simulated manifold pressure of the simulated engine if said engine is running under its own power.

66. In an aircraft trainer wherein the operation of an airplane engine is simulated, a source of current, a control conductor, an instructor's desk, a pilot's station, a simulated engine throttle controlled from said station, means operable by said throttle for deriving a potential from said source which varies with the throttle opening, means for modifying said potential in accordance with the altitude at which a simulated flight is being conducted, in accordance with the speed of rotation of the simulated engine and in accordance with the simulated supercharger blower speed, a rheostat at said desk for further modifying said potential and for applying it to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means controlled by said motor for introducing integration factors into other motor control circuit networks in the trainer commensurate with the manifold pressure of the simulated engine, and indicators at said desk and at said station controlled by said motor for indicating the simulated manifold pressure of the simulated engine, said instructor controlled rheostat being operable to vary the manifold pressure indications and integration factors at will.

67. In an aircraft trainer wherein the operation of an airplane engine is simulated, a source of current, a control conductor, an instructor's desk, a pilot's station, a simulated engine throttle controllable from said station, means operable by said throttle for deriving a potential from said source which varies with the throttle opening, means for modifying said potential in accordance with the altitude at which a simulated flight is being conducted, in accordance with the speed of rotation of the simulated engine and in accordance with the simulated supercharger blower speed, means operative in response to the starting of said engine but while the airplane is in flight to apply said potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means controlled by said motor for introducing integration factors into other motor control circuit networks in the trainer commensurate with the manifold pressure of the simulated engine, indicators at said desk and crew stations in said trainer controlled by said motor for indicating the simulated manifold pressure of the simulated engine, a potentiometer for deriving a potential from said source commensurate with the altitude at which the flight is being conducted, and means operated in response to the simulated feathering of the blades of the propeller driven by the engine and the consequent reduction of the speed of the engine to zero for disconnecting said first potential from said conductor and for connecting said latter potential thereto, whereupon said motor controls said integration factor introducing means and said indicators in accordance with a reduction of the manifold pressure to the barometic pressure at the altitude of flight.

68. In an aircraft trainer wherein the operation of an airplane engine is simulated, a source of current, a control conductor, an instructor's desk, pilot's and flight engineer's stations in said trainer, a simulated engine throttle controllable from said pilot's station, means operable by said throttle for deriving a potential from said source which varies with the throttle opening, a first potentiometer for modifying said potential in accordance with the altitude at which the simulated flight is being conducted, a second potentiometer for further modifying said potential in accordance with the simulated speed of rotation of said engine and for applying said potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means controlled by said motor for introducing integration factors into other motor control circuit networks in the trainer commensurate with the manifold pressure of the simulated engine, indicators at said desk and at said stations controlled by said motor for indicating the simulated manifold pressure of said engine, a supercharger blower speed control simulating switch at said flight engineer's station, and a relay operable when said switch is operated to its high speed position for enabling said second potentiometer to vary said first potential at a faster rate in accordance with the engine speed, whereupon said motor controls said integration factor introducing means and said indicators indicative of an increase in manifold pressure.

69. In an aircraft trainer wherein the operation of an airplane engine is simulated, a source of current, a control conductor, an instructor's desk, pilot's and flight engineer's stations in said trainer, a simulated engine throttle controllable from said pilot's station, means operable by said throttle for deriving a potential from said source which varies with the throttle opening, a first potentiometer for modifying said potential in accordance with the altitude at which a simulated flight is being conducted, a second potentiometer for further modifying said potential in accordance with the speed of rotation of said engine and for applying said potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means controlled by said motor for introducing integration factors into other motor control circuit networks of the trainer which vary with the manifold pressure of the simulated engine, indicators at said desk and at said stations controlled by said motor for indicating the simulated manifold pressure of said engine, a supercharger blower speed control simulating switch at said flight engineer's station, a resistance network associated with said second potentiometer and a relay operable when said switch is operated to its high speed position for changing the association of said resistance network and said second potentiometer with said control conductor and for establishing a resistance shunt of the leading half of the winding of said second potentiometer whereby said first potential is first varied at one increased rate and then at a greater rate as the engine speed increases whereupon said motor controls said integration factor introducing means and said indicators indicative of an increase in manifold pressure.

70. In an aircraft trainer, a flight engineer's station and a pilot's station, an instructor's desk, a bank of low fuel lamps at each of said stations and at said desk, each of said banks having a lamp corresponding to each of the fuel tanks of the airplane which the trainer simulates, fuel quantity control simulating switches at said instructor's desk corresponding respectively to said fuel tanks and circuits established upon the operation of said switches to positions simulating the condition in which the tanks which they simulate are less than a certain percentage full for lighting the low fuel lamps in said banks corresponding to said tanks.

71. In an aircraft trainer, a flight engineer's station, an instructor's desk, a source of current, fuel quantity control simulating switches at said instructor's desk corresponding, respectively to the fuel tanks of the airplane which the trainer simulates, each of said switches having a potentiometer operable thereby, a simulated fuel quantity indicator at said station and a selector switch associated therewith for selectively connecting said indicator with said potentiometers, said indicator when selectively associated with any one of said potentiometers being operable from said source of current as the control switch with which said potentiometer is associated is moved from its tank full to its tank empty position to indicate the simulated amount of fuel in the corresponding fuel tank.

72. In an aircraft trainer, a flight engineer's station, an instructor's desk, fuel quantity control simulating switches at said instructor's desk corresponding respectively to the fuel tanks of the airplane which the trainer simulates, a switch at said station for simulating the operation of the valve which enables fuel to be supplied selectively from any one of certain of the fuel tanks to the engine of said airplane, a relay operative when said switch is set to a position simulating the selection of one of said tanks, means operable following the operation of said relay for simulating the starting of the airplane engine, and means operable in response to the movement of the control switch to a position indicative that such tank is less than a certain percentage full for releasing said relay to simulate the disabling of said engine.

73. In an aircraft trainer wherein the transfer of fuel from a storage tank to the service tank of an airplane is simulated, a flight engineer's station, a switch at said station operable to simulate the transfer of fuel from the storage tank to the service tank, a first relay responsive to the operation of said switch, an instructor's desk, a fuel quantity control switch at said desk simulating the storage tank, a fuel quantity control switch at said desk simulating the service tank, a second relay operable under the control of said first control switch until such switch is operated to a position indicative that the storage tank is nearly empty, a third relay operable under the control of said second control switch until such switch is operated to a position indicative that the service tank has less than a specified amount of fuel remaining in it, a holding circuit for said third relay controlled by said second relay for maintaining said third relay operated until said second control switch has been operated to a position indicative of the lowering of the fuel level in the service tank below a specified amount and until said first control switch has been operated to a position indicative of a substantial depletion of the fuel in the storage tank, and signals at said desk and at said station operable upon the release of said third relay to simulate the indication of the fact that the pump which is transferring fuel from the storage tank to the service tank is about to run dry.

74. In an aircraft trainer wherein the transfer of fuel from storage tanks to the service tank of an airplane is simulated, a flight engineer's station, a selector switch at said station operable to simulate the transfer of fuel from the storage tanks to the service tank, a first group of relays selectively operable by said switch, said relays corresponding respectively to the simulated storage tanks, an instructor's desk, fuel quantity control switches at said desk simulating the storage tanks, a fuel quantity control switch at said desk simulating the service tank, a second group of relays selectable for operation by the relays of said first group, said relays corresponding respectively to simulated storage tanks and a selected one of said relays being operable until the control switch corresponding to the same storage tank is operated to a position indicative that the storage tank is nearly empty, a relay operable under the control of the control switch which simulates the service tank until such switch is operated to a position indicative that the service tank has less than a specified amount of fuel remaining in it, a holding circuit for said latter relay controlled by the operated one of the relays of said second group for maintaining said latter relay operated until the control switch corresponding to the service tank has been operated to a position indicative of the lowering of the fuel level in the service tank below the specified level and until the control switch corresponding to the selected storage tank has been operated to a position indicative of a substantial depletion of the fuel in the storage tank, and signals at said desk and at said station operable upon the release of said latter relay to simulate the indication of the fact that the pump which is transferring fuel from the selected storage tank to the service tank is about to run dry and that the selector switch should be operated to select another storage tank.

75. In an aircraft trainer wherein the transfer of fuel from a storage tank to the service tank of an airplane is simulated, a flight engineer's station, a switch at said station operable to simulate the transfer of fuel from the storage tank to the service tank, a first relay responsive to the operation of said switch, an instructor's desk, a fuel quantity control switch at said desk simulating the storage tank, a fuel quantity control switch at said desk simulating the service tank, a second relay operable under the control of said first control switch until said switch is operated to a position indicative that the storage tank is nearly empty, a third relay operable under the control of said second control switch until such switch is operated to a position indicative that the service tank has less than a specified amount of fuel remaining in it, a holding circuit for said third relay controlled by said second relay for maintaining said third relay operated until said second control switch has been operated to a position indicative of the lowering of the fuel level in the service tank below the specified amount and until said first control switch has been operated to a position indicative of a substantial depletion of the fuel in the storage tank, signals at said desk and at said station operable upon the release of said third relay to simulate the indication of the fact that the pump which is transferring fuel from the storage tank to the service tank is about to run dry, means for simulating the operation of an airplane engine and a relay effective upon the release of said third relay and if the control switch which simulates the service tank is operated to a position indicative of the empty condition of said tank for controlling said latter means to simulate the disabling of the engine due to a lack of fuel.

76. In an aircraft trainer wherein the transfer of fuel from a storage tank to the service tanks which supply the engines of a multiengined airplane is simulated, a flight engineer's station, a switch at said station operable to simulate the transfer of fuel from the storage tank to the service tanks, a first relay responsive to the operation of said switch, an instructor's desk, a fuel quantity control switch at said desk simulating the storage tank, a fuel quantity control switch at said desk simulating one of said service tanks, a fuel quantity control switch at said desk simulating the other of said service tanks, a second relay operable under the control of said first control switch until said switch is operated to a position indicative that the storage tank is nearly empty, third and fourth relays operable respectively under the control of the corresponding service tank control switches, each relay being operated until the corresponding switch is operated to a position indicative that the service tank has less than a specified amount of fuel remaining in it, a holding circuit for maintaining either said third or said fourth relay operated after the corresponding service tank control switch has been operated to a position indicative of the lowering of the fuel in the service tank below the specified amount and until the storage tank control switch has been operated to a position indicative of the substantial depletion of the fuel in the storage tank, means for simulating the operation of each of the airplane engines, fuel supply relays for rendering said means operative, a cross-over switch at said station operative to simulate the operation of a cross-over valve to enable all of the engines to be supplied from the same service tank, and a relay responsive to the operation of said last switch for maintaining said fuel supply relays both operated under the control of either said third or said fourth relay until said latter relays both become released.

77. In an aircraft trainer wherein the transfer of fuel from one service tank to one engine and the transfer of fuel from another service tank to another engine of a multiengined airplane is simulated, a selector switch simulating the left engine fuel selector valve operable to a service position or to a drain position, a selector switch simulating a right engine fuel selector valve operable to a service position or to a drain position, a defuel switch for simulating a defueling valve, an instructor's desk, fuel quantity control simulating switches at said desk, one of said switches simulating one of the service tanks and the other of said switches simulating the other of said service tanks, means for simulating the operation of each of the airplane engines, fuel supply relays for rendering said means operative, and means operative to maintain both said relays operated when one of said selector switches is operated to its service position, the other of said selector switches is operated to its drain position and said defuel switch is operated until the control switch corresponding to the service tank, the draining of which is being simulated by the operation of the corresponding selector switch to the drain position, has been operated to a position indicative that the service tank is substantially empty.

78. In an aircraft trainer wherein the transfer of fuel from a storage tank to both engines of a multiengined airplane is simulated, a selector switch simulating the left engine fuel selector valve operable to a storage tank service position or to a drain position, a selector switch simulating a right engine fuel selector valve operable to a storage service position or to a drain position, a defuel switch for simulating a defueling valve, an instructor's desk, a fuel quantity control switch at said desk simulating the storage tank, means for simulating the operation of each of the airplane engines, fuel supply relays for rendering said means operative and means operated to maintain both of said relays operated when one of said selector switches is operated to its storage tank service position, the other selector switch is operated to its drain position and said defuel switch is operated until the storage tank control switch at said desk is operated to a position indicative that the storage tank is substantially empty.

79. In an aircraft trainer wherein the transfer of fuel from a bomb bay service tank to the engine of an airplane is simulated, a selector switch for simulating the transfer of fuel from the bomb bay tank to the engine, a first relay responsive to the operation of said switch, an instructor's desk, a fuel quantity control switch at said desk for simulating a bomb bay tank, means for simulating the operation of an airplane engine, a fuel supply relay for rendering said means effective and a circuit controlled by said first relay for maintaining said fuel supply relay operated until said control switch is operated to a position indicative that the bomb bay tank is substantially empty.

80. In an aircraft trainer wherein the transfer of fuel from a plurality of service tanks to the engine of an airplane is simulated, a selector switch operable into any one of a plurality of positions for simulating the transfer of fuel from a wing tank, a bomb bay tank or a fuselage storage tank to the engine, relays selectively operable in the different selection positions of said switch, an instructor's desk, fuel quantity control switches at said desk for simulating said tanks, means for simulating the operation of an airplane engine, a fuel supply relay for rendering said means effective, and a circuit controlled by any operated one of said first relays for maintaining said fuel supply relay operated until the control switch corresponding to the tank selected for service is operated to a position indicative that the selected tank is substantially empty.

81. In an aircraft trainer wherein the starting of an airplane engine is simulated, a pilot's station, an engine ignition simulating key at said pilot's station, first means controlled by said ignition key for indicating the operation of same, a flight engineer's station, an engine starter simulating key at said flight engineer's station, second means controlled by said starter key for indicating the operation of same, a fuel selector valve simulating switch at said flight engineer's station, third means controlled by said switch for indicating the operation of same, means including said previously-mentioned means responsive to the operation of said keys and said switch for simulating the running of an airplane engine incident to starter operation, an instructor's desk, an engine disabling simulating key at said desk, and means controlled by the operation of said disabling key for controlling said running simulating means to indicate the disabling of the engine.

82. In an aircraft trainer wherein the starting of an airplane engine is simulated, a pilot's station, an engine ignition simulating key at said pilot's station, first means controlled by said ignition key for indicating the operation of same, a flight engineer's station, an engine starter simulating key at said flight engineer's station, second means controlled by said starter key for indicating the operation of same, a fuel selector valve simulating switch at said flight engineer's station, third means controlled by said switch for indicating the operation of same, means including said previously-mentioned means responsive to the operation of said keys and said switch for simulating the running of an airplane engine incident to starter operation, a main ignition simulating switch at said pilot's station, and means controlled by the operation of said main ignition switch for simulating the cutting off of the ignition from the engine whereby said running simulating means is controlled to indicate the disabling of the engine.

JOSEPH J. LUKACS.
WALTER B. STRICKLER.

REFERENCES CITED

The following references are of record in the file of this patent:

UNITED STATES PATENTS

| Number | Name | Date |
|---|---|---|
| 1,723,168 | Huess | Aug. 6, 1929 |
| 1,960,350 | Shackleton | May 29, 1934 |
| 1,968,836 | Karnes | Aug. 7, 1934 |
| 2,094,397 | Cortez | Sept. 28, 1937 |
| 2,099,857 | Link | Nov. 23, 1937 |
| 2,164,412 | Koster | July 4, 1939 |
| 2,218,546 | Muller | Oct. 22, 1940 |
| 2,327,997 | Carmody | Aug. 31, 1943 |
| 2,332,475 | Sorensen | Oct. 19, 1943 |
| 2,346,838 | Haight | Apr. 18, 1944 |
| 2,364,539 | Link | Dec. 5, 1944 |
| 2,366,603 | Dehmel | Jan. 2, 1945 |
| 2,372,741 | Roberts | Apr. 3, 1945 |
| 2,428,767 | Albert | Oct. 14, 1947 |
| 2,439,168 | Kail | Apr. 6, 1948 |
| 2,442,205 | Kail | May 25, 1948 |

FOREIGN PATENTS

| Number | Country | Date |
|---|---|---|
| 396,538 | Great Britain | 1933 |

OTHER REFERENCES

Robot Engine-Tutor, Aviation Magazine, August 1944, pp. 195, 270–273.